(12) United States Patent
Hunt et al.

(10) Patent No.: US 8,761,465 B2
(45) Date of Patent: Jun. 24, 2014

(54) CENTROID PROCESSING

(75) Inventors: Brandon T. Hunt, Bellevue, WA (US); Ernst S. Henle, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 564 days.

(21) Appl. No.: 12/726,927

(22) Filed: Mar. 18, 2010

(65) Prior Publication Data
US 2010/0239139 A1 Sep. 23, 2010

Related U.S. Application Data

(60) Provisional application No. 61/161,380, filed on Mar. 18, 2009, provisional application No. 61/219,293, filed on Jun. 22, 2009.

(51) Int. Cl.
*G06K 9/00* (2006.01)
(52) U.S. Cl.
USPC .............................................. 382/128; 705/3
(58) Field of Classification Search
USPC .......................................................... 382/128
See application file for complete search history.

(56) References Cited

U.S. PATENT DOCUMENTS

| 7,072,773 B2 | 7/2006 | Plumb et al. |
| 7,343,046 B2 | 3/2008 | Curry et al. |
| 7,645,984 B2 | 1/2010 | Gorenstein et al. |
| 2006/0151688 A1 | 7/2006 | Castro-Perez et al. |
| 2007/0211928 A1* | 9/2007 | Weng et al. ................. 382/128 |
| 2008/0272292 A1 | 11/2008 | Geromanos et al. |

OTHER PUBLICATIONS

Leptos, "MapQuant: Open-Source Software for Large-Scale Protein Quantification," http://arep.med.harvard.edu/pdf/Leptos06.pdf, Proteomics Journal, 2006.
Codrea, "Robust Peak Detection and Alignment of nano LC-FT Mass Spectrometry Data," http://www.cs.ru.nl/~elenam/evobio07_codrea.pdf, The Fifth European Conference on Evolutionary Computation, Machine Learning and Datamining in Bioinformatics. Springer, *LNCS* 4447, 2007, pp. 35-46.

* cited by examiner

*Primary Examiner* — Hiep V Nguyen
(74) *Attorney, Agent, or Firm* — Damon Rieth; Jim Ross; Micky Minhas

(57) ABSTRACT

Hardware and software components are configured to image-process centroid data as if they were profile data to discover biological features. Proper mass/charge bin size are determined to raster centroid data into LC/MS images. To correct for the decrease in precision, the LC/MS images are re-evaluated in view of the original centroid data. Peak detection from the binned image is refined by re-considering the corresponding centroid data through cluster analysis. Additionally, some peaks that were merged through processing may be resolved into individual peaks by identifying more than one significant cluster masked by a peak from the binned image.

20 Claims, 105 Drawing Sheets

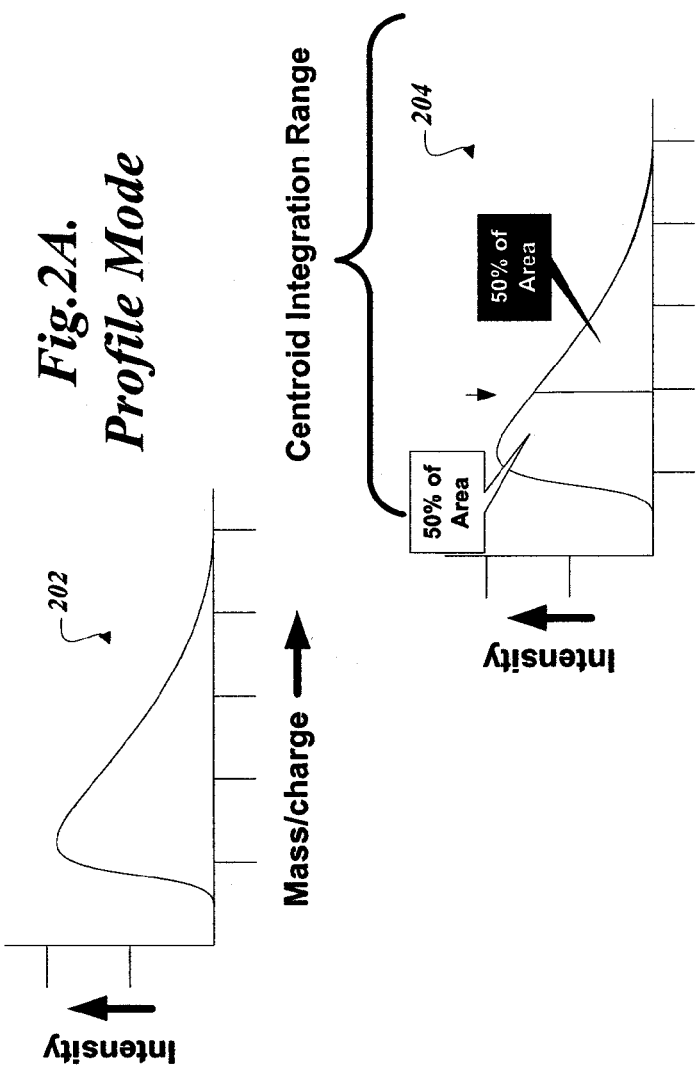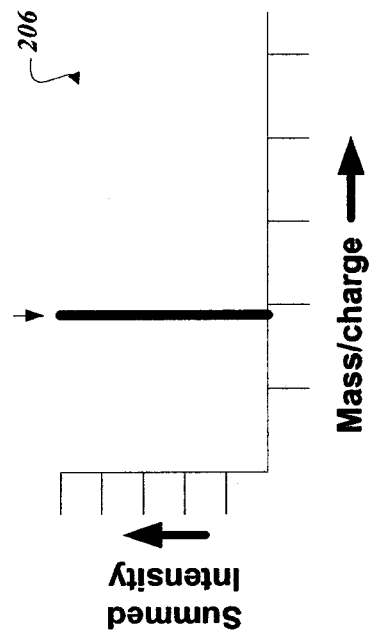
Fig. 2A. Profile Mode
Fig. 2B. Profile Mode
Fig. 2C. Centroid Mode

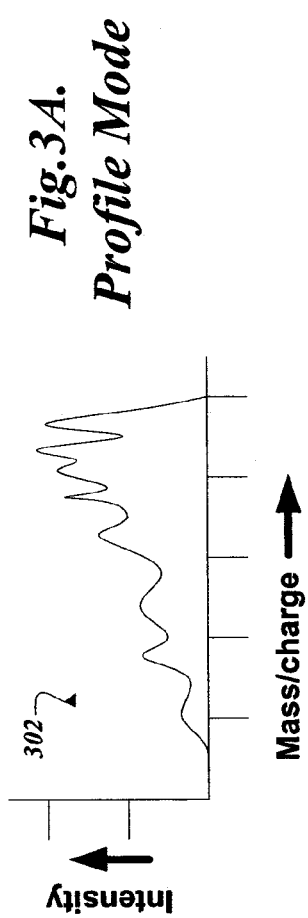
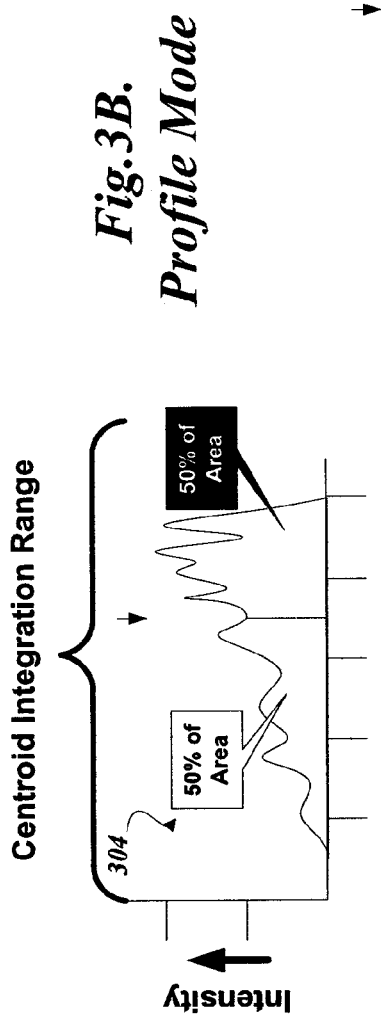
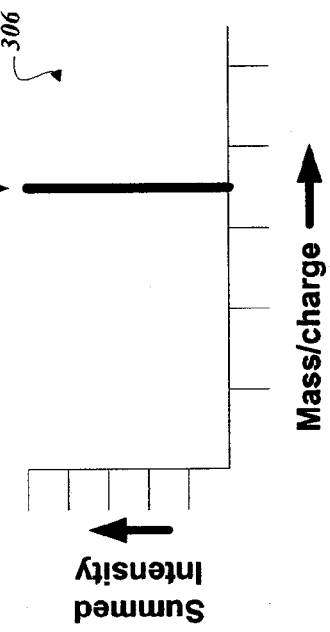
Fig.3A. Profile Mode
Fig.3B. Profile Mode
Fig.3C. Centroid Mode

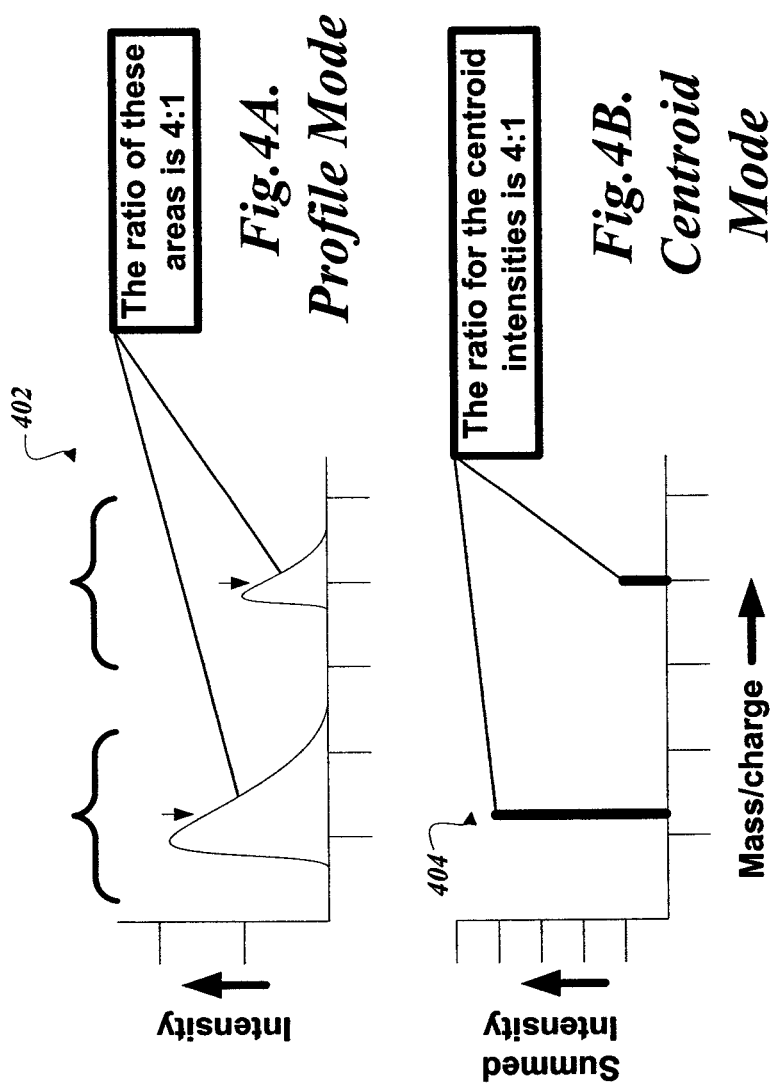
Fig. 4A. Profile Mode
Fig. 4B. Centroid Mode

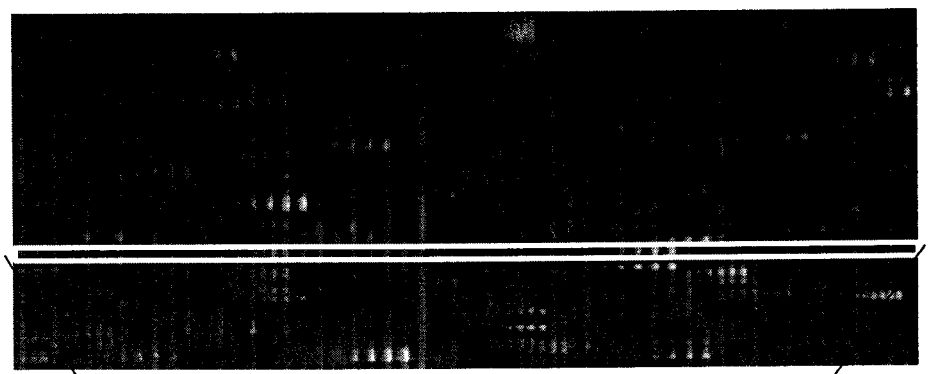
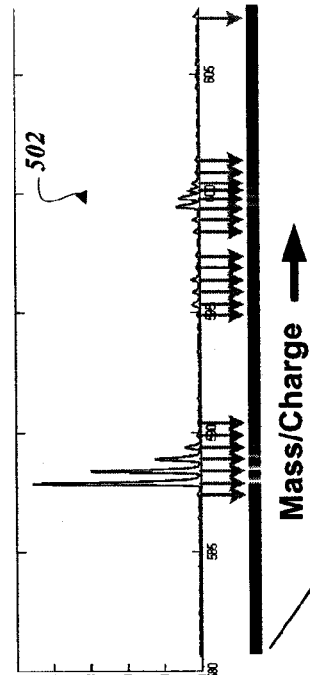
Fig. 5A.
Fig. 5B.

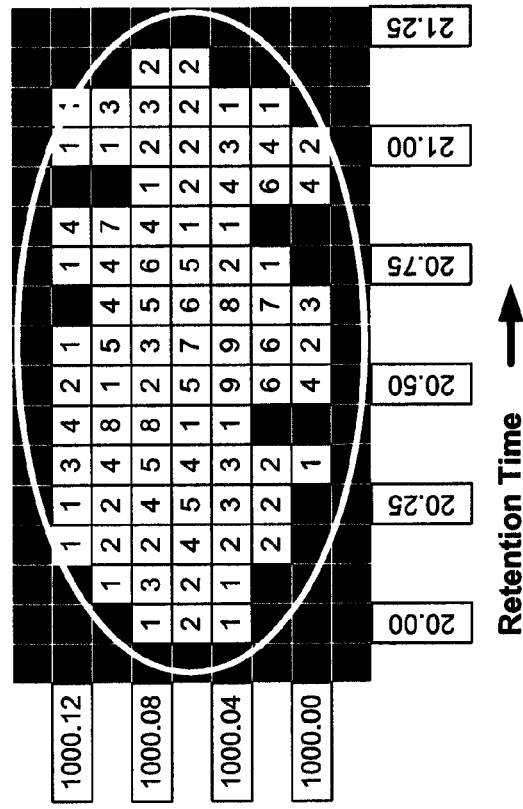
*Fig. 5D1.*
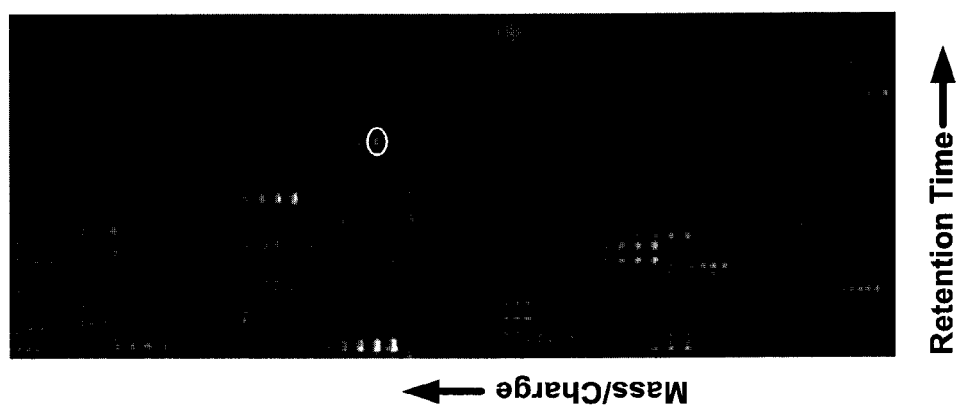
*Fig. 5C.*

Fig 5D2.

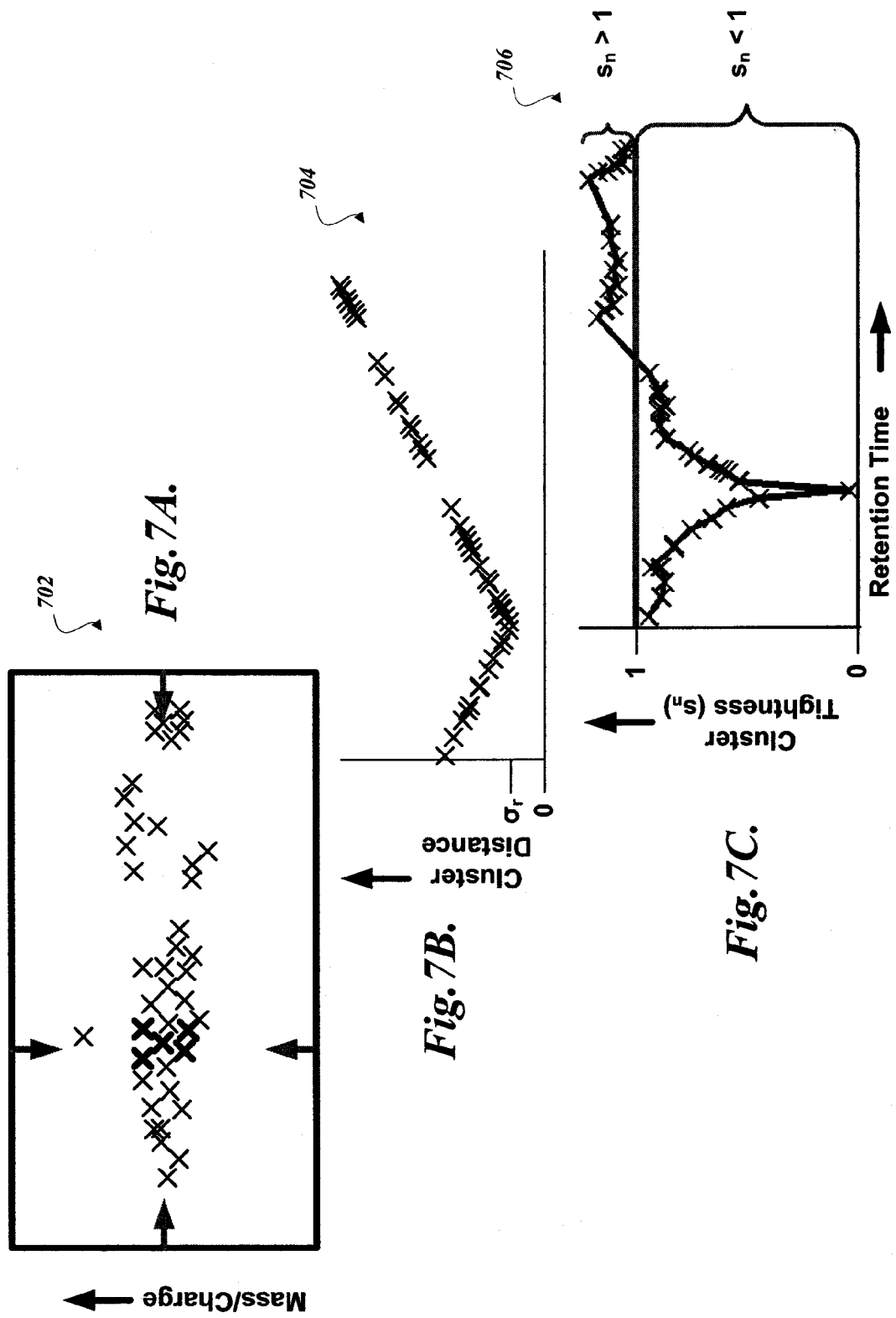

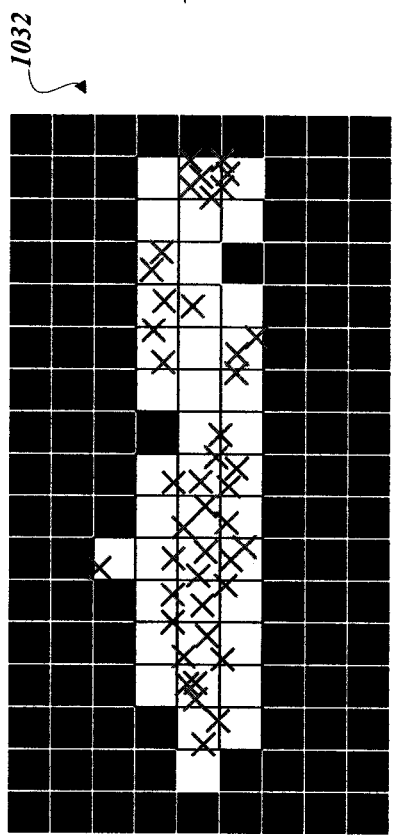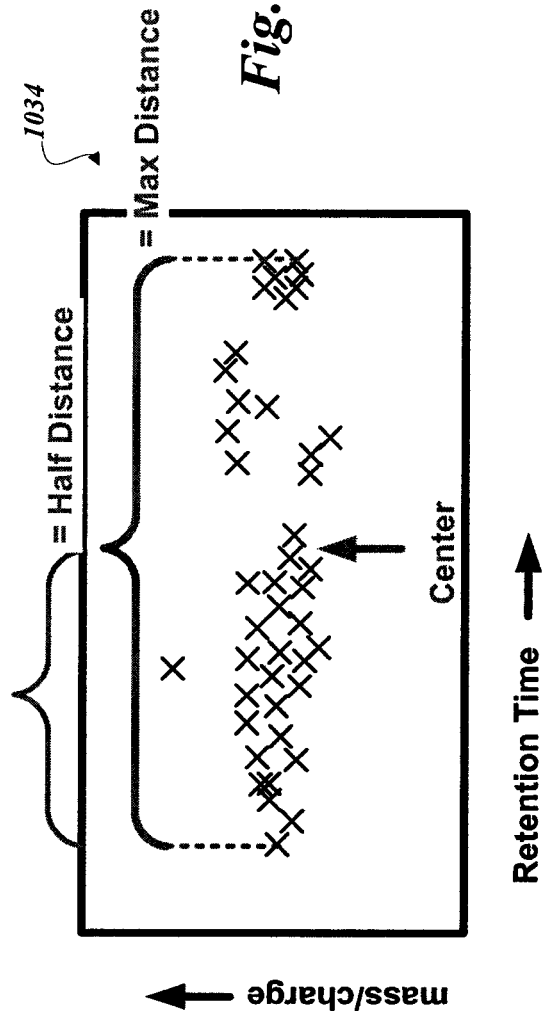

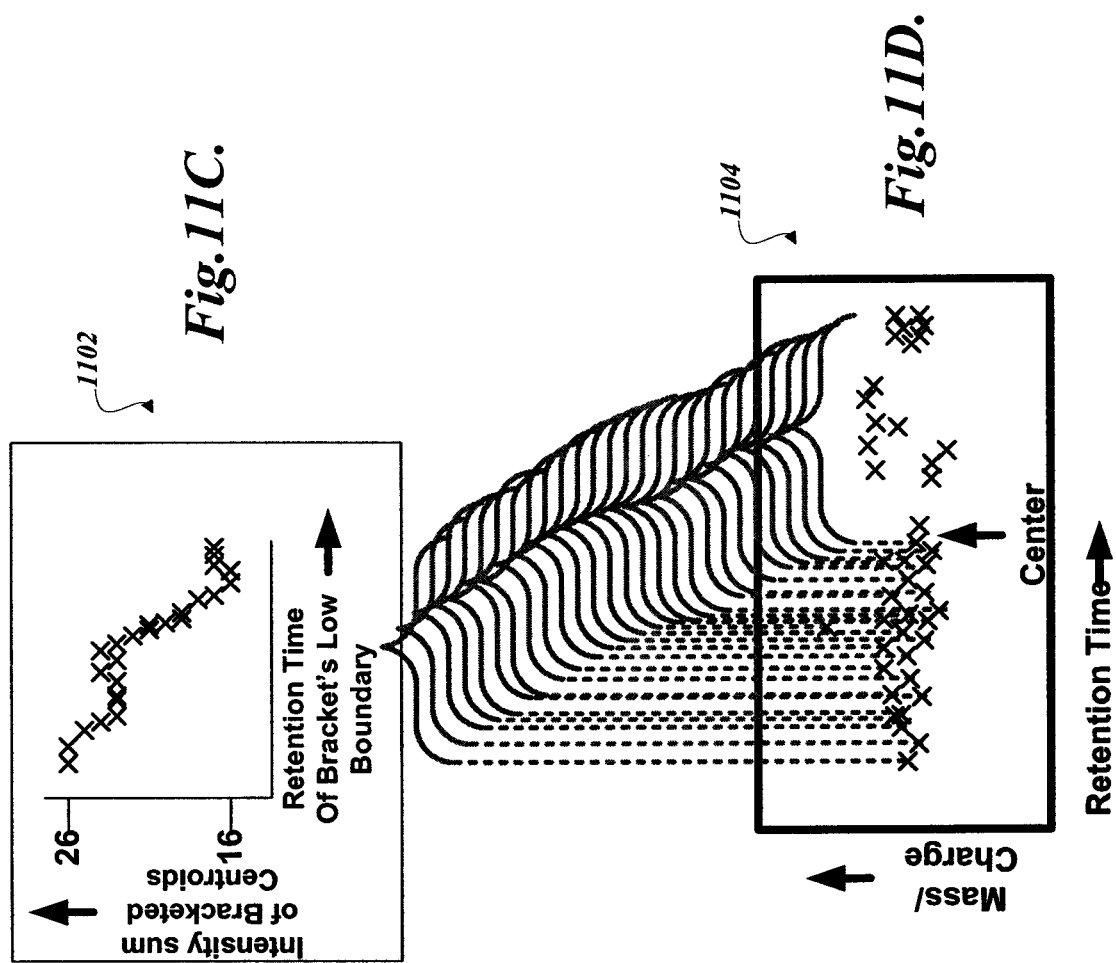

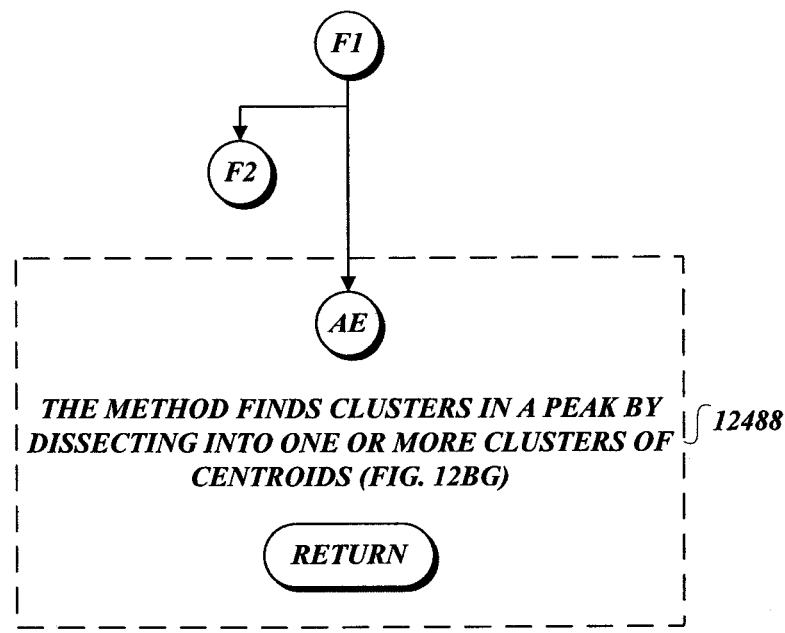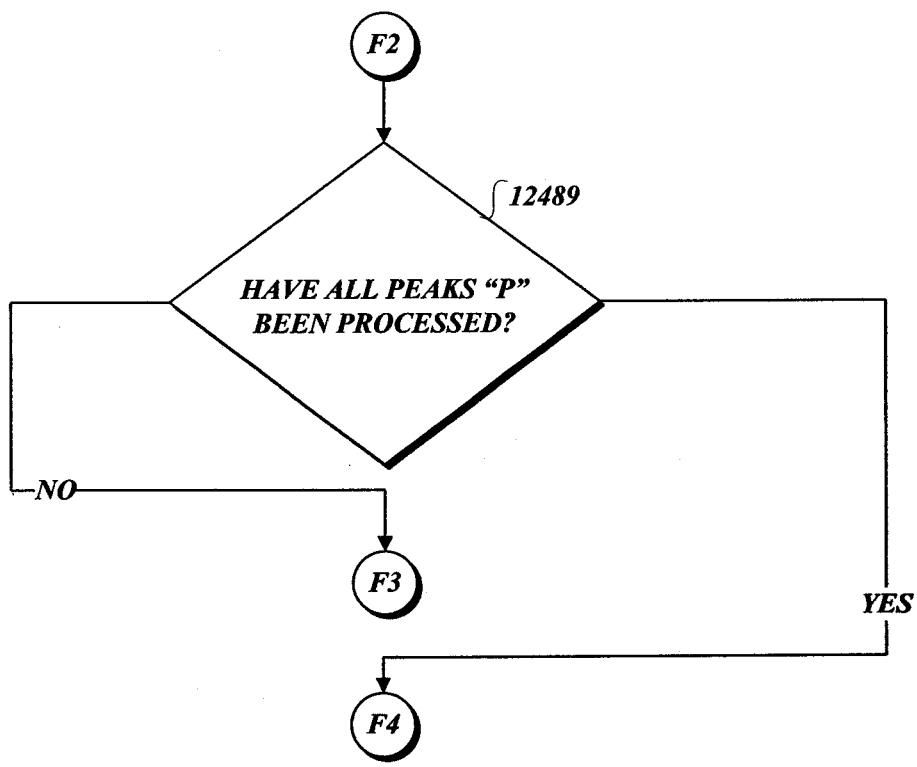
Fig.12BE.

Retention Time →

CENTROID PROCESSING

CROSS-REFERENCE TO RELATED APPLICATIONS

This application claims the benefit of U.S. Provisional Patent Application Nos. 61/161,380, filed Mar. 18, 2009 and 61/219,293, filed Jun. 22, 2009, both of which are incorporated herein by reference.

BACKGROUND

A mass spectrometer is a scientific device that converts molecules of a biological substance into ions and then separates the ions according to their mass-to-charge ratio. In some mass spectrometers, the mass spectrum of the substance is provided in raw, analog form (profile data) to computational devices that help scientists discover biological features of interest. Profile data naturally form contiguous areas that facilitate image processing. However, the massive amount of raw, analog data that is produced sometimes hinders computational analysis that enables detection of biological features of interest. Modern mass spectrometers compress the raw, analog form to produce an abbreviated, digital form (centroid data). Centroid data do not naturally form contiguous areas, hence frustrating detection of biological features of interest to scientists.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

One aspect of the present subject matter includes a system, which comprises a centroid rasterizer configured to receive original centroid data to form LC/MS images by determining a centroid integration range and centroid mass/charge uncertainty to formulate mass/charge bin widths to create the LC/MS images. The system further comprises an image processor configured to receive and merge the LC/MS images to form a merged image representing a scientific experiment, the image processor further configured to segment the merged image in preparation for peak reassembly.

Another aspect of the present subject matter includes a method for producing LC/MS images from centroid data, which comprises deriving a bin width rate of change from a centroid integration rate of change and a mass/charge uncertainty rate of change so as to calculate mass/charge values for each raster gradation suitably used to construct an LC/MS image based on original centroid data. The method further comprises performing image processing of the LC/MS image by combining replicates of an experimental condition to produce condition images, combining condition images to produce a merged image of an experiment, and segmenting the merged image in preparation for reassembly.

A further aspect of the present subject matter includes a computer-readable medium having stored thereon computer-executable instructions which when executed implement a method for producing LC/MS images from centroid data. The computer-readable medium comprises deriving a bin width rate of change from a centroid integration rate of change and a mass/charge uncertainty rate of change so as to calculate mass/charge values for each raster gradation suitably used to construct an LC/MS image based on original centroid data. The computer-readable medium further comprises performing image processing of the LC/MS image by combining replicates of an experimental condition to produce condition images, combining condition images to produce a merged image of an experiment, and segmenting the merged image in preparation for reassembly.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 2A-2C are pictorial diagrams illustrating profile data and centroid data;

FIGS. 3A-3C are pictorial diagrams illustrating profile data and centroid data;

FIGS. 4A-4B are pictorial diagrams illustrating profile data and centroid data;

FIGS. 5A-5B are pictorial diagrams illustrating a raster line and an LC/MS image based on profile information; FIGS. 5C-5D are pictorial diagrams illustrating a spot of an isotope peak; FIGS. 5D-5E are pictorial diagrams illustrating exemplary calculation of centroid data based on profile data.

FIGS. 7A-7C are pictorial diagrams illustrating exemplary calculations to cluster centroids;

FIGS. 11A-11B are pictorial diagrams illustrating an exemplary mask and exemplary distribution of centroids revealed by the exemplary mask; FIGS. 11C-11D are pictorial diagrams illustrating exemplary clusters of centroids.

FIG. 14A illustrates a section of the mask, FIG. 14B illustrates the section after a morphological closing to connect related centroids, and FIG. 14C illustrates the section after a morphological opening to remove isolated noise.

DETAILED DESCRIPTION

Figure 1:
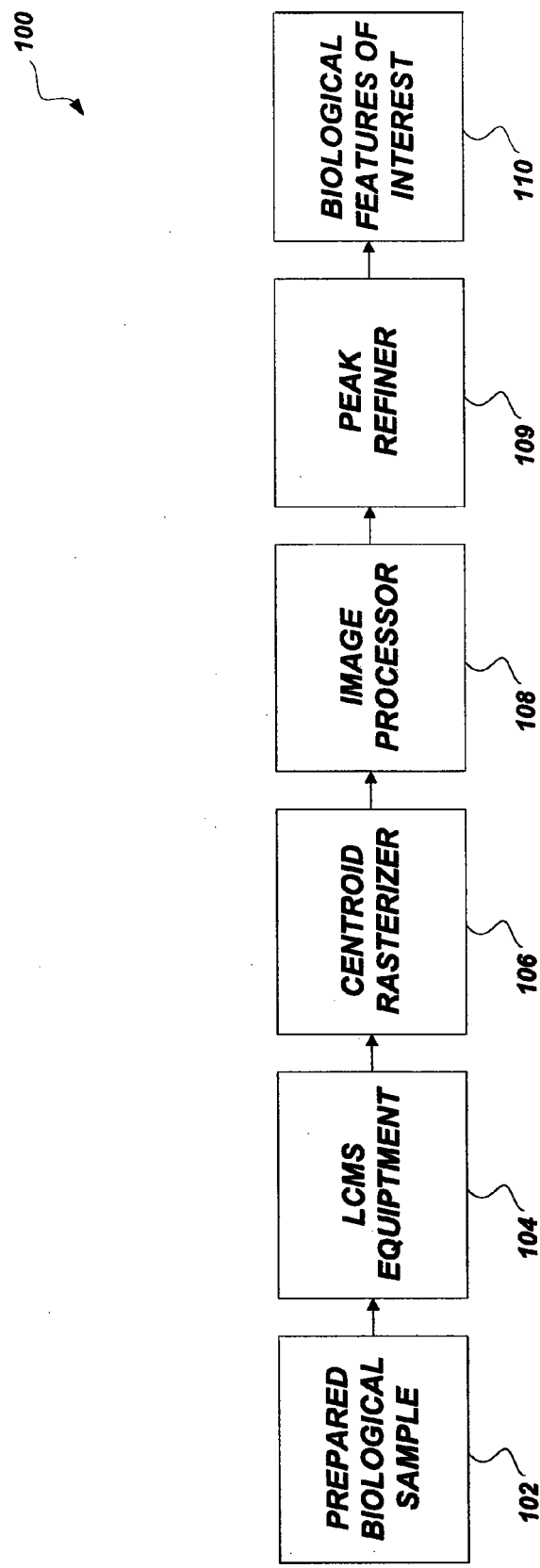
FIG. 1 is a block diagram illustrating an exemplary system for creating LC/MS images from centroid data to discover biological features.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

Mass spectrometry can be coupled with other separation techniques such as liquid chromatography, gel electrophoresis, gas chromatography, and ion diffusion. Data obtained by combinations of such techniques can be represented as n-dimensional data sets. For example, a chromatographic retention time and a mass-to-charge ratio of a mass spectrum can be used as coordinates of first and second axes. Signal intensities associated with these coordinates can be represented as a two-dimensional array of data values, and such data can be referred to as images or image data.

Mass spectrometry and liquid chromatography are two important separation techniques that can be applied to the evaluation of biological samples, and LC/MS data sets (referred to herein as images or image data) are used in the following description, but other types of data can be used. Typical biological specimens include mixtures of proteins, carbohydrates, lipids, and metabolites, but other chemical or biological specimens can be similarly investigated, and the disclosed methods and apparatus can be applied to non-biological specimens as well.

Some examples of the disclosed methods and apparatus pertain to pharmaceutical research. Pharmaceutical medical research is often directed to determining biological chemicals that are an indicator of a physiological state, such as a disease state or a response to treatment with a medication. A set of one or more of such chemicals is called a biomarker. Biomarkers may be used to diagnose disease or other physiological states. Biomarkers can be used in a laboratory as substitutes for clinical endpoints, and such biomarkers are referred to as surrogate endpoints. Surrogate endpoints may be used to develop medicines without involving human or even animal subjects. Drug development may begin by testing for a surrogate endpoint in a test tube.

A common scenario is to process a biological specimen such as a biopsy specimen, blood, saliva, amniotic fluid, etc such that the complex chemical mixture associated with the specimen can be introduced into liquid chromatography/mass spectrometry instruments. The resulting data (signal intensity as a function of retention time and m/z ratio) is then used to identify the biochemicals in this complex mixture. The disclosed methods and apparatus can facilitate identification of the more biologically relevant data by processing data to more clearly reveal any features of interest.

Processing analytical data as disclosed provides superior isolation and identification and better quantification of chemicals in a complex mixture. A researcher can repeat this analysis process for healthy and diseased subjects and/or for untreated and treated subjects. Based on differences in chemicals constituents between a healthy and a diseased subject or between a treated and treated subject identified in this manner, a biomarker can be defined. In some cases, this biomarker can serve as a surrogate endpoint for use a substitute for a clinical endpoint. Such biomarkers may be used as diagnostic and treatment indicators in drug development.

Representative embodiments are described herein with respect to images based on liquid chromatography (LC) and mass spectrometry (MS). Typically, signal intensity is recorded as a function of LC retention time and MS mass-to-charge ratio (m/z), and this recorded signal intensity can be stored or processed as an image data array. For convenience herein, retention time is generally arranged along a horizontal (x-axis) and m/z is arranged along a vertical (y-axis). In other examples, other types of data are used instead of or in addition to LC retention time or m/z ratio. For example, gas chromatography (GC), ion spectroscopy, gel electrophoresis, ion diffusion, or mass spectroscopy time-of-flight data can be used.

Various embodiments of the present subject matter facilitate image processing of biological information in the form of centroid data as if the centroid data were profile data. Specifically, the embodiments of the present subject matter create LC/MS images from centroid data so that they are amenable to image processing. An LC/MS image can be formed from LC/MS data, profile or centroid, using two spatial dimensions: retention time and mass/charge. The mass spectrometer signal (ion count) is the image intensity forming the third dimension for profile data. In order to analyze centroid data, various embodiments of the present subject matter identify and interpret LC/MS images that may be useful to discover biological features. Portions of an LC/MS image that have similar retention times and mass/charge may form useful groupings, using image processing, to facilitate better interpretation of biological features. Thus, putting biological information in image forms enables image processing. As examples, the relative location of pixels in the LC/MS image indicates how their signal intensities relate among each other. Related pixels that form a contiguous spot are differentiated from background signal as a peak. Peaks may point to biological features of interest to scientists.

Prepared biological samples, which typically contains both a control sample and a treated sample from experiments under different treatment conditions, are submitted to a system 100. See FIG. 1. Each prepared biological sample 102 is submitted to LC/MS equipment 104. LC/MS equipment 104 allows biological features to be shown as isotope peaks in a continuum. The peak intensity of each isotope peak is assumed to be proportional to the relative abundance of non radioactive, stable isotopes, which are somehow associated with biological features of interest. When the LC/MS equipment 104 collects enough one dimensional mass spectrometer continua, a two dimensional profile data set is formed, with retention time being referenced as the X axis and mass/charge being referenced as the Y axis. Often, each mass/charge continuum is captured as centroid data or is translated to centroid data. These centroid data are presented to a centroid rasterizer 106 of the system 100 to create an LC/MS image. Next, the image processor 108 executes image processing techniques on the LC/MS image created from centroid data as if the LC/MS image were created from profile data. In a step 109, any peaks in the LC/MS image can be refined and biological features of interest 110 are identified to scientists running one or more experiments connected with the system 100.

Conventional LC/MS equipment 104 attempts to simplify mass spectral data and reduce data file size by translating the profile data into centroid data via one or more data compression algorithms. The resultant product of the data compression algorithms includes one or more tables of centroids for the three dimensional profile data set. Centroid data that are used to represent mass spectral peaks presents itself in terms of two parameters, the centroid (weighted center of mass/charge) and intensity. Centroid data differ from profile data. In profile data the mass spectral peak is represented as a series of data points, each with its own intensity value. In centroid data the transformed representation of this mass spectral peak includes the centroid of this series of data points and a single intensity value that represents the sum of the intensities of the data points. One side effect of using the data compression algorithms is that each centroid datum may appear to be disconnected from other centroid data, hence adding greater complexity to adduce biological features of interest 110 from the prepared biological sample 102.

The centroid rasterizer 106 is configured as either a piece of hardware or a piece of software running on the piece of hardware. The centroid rasterizer 106 produces an LC/MS image based on the centroid data. To translate centroid data into a raster (LC/MS image), the centroid rasterizer 106 determines the proper mass/charge bin widths for translating the centroid data into a raster. The integration range of centroid data may be larger than the precision of the mass spectrometer from which the centroid data was produced. Binning of centroid data at the instrument's precision may cause non-contiguity in an LC/MS image, which hinders image processing to detect biological features of interest. The mass/charge bin width for centroid data suitably is large enough to bin the centroids from the same ion in a series of successive mass spectra (scans). Therefore, centroid data suitably is binned in larger bins such that related imaged data forms a contiguous area on the LC/MS image. This means that the centroid's mass/charge binning width for an LC/MS image is suitably larger than the mass spectrometer's uncertainty.

In connection with the translation process, the centroid rasterizer 106 analyzes the centroid integration range and the centroid mass/charge uncertainty. The centroid rasterizer 106 also removes streaks along the retention time dimension that form upon binning of centroid data in the mass/charge dimension. The image processor 108 performs peak detection and peak extraction. The peak refiner 109 refines the peak extracted in image processor 108 by considering the original centroid data. The refinement is suitably performed at the sub-pixel level. The refinement reduces or corrects for the loss of precision due to image processing 108 transformations and operations, and the mass/charge binning of centroid data in centroid rasterizer 106. Furthermore, the peak refiner 109 determines the mass/charge centers and apexes of refined peaks as well as peak expression levels of the refined peaks. For merged peaks, the peak refiner 109 may re-split them to allow finer analysis of peaks. In other words, the peak refiner 109 refines the peak detection of image processor 108 through better segmentation of the data that constitutes the LC/MS image to ensure that merged peaks may be resolved into individual peaks by identifying more than one cluster originally detected.

FIG. 2A illustrates a portion of a mass spectrum in profile mode showing an isotope peak in the intensity dimension and the mass/charge dimension. A continuous waveform 202 with one maximum represents this isotope peak. FIG. 2B illustrates a waveform 204 representing the isotope peak that is similar to the waveform 202 with the center of mass being identified as a point that separates two areas of the waveform 204, each area comprising 50% of the total area of the waveform 204. The point at which the 50% of the total area of the waveform 204 is marked is the mass/charge of a centroid representing the waveform 204. FIG. 2B also illustrates the identification of the centroid integration range to determine this center of mass of the waveform 204. FIG. 2C illustrates a centroid mode that compresses the waveform 204 to a waveform 206 that comprises a centroid visually represented as a line positioned at the center of mass of the waveform 204 and the height of which equates to the integrated intensity (e.g., summed intensity) of the waveform 204.

FIG. 3A illustrates another portion of a mass spectrum in profile mode showing an isotope peak in the form of a waveform 302 in the dimensions of intensity and mass/charge. The waveform 302 comprises multiple maxima. FIG. 3B also illustrates the profile mode of a waveform 304, which is similar to the waveform 302, except that the center of mass (centroid) has been identified at a point (mass/charge) that divides the waveform 304 into two areas, each area comprising 50% of the total area of the waveform 304. FIG. 3C illustrates the centroid mode of a waveform 306, which is a compression of the waveform 304. The waveform 306 is the centroid of the waveform 304 and is located at the center of mass of the waveform 304 and whose intensity is the integrated intensity (e.g., summed intensity) of the waveform 304.

FIG. 4A illustrates two waveforms 402 representing two isotope peaks in profile mode along the intensity dimension and the mass/charge dimension. Each waveform 402 has an area, and the ratio of the areas of the two waveforms 402 is 4:1. FIG. 4B illustrates centroids 404 in centroid mode which is a compression of the waveforms 402. In other words, the waveforms 402 are reduced to the centroids 404. The centroids 404 are similar to the waveforms 402 in that the ratio for the centroid intensities is also 4:1.

Each centroid 404 has a centroid height, which is also called the centroid intensity. The centroid intensity is proportional to the ion count. The areas of the two waveforms 402 in profile mode when added together is the summed intensity, and the summed intensity is proportional to the ion count. As a matter of logic, the centroid intensity is proportional to the areas of the two waveforms 402 in profile mode. Mathematically, this relationship is presented by the following equation: $I_1/A_1=I_2/A_2$, where $I_1$ is the centroid intensity of the first isotope peak; $A_1$ is the area under the first isotope peak; $I_2$ is the centroid intensity of the second isotope peak; and $A_2$ is the area under the second isotope peak.

FIG. 5A illustrates profile data of a waveform 502 representing a mass spectrum in the intensity dimension and the mass/charge dimension. Each maximum and its proximate portions of the waveform 502 are translated onto a raster line, which correspond to the intensities of the mass spectrum. Arrows emanating from the waveform 502 and terminating on the raster line indicate some of the major maxima (isotope peaks) of the mass spectrum. The raster line is placed in the context of an LC/MS image 504 that is composed from profile data. See FIG. 5B. The raster line is emphasized by the white rectangle that frames the intensities of the pixels, which correspond to the intensities captured by the raster line of FIG. 5A, and therefore, ultimately correspond to the intensities of the mass spectrum. In other words, the raster line was rotated about 90 degrees and reduced to a width of one pixel to form a portion of the LC/MS image. Other mass spectra in addition to the mass spectrum represented by the hereinabove raster line can be added the same way to form the LC/MS image. Thus, the raster line representing one mass spectrum becomes a column in an LC/MS image. In the LC/MS image, the mass spectrum is positioned after a mass spectrum from a previous retention time and prior to the mass spectrum from a later retention time. Isotope peaks from individual mass spectra can be grouped together by their contiguity in the mass/charge and retention time dimensions. This ordered collection of mass spectra can be analyzed by image processing.

FIG. 5C illustrates an LC/MS image 506 based on profile data. An isotope peak has been identified and is emphasized by a white oval shown on the LC/MS image 506. FIG. 5D illustrates the identified isotope peak in greater detail as a pixel map 508. The pixel map 508 is in two dimensions, one dimension being the mass/charge dimension and the other dimension being the retention time dimension. The intensity of each pixel is viewed numerically in a pixel square occupied by the pixel. Each square in the pixel map 508 represents a single pixel. Each column of pixels is a mass spectrum at one retention time. Each row of pixels is a chromatogram at one mass/charge. The pixels whose intensity values are above background are shown in white squares superimposed by a number representing the intensity values. The pixels with intensities above background form a contiguous spot on the pixel map 508.

Figure 5E:
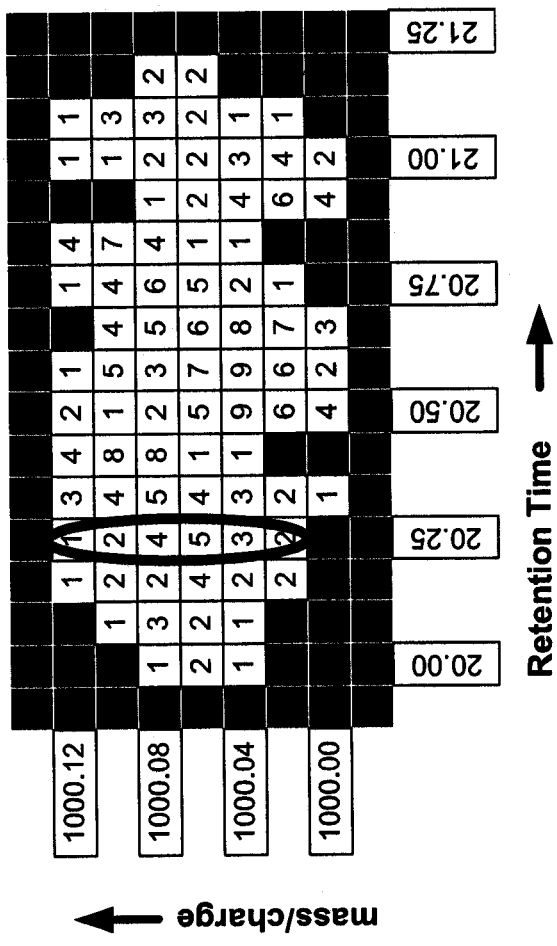
Figures 5F, 5G:
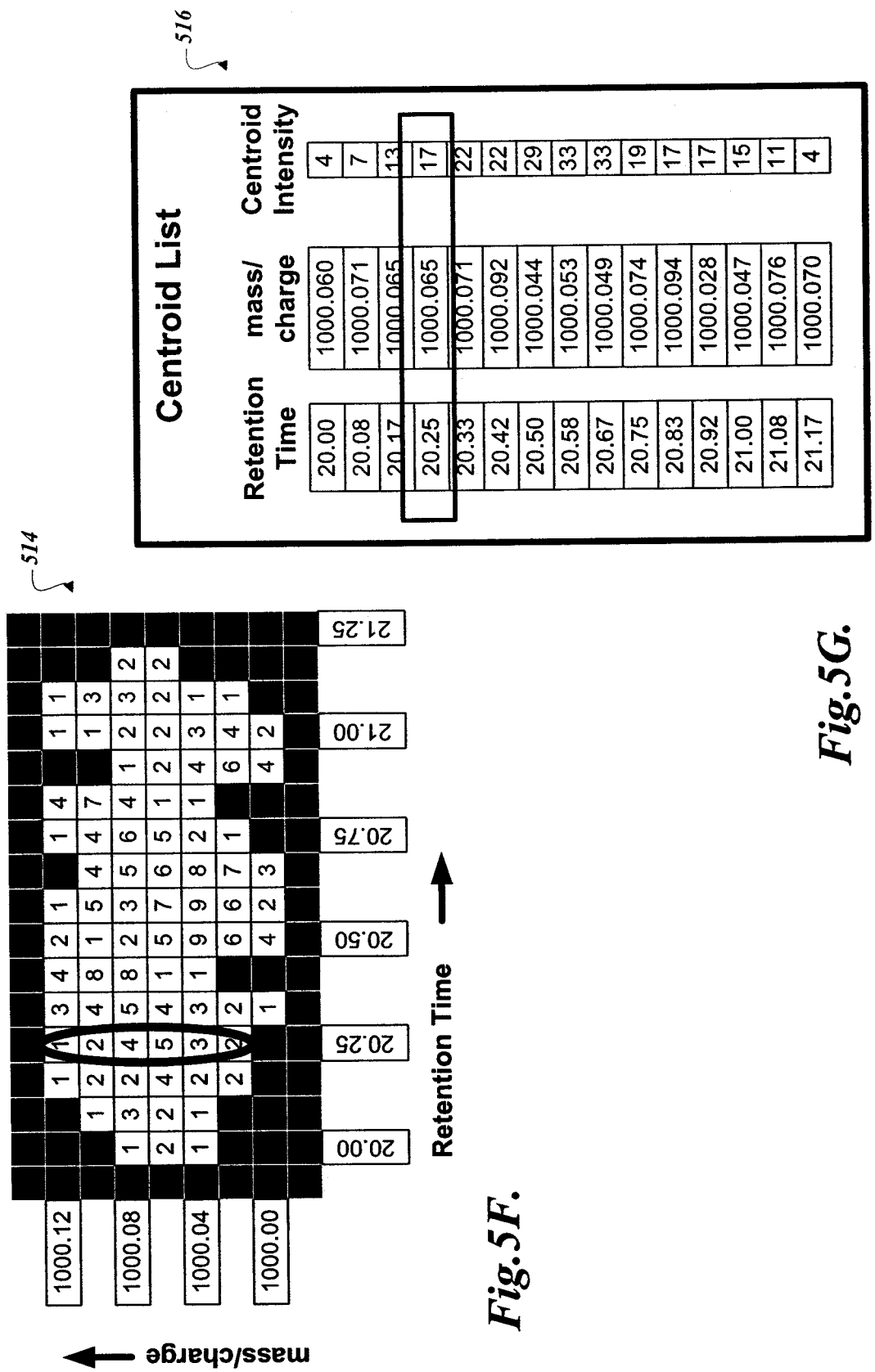
FIGS. 5F-5G are pictorial diagrams illustrating exemplary calculation of centroid data based on profile data.

FIG. 5D illustrates pixel map 510 that is similar to the pixel map 508, except now a column of pixels has been identified by a data compression algorithm. The column of pixels is positioned at retention time 20.25 and ranges between mass/charge 1000.00 to mass/charge 1000.12. The intensity values of these pixels in the column of pixels include pixel values 2, 3, 5, 4, 2, and 1. These pixel values will be processed by the data compression algorithm to produce a centroid with an intensity of 17 as illustrated by matrix 512. See FIG. 5E. The matrix 512 shows that at retention time 20.25 and a mass/charge value of 1000.065, a centroid with intensity value of 17 can be found. Suitably, FIGS. 5D, 5E illustrate visually and numerically the relationship between profile data and centroid data. Using a centroid mass/charge integration range of about 0.12 mass/charge, the data compression algorithm produces the centroid using the profile data captured by the column of pixels. FIG. 5F illustrates another pixel map 514 that is similar to the pixel maps 510, 508. FIG. 5G illustrates a matrix 516 that lists various centroids with various intensities as calculated by the data compression algorithm at various retention times and mass/charge values.

Figures 5H, 5I:
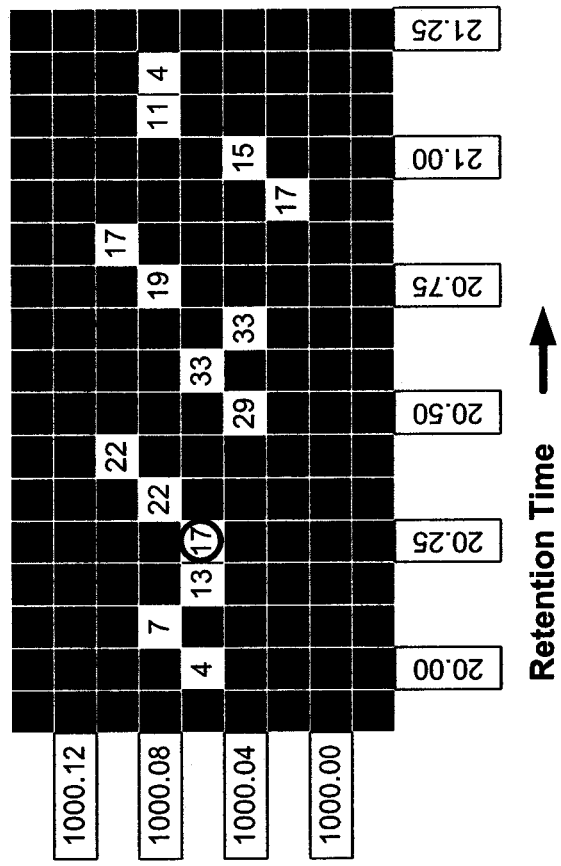
FIGS. 5H-5I are pictorial diagrams illustrating centroid data and an exemplary LC/MS image of centroid data.

FIG. 5H illustrates a matrix 518 that is similar to the matrix 516 in that a list of centroids and their intensities are presented along with associated retention time locations and mass/charge locations. FIG. 5I illustrates an LC/MS image 520 that maps the values, not of profile intensities, but of various centroid intensities of the matrix 518 at respected retention time locations and mass/charge locations. At the centroid intensity value of 17 at the retention time location of 20.25 and mass/charge location of 1000.065 is identified on the LC/MS image 520, a circle visually marks its position. Thus, centroids from the matrix 518 are placed on the LC/MS image (raster), in an attempt to create an LC/MS image from centroid data. On this LC/MS image, various groups of centroids appear non-contiguous, diffuse, or disjointed. These attributes are common for LC/MS images derived from centroid data and pixel map 520 exemplifies these attributes in a section of an LC/MS image derived from centroid data. If these data had been produced and stored as profile data, then this section of the LC/MS image would appear similar to the contiguous pixel map 508.

Figure 5J:
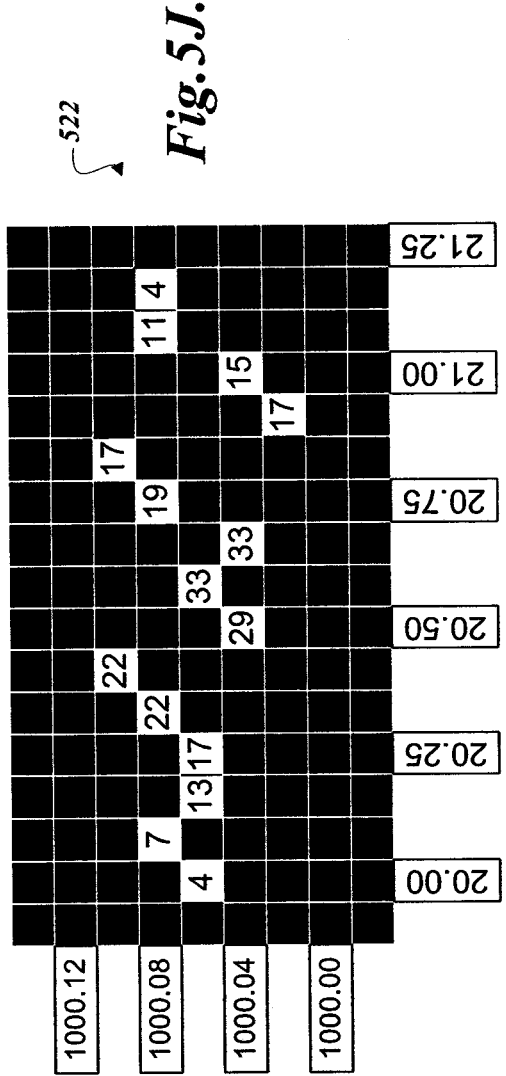
FIGS. 5J-5K are pictorial diagrams illustrating an exemplary LC/MS image of centroid data.
Figure 5K:
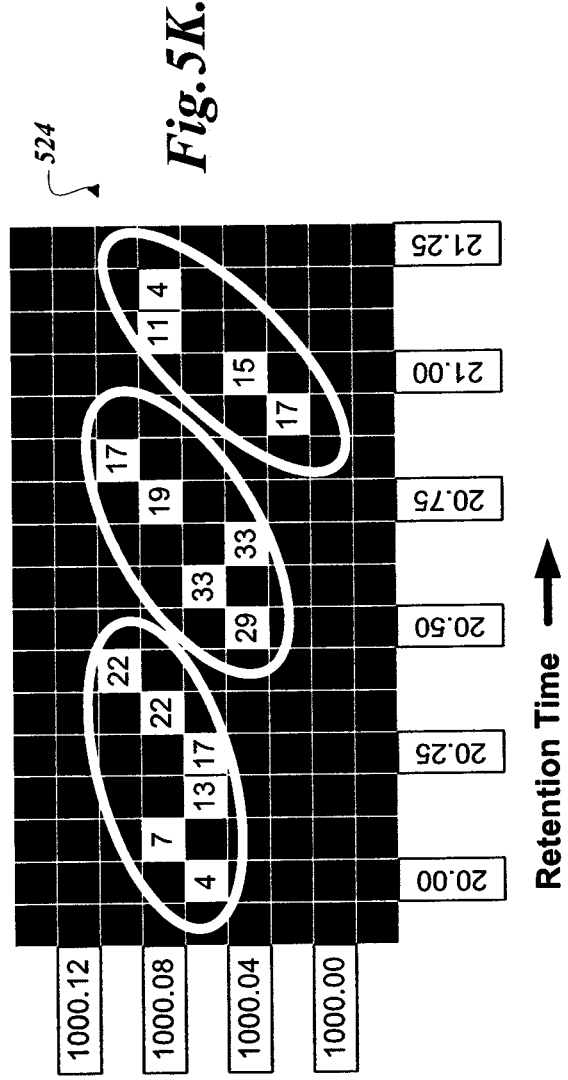

FIG. 5J illustrates an LC/MS image 522 that contains elements similar to the LC/MS image 520, and for the sake of brevity, their description will not be repeated. FIG. 5K illustrates another LC/MS image 524 which is similar to the LC/MS images 522, 520. However, a cursory inspection indicates that at least three groups of centroids can be gathered, which are marked visually by three ellipses. See FIG. 5K. One group of centroids includes centroid intensity values of 4, 7, 13, 17, 22, and 22. A second group contains centroids with intensity values of 17, 19, 29, 33, and 33. A third group identifies centroids with intensity values 4, 11, 15, and 17.

Figures 6A, 6B:
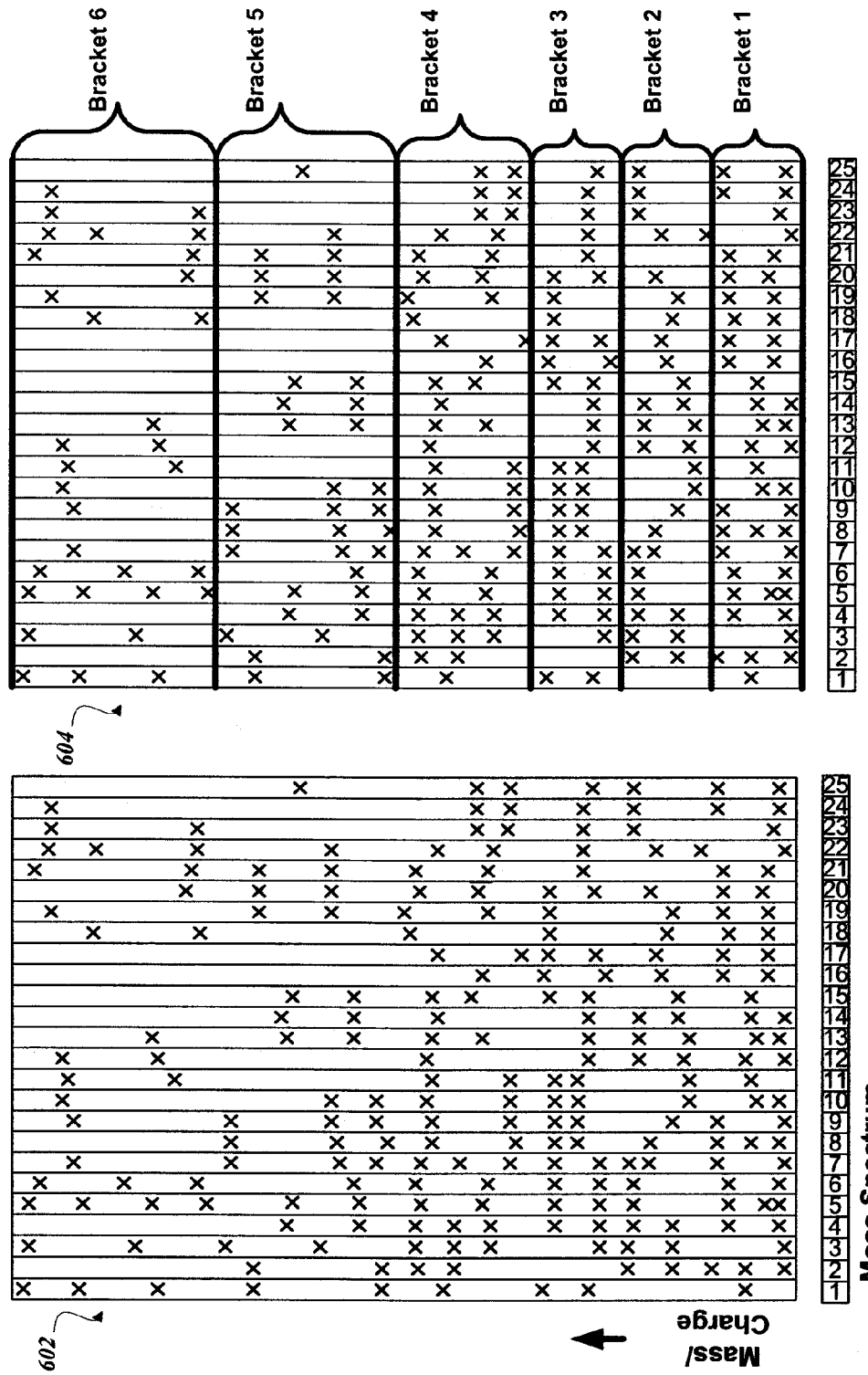
FIGS. 6A-6B are pictorial diagrams illustrating exemplary centroid data.

FIG. 6A illustrates a matrix 602 containing centroid data over 25 mass spectra, each centroid datum being positioned at the intersection of a mass/charge location and a mass spectrum as indicated by a cross (X). The centroid intensity values are not shown. The 25 mass spectra represent a portion of many mass spectra from all LC/MS runs. The mass spectra are represented as scan numbers ranging from 1 25. Each scan number constitutes a column containing centroid data. FIG. 6B also illustrates a matrix 604 that is similar to the matrix 602. The matrix 604 contains centroid data, each centroid datum being positioned at the intersection of a mass/charge positions and a scan number as indicated by a cross (X). In addition, multiple pieces of centroid data are segmented by various brackets 1 6.

Figures 6C, 6D:
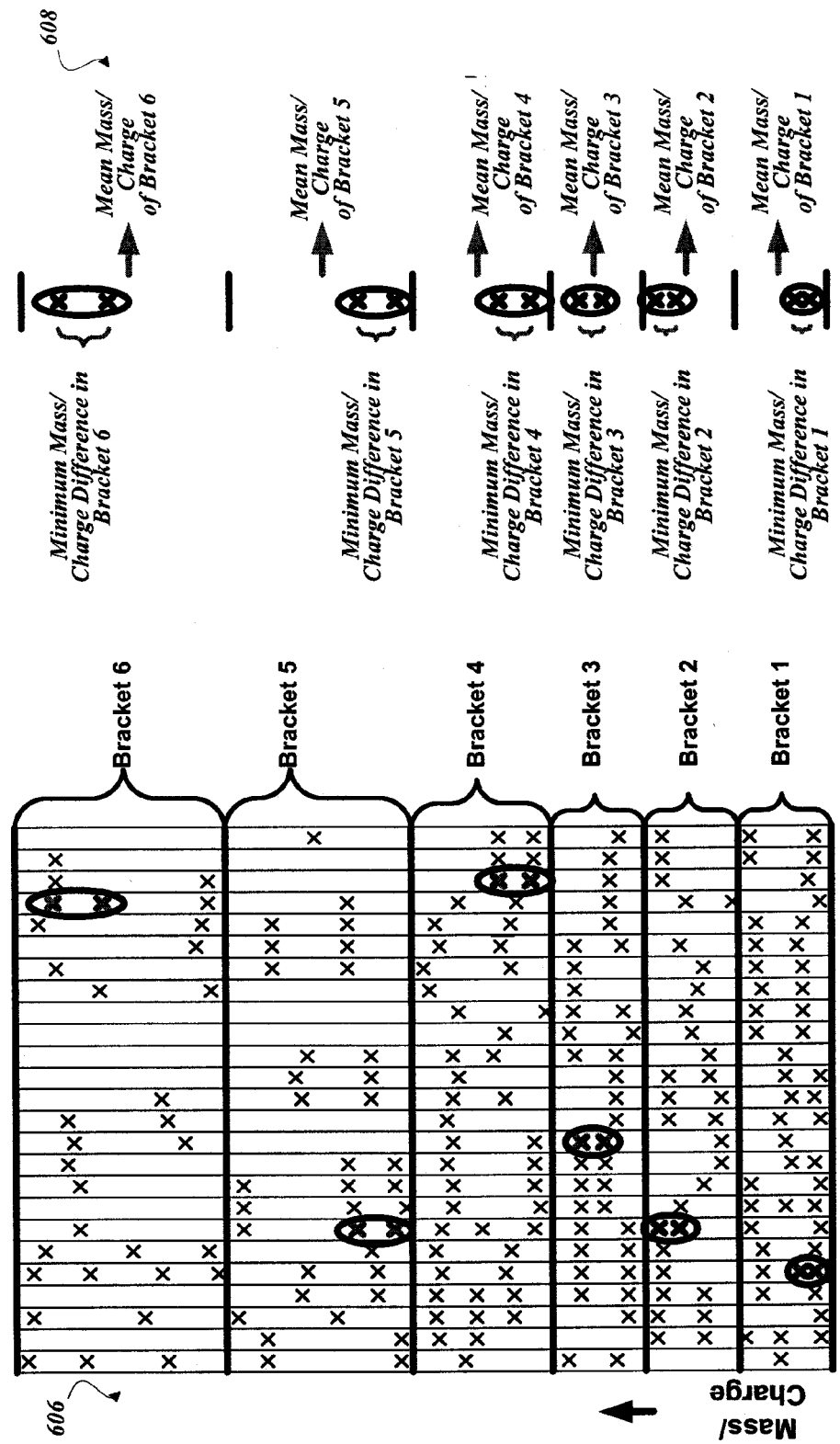
FIGS. 6C-6D are pictorial diagrams illustrating exemplary centroid data.

FIG. 6C illustrates a matrix 606, which is similar to matrices 602, 604. The matrix 606 identified two centroid data within each bracket for calculation of the minimum mass/charge difference. The identified two pieces of centroid data, which are enclosed in an ellipse, have the smallest difference in mass/charge from a particular mass spectrum (scan number) and for a particular bracket. For bracket 1, the identified two pieces of centroid data with the minimum mass/charge difference can be found in scan number 5. For bracket 2, the identified two pieces of centroid data with the minimum mass/charge difference can be found in scan number 7. For bracket 3, the identified two pieces of centroid data with the minimum mass/charge difference can be found in scan number 11. For bracket 4, the identified two pieces of centroid data with the minimum mass/charge difference can be found in scan number 23. For bracket 5, the identified two pieces of centroid data with the minimum mass/charge difference can be found in scan number 7. For bracket 6, the identified two pieces of centroid data with the minimum mass/charge difference can be found in scan number 22. FIG. 6D focuses on the identified two pieces of centroid data from each bracket without regard to their scan number identifications to calculate the minimum mass/charge difference as well as the calculation of the mean mass/charge of each bracket. To obtain the centroid mass/charge integration rate of change ($s_1$) for various calculations discussed below, various minimum mass/charge differences are plotted in the x axis against the mean mass/charge of various brackets in the y axis. The slope of a best fit line to the data reveals the centroid mass/charge integration rate of change ($s_1$).

FIG. 7A illustrates a distribution 702 of centroid data visually represented as various X-shaped crosses. The centroid distribution 702 is presented in two dimensions, one being the mass/charge dimension and the other being the retention time dimension. Four arrows emanating from the edges of the distribution 702 point to a cluster center. A centroid closest to the cluster center may be selected as the seed centroid around which a cluster of centroids may be formed. Clusters of centroids aid image processing to reveal biological features of interest to scientists whereas solitary centroids unconnected to one another render more difficult the revelation of biological features of interest.

FIG. 7B illustrates a graph 704 in which the y-axis represents the cluster distance dimension and the x-axis represents the retention time dimension. Each X-shape cross of the graph 704 represents a centroid datum and the graph 704 indicates its distance from the cluster center. The minimum distance is at the cluster center $\sigma_r$ and logically it is greater than zero. FIG. 7C illustrates a graph 706 that indicates cluster tightness of centroid data in which the x-axis represents cluster tightness ($s_n$) and the y-axis represents retention time. The graph 706 is divided into two sections, upper and lower, and whose division line is at a point where cluster tightness is equal to the value 1. The lower section indicates cluster tightness ($s_n$) that is less than 1 and the upper section indicates cluster tightness that is greater than 1. The largest cluster distance with a cluster tightness of less than 1 determines the extent of a cluster of centroids.

Figure 8A:
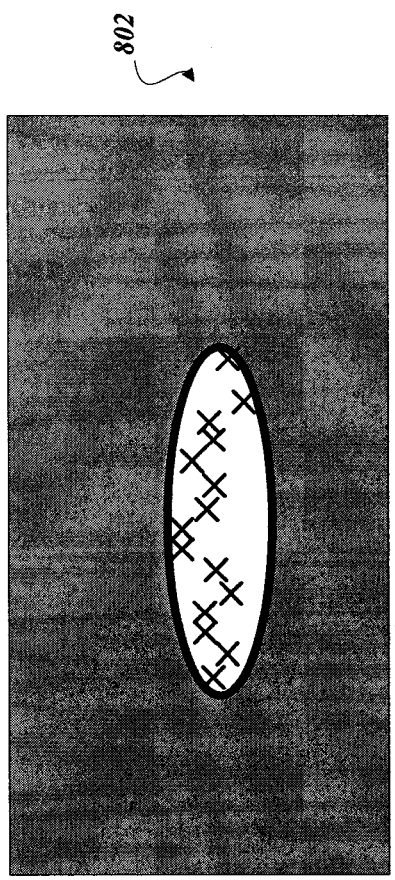
FIGS. 8A-8B are pictorial diagrams illustrating an exemplary cluster of centroids.
Figure 8B:
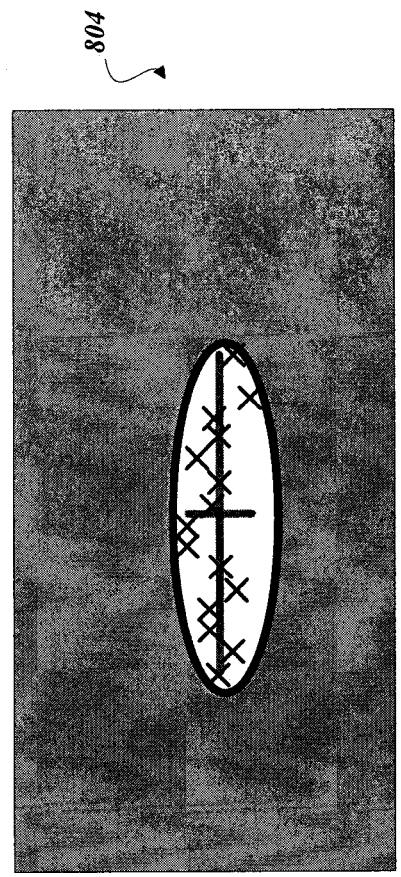

FIG. 8A illustrates a cluster 802 of centroids and is identified and bound by an ellipse. Each centroid is represented as an X-shaped cross. This cluster 802 is identified using the measurement of cluster tightness previously illustrated by FIG. 7C to determine the extent from a seed centroid to which other centroids may be identified as part of the cluster 802. FIG. 8B illustrates the cluster 804, in which calculated extents are represented as a cross-hair mark to identify centroids that are a member of the cluster 804. The cluster 804 contains elements similar to the cluster 802 and for the sake of brevity their description will not be repeated.

Figure 8C:
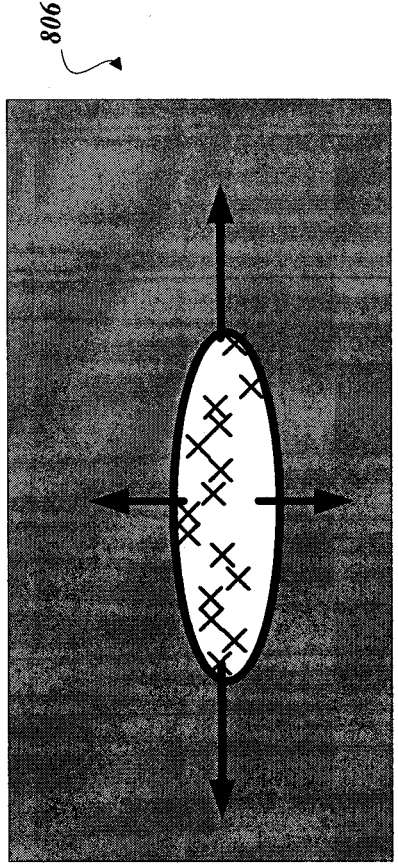
FIGS. 8C-8D are pictorial diagrams illustrating an exemplary cluster of centroids.
Figure 8D:
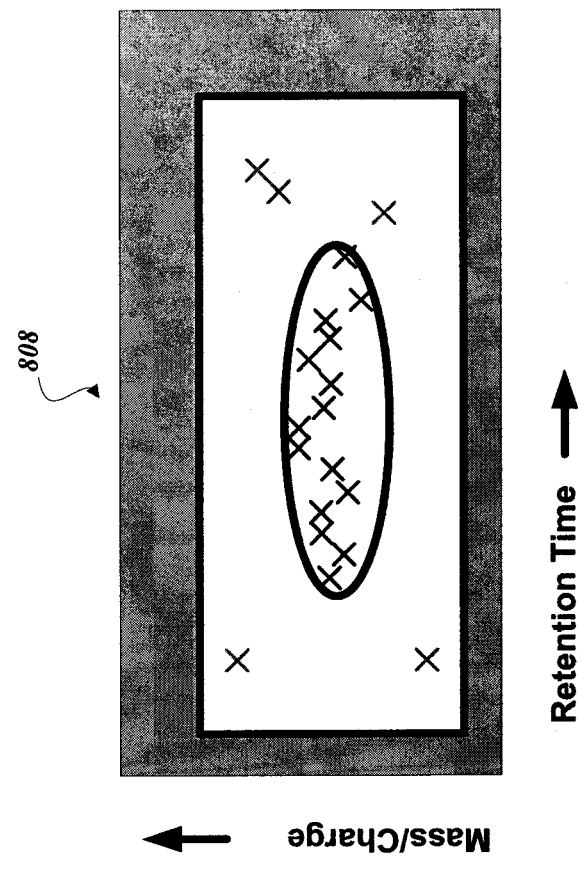

FIG. 8C illustrates a cluster 806 that is similar to the cluster 802, 804. The centroid members of the cluster 806 are visually enclosed by an ellipse. To capture additional centroids, an extent expansion both in the mass/charge dimension and also in the retention time dimension are expanded from the boundaries of the ellipse. FIG. 8D illustrates an expanded cluster 808 which contains not only the original cluster 806 but also centroid members identified by the extent expansion, visually emphasized by the rectangle enclosing the ellipse.

Figure 9B:
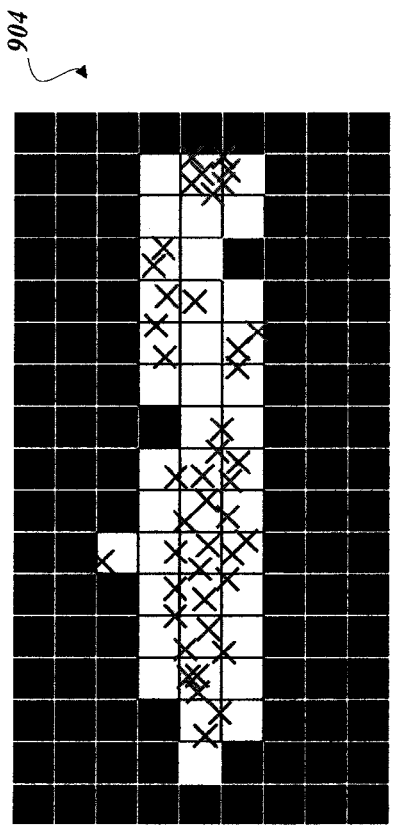
FIGS. 9A-9B are pictorial diagrams illustrating an exemplary mask and exemplary centroids of interest revealed by the exemplary mask.
Figure 9A:
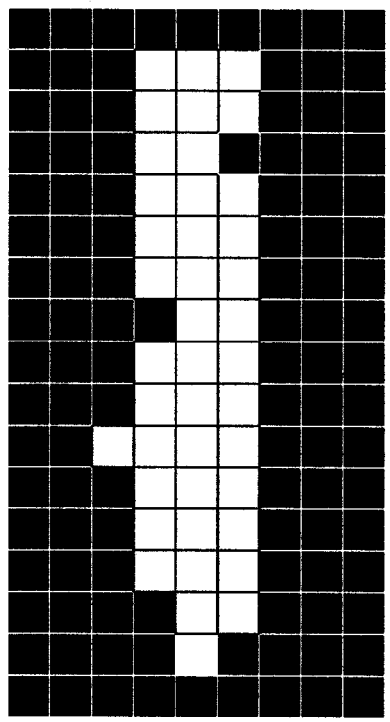
Figure 9C:
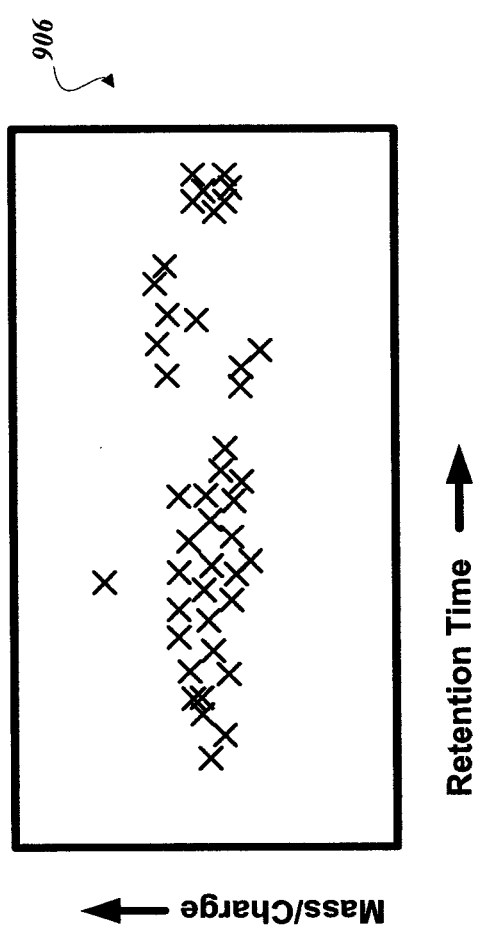
FIGS. 9C-9D are pictorial diagrams illustrates exemplary centroids of interest.

FIG. 9A illustrates a mask 902 which identifies a peak on an LC/MS image that reveals centroids of interest, such as centroid members of a cluster. Each white pixel of the mask is contiguous to another white pixel of the mask. The white pixels reveal locations of centroids of interest. The black pixels reveal background. The mask 902 is shown along the dimensions of mass/charge and retention time. FIG. 9B illustrates another mask 904, which is similar to the mask 902 and for the sake of brevity such discussion will not be repeated. The white pixels of the mask 904 reveal centroids of interest. FIG. 9C illustrates a peak 906 of the LC/MS image that contains centroids of interest along the dimensions of mass/charge and retention time. These centroids of interest were identified using the white pixels of the mask 904.

Figure 9D:
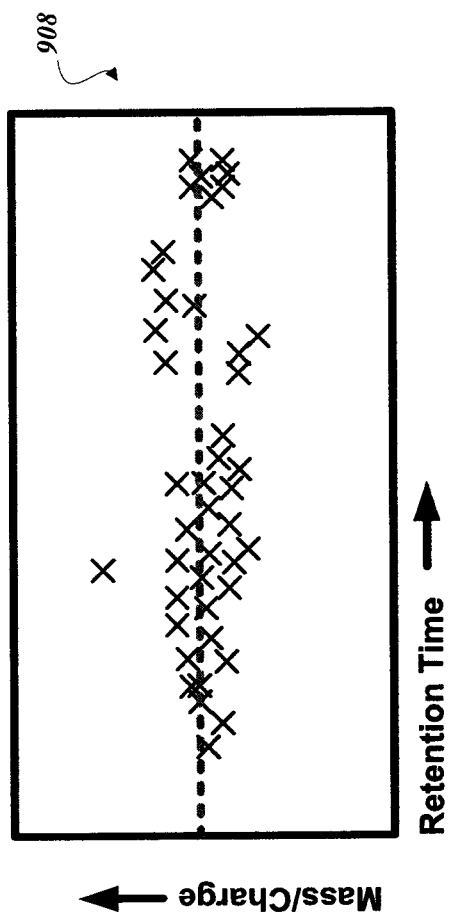
Figure 9E:
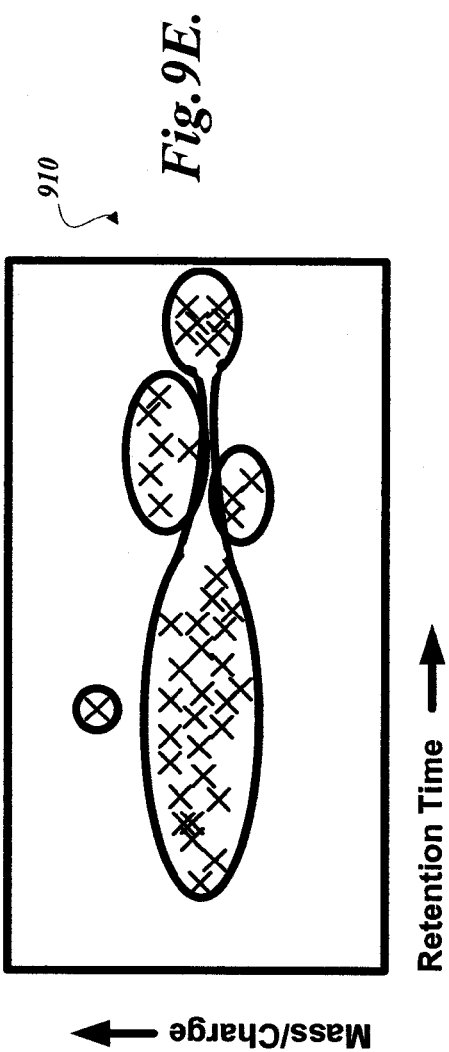
FIGS. 9E-9F are pictorial diagrams illustrating exemplary clusters of centroids.
Figure 9F:
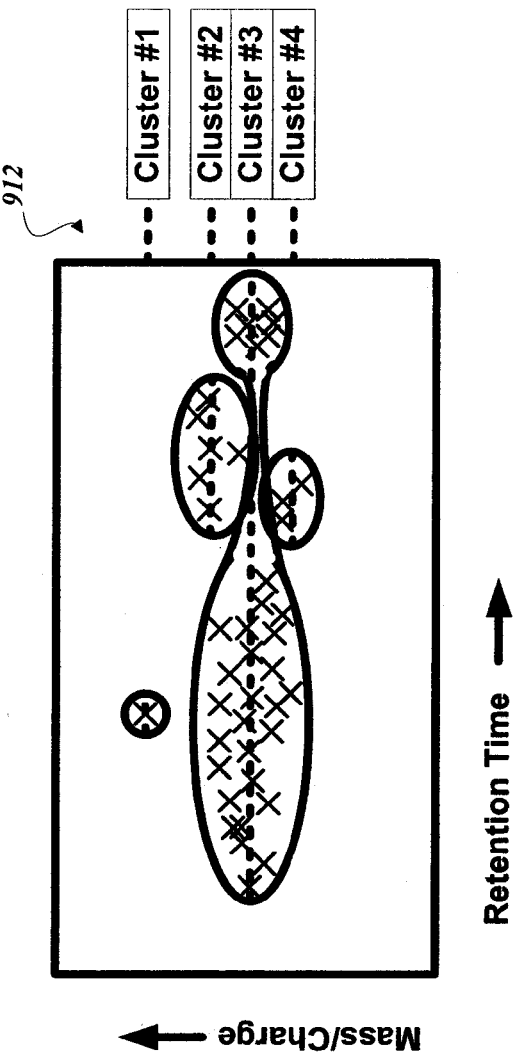

FIG. 9D illustrates a peak 908 of the LC/MS image, which is similar to the peak 906 of the LC/MS image, that contains centroids of interest along the dimensions of mass/charge and retention time. A dotted line running across these centroids of interest indicates the mean mass/charge of these centroids of interest (or the peak 906 of the LC/MS image). FIG. 9E illustrates four clusters of centroids 910. FIG. 9F illustrates a cluster of centroids 912, which is similar to the cluster of centroids 910. Each cluster is identified as 1, 2, 3, or 4, each cluster is marked with a dotted line, the dotted line positioned over the mean mass/charge of the cluster.

Figure 9G:
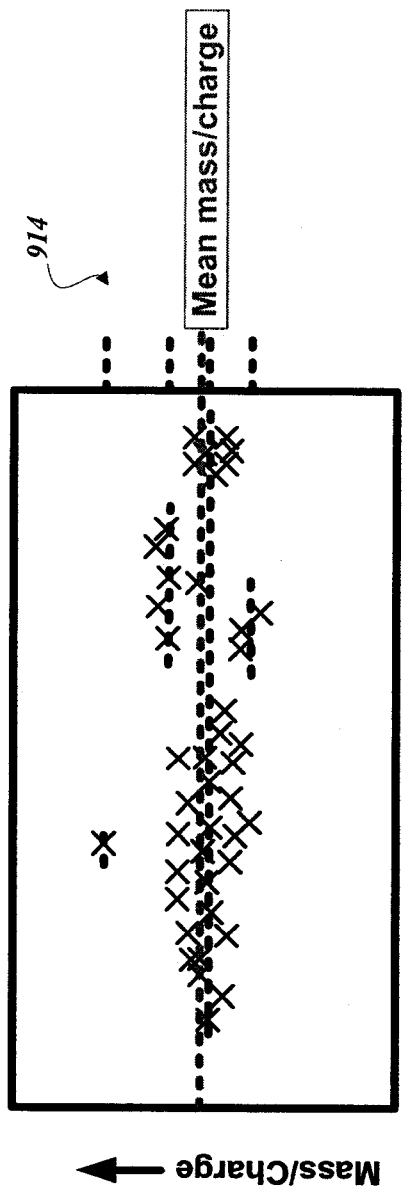
FIGS. 9G-9H are pictorial diagrams illustrating exemplary clusters of centroids.
Figure 9H:
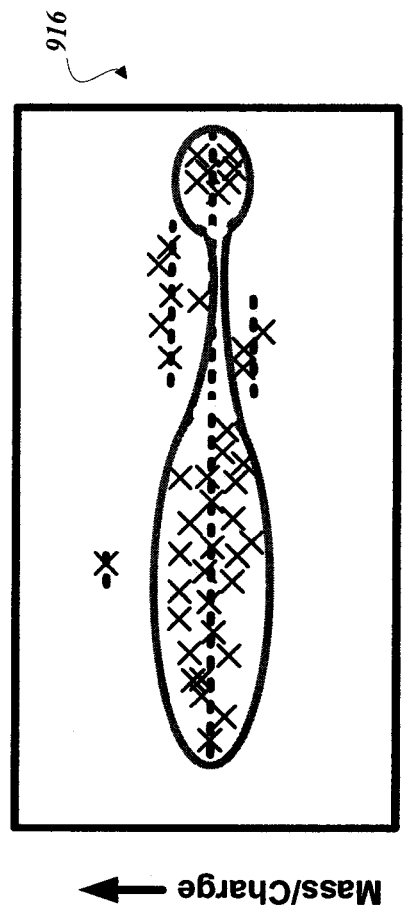
Figure 9I:
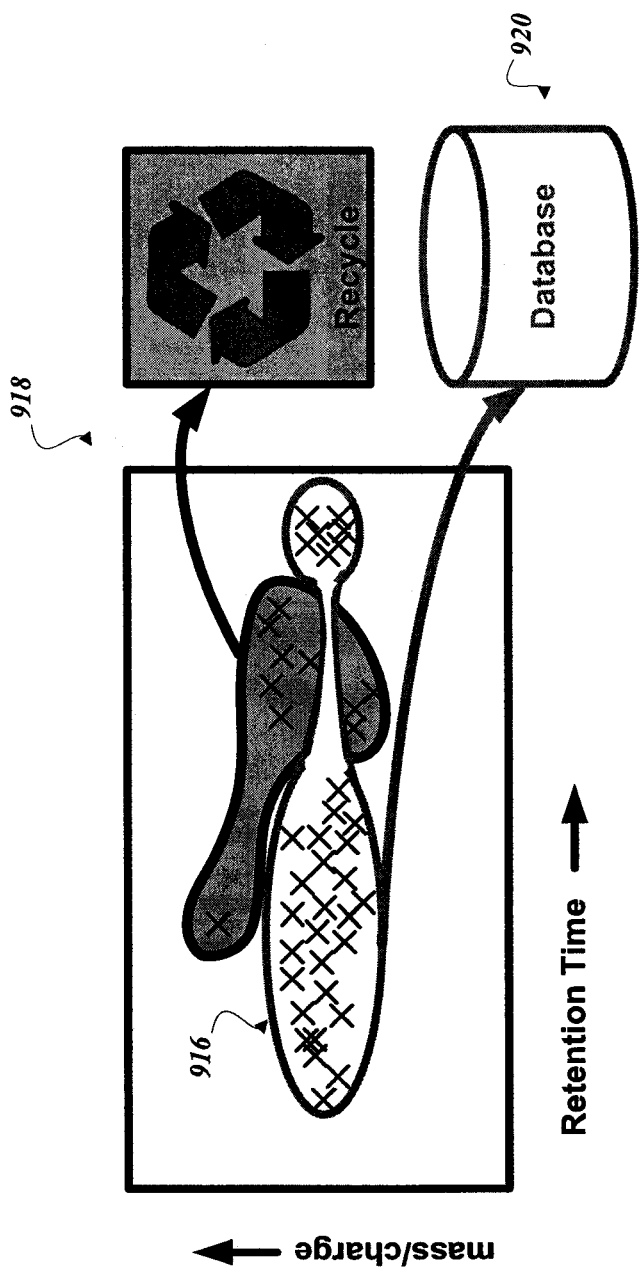
FIG. 9I are pictorial diagrams illustrating exemplary clusters of centroids.

FIG. 9G illustrates the four dotted lines identified by FIG. 9F, each dotted line positioned over the mean mass/charge of a cluster. FIG. 9G also superimposes a fifth dotted line, which is the mean mass/charge of the peak 906 of the LC/MS image. By exposing these dotted lines, a visual comparison may be made between the dotted lines that represent the mean mass/charge of a cluster and the mean mass/charge of the peak 906 (various embodiments of the present subject matter may suitably make the comparison computationally without resorting to a visual comparison). FIG. 9H illustrates a selection 916 which identifies cluster 3 as the cluster with the closest mean mass/charge to the mean mass/charge of the peak 906. FIG. 9I illustrates the storage of the cluster with the closest mean mass/charge to the mean mass/charge of the peak 906 (the identified cluster 3) to a database 920. The remaining centroids 918 are recycled for further processing to identify additional clusters.

Figure 10A:
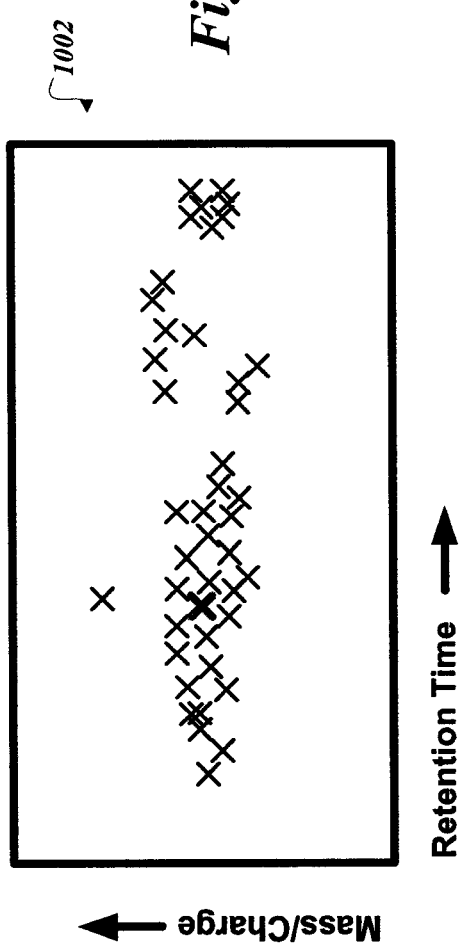
FIGS. 10A-10B are pictorial diagrams illustrating an exemplary distribution of centroids of interest.
Figure 10B:
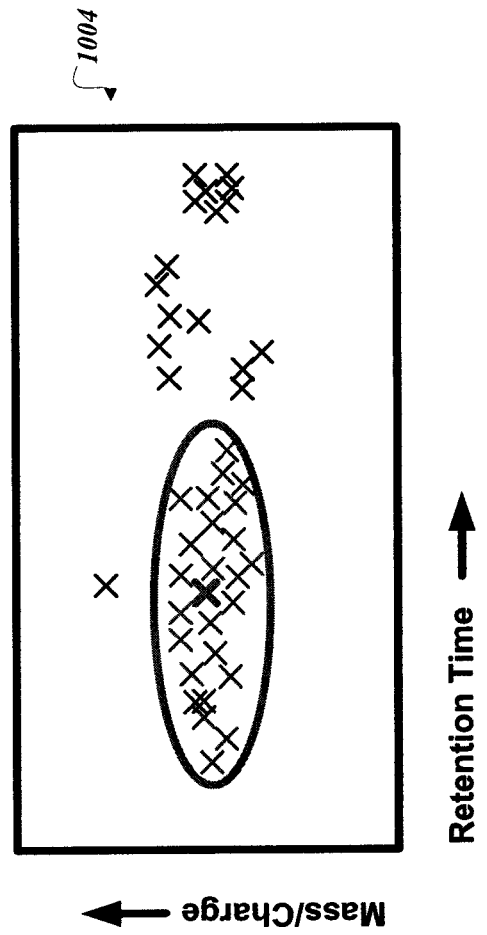

FIG. 10A illustrates a pool of centroids of interest 1002, which are identified by a mask, and which are mapped along the mass/charge dimension and the retention time dimension. FIG. 10A is similar to FIG. 9C and for the sake of brevity their description will not be repeated. In executing a rectilinear method to find a cluster of centroids of interest, the rectilinear method first selects a seed centroid from which a dominant cluster will eventually be identified. This seed centroid is marked with an X-shaped mark. See FIG. 10A. FIG. 10B illustrates a dominant cluster 1004 using the seed centroid, whose dominant cluster is visually marked by the ellipse.

Figure 10C:
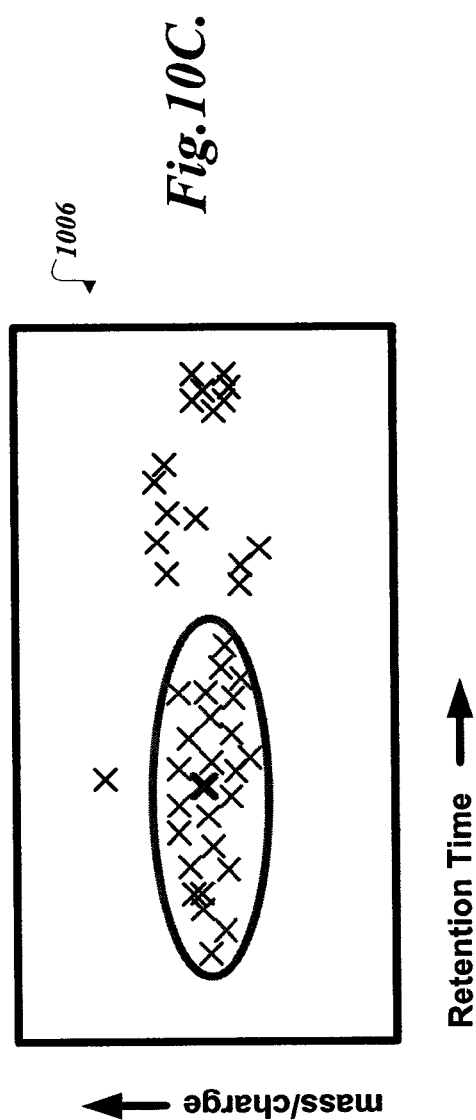
FIGS. 10C-10D are pictorial diagrams illustrating exemplary clusters of centroids.
Figure 10D:
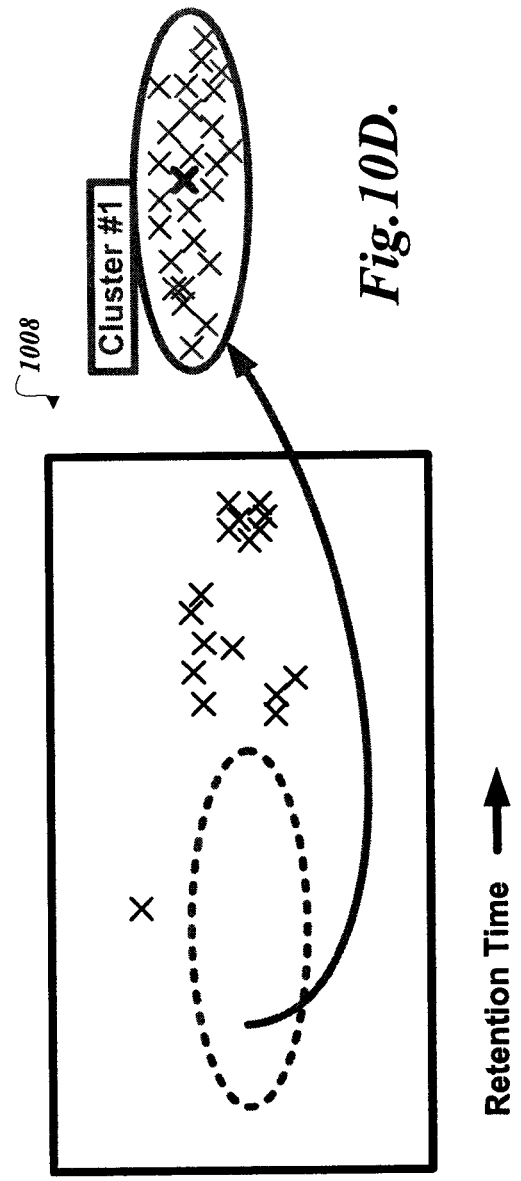
Figure 10E:
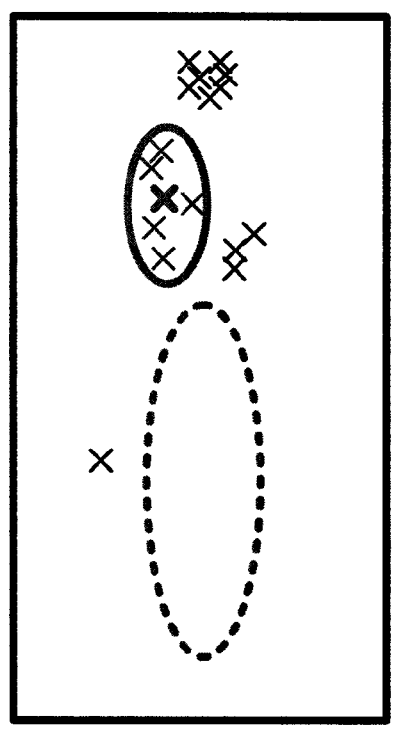
FIGS. 10E-10F are pictorial diagrams illustrating exemplary clusters of centroids.
Figure 10F:
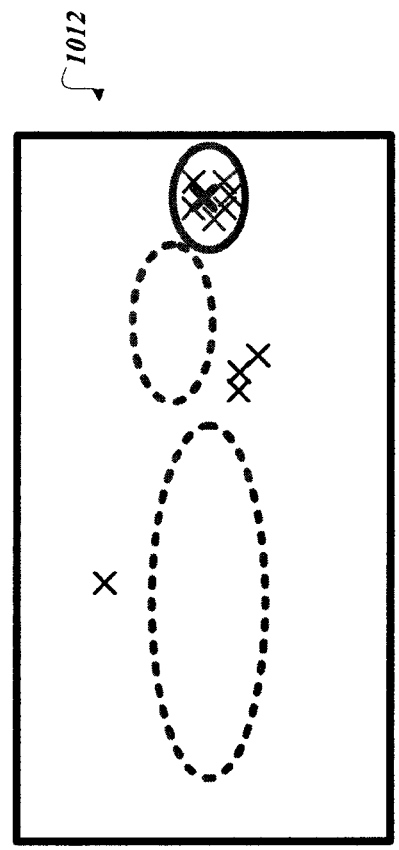
Figure 10G:
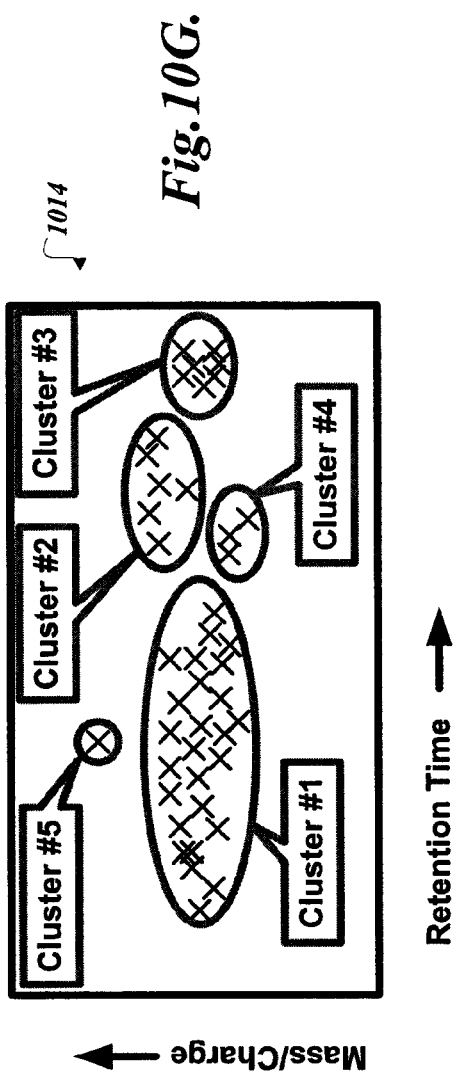
FIGS. 10G-10H illustrate pictorial diagrams of centroid data and clusters.

FIG. 10C illustrates a dominant cluster 1006 that is similar to the dominant cluster 1004 and for the sake of brevity their description will not be repeated. FIG. 10D illustrates a pool of centroids of interest 1008 that is similar to the pool of centroids of interest 1002, but the dominant cluster, referenced as cluster 1, has been stored and removed from the pool 1008. FIG. 10E illustrates a pool of centroids of interest 1010 that is similar to the pool of centroids of interest 1008 with the dominant cluster 1 removed and another dominant cluster identified. FIG. 10F illustrates a pool of centroids of interest 1012 that is similar to the pool 1010 and the pool 1008 with two dominant clusters that were identified and now removed and a third dominant cluster identified. This process is repeated until dominant clusters are identified, stored, and removed from the pool of centroids of interest. FIG. 10G illustrates a set of stored dominant clusters 1014, which are identified as clusters 1-5.

Figure 10H:
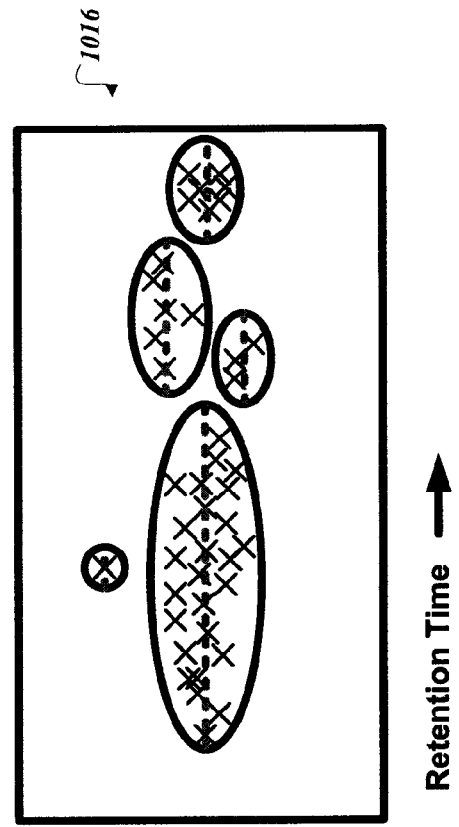
Figure 10I:
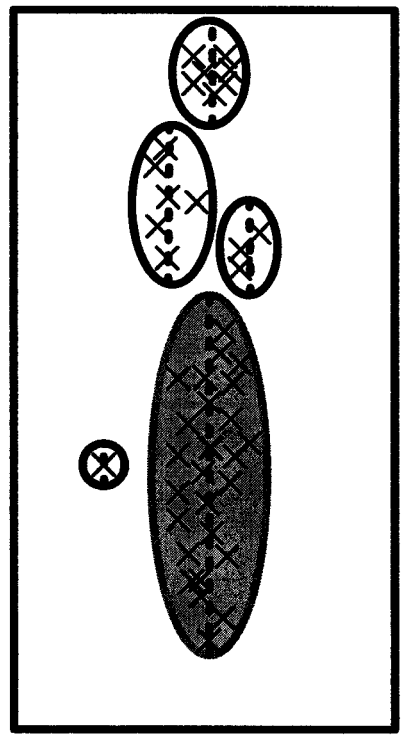
FIGS. 10I-10J are pictorial diagrams illustrating exemplary clusters of centroids.

FIG. 10H illustrates a set of stored clusters 1016, each cluster having a dotted line imposed on the mean mass/charge of the cluster. FIG. 10I illustrates a set of stored clusters 1018 similar to the set of stored clusters 1016 where a seed cluster has been identified by a remerging method. The seed cluster is visually presented as a filled cluster. See FIG. 10I. It is shown by the shading of cluster 1 by graph 1018.

Figure 10J:
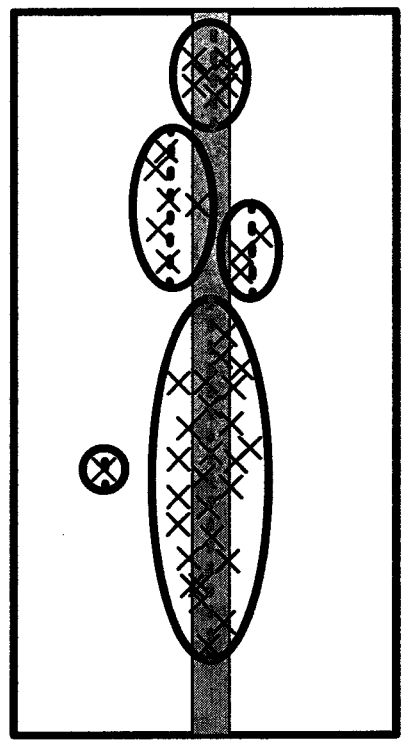
Figures 10K, 10L:
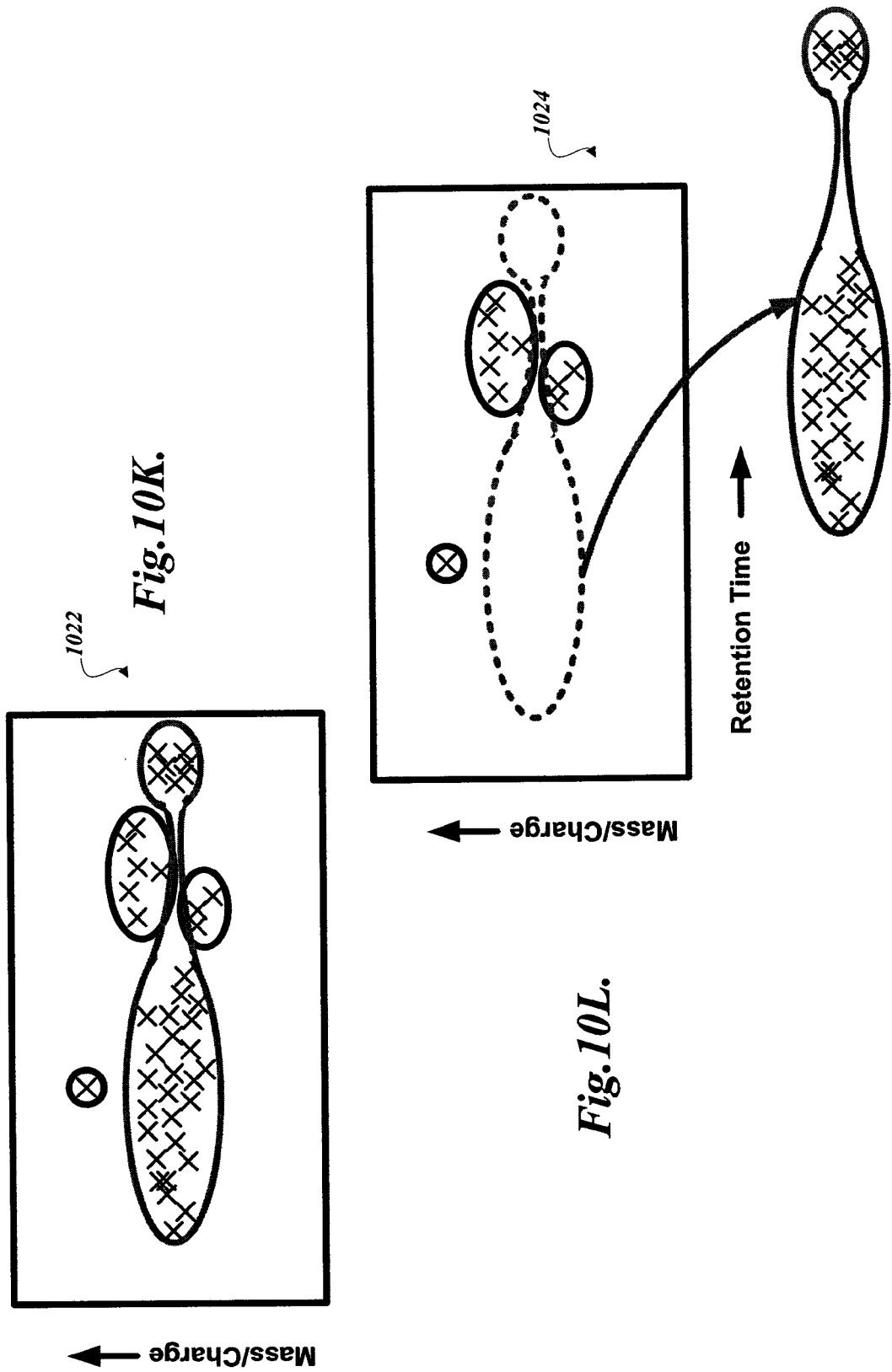
FIGS. 10K-10L are pictorial diagrams illustrating exemplary clusters of centroids.

FIG. 10J illustrates a pool of centroids of interest 1020. A filled rectangle is visually superimposed over the mean mass/charge location of the seed cluster of the pool 1020. The height of the filled rectangle indicates mass/charge locations that are within a suitable tolerance of the seed cluster. FIG. 10K illustrates a pool of centroids of interest 1022, which is similar to the pool 1020. Two clusters have been merged together by the remerging method because the mean mass/charge of each cluster is within a suitable tolerance (visually represented by the height of the filled rectangle of FIG. 10J). FIG. 10L illustrates a pool of centroids of interest 1024, which is similar to the pool 1022, 1020, with the merged clusters stored and removed from the pool 1024.

Figure 10M:
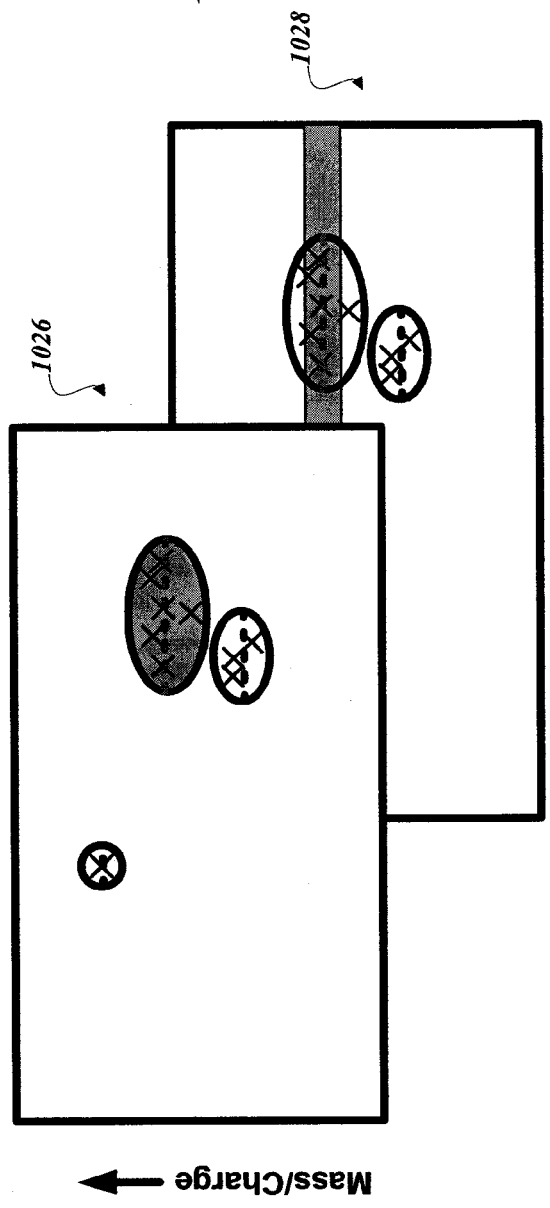
FIGS. 10M-10N are pictorial diagrams illustrating exemplary clusters of centroids.
Figure 10N:
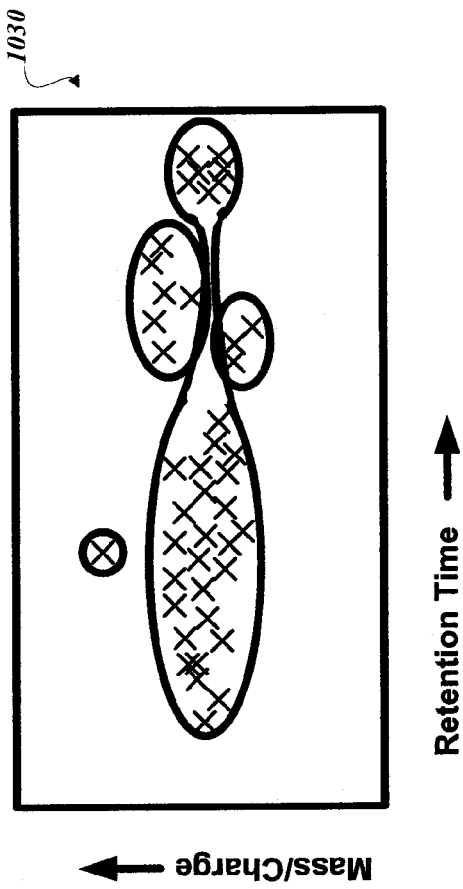

FIG. 10M illustrates pools of centroids of interest 1026, 1028, which are similar to the pool 1024, but with the merged clusters removed. The remerging method identifies another seed cluster in the pool 1026 and the height of a filled rectangle superimposed over the mean mass/charge of the seed cluster indicates mass/charge locations that are within a suitable tolerance. The remerging method is repeated to discover all merged clusters. FIG. 10N illustrates a set of merged clusters 1030 that shows four clusters, one of which is comprised of two merged clusters.

FIG. 11A illustrates a mask 1032, which is similar to the mask 904, that reveals a pool of centroids of interest. FIG. 11B illustrates the calculation of the maximum distance of the mask 1032 and a half distance from the center of the calculated maximum distance. More specifically, the retention time is used as the distance of calculation. The retention time range among these centroids of interest is indicated by the curly brace that is labeled as "Max Distance". The bracket size that is used by the process depicted in FIG. 11D is indicated by the curly brace that is labeled "Half Distance". The midpoint between the retention time extremes is labeled "center".

FIG. 11C illustrates a graph 1102 regarding a distribution of centroids along the dimension of the summed intensity of bracketed centroids and in the dimension of retention time. FIG. 11D illustrates a pool of centroids of interest 1104 with multiple brackets (curly braces). The lower boundary of each bracket is set to a centroid whose retention time is less than the center. The lower bracket boundaries are visually connected to their respective centroids by dotted lines. The bracket with the most summed intensity is a candidate for a bracket. The summed intensities are shown in FIG. 11C. In this example, the intensity of each individual centroid is one. The two brackets with the lowest retention times have the highest intensity sum. The first bracket is the favored bracket. The process is suitably repeated by setting the higher boundary of the bracket to every centroid whose retention time is greater than the centroid (not shown).

Figure 12A:
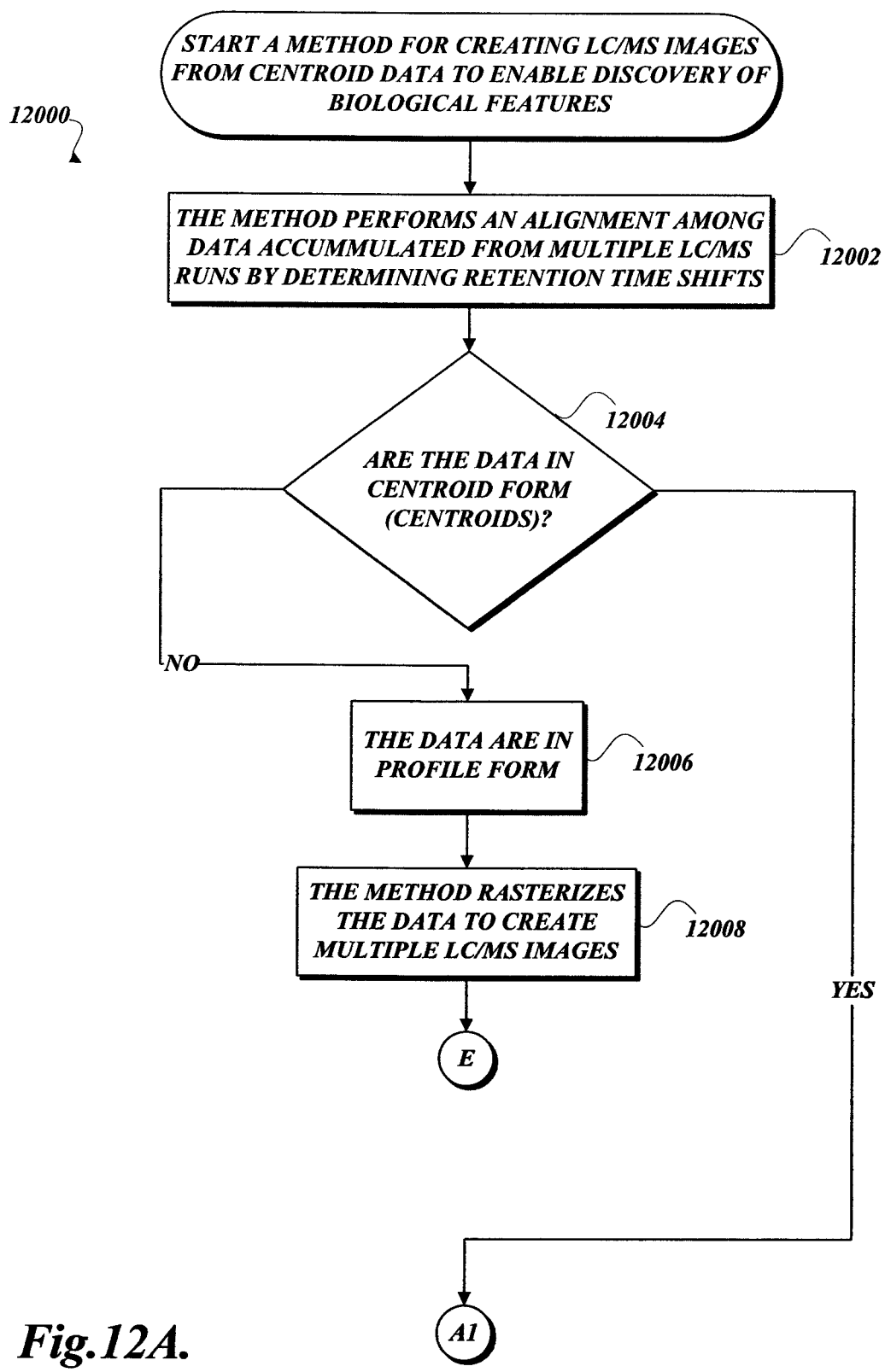
FIGS. 12A-12BT are process diagrams illustrating a method for creating LC/MS images from centroid data to enable discovery of biological features.
Figure 12B:
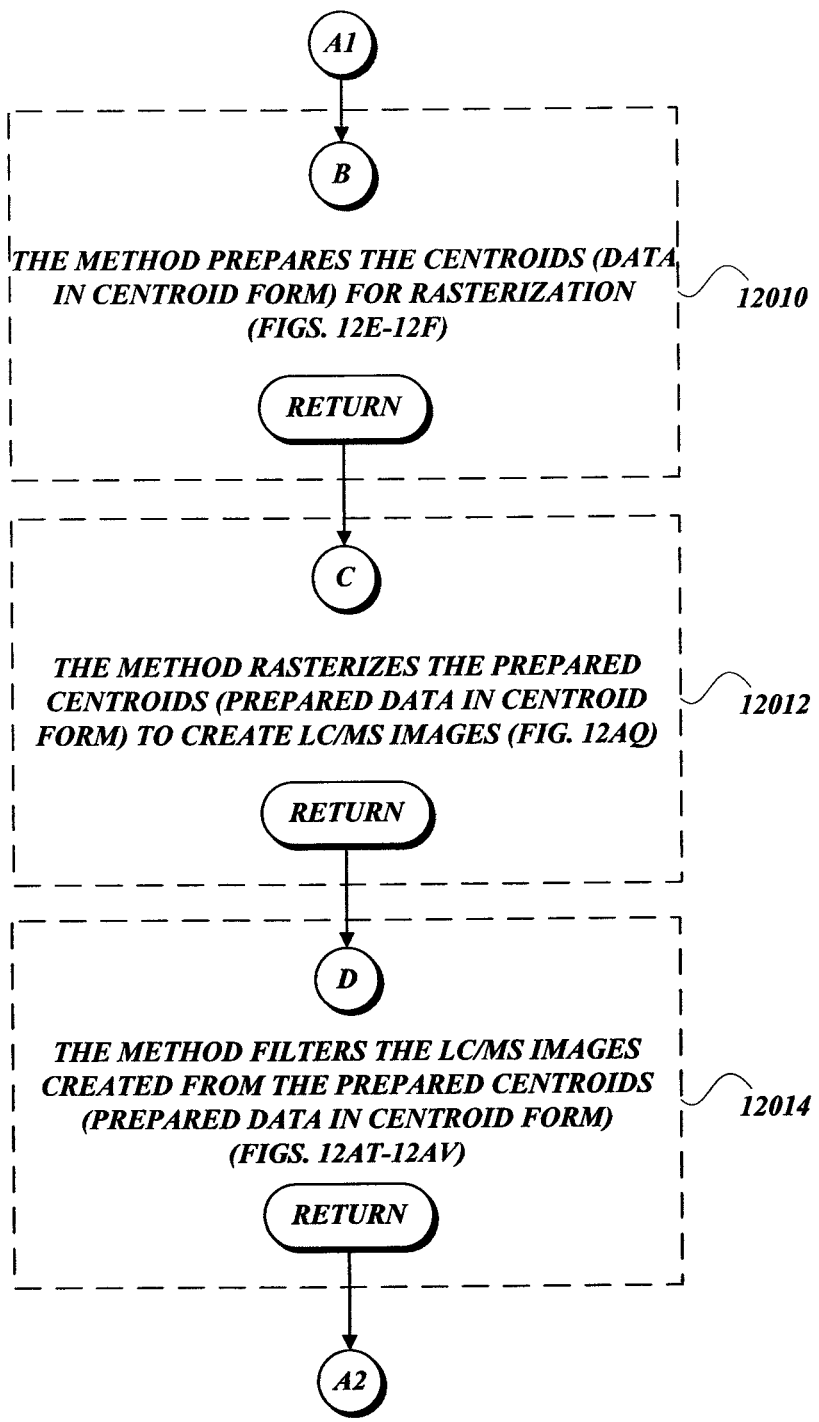

FIGS. 12A-12BT illustrate a process 12000 for imaging biological data in centroid form to enable discovery of biological features. From a start block, the method 12000 proceeds to block 12002, where the method performs an alignment among data accumulated from among multiple LC/MS runs by determining retention time shifts. The method then proceeds to decision block 12004, where a test is performed to determine whether the data is in centroid form (centroids). If the answer is No, the data is understood to be in profile form. See block 12006. The method 12000 then rasterizes the data to create multiple LC/MS images. See block 12008. The method then continues to another continuation terminal ("terminal E"). Otherwise, if the answer to the test at decision block 12004 is Yes, then the method proceeds to another continuation terminal ("terminal A1").

Figure 12C:
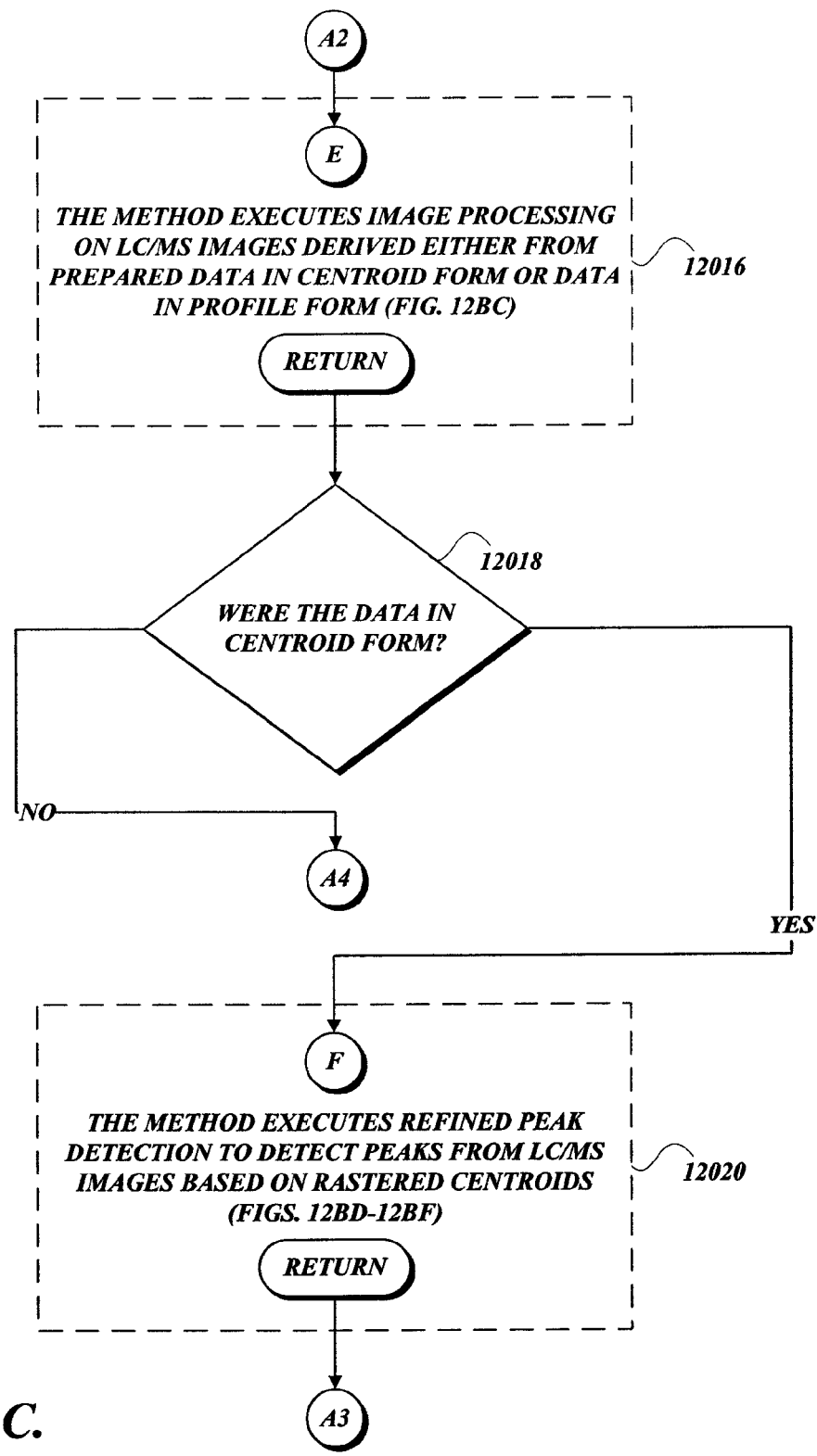
Figure 12D:
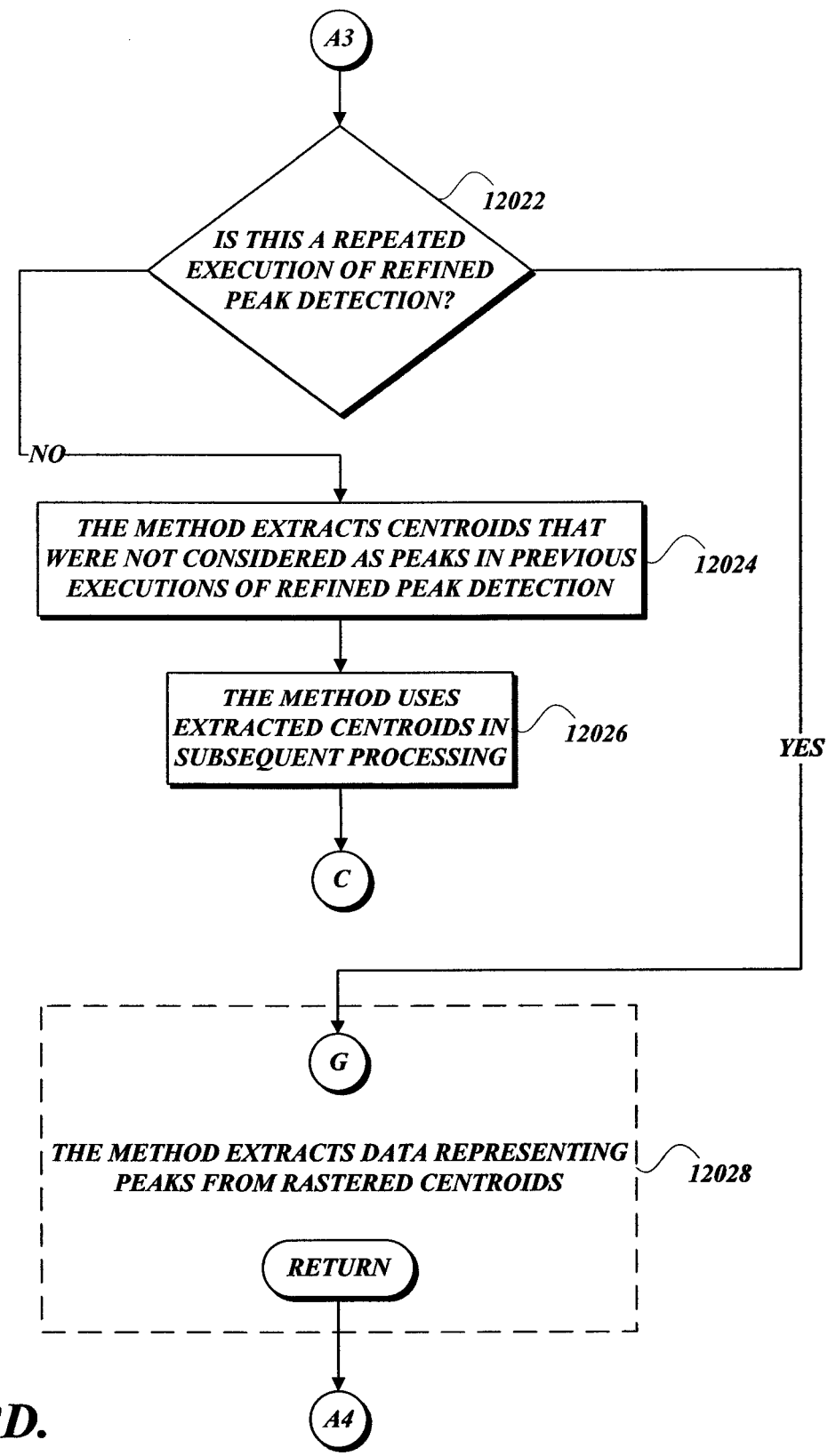
Figure 12E:
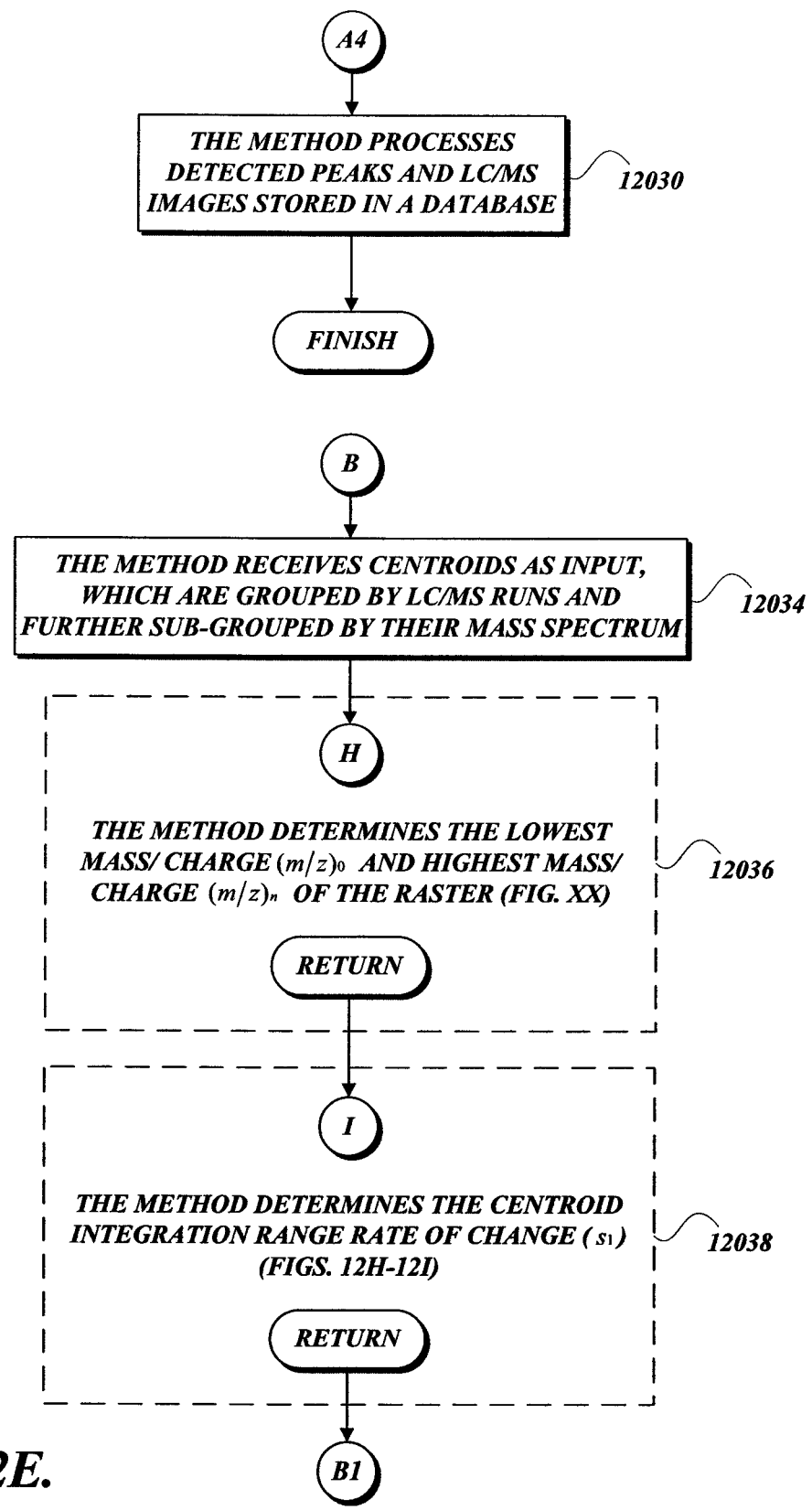
Figure 12F:
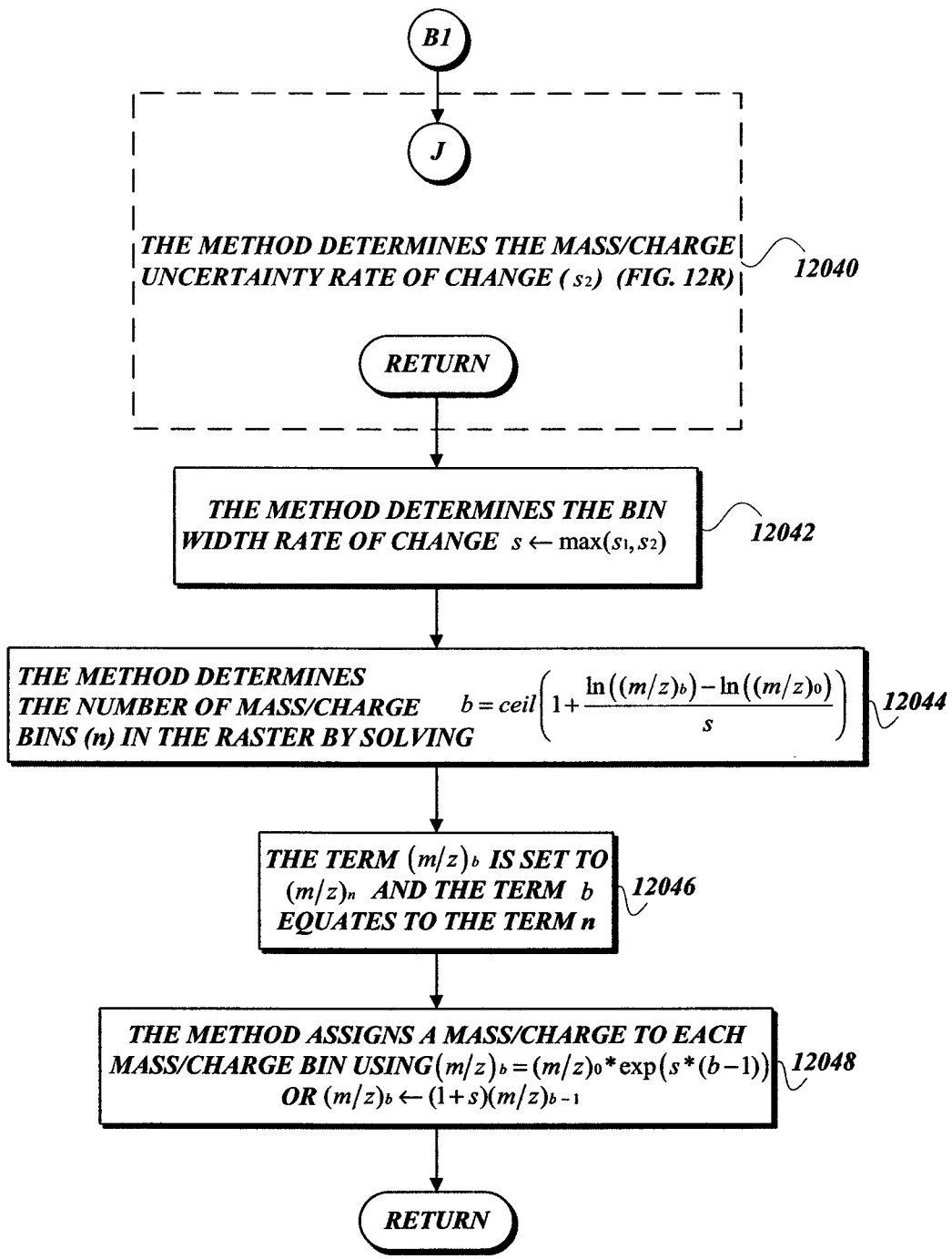

From terminal A1 (FIG. 12B), the method 12000 proceeds to a set of method steps, defined by a continuation terminal ("terminal B"). See block 12010. The set of method steps at 12010 prepares the centroids (centroid data) for rasterization by defining a sampling rate, which in the technical idiom of the present subject matter includes one or more bins to define a raster (an LC/MS image). (See FIGS. 12E-12F). Next, a set of method steps 12012 is defined by a continuation terminal ("terminal C"). The set of method steps at block 12012 rasterizes the prepared centroids (prepared data in centroid form) to create LC/MS images. See FIG. 12AQ. In other words, the method places the centroids on the raster (LC/MS image). Next, the method 12000 proceeds to a set of method steps 12014 where the method filters the LC/MS images created from the prepared centroids (prepared data in centroid form) defined by a continuation terminal ("terminal D"). See FIGS. 12AT-12AV. From the set of method steps 12014, the method 12000 proceeds to another continuation terminal ("terminal A2").

From terminal A2 (FIG. 12C), the method 12000 proceeds to a set of method steps 12016 where the method executes image processing on LC/MS images derived either from prepared data in centroid form or data in profile form, defined at continuation terminal ("terminal E"). See FIG. 12BC. The method then continues to decision block 12018 where a test is performed to determine whether the data were in centroid form. If the answer to the test at decision block 12018 is No, the method continues to another continuation terminal ("terminal A4"). Otherwise, the answer to the test at decision block 12018 is Yes, and the method proceeds to a set of method steps, defined at continuation terminal ("terminal F"), where the method executes refined peak detection to better detect peaks from LC/MS images based on various refining techniques and clustering techniques. See FIGS. 12BD-12BF.

From terminal A3 (FIG. 12D), the method 12000 proceeds to decision block 12022 where a test is performed to determine whether the event is a repeated execution of refined peak detection. If the answer is No to the test at decision block 12022, the method extracts centroids that were not considered as peaks in previous executions of refined peak detection. See block 12024. Next, at block 12026, the method uses extracted centroids in subsequent processing. The method then proceeds to terminal C. If the answer to the test at decision block 12022 is Yes, the method continues to a set of method steps 12028, defined by a continuation terminal ("terminal G") where the method extracts data representing peaks from rastered centroids. The method 12000 then continues to another continuation terminal ("terminal A4"). From terminal A4 (FIG. 12E), the method 12000 proceeds to block 12030 where the method processes detected peaks and LC/MS images stored in a database. The method then terminates execution.

Figure 12G:
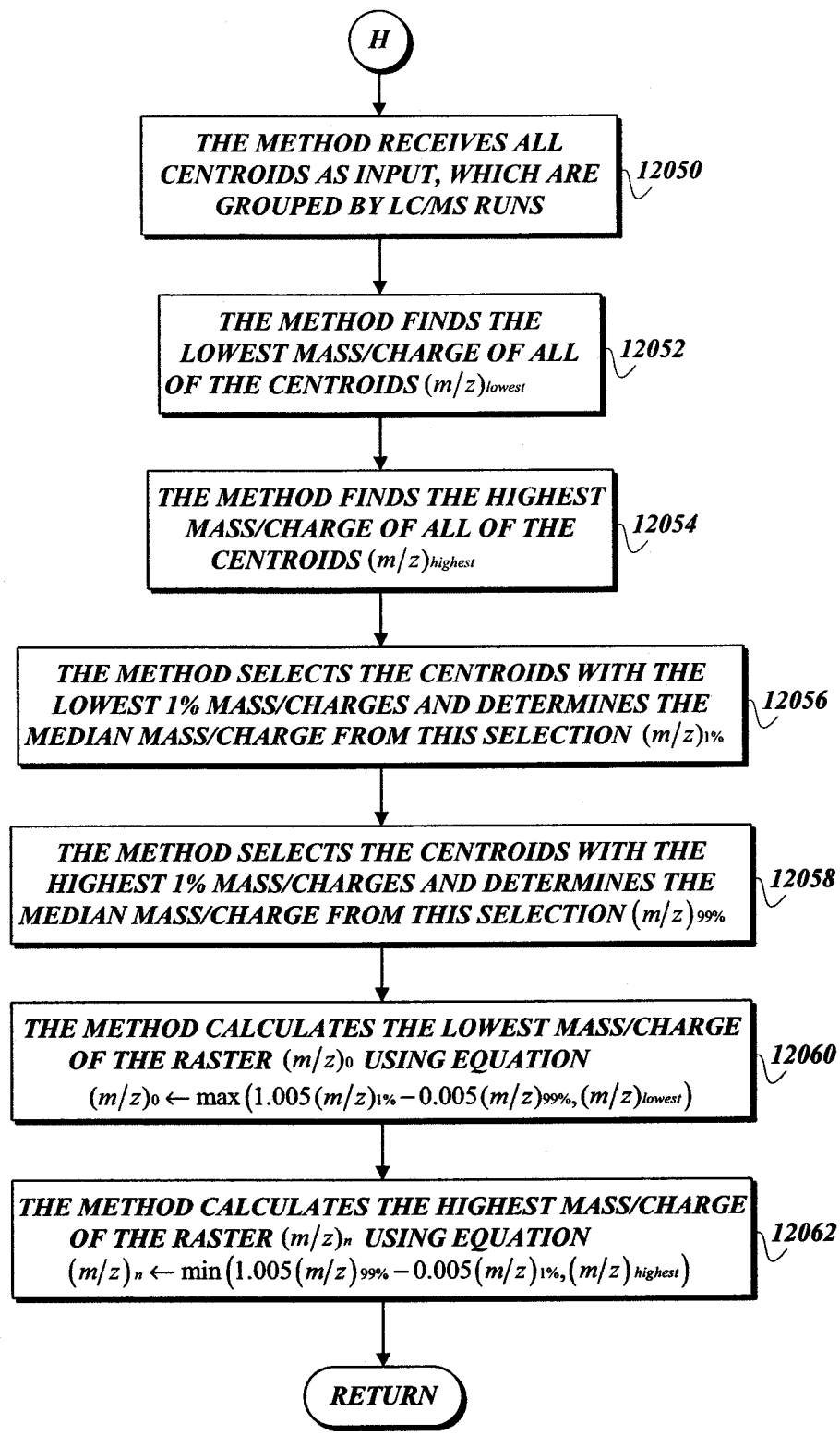
Figure 12H:
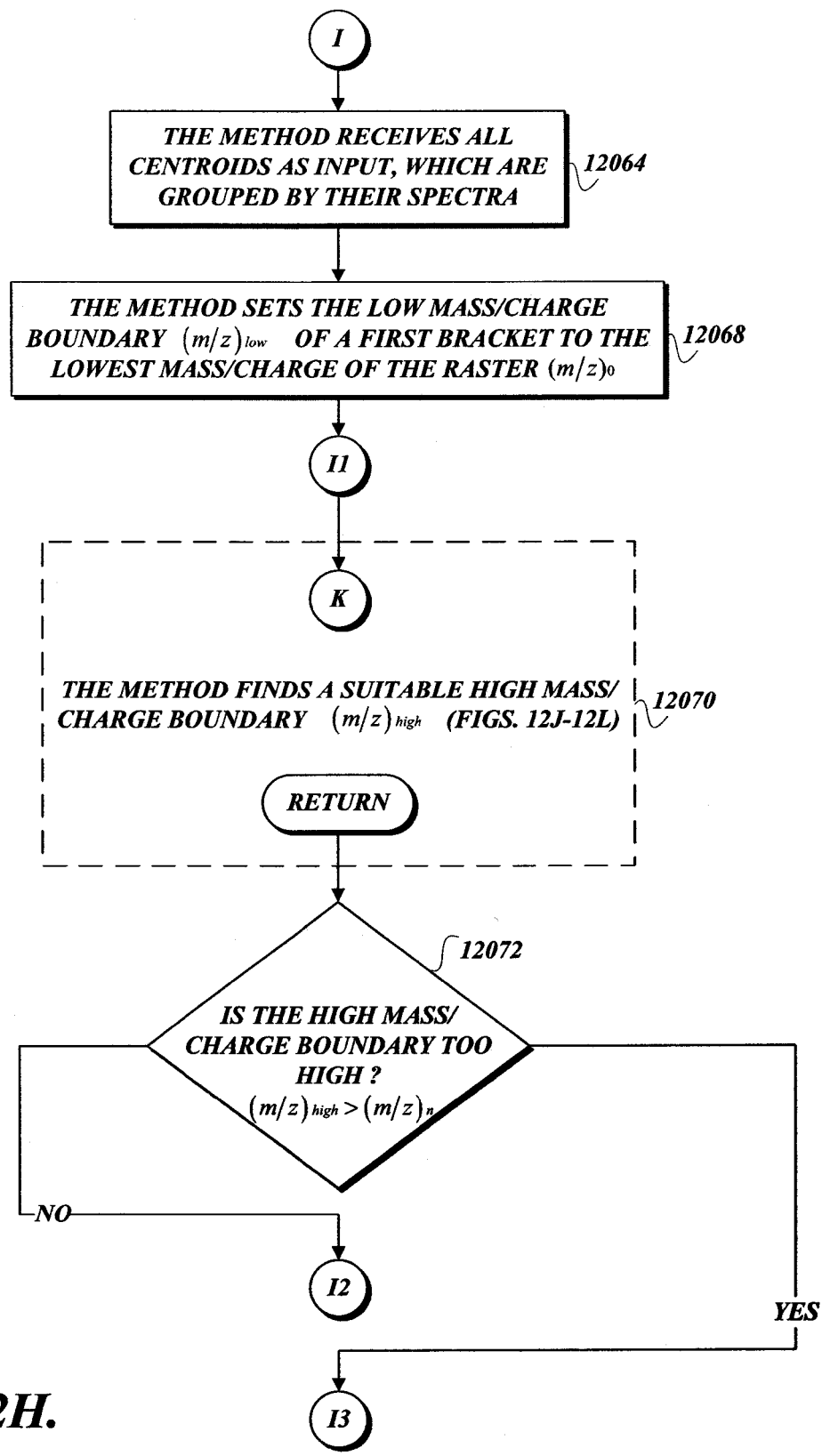
Figure 12I:
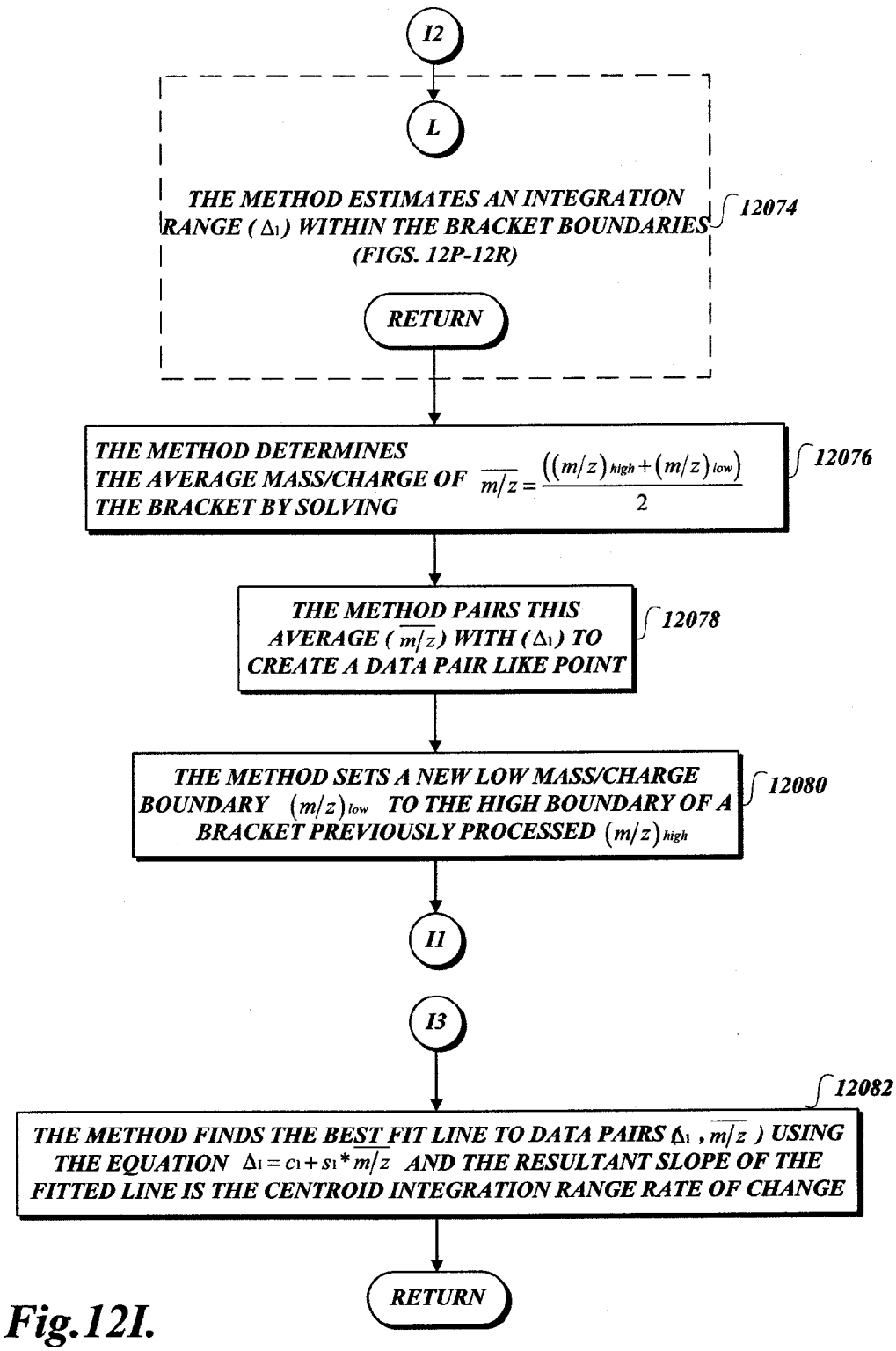

From terminal B (FIG. 12E), the method 12000 proceeds to block 12034 where the method receives centroids as input, which are grouped by LC/MS runs and further sub-grouped by their mass spectra. The steps of the method of terminal B aim to produce one or more LC/MS images based on centroid data that are suitable for image processing. Retention alignments suitably occur prior to the steps of the method from terminal B. The method then continues to another continuation terminal ("terminal H"), which defined a set of method steps 12036, where the method determines the lowest mass/charge $(m/z)_0$ and highest mass/charge $(m/z)_n$ of the raster. See FIG. 12G. The method then proceeds to another continuation terminal ("terminal I"), defined by a set of method steps 12038 where the method determines the centroid integration range rate of change $(s_1)$. See FIGS. 12H-12I. The method 12000 then continues to another continuation terminal ("terminal B1").

Figure 12J:
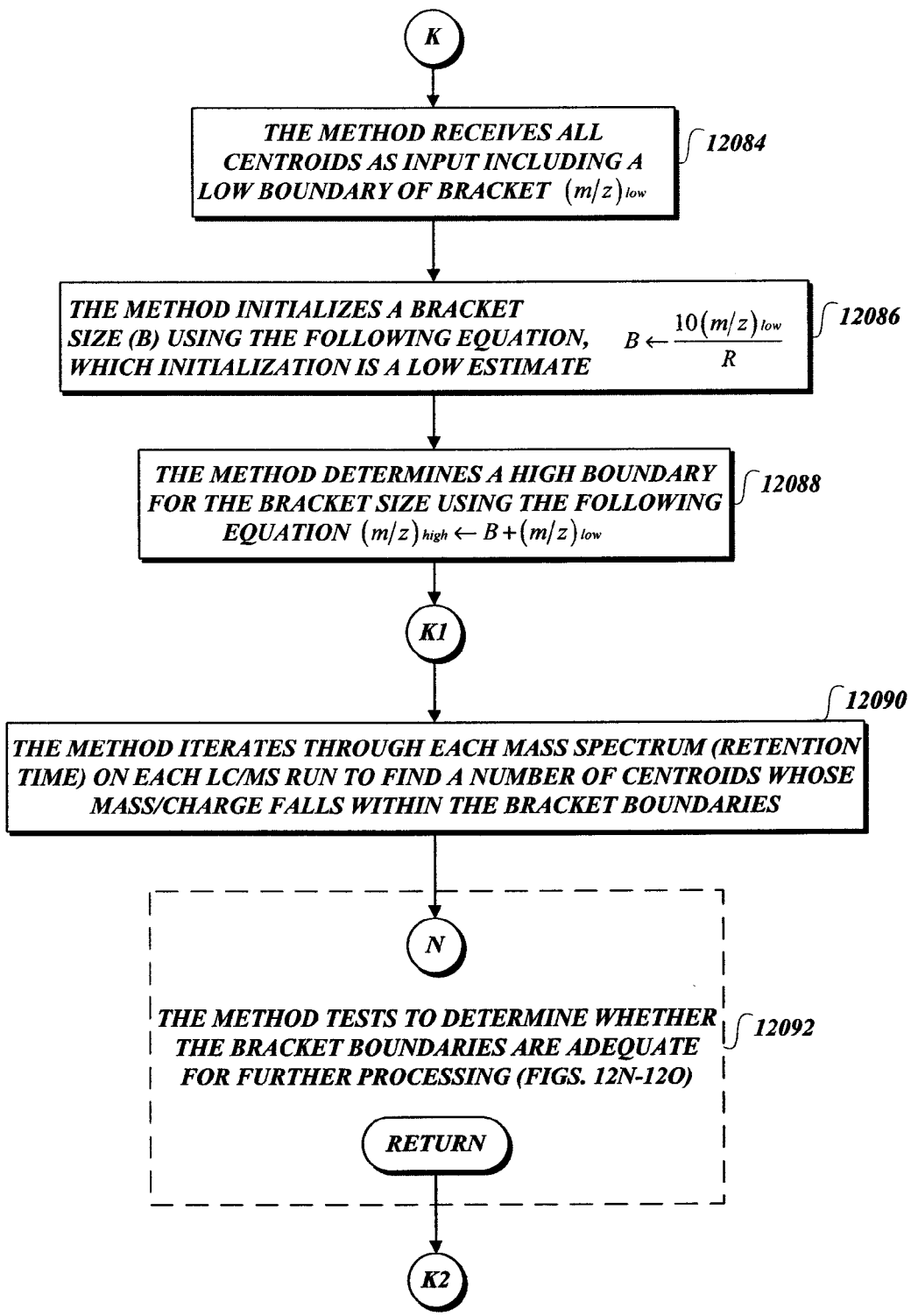
Figure 12K:
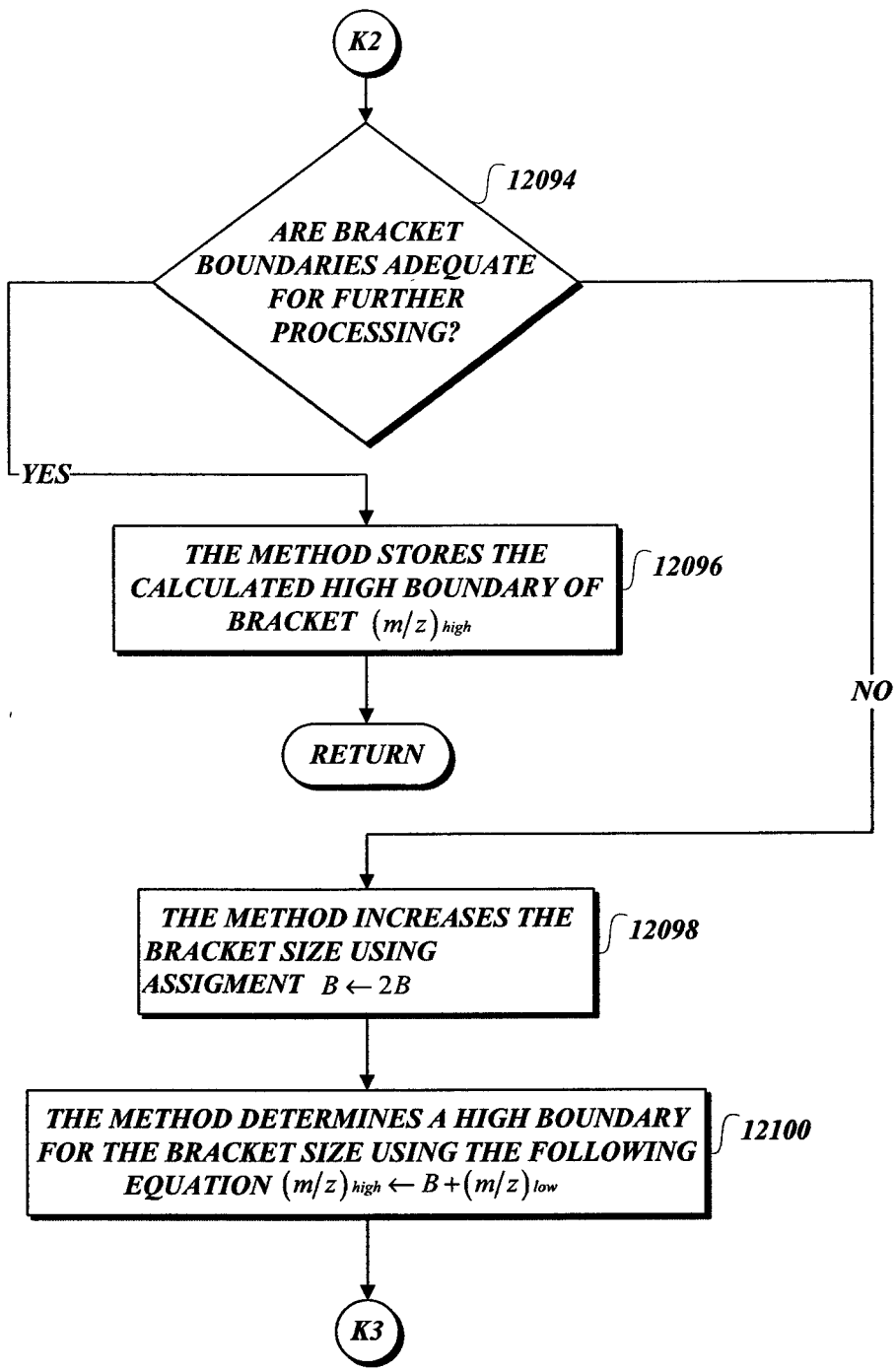
Figure 12L:
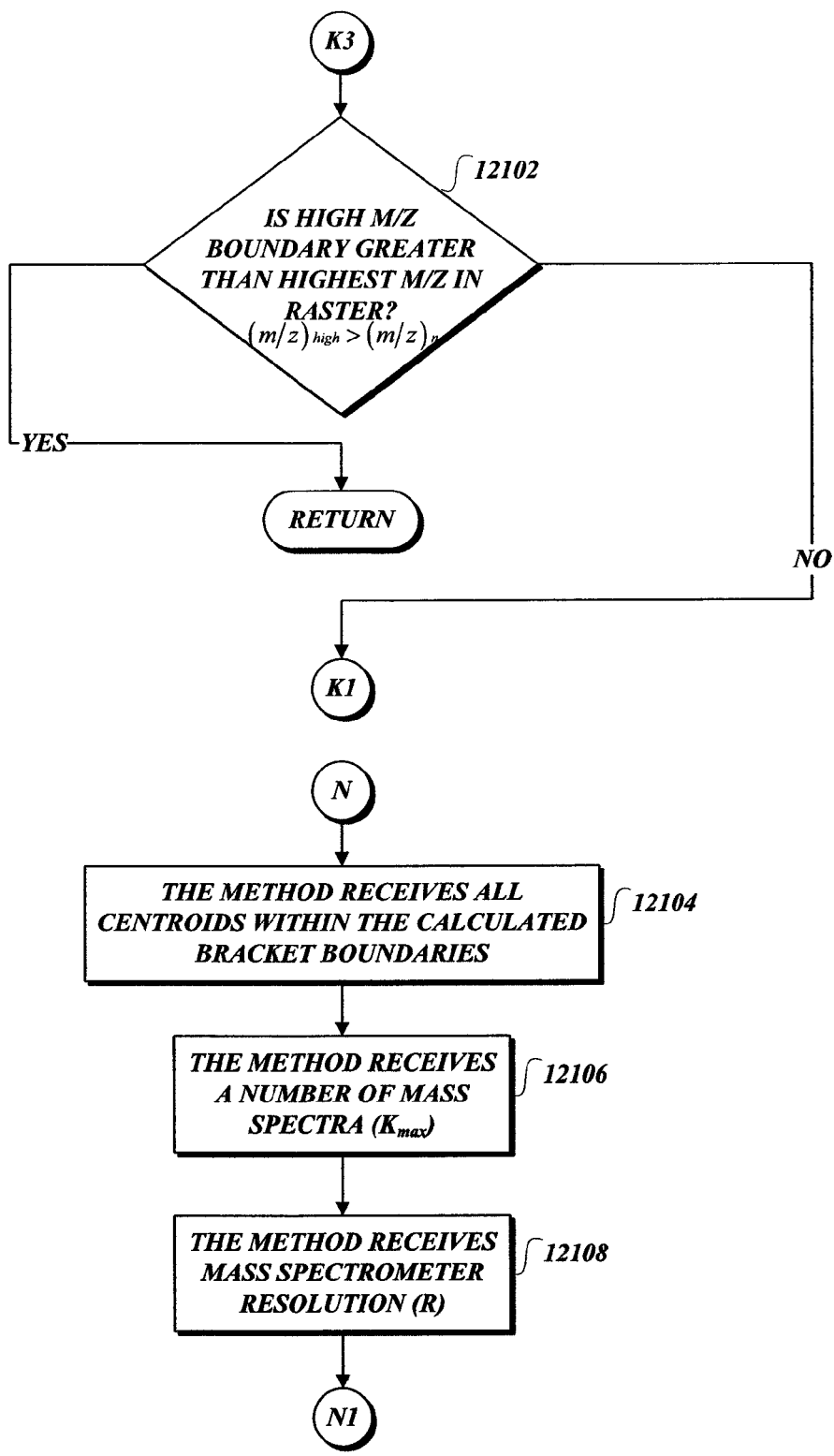
Figure 12M:
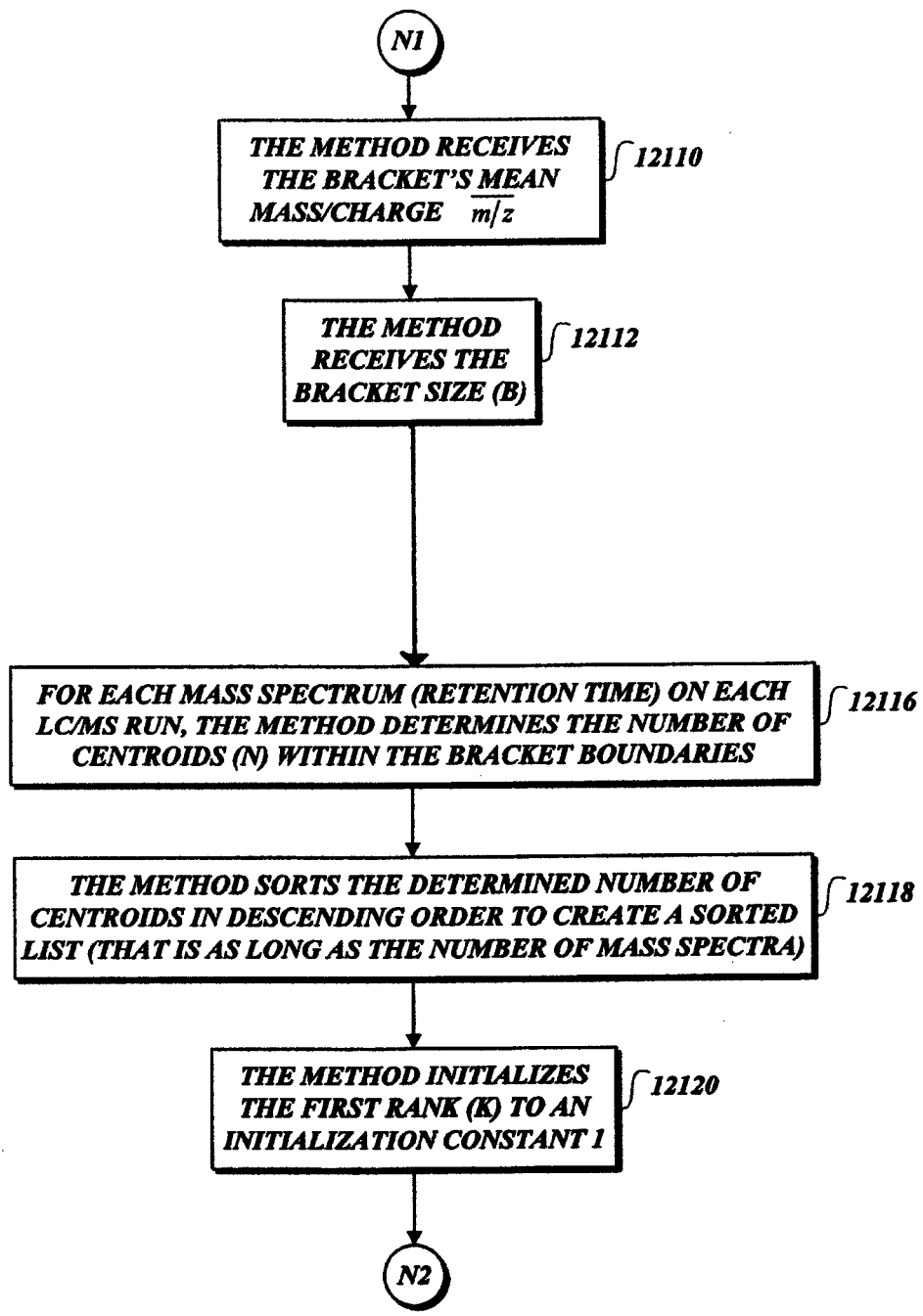
Figure 12N:
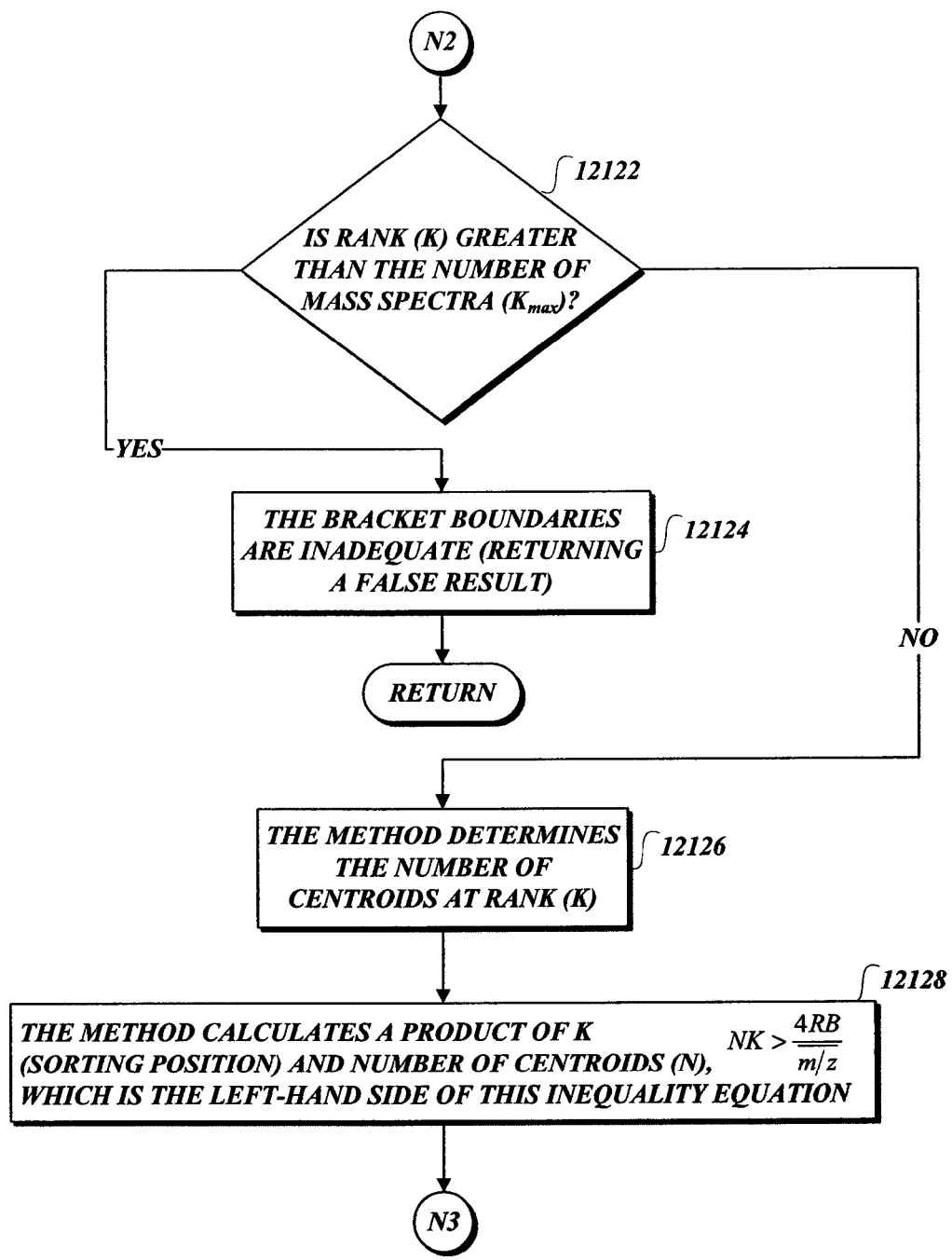
Figure 120:
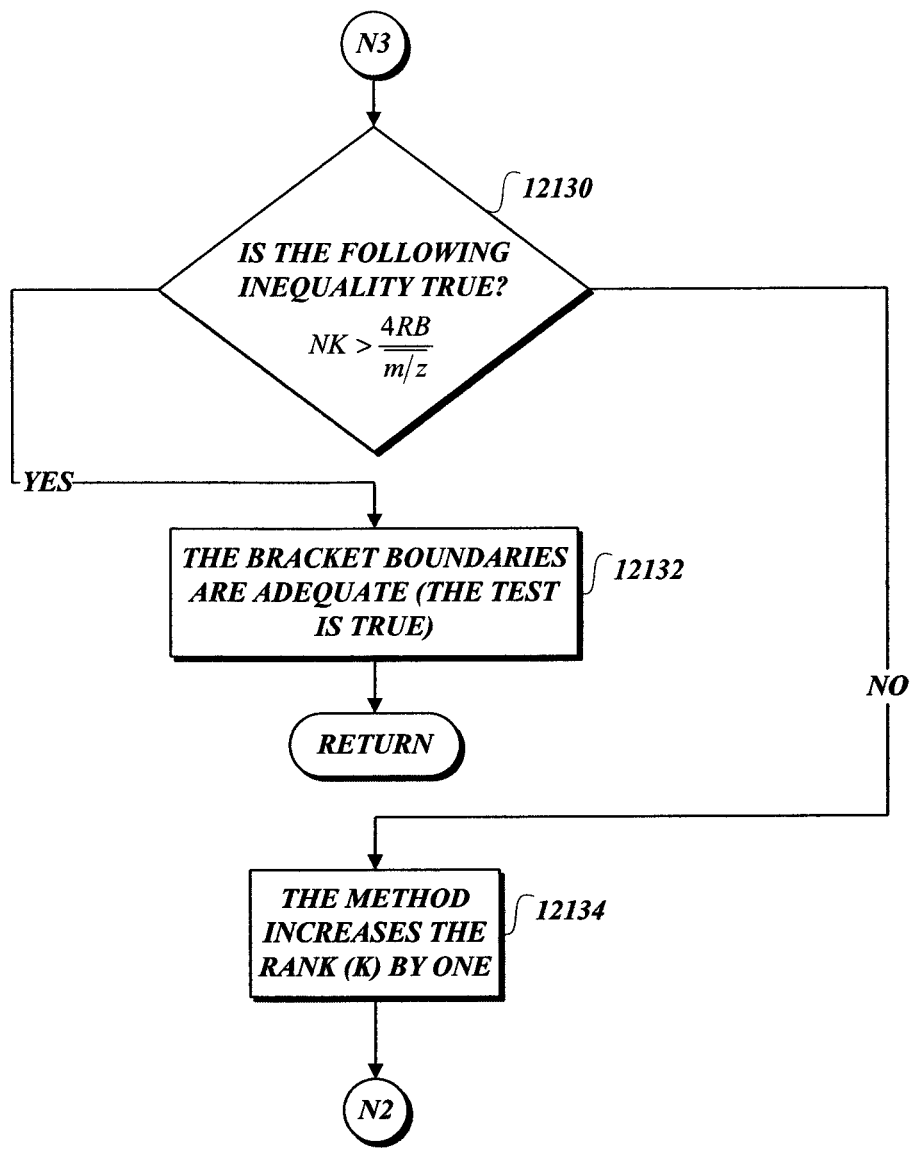
Figure 12P:
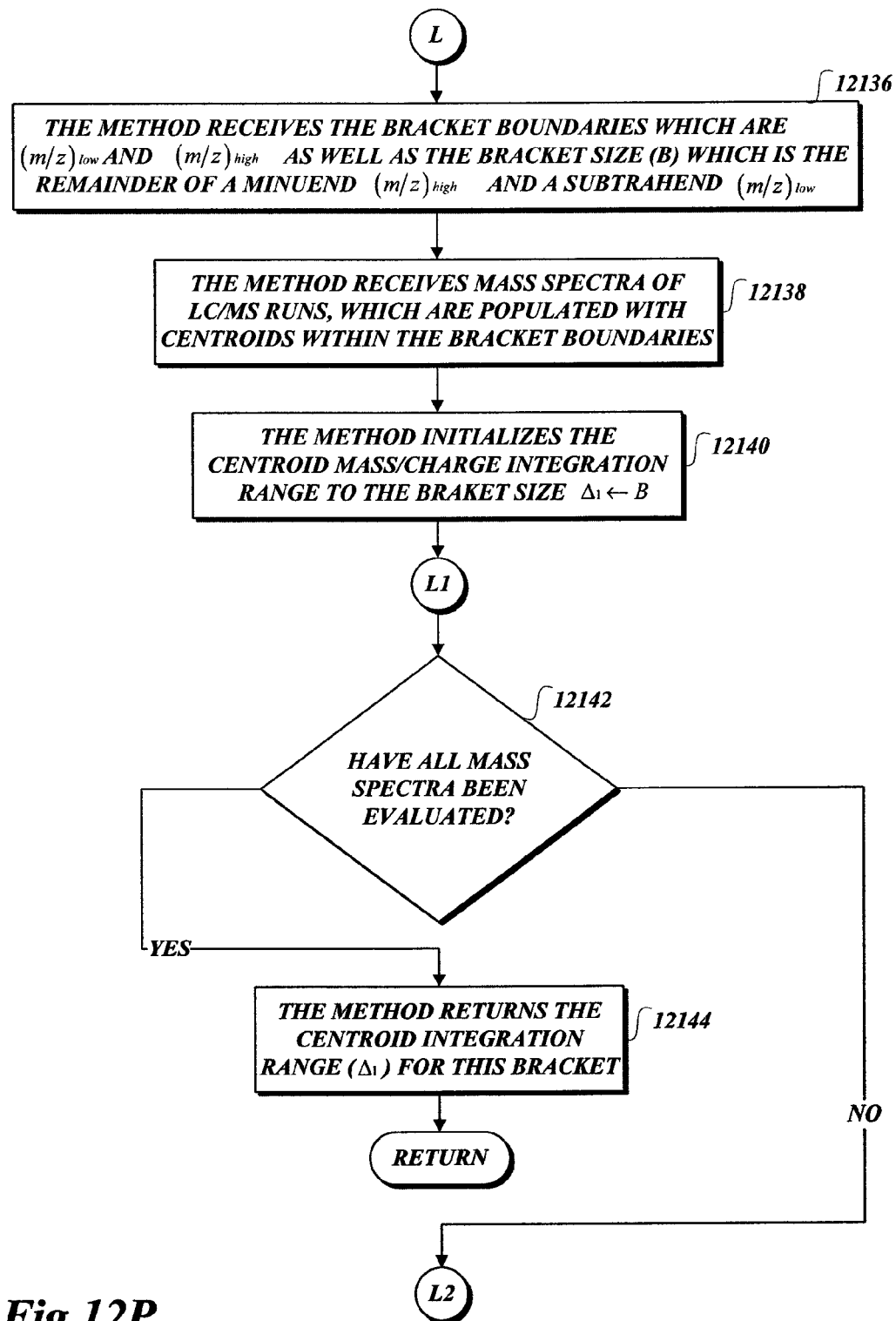
Figure 12Q:
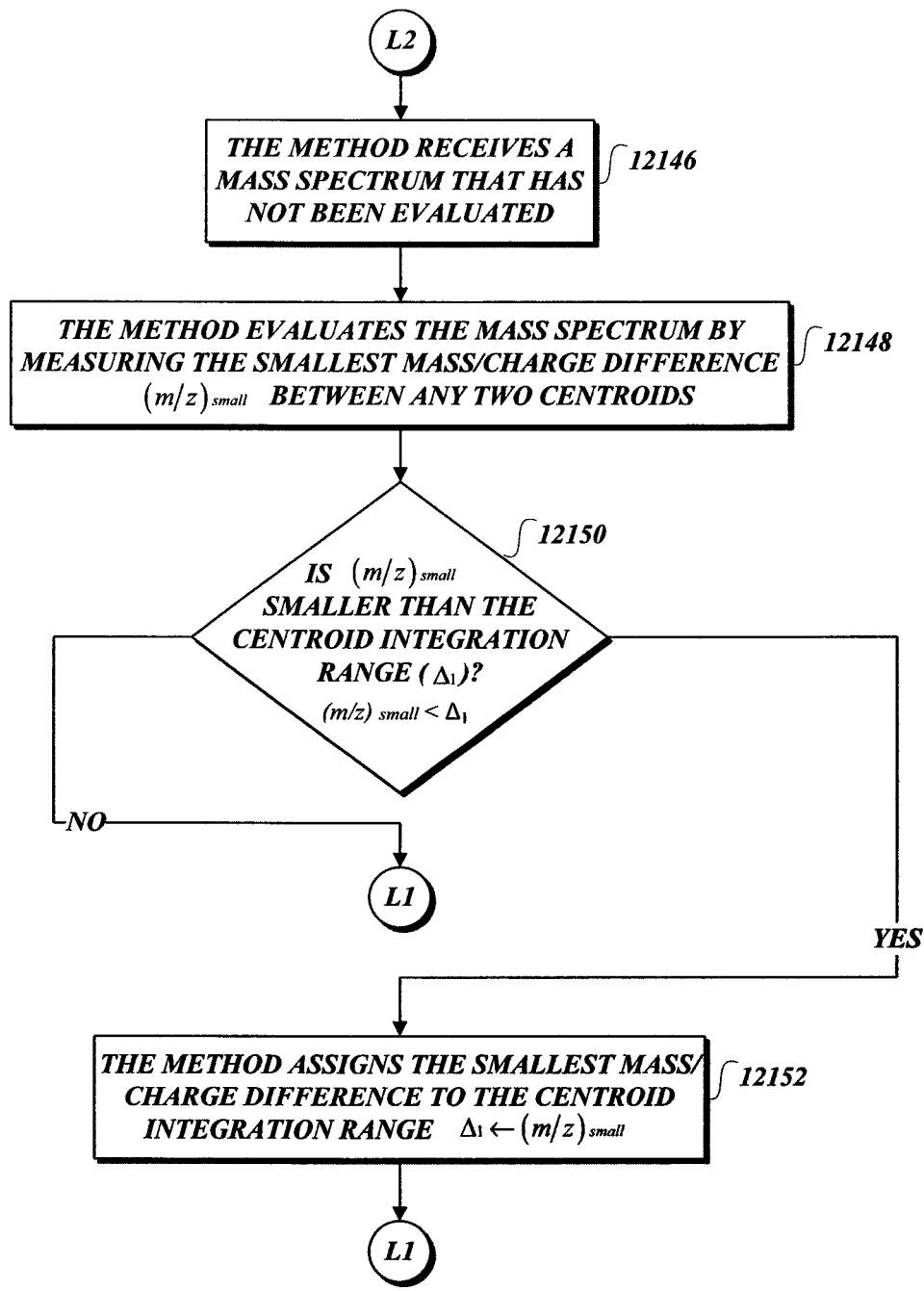
Figure 12R:
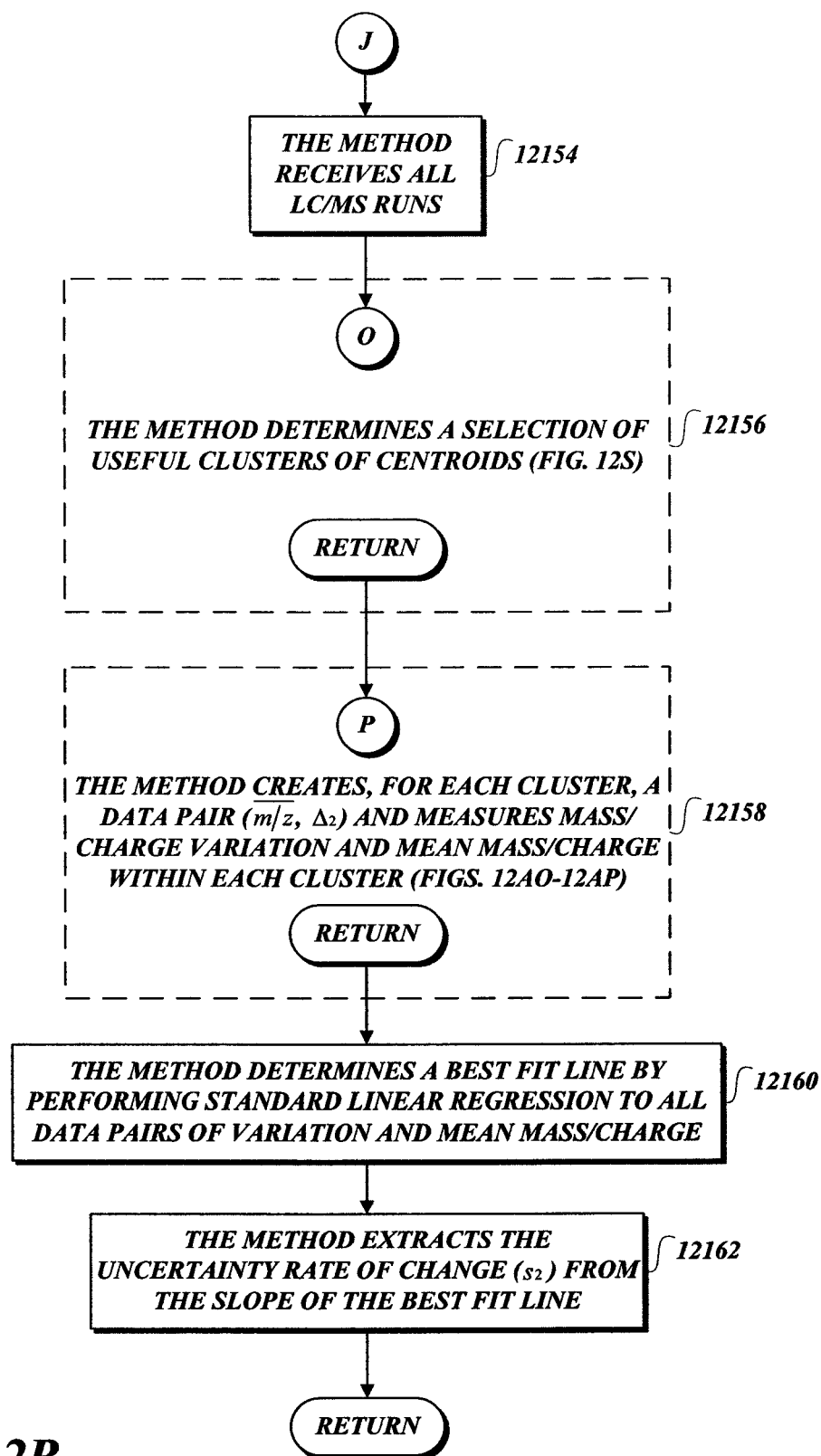

From terminal B1 (FIG. 12F), the method proceeds to another continuation terminal ("terminal J"), defining a set of method steps 12040, where the method determines the mass/charge uncertainty rate of change $(s_2)$. See FIG. 12R. The mass/charge uncertainty $(\Delta_2)$ suitably increases with mass/charge. To determine the centroid mass/charge uncertainty rate of change in respect to mass/charge $(s_2)$, it is suitable to determine the uncertainty of the mass/charge $(\Delta_2)$ at different mass/charge values. Specifically, it is suitable to plot the variation of the centroids $(\Delta_2)$ in a cluster against the mean of the cluster's mass/charge $(\overline{m/z})$. The slope of the best fit line to these points is the centroid mass/charge uncertainty rate of change $(s_2)$. Regarding the uncertainty of the mass/charge $(\Delta_2)$, it provides another estimate for the mass/charge bin width $(\Delta)$ as described hereinbefore. It is suitable to determine the variation of mass/charge from selected centroids that form a cluster. This variation is due to the mass/charge uncertainty of the centroid $(\Delta_2)$. A cluster of centroids is a group of centroids whose mass/charge and retention times are close enough such that they are likely to be derived from the same ion and that these centroids form a contiguous peak or streak on a two dimensional LC/MS image. The mass/charge variation of the cluster centroids is suitably within a bin width. Therefore it is suitable to consider the mass/charge uncertainty $(\Delta_2)$ as the suitable "compression distance" to bin centroids from a single cluster onto a line that is one or two pixels wide.

The method then continues to block 12042 where the method determines the bin width rate of change $(s \leftarrow \max(s_1, s_2))$. The bin width rate of change $(s)$ is used to determine the raster bin widths. To determine this bin width rate of change $(s)$, it is suitable to choose the maximum of the centroid mass/charge uncertainty rate of change $(s_2)$ and the centroid integration range rate of change $(s_1)$. Next, the method determines the number of mass/charge bins $(n)$ in the raster by solving the following mathematical equation:

$$b = \text{ceil}\left(1 + \frac{\ln((m/z)_b) - \ln((m/z)_0)}{s}\right)$$

See block 12044. Continuing to block 12046, the method sets the term $(m/z)_b$ to another mathematical equation $(m/z)_n$, and the term "b" is equated to the term "n". The method then assigns a mass/charge to each mass/charge bin using a first calculation $(m/z)_b = (m/z)_0 * \exp(s*(b-1))$ or a second calculation $(m/z)_b \leftarrow (1+s)(m/z)_{b-1}$. See block 12048. In the first calculation, it is suitable to set the mass/charge of the first bin to $(m/z)_0$. The mass/charge for the next bin (b) is the mass/charge of the previous bin (b-1) multiplied by (1+s). The terms of the first calculation include $(m/z)_b$ as the mass/charge that refers to bin number b; and $(m/z)_{b-1}$ as the mass/charge of the neighboring bin (b-1) with smaller mass/charge. The first calculation is repeated by increasing the bin number (b) until the mass/charge of a gradation is equal to or higher than $(m/z)_n$. The method then returns from execution to the point of invocation.

From terminal H (FIG. 12G), the method proceeds to block 12050 where the method receives all centroids as input, which are grouped by LC/MS runs. Digressing, from a collection of LC/MS runs that will be put onto equivalent LC/MS images, the lowest mass/charge of any centroid is $(m/z)_{lowest}$. From the collection of LC/MS runs that will be put onto equivalent LC/MS images, the highest mass/charge of any centroid is $(m/z)_{highest}$. The lowest $((m/z)_{lowest})$ and highest $((m/z)_{highest})$ mass/charge of centroids in a collection of LC/MS runs may be outlier values that may increase the number of bins unnecessarily. Therefore, it is suitable to determine reasonable low $((m/z)_0)$ and high $((m/z)_n)$ mass/charge values for the raster. It is suitable to consider the 1% of centroids that have the lowest mass/charge values. It is suitable to take the median of these mass/charge values. This is the initial low mass/charge estimate: $(m/z)_{1\%}$. It is suitable to consider the 1% of centroids that have the highest mass/charge value. It is suitable to take the median mass/charge value from this collection. This is the initial high mass/charge estimate: $(m/z)_{99\%}$.

Returning to block 12052, the method finds the lowest mass/charge value of all of the centroids $(m/z)_{lowest}$. At block 12054, the method finds the highest mass/charge value of all of the centroids $(m/z)_{highest}$. The method at block 12056 selects the centroids with the lowest 1% mass/charge values and determines the median mass/charge value from this selection $(m/z)_{1\%}$. At block 12058, the method selects the centroids with the highest 1% mass/charge values and determines the median mass/charge value from this selection $(m/z)_{99\%}$. At block 12060, the method calculates the lowest mass/charge value of the raster $(m/z)_0$ using assignment $(m/z)_0 \leftarrow \max(1.005(m/z)_{1\%} - 0.005(m/z)_{99\%}, (m/z)_{lowest})$ At block 12062, the method calculates the highest mass/charge value of the raster $(m/z)_n$ using assignment $(m/z)_n \leftarrow \min(1.005(m/z)_{99\%} - 0.005(m/z)_{1\%}, (m/z)_{highest})$ The method then returns to the point of invocation.

Digressing, it is suitable to determine the mass/charge value and retention time bins of the LC/MS image. To this end it is suitable to determine the bin widths of the LC/MS image. The retention time bin width is usually determined by the scan rate of the mass spectrometer. The scan rate is number of mass spectra acquired over a period of time. The retention time bin widths are equal throughout an LC/MS image. The mass/charge bin widths $(\Delta)$ are not typically equal throughout the raster. The mass/charge peak width of an ion is proportional to the mass/charge uncertainty of the mass spectrometer. It is suitable to have approximately the same number of pixels (or raster bins) per mass/charge peak width. Therefore, the desired mass/charge bin width $(\Delta)$ is proportional to the uncertainty of the mass spectrometer. Since the mass spectrometer's uncertainty is proportional to mass/charge $(m/z)$, the desired bin width $(\Delta)$ increases in proportion to the mass/charge $(m/z)$.

The bin width is proportional to the mass/charge value according to this calculation: $\Delta = s*m/z$, where m/z is the mass/charge value; $\Delta$ is the mass/charge bin width; and s is the bin width rate of change (with respect to mass/charge). It is suitable to consider the mass/charge bin width as the change in mass/charge per change in bin number in this differential equation:

$$\Delta = \frac{d(m/z)}{db}$$

In the above calculation the term b is the bin number. Returning, from terminal I (FIG. 12H), the method proceeds to block 12064 where the method receives all centroids as input, which are grouped by their spectra. The method at block 12068 sets the low mass/charge boundary $(m/z)_{low}$ to the lowest mass/charge of the raster $(m/z)_0$. The method then continues to another continuation terminal ("terminal I1"). From terminal I1, the method proceeds to another continuation terminal ("terminal K"), defining a set of method steps 12070 where the method finds a suitable high mass/charge boundary $(m/z)_{high}$. See FIGS. 12J-12L. The method then continues to decision block 12072 where a test is performed to determine whether the mass/charge boundary is too high $(m/z)_{high} > (m/z)_n$. If the answer to the test at decision block 12072 is No, the method continues to another continuation terminal ("terminal I2"). Otherwise, the answer to the test at decision block 12072 is Yes, and the method continues to another continuation terminal ("terminal I3"). Decision block 12072 suitably decides whether the method should stop determining additional centroid integration ranges $(\Delta_1)$. If $(m/z)_{high}$ is larger than the highest mass/charge of the LC/MS image, then no more brackets are determined and the process continues.

From terminal I2 (FIG. 12I), the method continues to another continuation terminal ("terminal L"), defining a set of method steps 12074 where the method estimates an integration range $(\Delta_1)$ within the bracket boundaries. See FIGS. 12P-12R. The method then continues to block 12076, where the method determines the average mass/charge of the bracket by solving $$\overline{m/z} = \frac{((m/z)_{high} + (m/z)_{low})}{2}.$$

At block 12078, the method pairs this calculated average ($\overline{m/z}$) with ($\Delta_1$) to create a data pair like point. At block 12080, the method sets a new low mass/charge boundary $(m/z)_{low}$ to the high boundary of a bracket previously processed $(m/z)_{high}$. The method then continues to terminal I1 and skips back to sets of method steps 12070 where the above-identified processing steps are repeated.

From terminal I3 (FIG. 12I), the method finds the best fit line to the data pairs $(\Delta_1, \overline{m/z})$ using the equation $\Delta_1 = c_1 + s_1 * \overline{m/z}$, and the resultant slope of this fitted line is a centroid integration range rate of change. See block 12082. In other words, the method plots the estimates of the centroid integration ranges $(\Delta_1)$ versus the mean mass/charge $(\overline{m/z})$ of the mass/charge bracket. A best fit line is determined by standard linear regression from the plotted points $(\Delta_1, \overline{m/z})$: $\Delta_1 = c_1 + s_1 * \overline{m/z}$. The slope of this best fit line is the centroid integration range rate of change in respect to mass/charge $(s_1)$. The intercept of this line $(c_1)$ may be thought of as the minimum integration range. The method then returns from execution to the point of invocation.

From terminal K (FIG. 12J), the method proceeds to block 12084 where the method receives all centroids as input, including a low boundary of bracket $(m/z)_{low}$. At block 12086, the method initializes a bracket size (b) using the following assignment, whose initialization is a low estimate $$B \leftarrow \frac{10(m/z)_{low}}{R}.$$

Next, at block 12088, the method determines a high boundary for the bracket size using the following assignment $(m/z)_{high} \leftarrow B + (m/z)_{low}$. The method then continues to another continuation terminal ("terminal K1"). From terminal K1 (FIG. 12J), the method proceeds to block 12090 where the method iterates through each mass spectrum (retention time) on each LC/MS run to find a number of centroids whose mass/charge falls within the bracket boundaries. The method then continues to another continuation terminal ("terminal N"), defining a set of method steps 12092 where the method tests to determine whether the bracket boundaries are adequate for further processing. See FIGS. 12L-12O. The method then continues to another continuation terminal ("terminal K2").

From terminal K2 (FIG. 12J), the method continues to decision block 12094 where a test is performed to determine whether bracket boundaries are adequate for further processing. If the answer to the test at decision block 12094 is Yes, the method continues to block 12096 where the method stores the calculated high boundary of bracket $(m/z)_{high}$. The method then returns from execution to the point of invocation. Otherwise, the answer to the test at decision block 12094 is No, and the method proceeds to block 12098 where the method increases the bracket size using the assignment $B \leftarrow 2B$. The reason for this step is because the number of centroids is deemed insufficient by the method. At block 12100, the method determines a high boundary for the bracket size using the following assignment $(m/z)_{high} \leftarrow B + (m/z)_{low}$. The method then continues to another continuation terminal ("terminal K3").

From terminal K3 (FIG. 12L), the method proceeds to a decision block 12102 where a test is performed to determine whether the high mass/charge boundary is greater than the highest mass/charge in the raster $(m/z)_{high} > (m/z)_n$. If the answer to the test at decision block 12102 is Yes, the method returns from execution to the point of invocation. In other words, If $(m/z)_{high}$ is larger than the highest mass/charge of the raster, then no more brackets are determined and the process continues. If the answer to the test at decision block 12102 is No, the method continues to terminal K1 and skips back to block 12090 where the above-identified processing steps are repeated.

From terminal N (FIG. 12L), the method proceeds to block 12104 where the method receives centroids within the calculated bracket boundaries. At block 12106, the method receives a number of mass spectra $(K_{max})$. The steps of terminal N decide if the number of centroids is sufficient by determining the number of centroids in each mass spectrum of LC/MS runs that are within the bracket boundaries $(m/z)_{low}$ and $(m/z)_{high}$. The method tests to see whether there is any number N greater than 1 that can fulfill the following inequality $$NK > \frac{4RB}{\overline{m/z}}$$

In other words, the method chooses a mass/charge bracket that contains sufficient centroids for statistical significance. The condition of statistical significance is met when the above inequality is met. The terms of the above entity are as follows: N=1, 2, 3, . . . ; K is number of mass spectra with more than N centroids within the bracket boundaries; R is the resolution of the mass spectrometer. At block 12108, the method receives mass spectrometers resolution (R). The method then continues to another continuation terminal ("terminal N1").

From terminal N1 (FIG. 12M), the method proceeds to block 12110 where the method receives the bracket's mean mass/charge $\overline{m/z}$. The method then receives the bracket size (B). See block 12112. At block 12116, for each mass spectrum (retention time), on each LC/MS run, the method determines the number of centroids (N) within the bracket boundaries. At block 12118, the method sorts the determined number of centroids in descending order to create a sorted list (that is as long as the number of mass spectra). The method then initializes at block 12120 the first rank (K) to an initialization constant 1. The method then continues to another continuation terminal ("terminal N2").

From terminal N2 (FIG. 12N), the method proceeds to decision block 12122 where a test is performed to determine whether the rank (K) is greater than the number of mass spectra ($K_{max}$). If the answer to the test at decision block 12122 is Yes, the method proceeds to block 12124 where the bracket boundaries are, as determined by the method 12000, found to be inadequate (returning a false result). The method then returns from execution to the point of invocation. If the answer to the test at decision block 12122 is No, the method continues to block 12126 where the method determines the number of centroids at rank (K). At block 12128, the method calculates a product of (K) (sorting position) and number of centroids (N) which is the left-handed side of the following inequality expression:

$$NK > \frac{4RB}{\overline{m/z}}$$

The method then continues to another continuation terminal ("terminal N3").

From terminal N3 (FIG. 12O), the method proceeds to decision block 12130 where a test is performed to determine whether the following inequality is true:

$$NK > \frac{4RB}{\overline{m/z}}$$

If the answer to the test at decision block 12130 is Yes, the method proceeds to block 12132 where the bracket boundaries, as determined by the method 12000, are adequate (the test is true). The method then returns from execution to the point of invocation. If the answer to the test at decision block 12130 is No, the method proceeds to block 12134 where the method increases the rank (K) by one. The method then continues to terminal N2 and skips back to decision block 12122 where the above-identified processing steps are repeated.

The steps of terminal L calculate the centroid integration range ($\Delta_1$). It is suitable to determine the centroid integration range ($\Delta_1$) that was used by a device to create the centroids. Examples of this device include the mass spectrometer, an analog-to-digital converter, or software that pre-processed the mass spectra. At a given mean mass/charge ($\overline{m/z}$) the device integrates signal over a range of mass/charge. The centroid integration range ($\Delta_1$) may vary with mean mass/charge ($\overline{m/z}$). No two centroids may be closer than their centroid integration range ($\Delta_1$). The method for determining the integration range suitably includes finding the smallest change in mass/charge between two adjacent centroids in the same mass spectrum around the mean mass/charge ($\overline{m/z}$). The steps of terminal L also calculate the mass/charge bracket for determining the centroid integration range ($\Delta_1$). The mass/charge range around a mean mass/charge ($\overline{m/z}$) is the mass/charge bracket. It is suitable to choose a mass/charge bracket that contains sufficient centroids for statistical significance. The mass/charge bracket includes a low mass/charge boundary ($(m/z)_{low}$) and a high mass/charge boundary ($(m/z)_{high}$). The size (B) of the mass/charge bracket is: $B = (m/z)_{high} - (m/z)_{low}$.

From terminal L (FIG. 12P), the method receives the bracket boundaries which are $(m/z)_{low}$ and $(m/z)_{high}$ as well as the bracket size (B) which is the remainder of a minuend $(m/z)_{high}$ and a subtrahend $(m/z)_{low}$. See block 12136. Digressing, the mean mass/charge ($\overline{m/z}$) of the bracket is determined using the following equation $$\overline{m/z} = \frac{((m/z)_{high} + (m/z)_{low})}{2}$$

Within a mass/charge bracket on every mass spectrum in one or more related LC/MS runs the method determines the smallest mass/charge difference of two centroids on any single mass spectrum. This smallest mass/charge difference is an approximation of the centroid integration range ($\Delta_1$) for this mass/charge bracket around the mean mass/charge of the bracket ($\overline{m/z}$). Returning to block 12138, the method receives mass spectra of LC/MS runs, which are populated with centroids within the bracket boundaries. At block 12140, the method initializes the centroid mass/charge integration range to the bracket size $\Delta_1 \leftarrow B$. The method then continues to another continuation terminal ("terminal L1").

From terminal L1 (FIG. 12P), the method proceeds to decision block 12142 where a test is performed to determine whether all mass spectra have been evaluated. If the answer to the test at decision block 12142 is Yes, the method proceeds to block 12144 where the method returns the centroid integration range ($\Delta_1$) for this bracket. The method then returns from execution to the point of invocation. If the answer to the test at decision block 12142 is No, the method continues to another continuation terminal ("terminal L2").

From terminal L2 (FIG. 12Q), the method proceeds to block 12146 where the method receives a mass spectrum that has not been evaluated. At block 12148, the method evaluates the mass spectrum by measuring the smallest mass/charge difference $(m/z)_{small}$ between any two centroids. At decision block 12150 a test is performed to determine whether $(m/z)_{small}$ is smaller than the centroid integration range ($\Delta_1$). See mathematical expression:

$$(m/z)_{small} < \Delta_1$$

If the answer to the test at decision block 12150 is No, the method proceeds to continuation terminal L1 and skips back to decision block 12142 where the above-identified processing steps are repeated. Otherwise, the answer to the test at decision block 12150 is Yes, and the method proceeds to block 12152 where the method assigns the smallest mass/charge difference to the centroid integration range $\Delta_1 \leftarrow (m/z)_{small}$. The method 12000 then proceeds to continuation terminal L1 and skips back to block 12142 where the above-identified processing steps are repeated.

The steps of terminal J calculate the mass/charge uncertainty rate of change ($s_2$). The compression distance $\Delta_2$ may be determined by either Method 1 or 2 described hereinbefore. The compression distance $\Delta_2$ from each cluster is plotted against the weighted mean ($\overline{m/z}$) of the cluster mass/charge. The process is repeated for all clusters in a collection of LC/MS runs. It is suitable to determine the best fit line to these points that intercepts the origin. The slope ($s_2$) of this line is the mass/charge uncertainty rate of change.

Figure 12S:
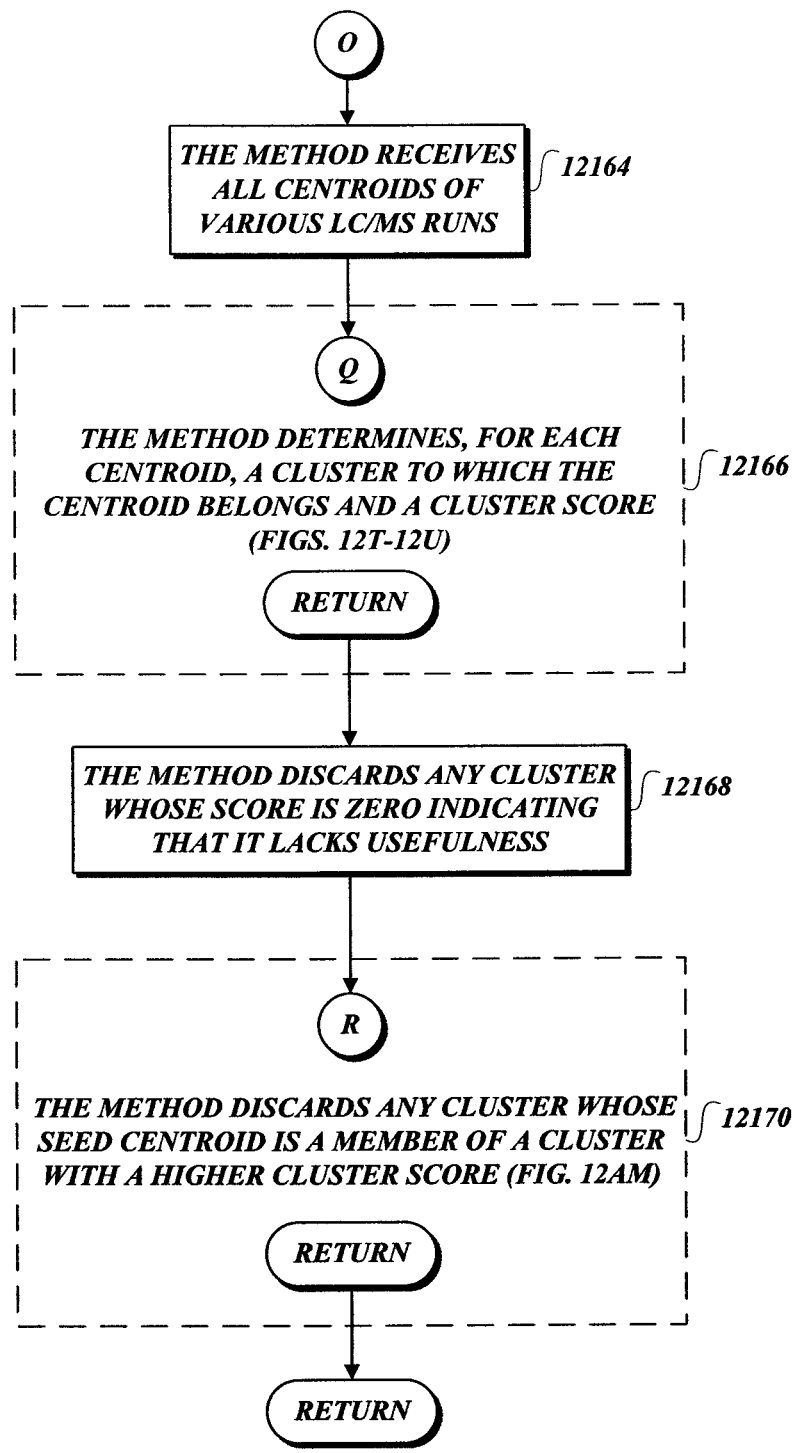

From terminal J (FIG. 12R), the method proceeds to block 12154 where the method receives all LC/MS runs as input. The method then continues to another continuation terminal ("terminal O"), which defines a set of method steps 12156 where the steps determine a selection of useful clusters of centroids. See FIG. 12S. The method then continues to another continuation terminal ("terminal P"), which defines another set of method steps 12158 where the steps create, for each cluster, a data pair ($\overline{m/z}$, $\Delta_2$) and measures mass/charge variation as well as mean mass/charge within each cluster. See FIGS. 12AO-12AP. The method proceeds to block 12160 where the method determines a best fit line by performing standard linear regression on all data pairs of variation and mean mass/charge. At block 12162 the method extracts the uncertainty rate of change ($s_2$) from the slope of the best fit line. The method then returns from execution to the point of invocation.

From terminal O (FIG. 12S), the method proceeds to block 12164 where the method receives all centroids of various LC/MS runs. Digressing, the steps of terminal O suitably find a selection of useful clusters by iterating through LC/MS runs. It is suitable to iterate through all centroids within each single LC/MS run. It is suitable to define the current centroid the seed centroid. For each seed centroid it is suitable to determine its surrounding cluster of centroids within its LC/MS run. Each cluster is scored. A cluster's score reflects its usefulness in determining the mass/charge uncertainty rate of change ($s_2$). The clusters are ranked in order of descending score. It is suitable to disregard any cluster whose seed centroid is a member of a higher ranked cluster. It is further suitable to disregard any cluster whose score is zero. Each of the remaining clusters may be used to determine its mass/charge uncertainty.

Figure 12T:
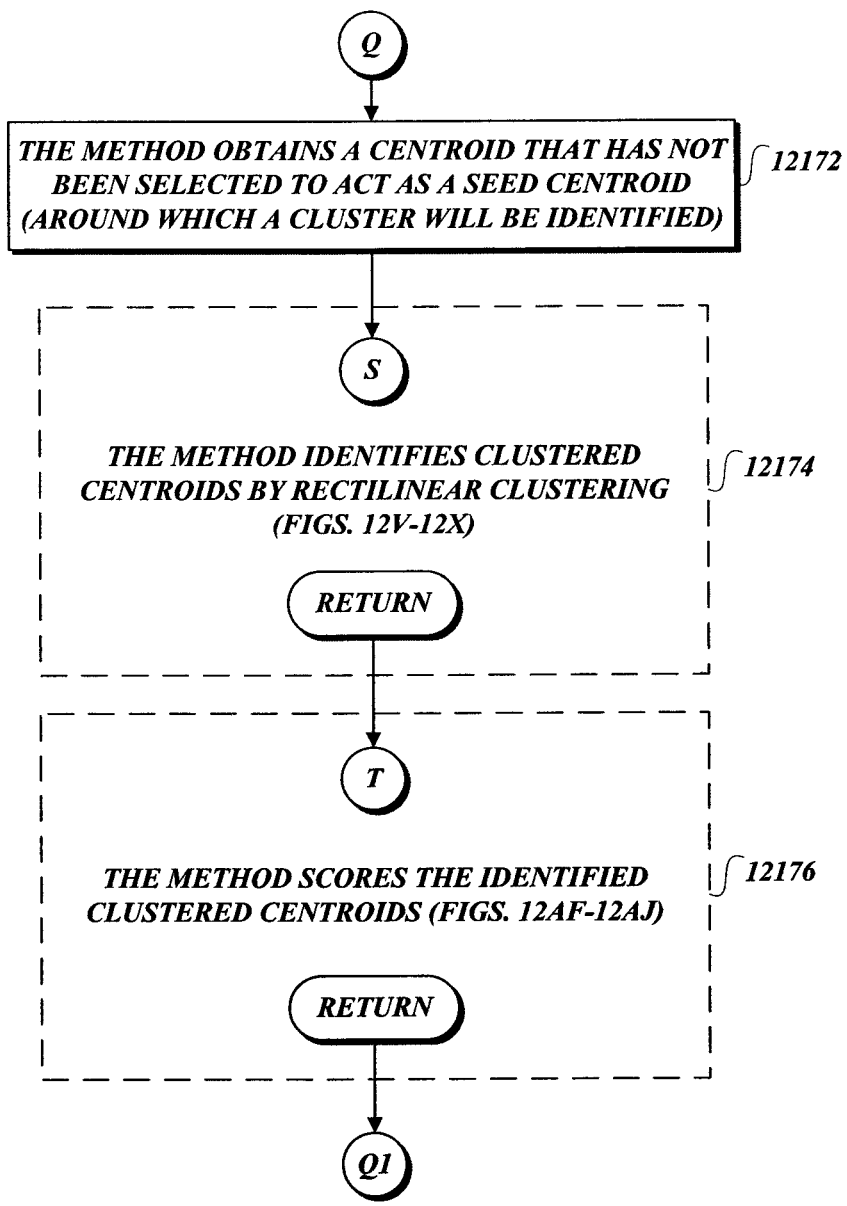
Figure 12U:
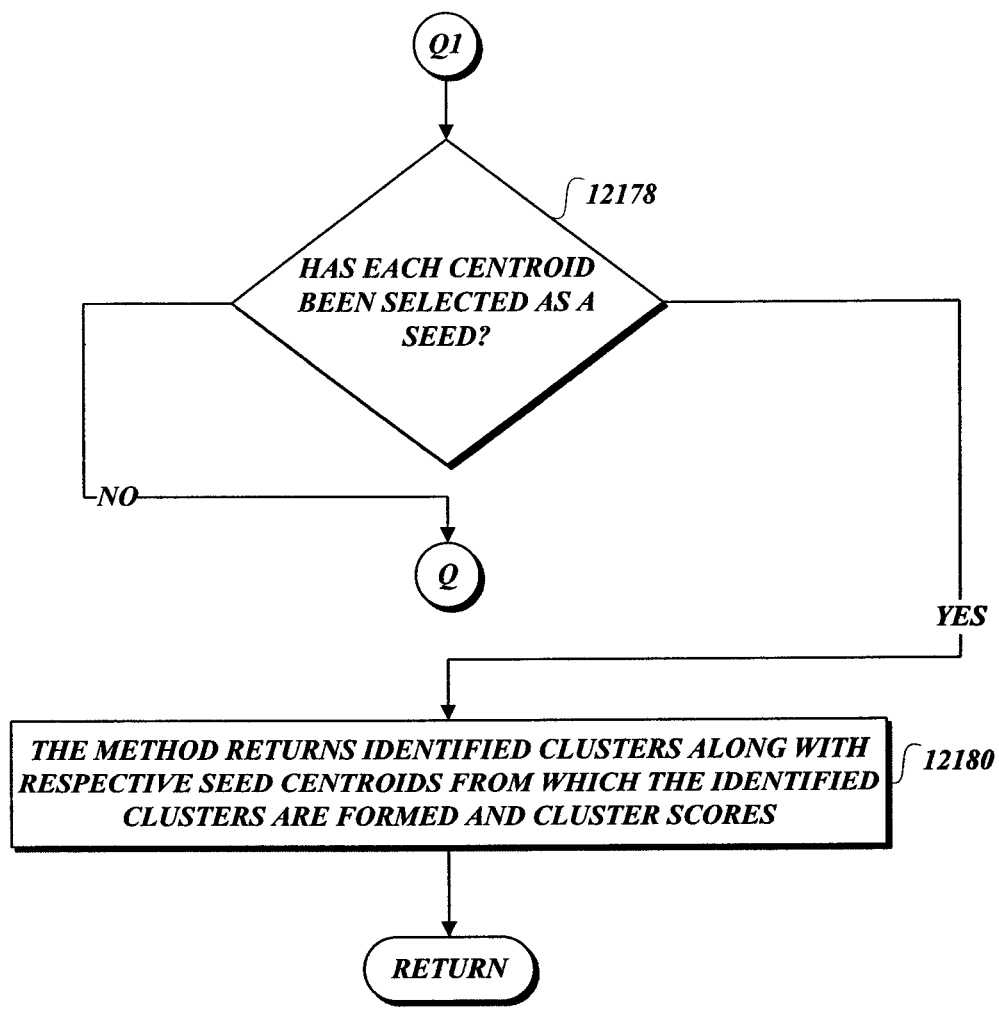

Returning, the method then continues to another continuation terminal ("terminal Q"), defining a set of method steps 12166 where the method determines, for each centroid, a cluster to which the centroid belongs and a cluster score. See FIGS. 12T-12U. The method then proceeds to block 12168 where the method discards any cluster whose score is zero, indicating that it lacks usefulness. The method then continues to another continuation terminal ("terminal R"), which defines a set of method steps 12170 where the method discards any cluster whose seed centroid is a member of a cluster with a higher cluster score. See FIG. 12AM. The method then returns from execution to the point of invocation.

Figure 12V:
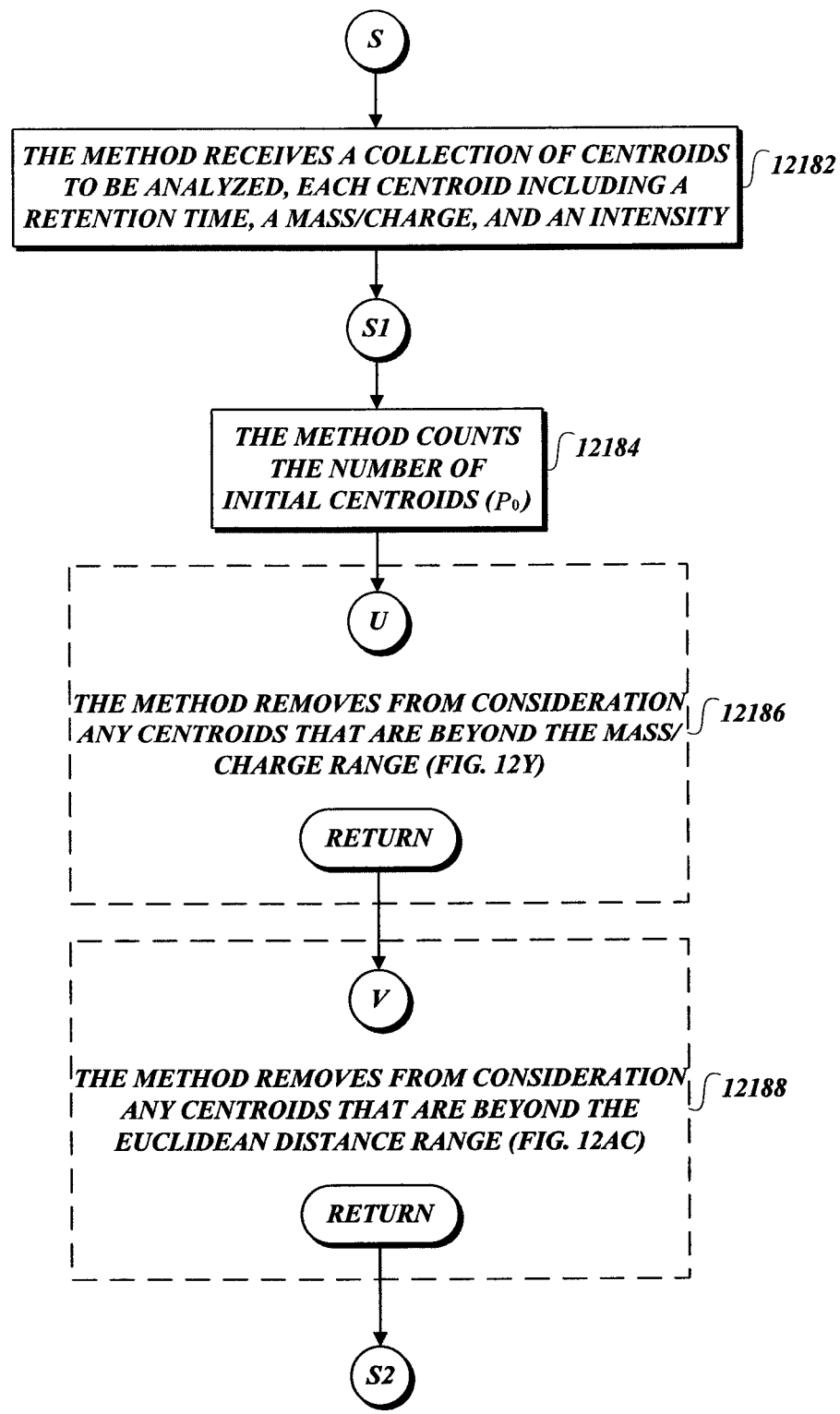
Figure 12W:
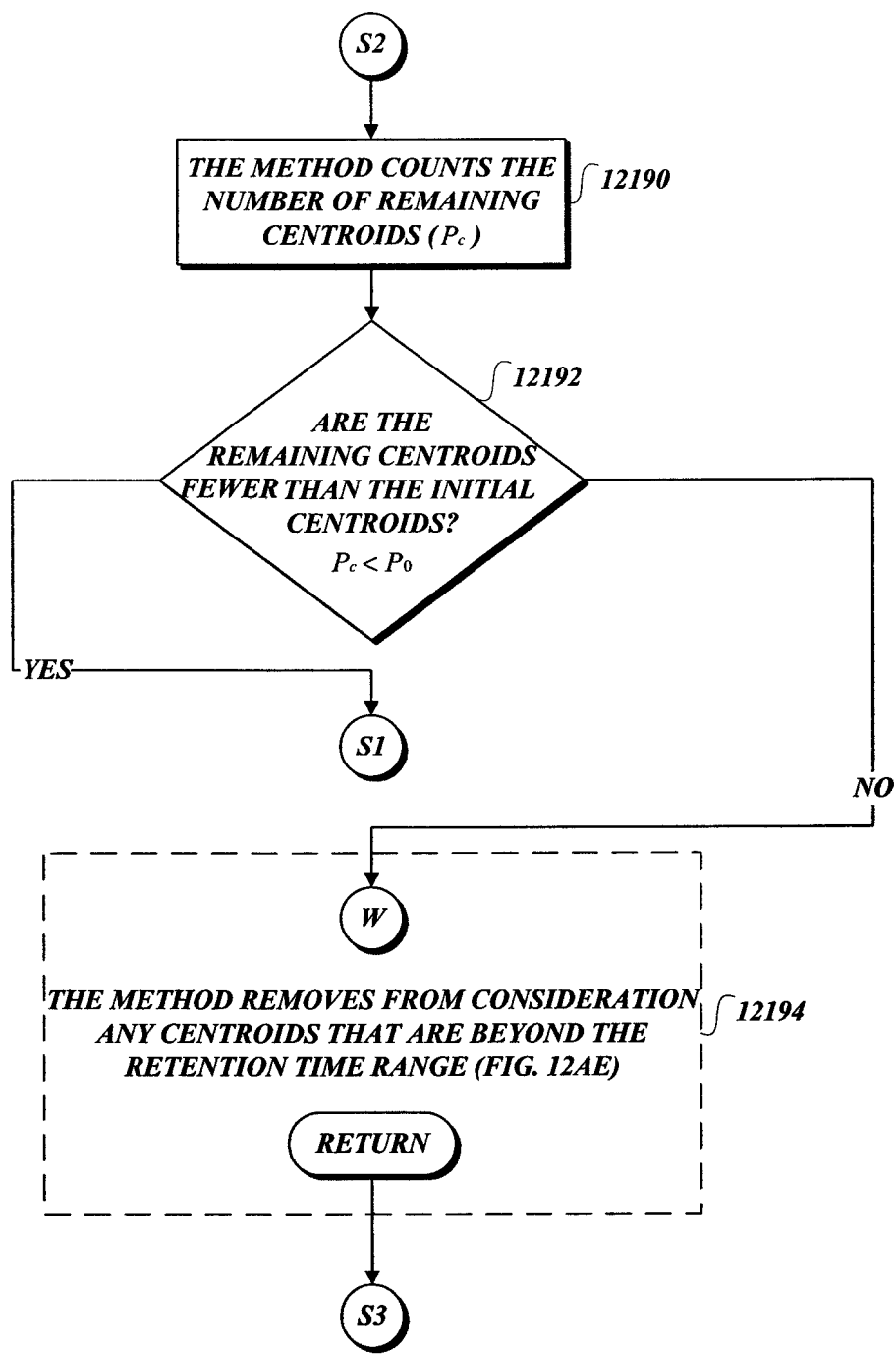
Figure 12X:
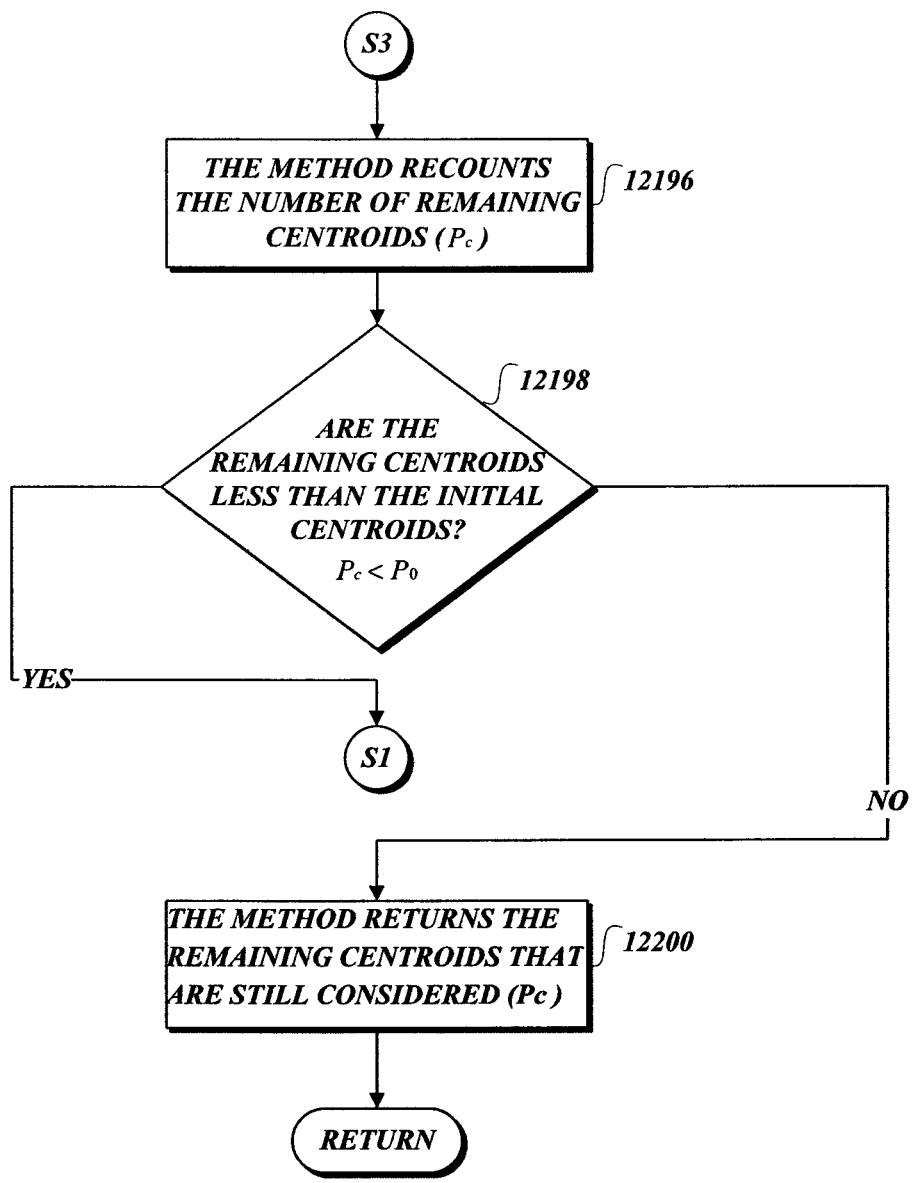

From terminal Q (FIG. 12T) the method obtains a centroid that has not been selected to act as a seed centroid (around which a cluster will be identified). See block 12172. The method then continues to another continuation terminal ("terminal S"), which defines a set of method steps 12174 where the method identifies clustered centroids by rectilinear clustering. See FIGS. 12V-12X. The method then continues to another continuation terminal ("terminal T"), defining a set of method steps 12176 where the method scores the identified clustered centroids. See FIGS. 12AF-12AJ. The method then continues to another continuation terminal ("terminal Q1").

From terminal Q1 (FIG. 12U) the method proceeds to decision block 12178 where a test is performed to determine whether its centroid has been selected as a seed. If the answer to the test at decision block 12178 is No, the method continues to terminal Q and skips back to block 12172 where the above-identified processing steps are repeated. Otherwise, the method proceeds to block 12180 because the answer to the test at decision block 12178 is Yes, and the method returns the identified clusters along with respective seed centroids, from which the identified clusters are formed, and cluster scores. The method then returns from execution to the point of invocation.

From terminal S (FIG. 12V), the method receives a collection of centroids to be analyzed, each centroid including a retention time, a mass/charge, and an intensity. See block 12182. Digressing, the steps of terminal S process rectilinear clustering. Rectilinear clustering determines a subset of clustered centroids that are within a set of centroids. Rectilinear clustering invokes "distance clustering" algorithm that is described hereinafter. A rectilinear approach to clustering is suitable in order to deal with two-dimensional data.

Figure 12Y:
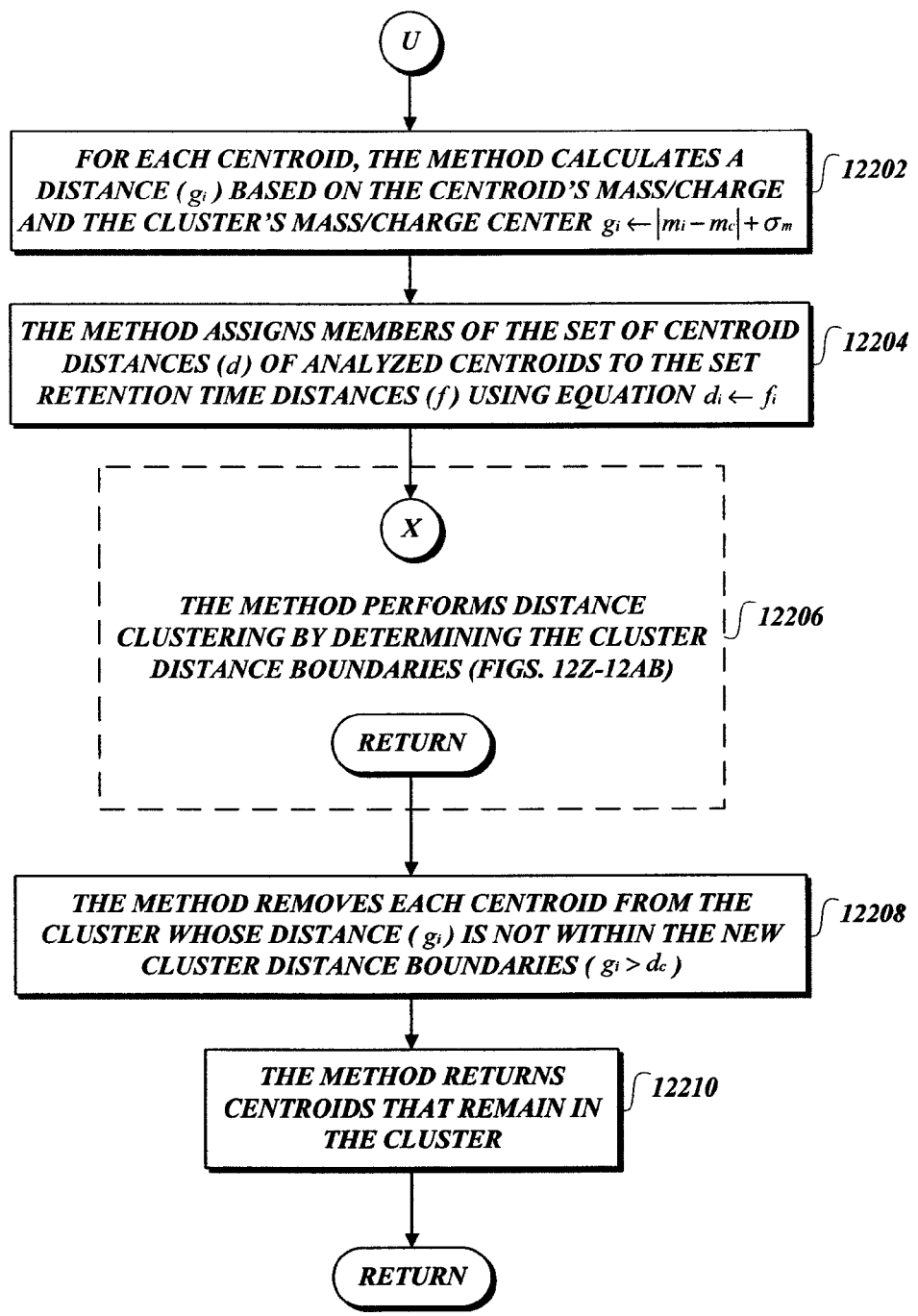

Returning, the method then continues to another continuation terminal ("terminal S1"). From terminal S1 (FIG. 12V), the method proceeds to block 12184 where the method counts the number of initial centroids ($P_0$) prior to each iteration of clustering. The method then continues to another continuation terminal ("terminal U"), defining a set of method steps 12186 where the method removes from consideration any centroids that are beyond the mass/charge range. See FIG. 12Y. The method then continues to another continuation terminal ("terminal V"), defining a set of method steps 12188 where the method removes from consideration any centroids that are beyond the Euclidian distant range. See FIG. 12AC. The method then continues to another continuation terminal ("terminal S2").

From terminal S2 (FIG. 12W) the method at block 12190 counts the number of remaining centroids ($P_c$). Proceeding to decision block 12192, a test is performed to determine whether the remaining centroids are fewer than the initial centroids ($P_c < P_0$). If the answer is Yes to the test at decision block 12192, the method proceeds to terminal S1 and skips back to block 12184 where the above-identified processing steps are repeated. Otherwise, if the answer to the test at decision block 12192 is No, the method proceeds to another continuation terminal ("terminal W"), which defines a set of method steps 12194 where the method removes from consideration any centroids that are beyond the retention time range. See FIG. 12AE. The steps of the terminal S2 determine whether clustering in the retention time is desirable. The method then continues to another continuation terminal ("terminal S3").

From terminal S3 (FIG. 12X), the method recounts the number of remaining centroids ($P_c$). See block 12196. The method then continues to decision block 12198 where a test is performed to determine whether the remaining centroids are less than the initial centroids ($P_c < P_0$). If the answer to the test at decision block 12198 is Yes, the method proceeds to terminal S1 and skips back to block 12184 where the above-identified processing steps are repeated. Otherwise, the answer to the test at decision block 12198 is No, and the method returns the remaining centroids ($P_c$). See block 12200. The method returns from execution to the point of invocation.

From terminal U (FIG. 12Y) the method proceeds to block 12202 where for each centroid the method calculates a distance ($g_i$) based on the centroid's mass/charge and the cluster's mass/charge center according to the following assignment ($g_i \leftarrow |m_i - m_c| + \sigma m$). At block 12204 the method assigns members of the set of centroid distances (d) of analyzed centroids to a set retention time distances (f) using assignment ($d_i \leftarrow f_i$). The method then continues to another continuation terminal ("terminal X"), which defines a set of method steps 12206 where the method performs distance clustering by determining the clustered distant boundaries. See FIGS. 12Z-12AB. The method then continues to block 12208 where the method removes each centroid from the cluster whose distance ($g_i$) is not within the new clustered distance boundaries ($g_i > d_c$). The method at block 12210 returns centroids that remain in the cluster. The method then returns from execution to the point of invocation.

From terminal X (FIG. 12Z) the method proceeds to block 12212 where the method receives as input a collection of centroids, each centroid specifying a distance (d) and weight (w). The steps of terminal X identify, via distance clustering, a subset of centroids that form a cluster. The method executes a step to speed up processing, such as by sorting the centroids by their distances through the cluster center. See block 12214. Suitably, available centroids are sorted by ascending distance. The first centroid in this sorted list is defined as the seed centroid and has minimal distance. The last centroid in this list of available centroids has the largest distance ($d_{max}$). At block 12216, the method determines the maximum distance ($d_{max}$) from the distances of all centroids.

At block 12218 the method initializes the centroid range ($d_n$) and cluster extent ($d_c$) to zero. The centroid range ($d_n$) is the largest distance of the subset of centroids that are candidates for a cluster. The cluster extent ($d_c$) is the largest distance of the centroids that form a cluster. At the start of distance clustering, the centroid range ($d_n$) and the cluster extent ($d_c$) are initialized to the distance of the seed centroid. The method then continues to another continuation terminal ("terminal X1"). From terminal X1 (FIG. 12Z), the method proceeds to decision block 12220 where a test is performed to determine whether a centroid has been analyzed for distance clustering ($d_n = d_{max}$). If the answer to the test at decision block 12220 is No, the method continues to another continuation terminal ("terminal X2"). If the answer to the test at decision block 12220 is Yes, the method proceeds to another continuation terminal ("terminal X3"). The steps of decision block 12220 determine whether cluster extent is reached.

From terminal X2 (FIG. 12AA) the method proceeds to block 12222 where the method obtains a next smallest centroid distance (d), which is the smallest distance that is larger than the centroid range ($d_n$). Looking forward, it is suitable to iterate through available centroids (N=1, 2, 3, . . . ) by increasing distance until it is suitable to determine the largest possible cluster extent. The next tested distance in this loop is the distance of the centroid with the smallest distance but whose distance is larger than the current centroid range ($d_n$). In other words, N is increased by 1. At block 12224 the method assigns the centroid range ($d_n$) to the newly calculated distance (d) via ($d_n \leftarrow d$), which represents the distance of the nth centroid in a distant-charted list. At block 12226 the method selects those centroids whose distance is less than or equal to the centroid range ($d_n$) which results in a selection of N centroids. At block 12228, the method calculates the cluster tightness ($s_n$) for the selected centroids, as follows:

$$s_n \leftarrow \frac{1}{2}\sqrt{\frac{(n-1)d_n^2 \sum_i^n w_i}{n \sum_i^n (w_i d_i^2)}}$$

The cluster tightness ($s_n$) measures whether a collection of centroids is well-formed or well-grouped. The above calculation determines the cluster tightness ($s_n$) for the current centroid range ($d_n$) where $d_n$ is the centroid range where $d_n \leq d_{max}$; $d_i$ is the distance of the $i^{th}$ centroid where $d_i \leq d_n$; w is the weight of the $i^{th}$ centroid; n is the number of centroids whose distance $d_i \leq d_n$; and $s_n$ is the cluster tightness for centroids whose distance are less than or equal to $d_n$. The method then proceeds to decision block 12230 where a test is performed to determine whether the centroid distances are sufficiently tight ($s_n < 1$). If the answer is Yes, the method proceeds to another continuation terminal ("terminal X4"). Otherwise, the answer to the test at decision block 12230 is No, and the method proceeds to another continuation terminal ("terminal X5").

From terminal X4 (FIG. 12AB), the method at block 12232 assigns the cluster extent ($d_c$) to the cluster range ($d_n$) via ($d_c \leftarrow d_n$). If the cluster tightness ($s_n$) is less than 1, then a cluster of the available centroids with distances up to the centroid range ($d_n$) is well-formed and the cluster extent ($d_c$) is reset to the centroid range ($d_n$). The method then continues to terminal X1 and skips back to decision block 12220 where the above-identified processing steps are repeated.

From terminal X5 (FIG. 12AB), the method proceeds to decision block 12234 where a test is performed to determine whether the product ($2d_c$) is less than the cluster range ($d_n$) as follows:

$$2d_c < d_n$$

If the answer is No to the test at decision block 12234, the method proceeds to terminal X1 and skips back to decision block 12220 where the above-identified processing steps are repeated. If the answer to the test at decision block 12234 is Yes, the method proceeds to another continuation terminal, terminal X3, and proceeds further to block 12236 where the method returns the cluster extent ($d_c$). The last determined cluster extent ($d_c$) is the final cluster extent ($d_c$) and all centroids with distances $d_i \leq d_c$ are members of the cluster and the centroids with distances $d_i > d_c$ are removed from consideration for this cluster. The method then returns from execution to the point of invocation.

The steps of terminal V processes rectilinear clustering using a combination of retention time and mass/charge dimensions. From terminal V (FIG. 12AC), the method proceeds immediately to another continuation terminal ("terminal Z"), defining a set of method steps 12238 where the method calculates for each centroid a distance that is the normalized combination of retention time and M/Z from the center. See FIG. 12AD. The method then proceeds to block 12240 where the method assigns the calculated distance ($h_i$) to the distance used for distance clustering ($h_i > d_c$). The method proceeds to continuation terminal X defining a set of method steps 12242 where the method performs distance clustering and determines the clustered distance boundaries. See FIGS. 12Z-12AB. The method then continues to block 12244 where the method removes each centroid from the cluster whose distance ($h_i$) is not within the new clustered distance boundaries ($h_i > d_c$). The method then continues to block 12246 where the method returns centroids that remain in the cluster. The method then returns from execution to the point of invocation.

The steps of terminal Z determine a Euclidean distance from a cluster center that is a normalized combination of retention time and mass/charge positions. For clustering purposes, each centroid is given a weight (w) and a distance (d). A centroid weight (w) is determined for each centroid: $w_i \leftarrow \sqrt{I_i}$ where $I_i$ is the centroid intensity (ion count) of the $i^{th}$ centroid; and $w_i$ is the weight of the $i^{th}$ centroid. The clustering method identifies a cluster of centroids surrounding a cluster center ($r_c$, $m_c$), where $r_c$ is the retention time of the center; and $m_c$ is the mass/charge of the center. If a seed centroid was used, then the cluster center is the retention time and mass/charge of the seed centroid, otherwise the cluster center ($r_c$, $m_c$) is given. For clustering purposes, a centroid distance (d) is determined for each centroid to this cluster center $(r_c, m_c)$. This distance (d) may be one of three measures: f, g, or h. The choice of the measure changes during rectilinear clustering as described hereinafter.

From terminal Z (FIG. 12AD), the method at block 12248 calculates a distance based on the retention time distance to the cluster center as follows:

$$f_i \leftarrow |r_i - r_c| + \sigma_r$$

The above calculation reflects a rectilinear clustering process that considers a distance (d) to be measured in terms of retention time to produce a measure f where $f_i$ is the distance based on the retention time of the $i^{th}$ centroid; $r_i$ is the retention time of the $i^{th}$ centroid; and $\sigma_r$ is the time between two successive mass spectra (the same as the inverse scan rate). At block 12250, the method calculates a distance based on the mass/charge distance to the cluster center as follows:

$$g_i \leftarrow |m_i - m_c| + \sigma_m$$

The above calculation reflects a rectilinear clustering process that considers a distance (d) to be measured in terms of mass/charge to produce a measure g where $g_i$ is the distance based on the mass/charge of the $i^{th}$ centroid; $m_i$ is the mass/charge of the $i^{th}$ centroid; $\sigma_m$ is defined as $$\sigma_m \leftarrow \max\left(\frac{c_1 + s_1 m_c}{10}, \frac{m_c}{R}\right);$$

and R is the resolution of the mass spectrometer. At block 12252, the method calculates the retention time variance around the cluster center as follows:

$$v_f \leftarrow \frac{n \sum_{i}^{n} w_i f_i^2}{(n-1) \sum_{i}^{n} w_i}$$

At block 12254, the method calculates the mass/charge variance around the cluster center as follows:

$$v_g \leftarrow \frac{n \sum_{i}^{n} w_i g_i^2}{(n-1) \sum_{i}^{n} w_i}$$

At block 12256, the method calculates the normalized two-dimensional distance from the cluster center as follows:

$$hi \leftarrow \sqrt{\frac{f_i^2}{v_f} + \frac{g_i^2}{v_g}}$$

$h_i$ is a Euclidean combination of mass/charge and retention time of the $i^{th}$ centroid. The method at block 12258 returns the Euclidian combination of retention time and mass/charge for each centroid. The method then returns from execution to the point of invocation.

From terminal W (FIG. 12AE), the method calculates a distance ($f_i$) based on the centroid's retention time distance to the cluster's retention time center as follows:

$$f_i \leftarrow |r_i - r_c| + \sigma_r$$

See block 12260. At block 12262, the method assigns the distance ($d_i$) used for distance clustering to the retention time distancing ($f_i$) as follows:

$$d_i \leftarrow f_i$$

Figure 12Z:
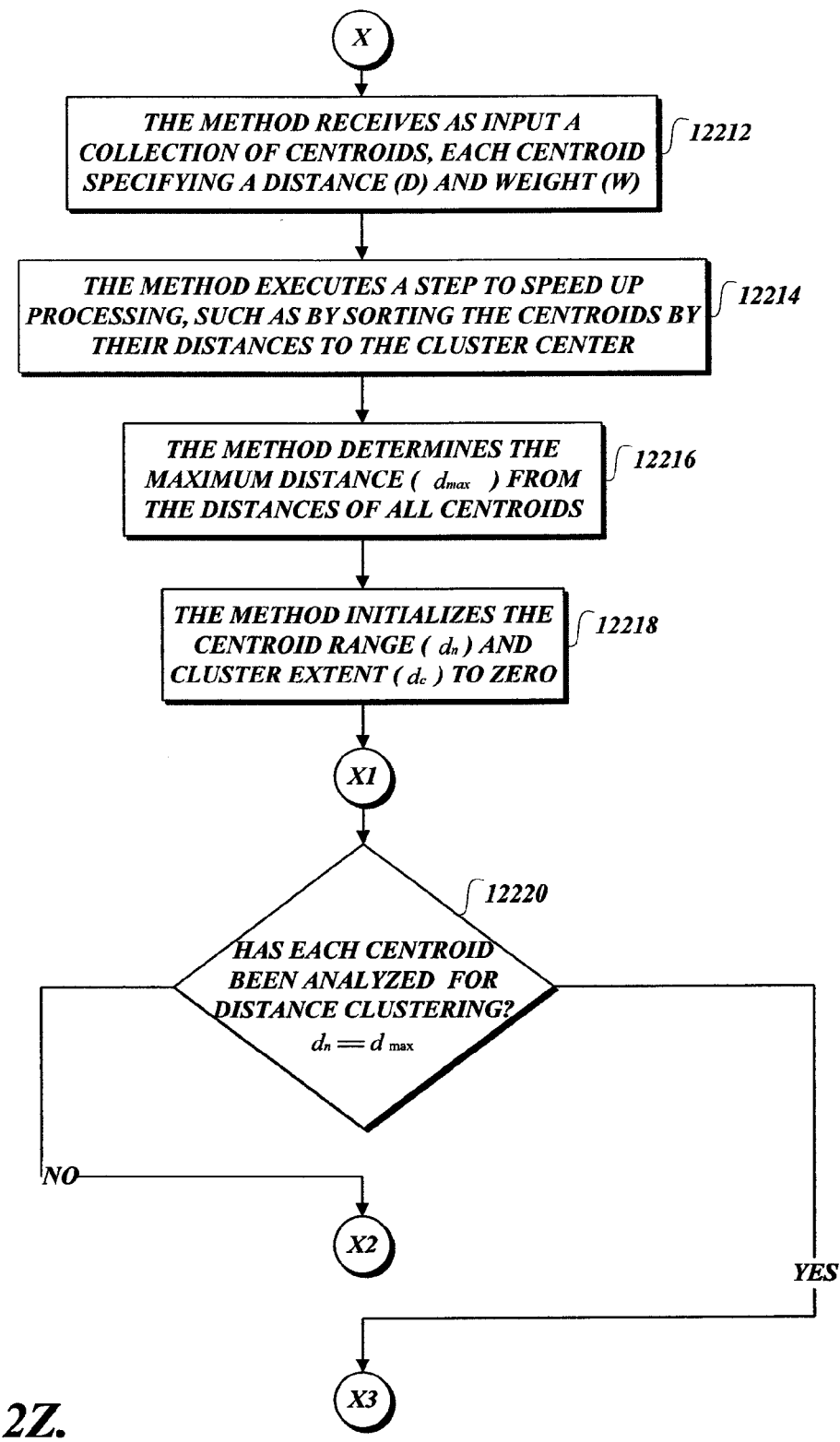
Figure 12A:
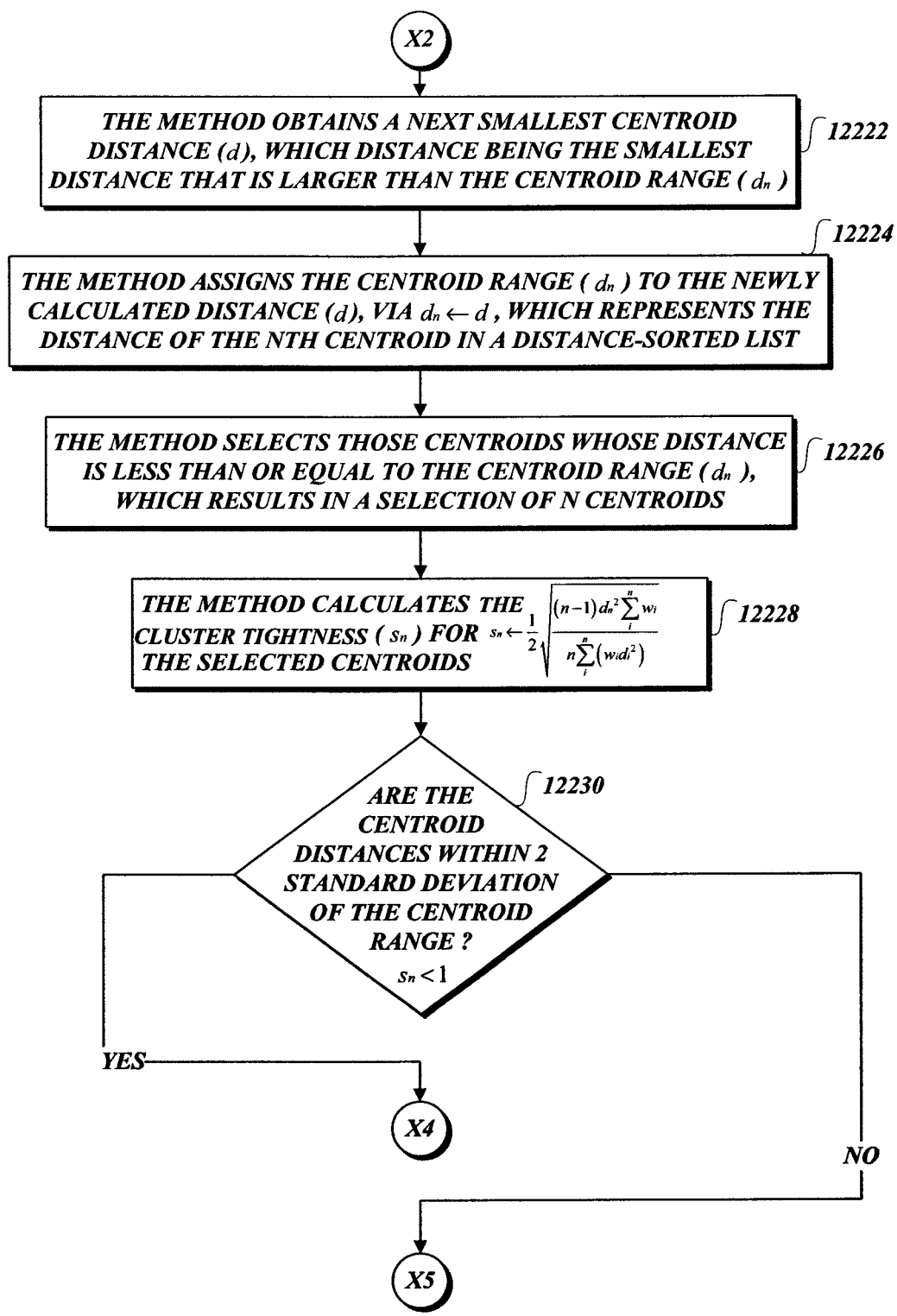
Figure 12A:
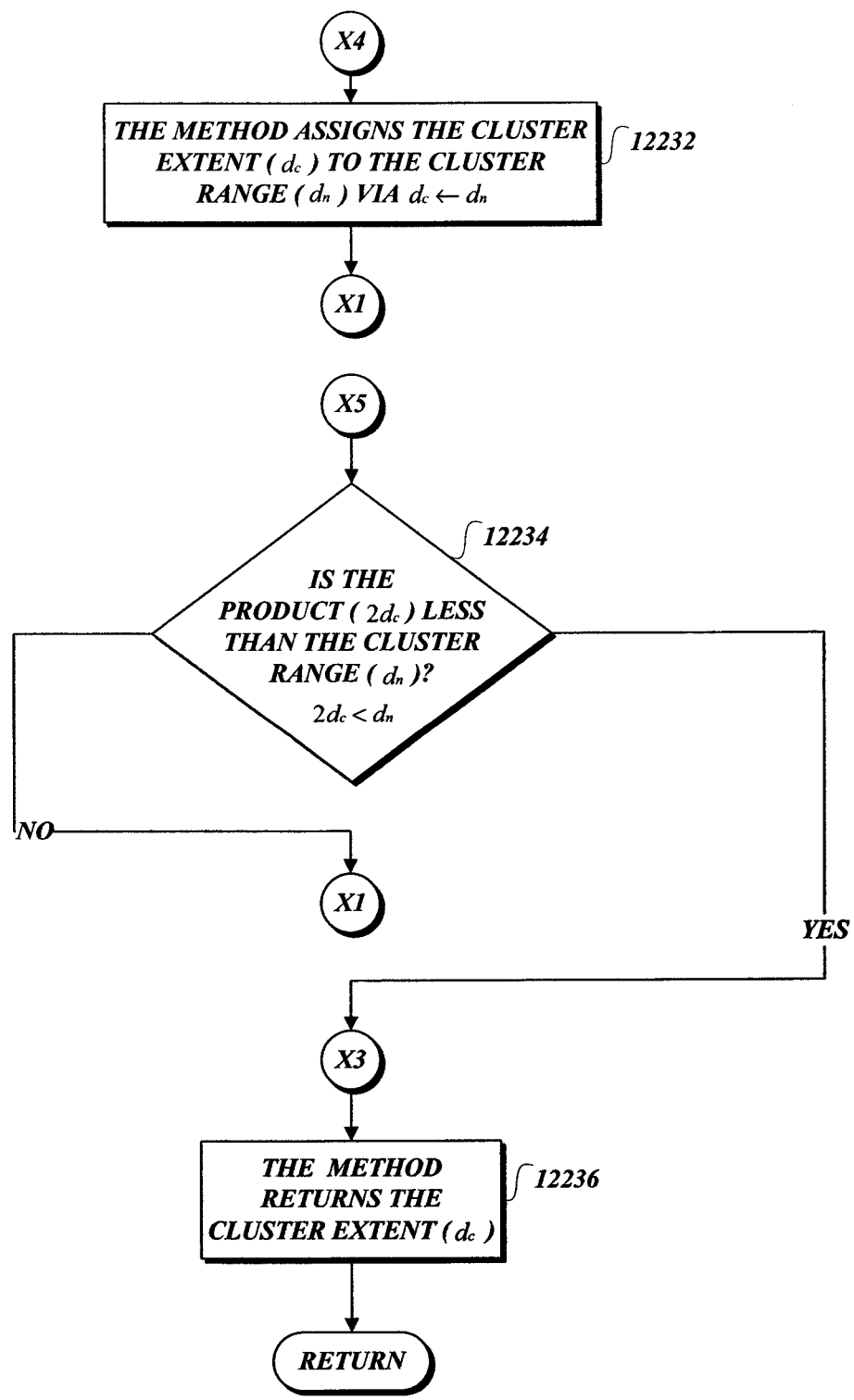
Figure 12A:
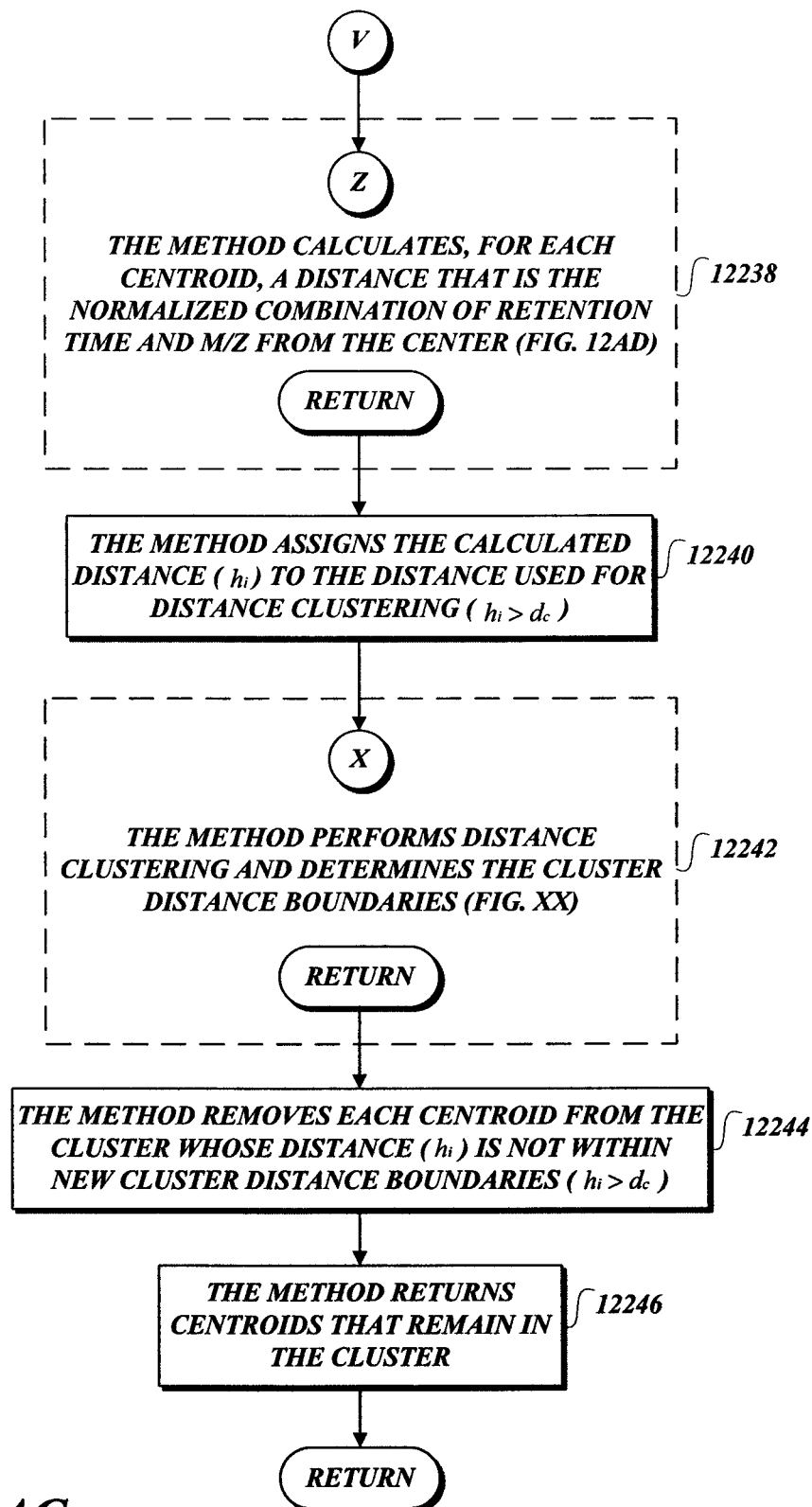
Figure 12A:
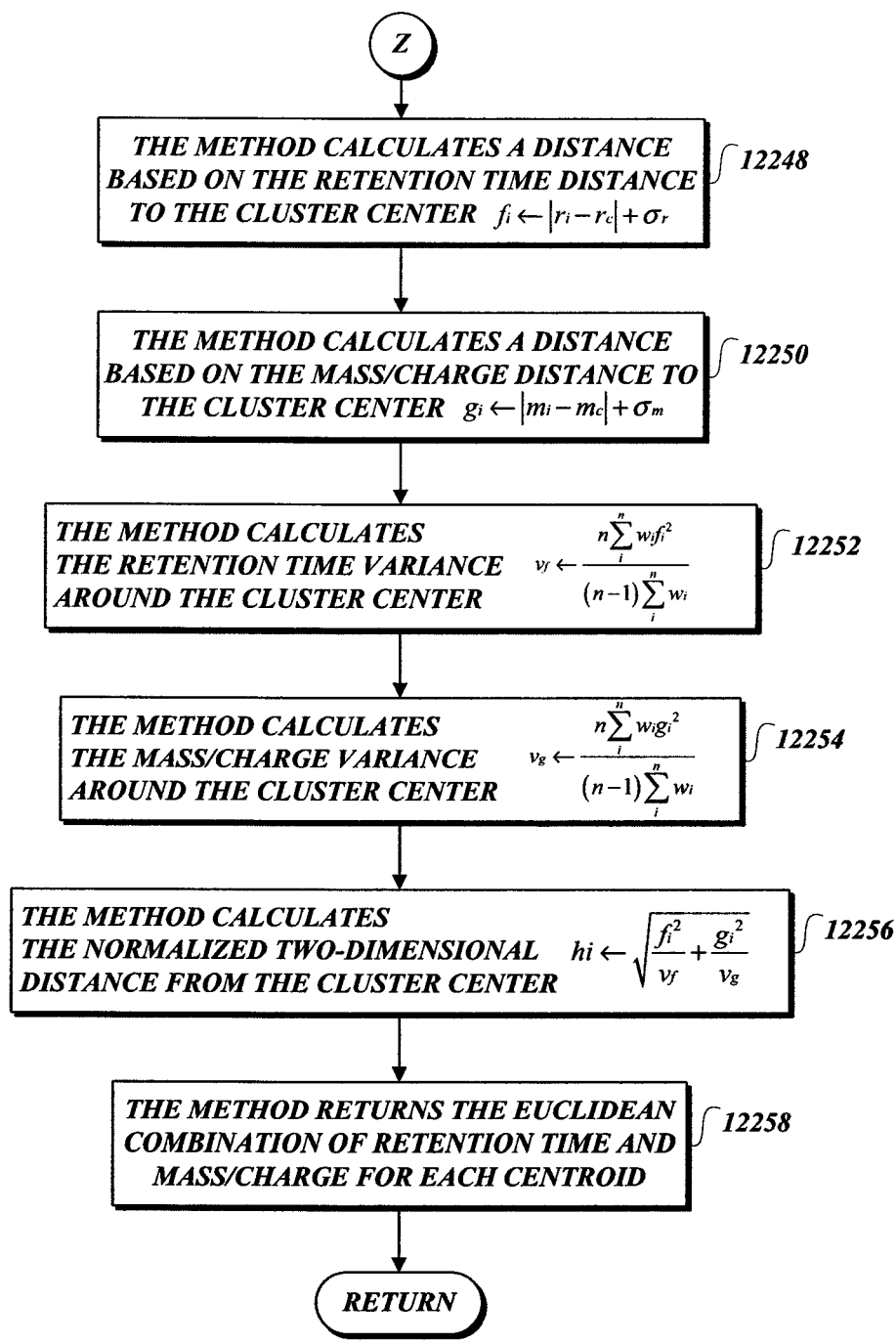
Figure 12A:
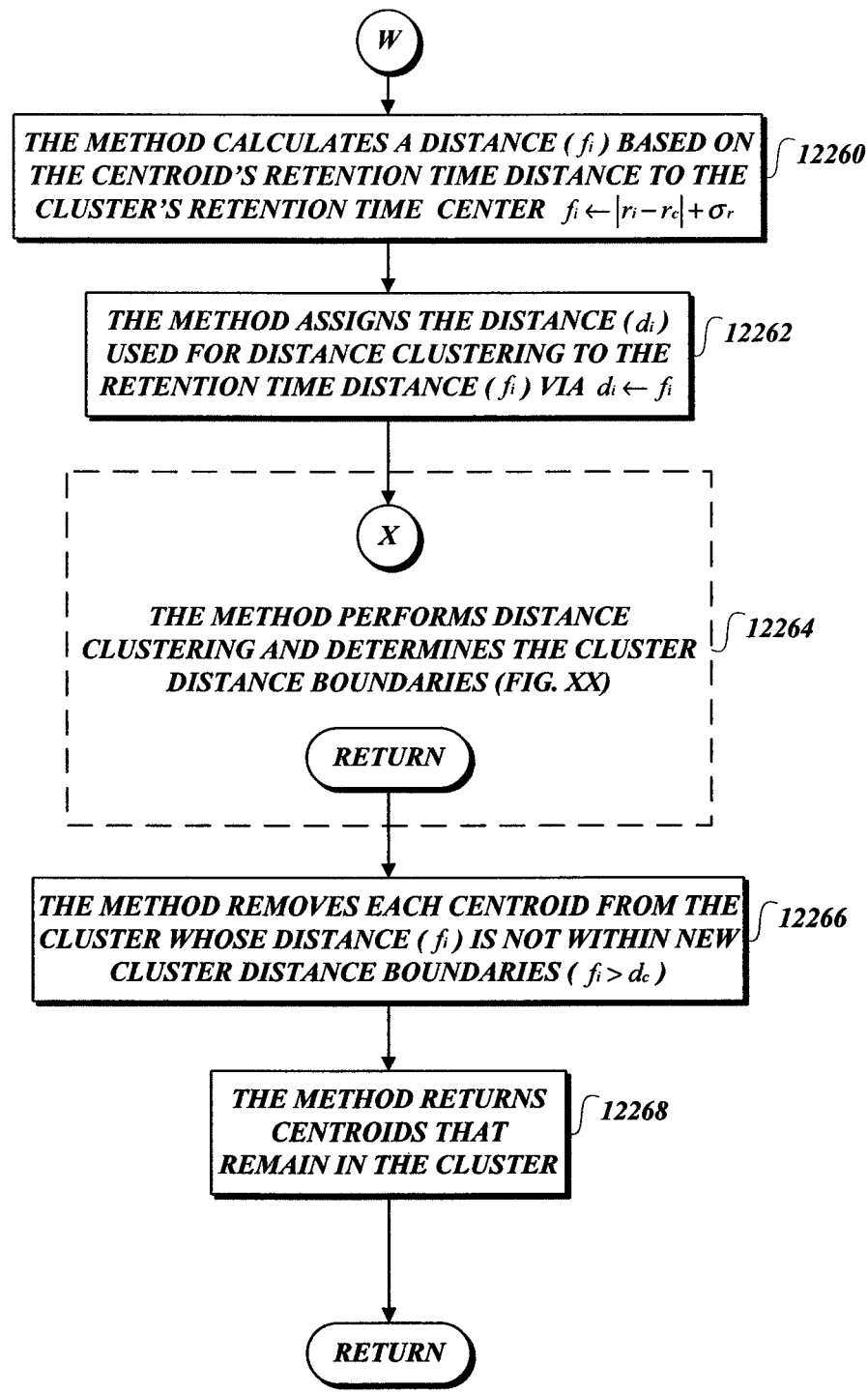
Figure 12A:
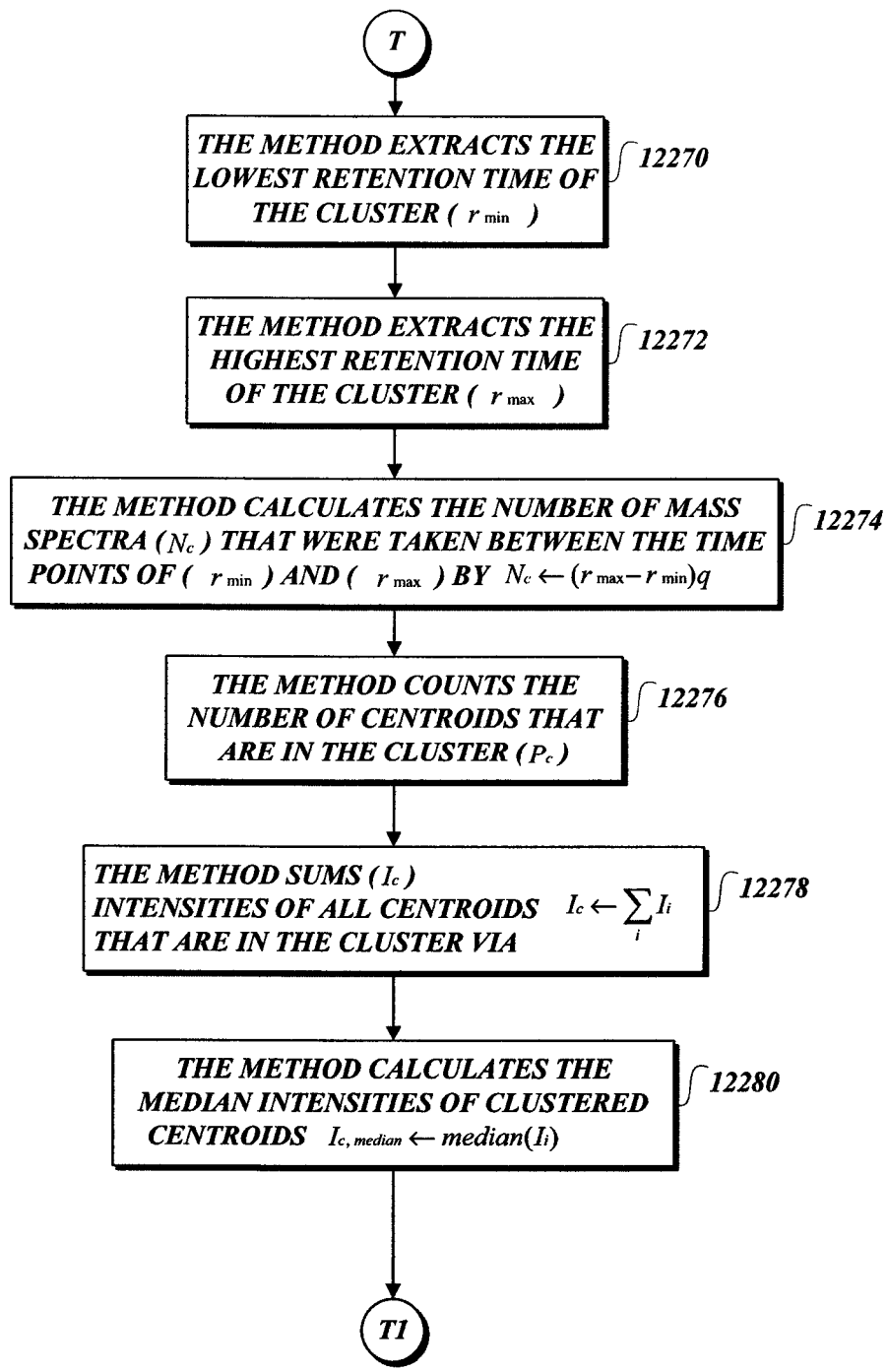
Figure 12A:
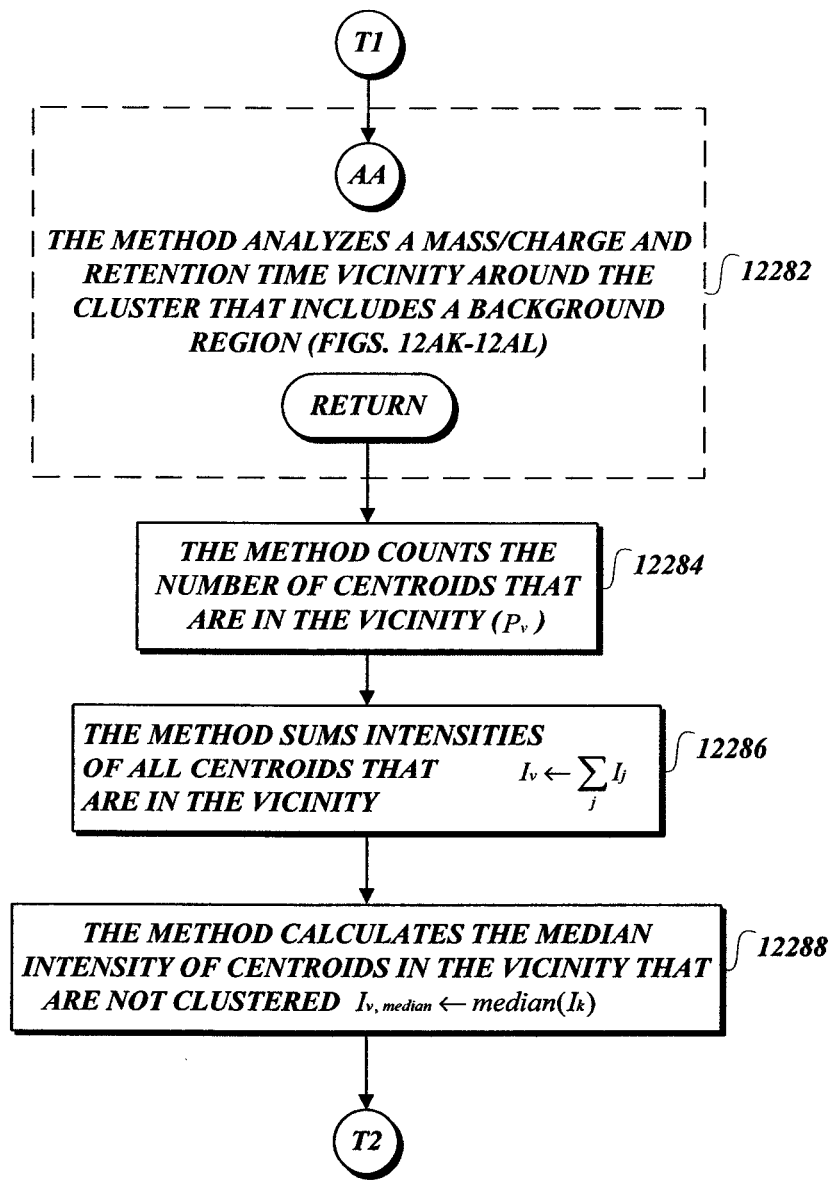
Figure 12A:
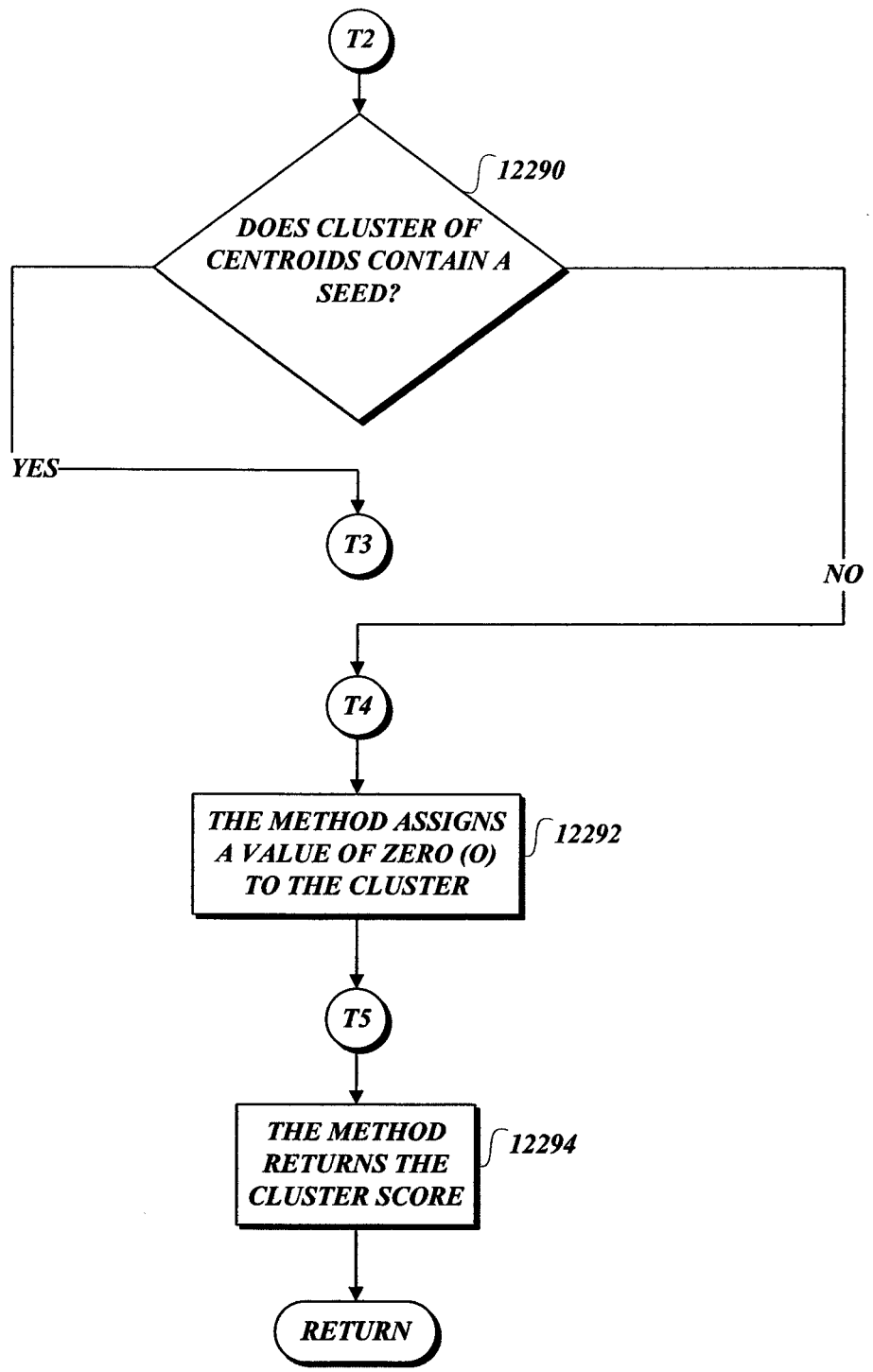
Figure 12A:
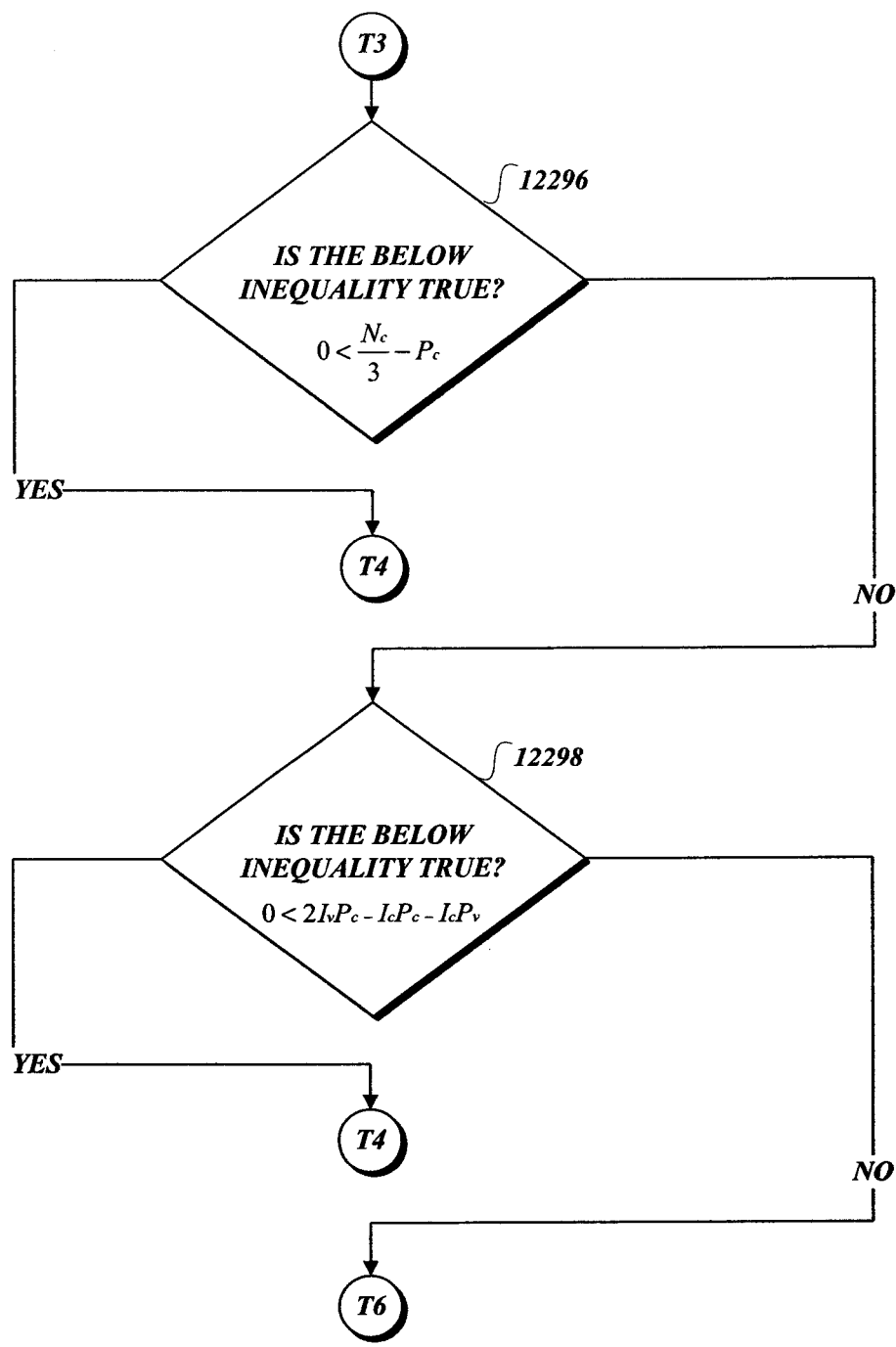
Figure 12A:
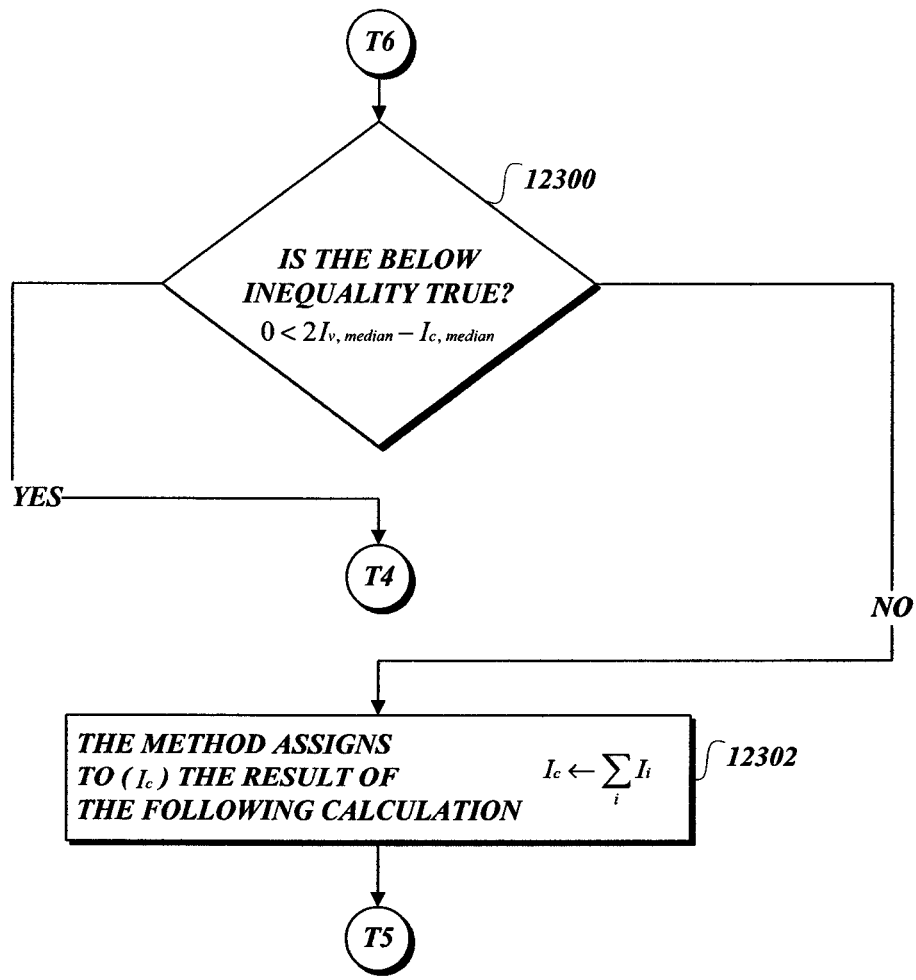
Figure 12A:
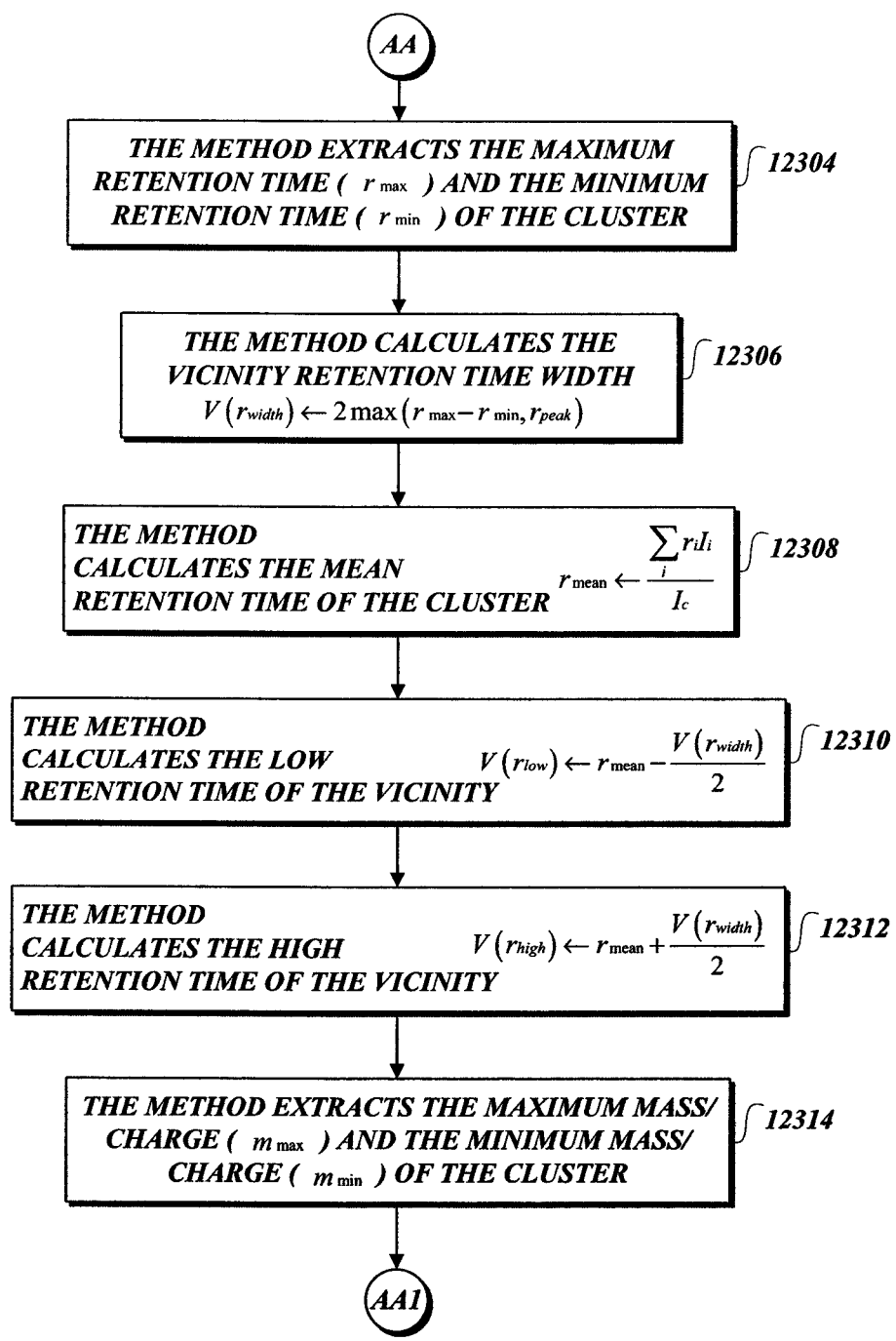
Figure 12A:
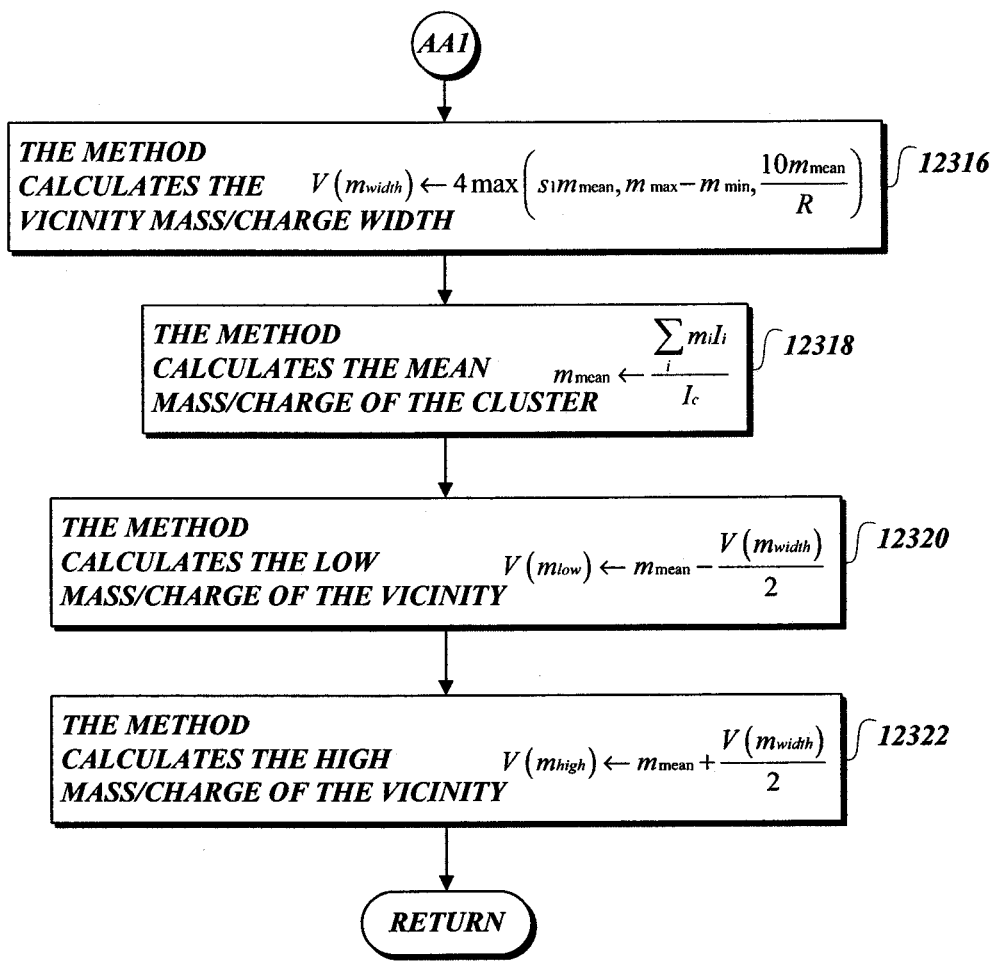
Figure 12A:
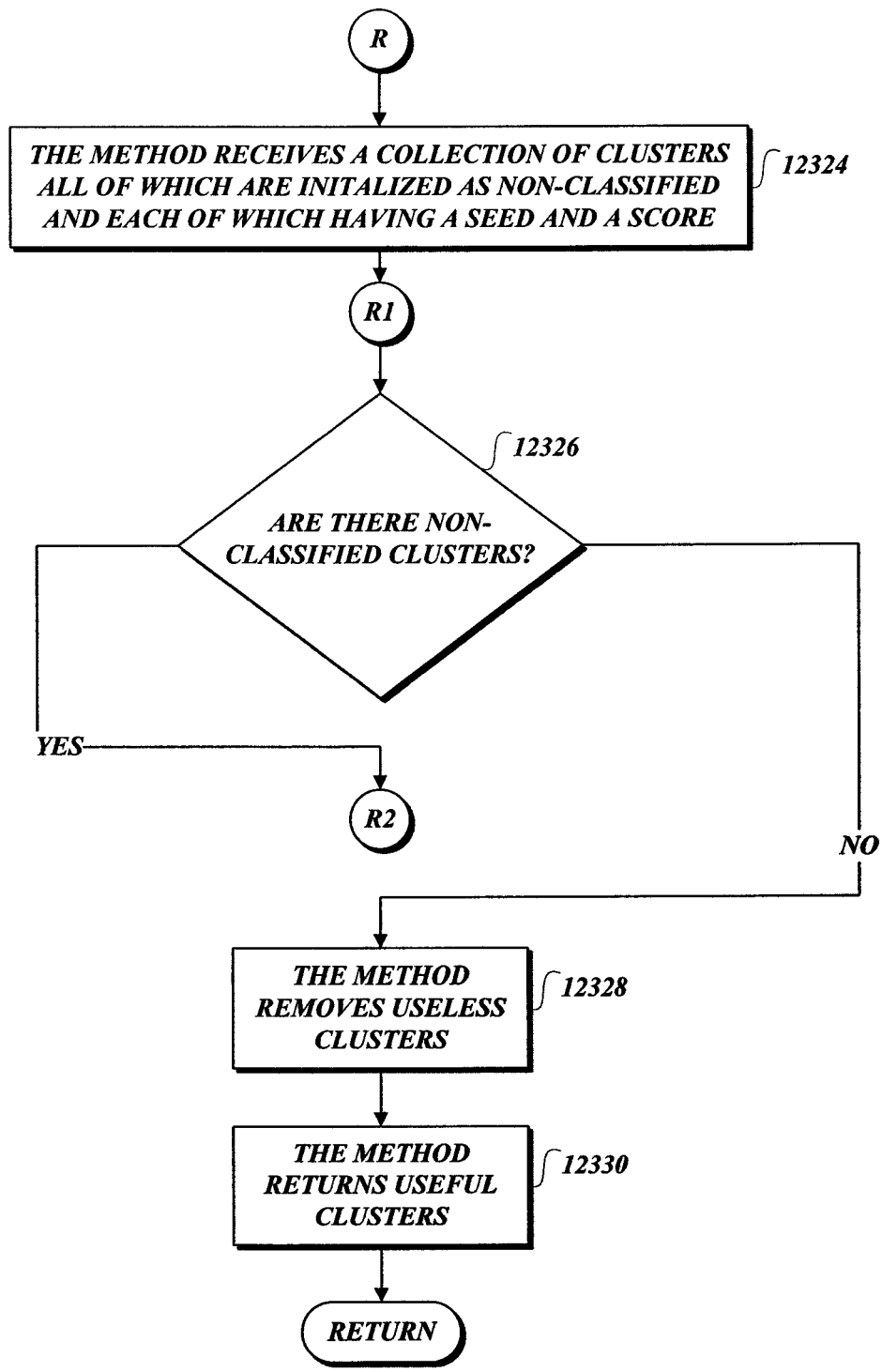
Figure 12A:
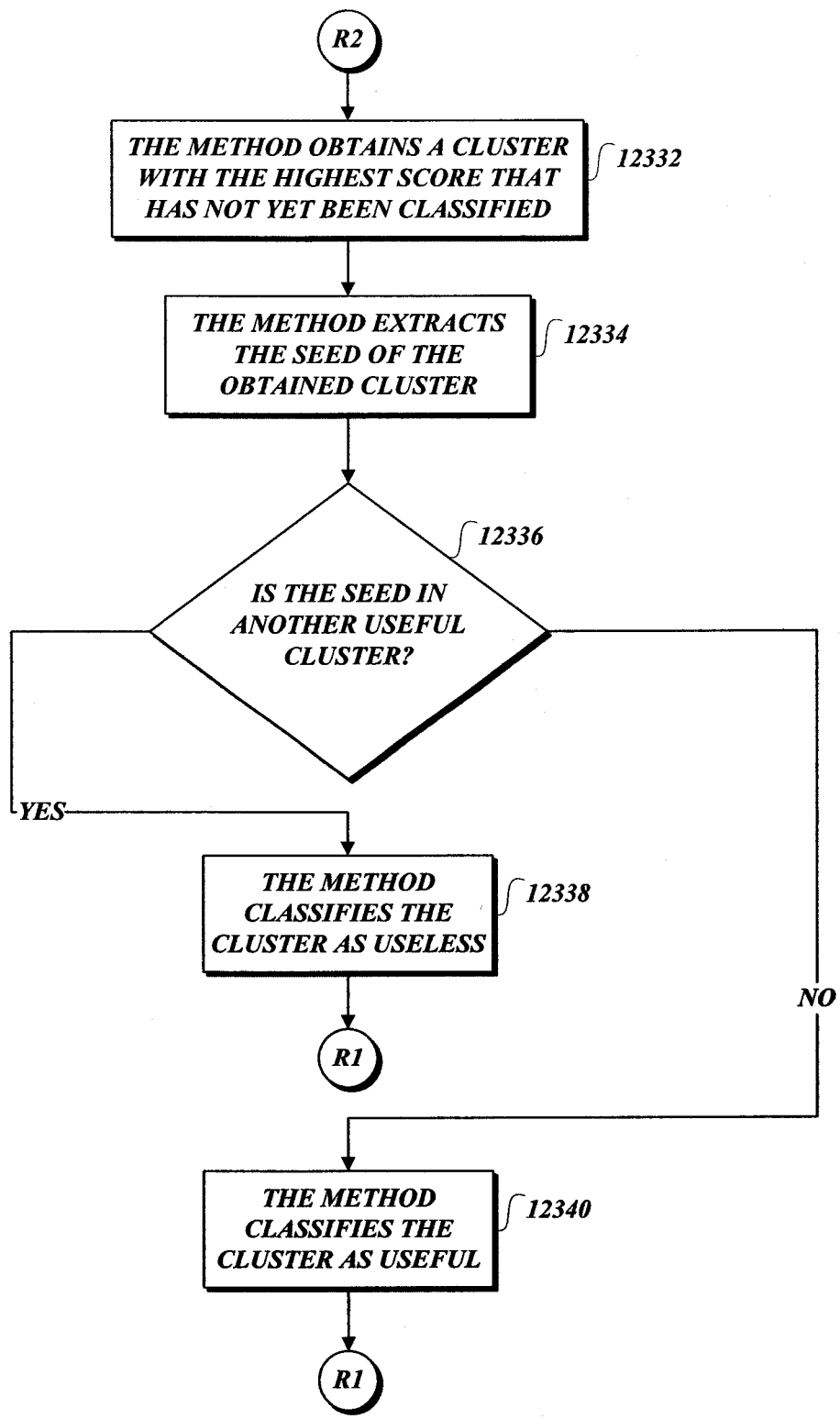
Figure 12A:
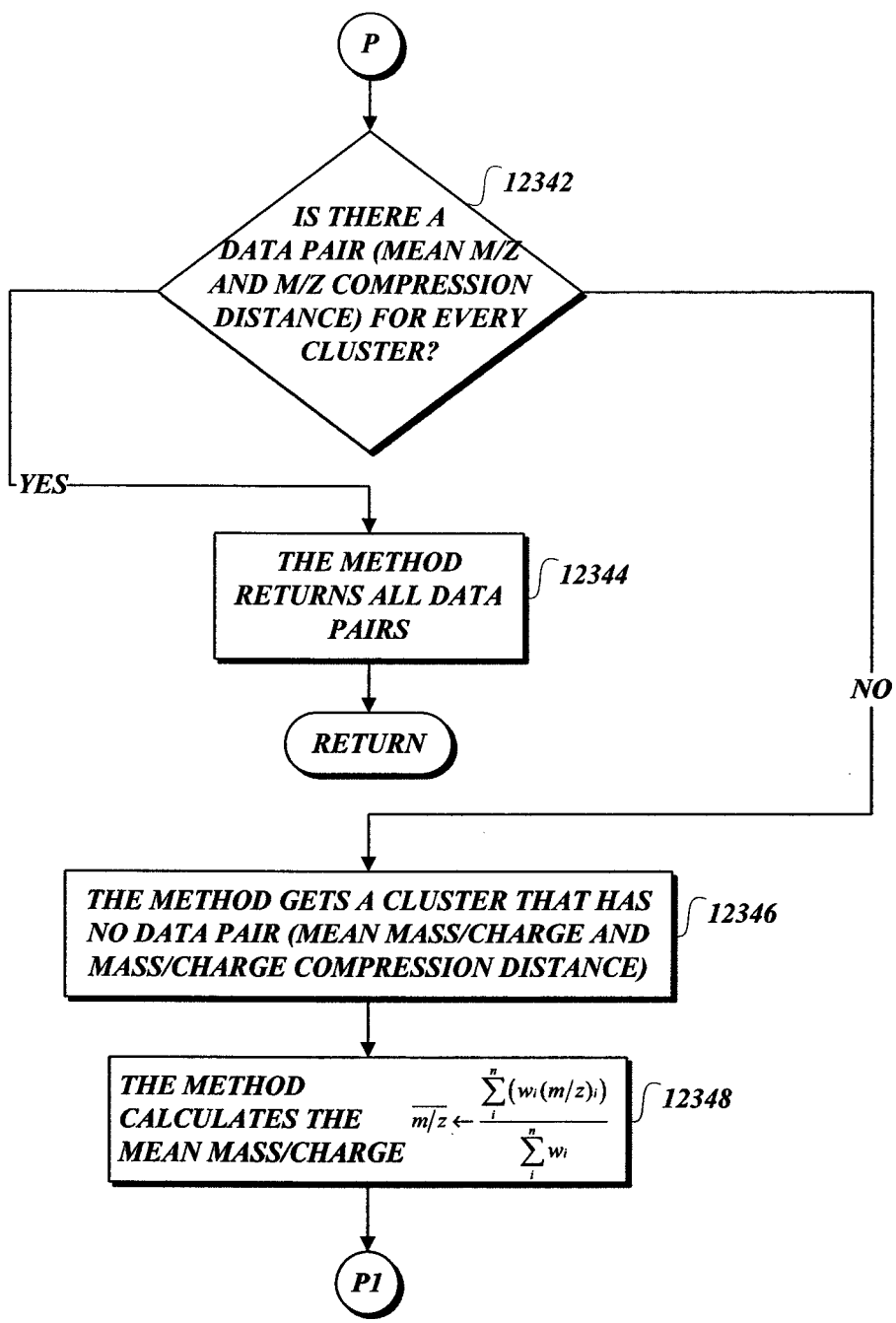
Figure 12A:
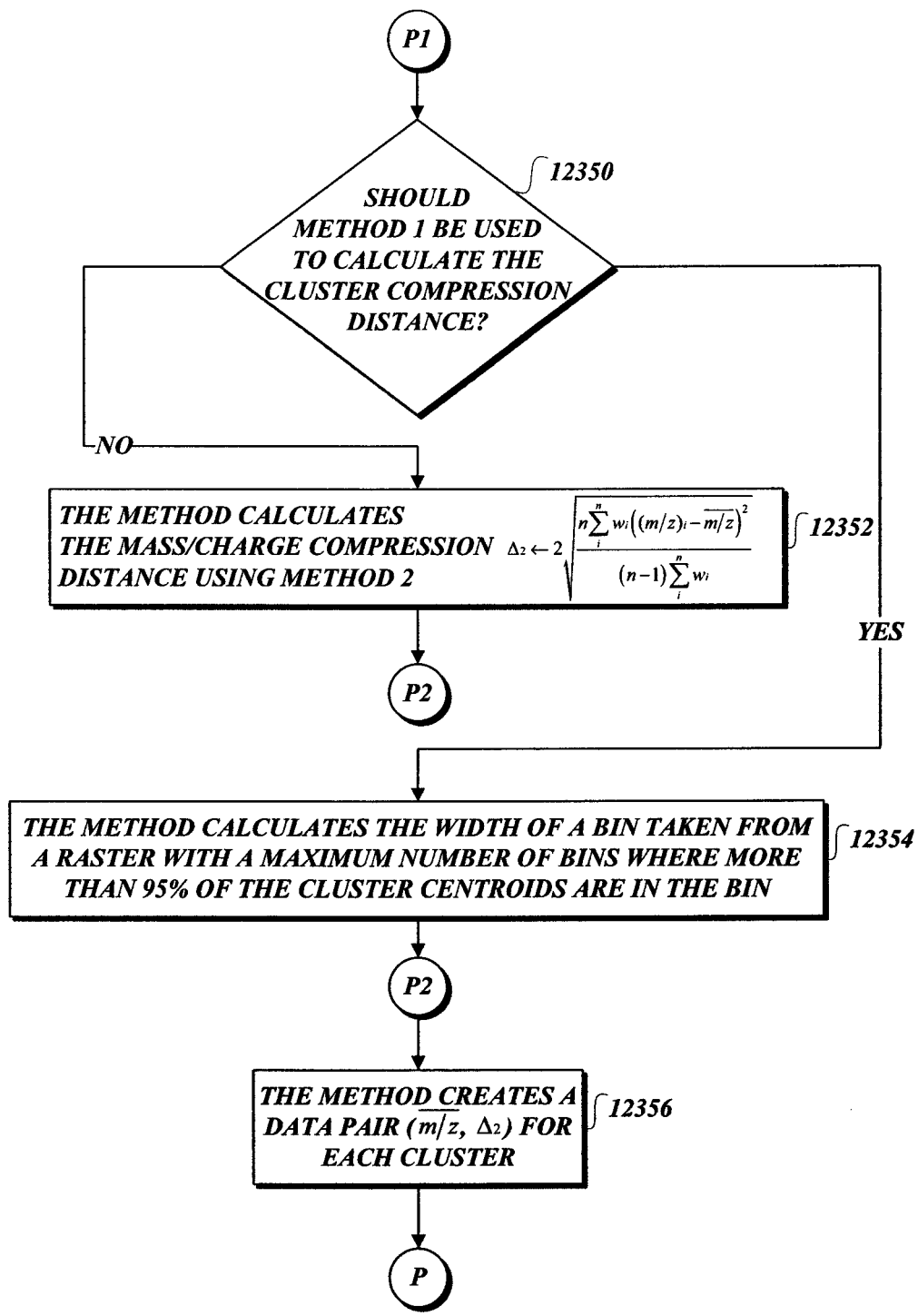
Figure 12A:
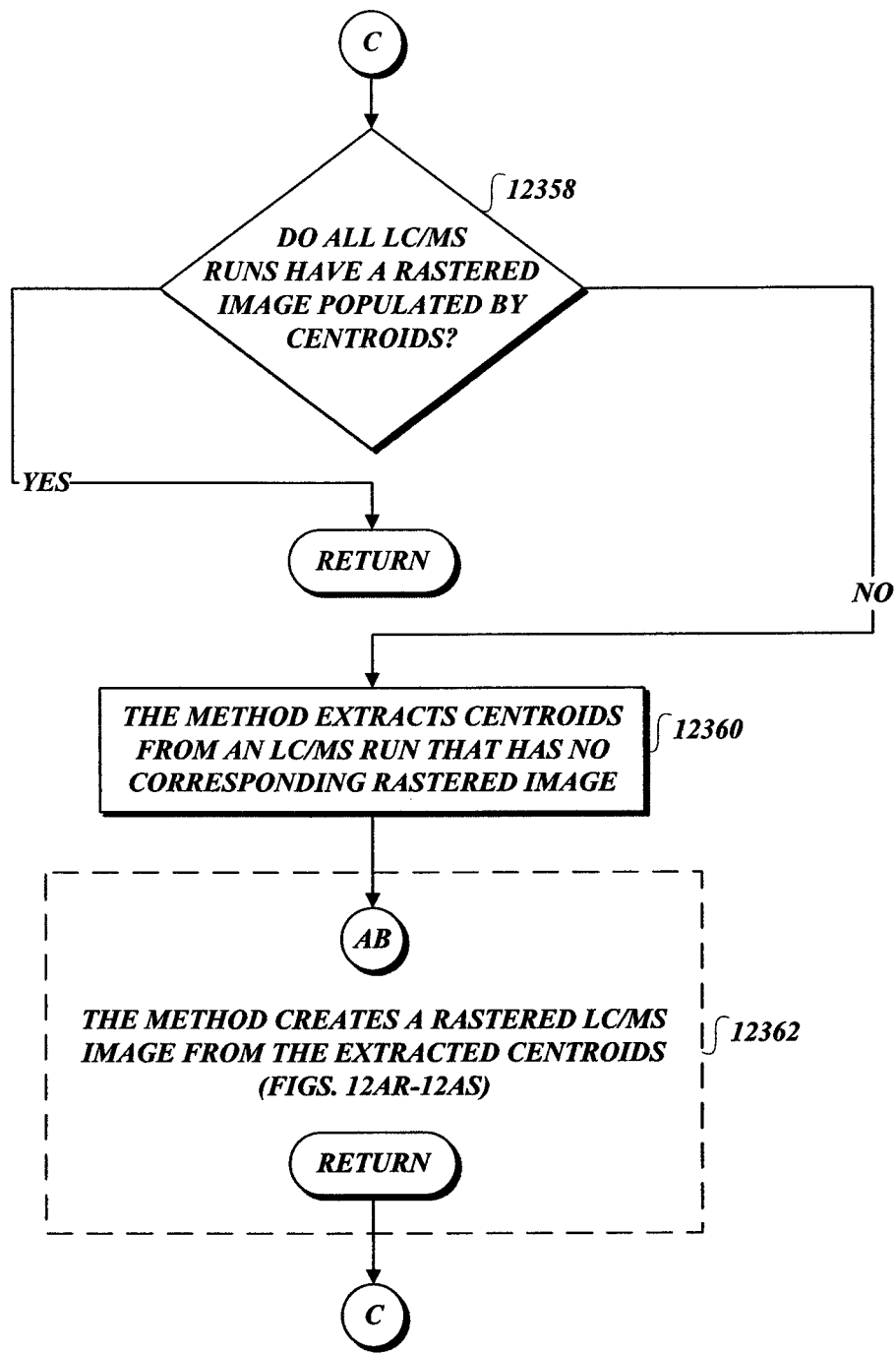
Figure 12A:
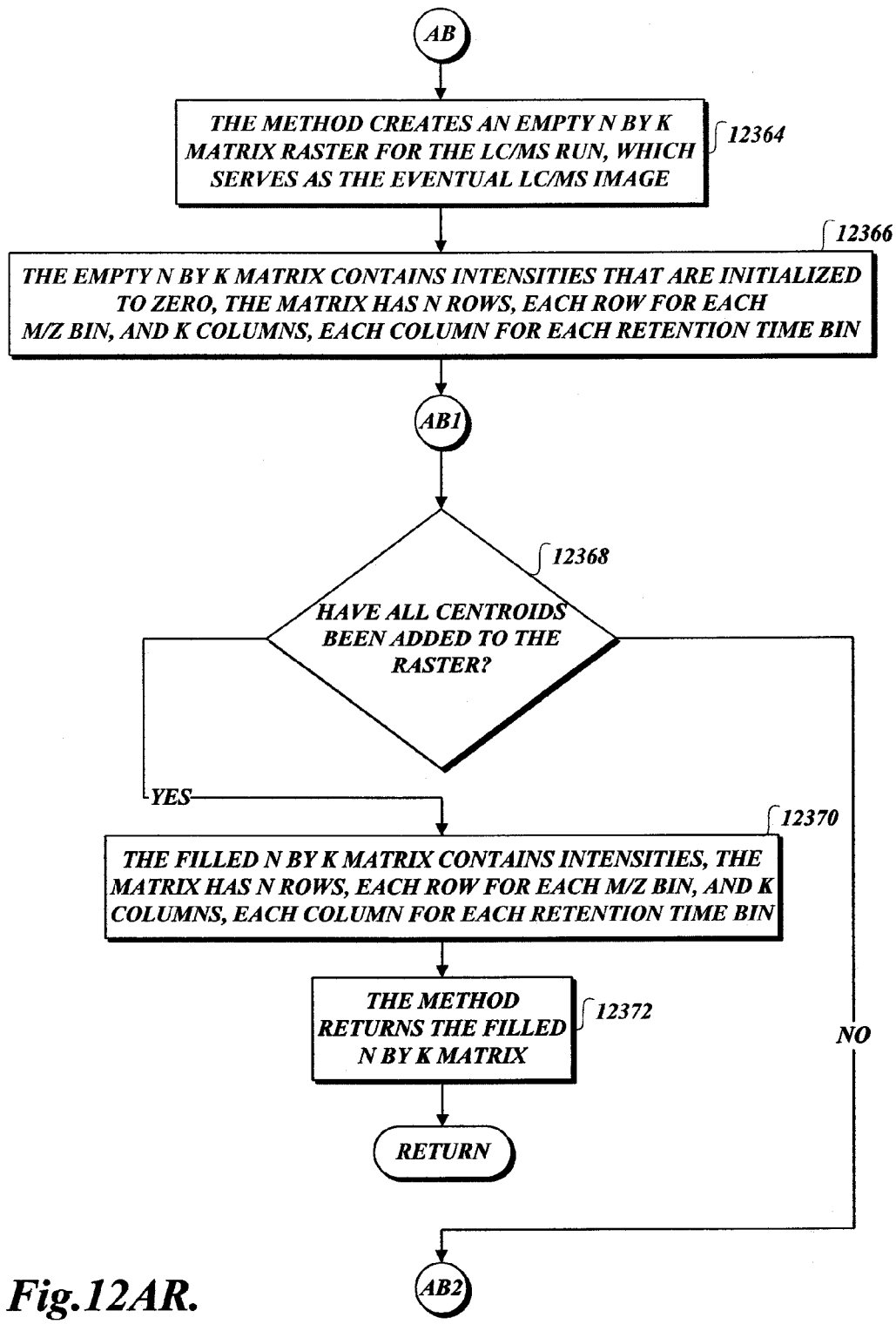
Figure 12A:
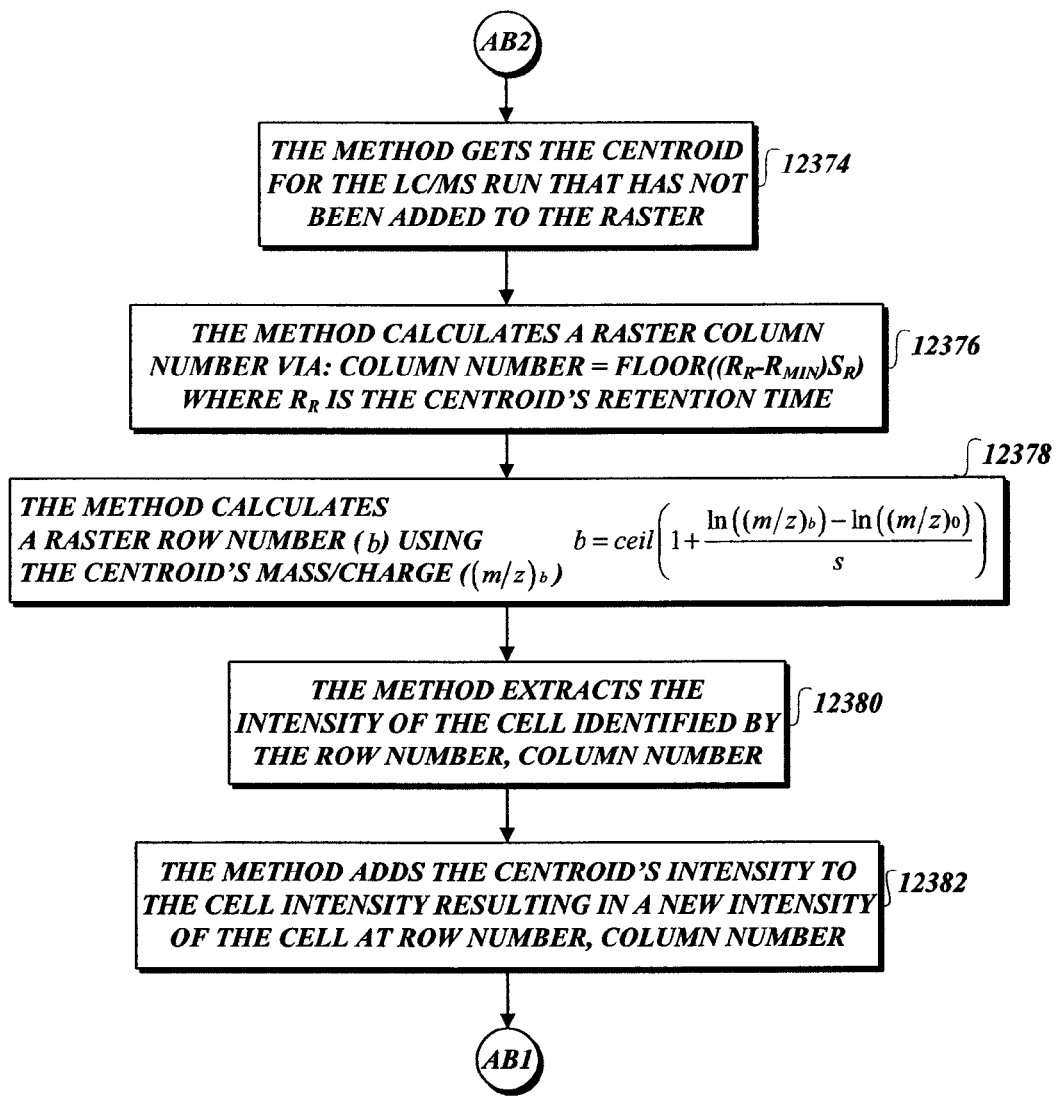
Figure 12A:
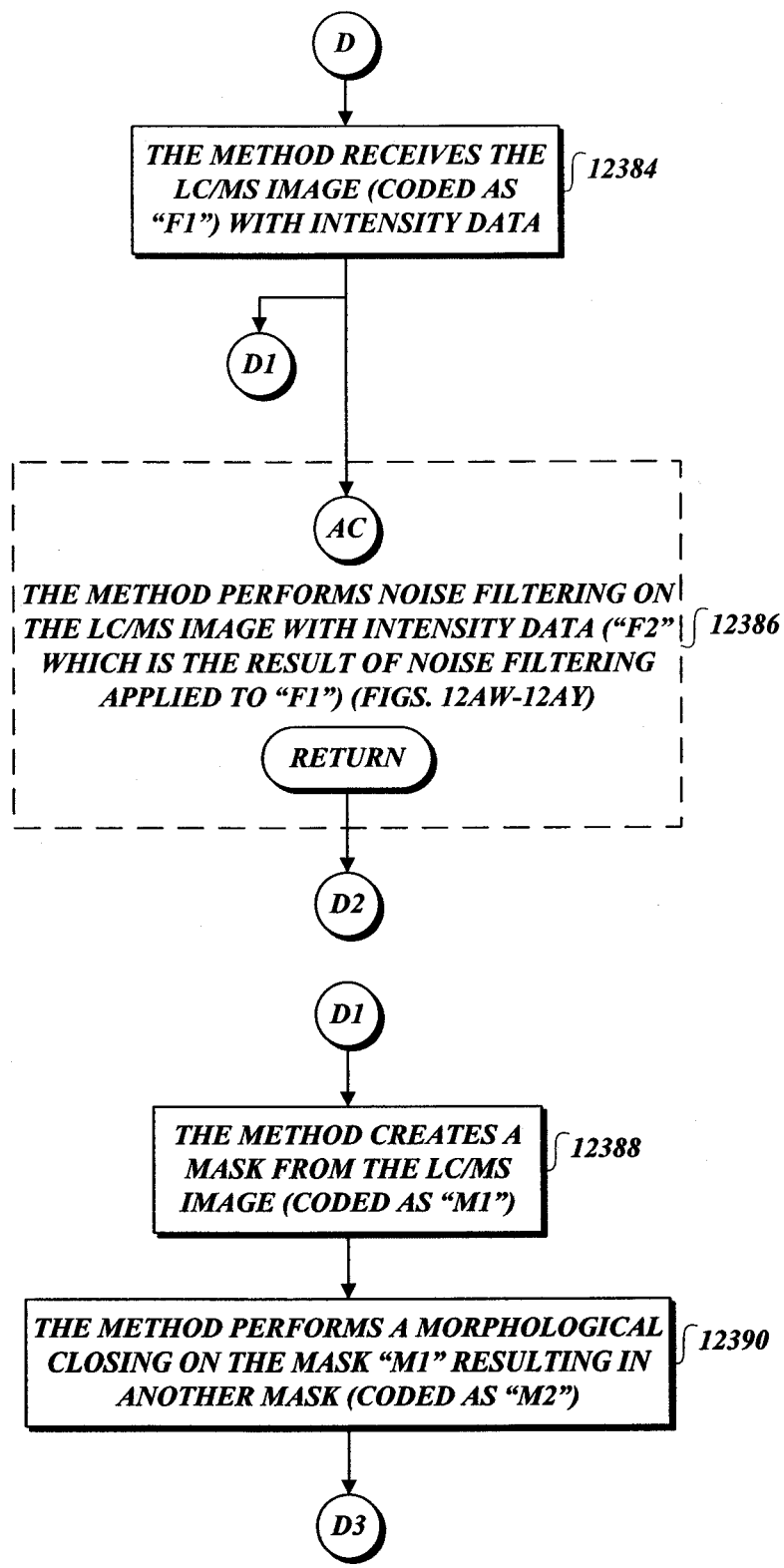
Figure 12A:
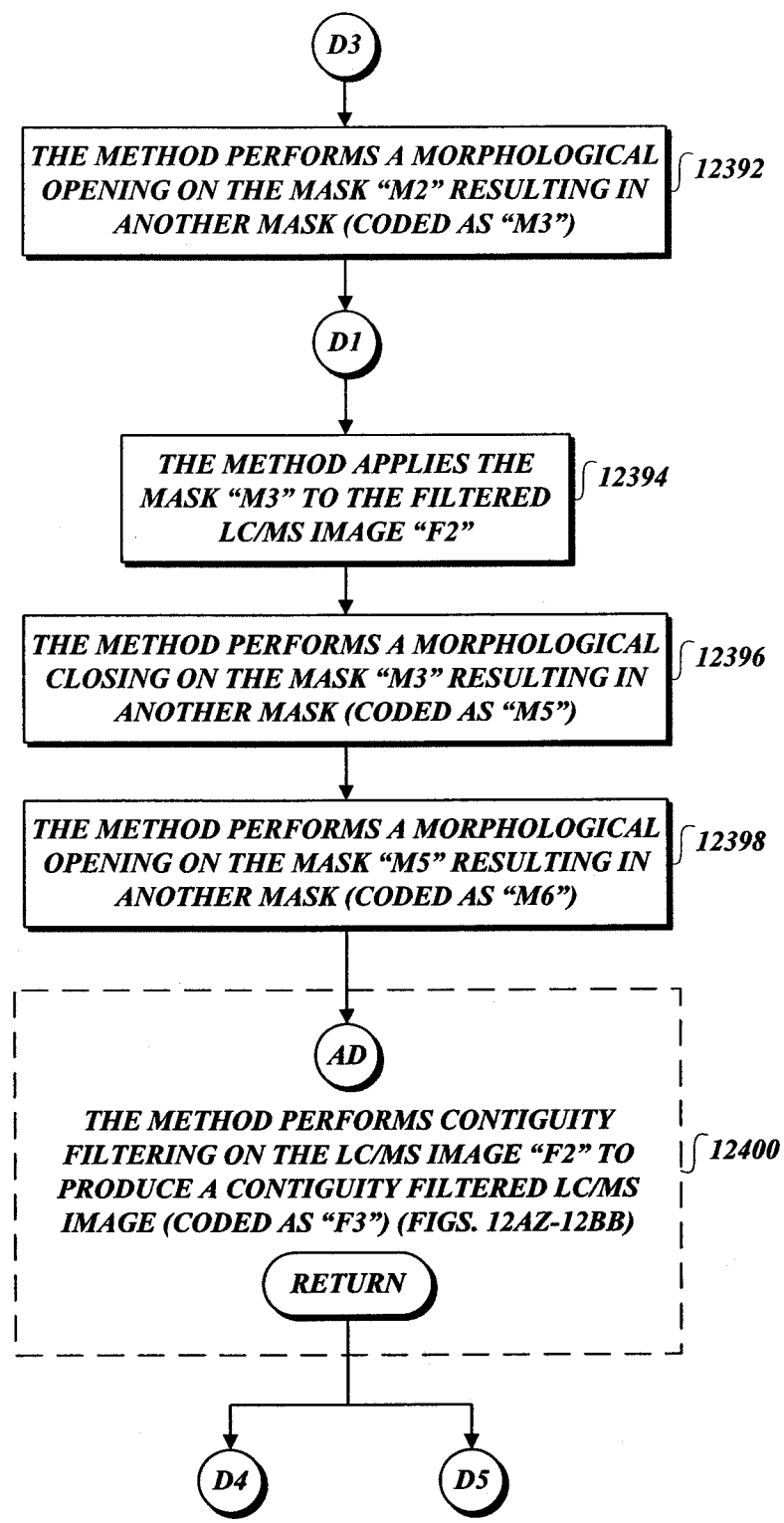
Figure 12A:
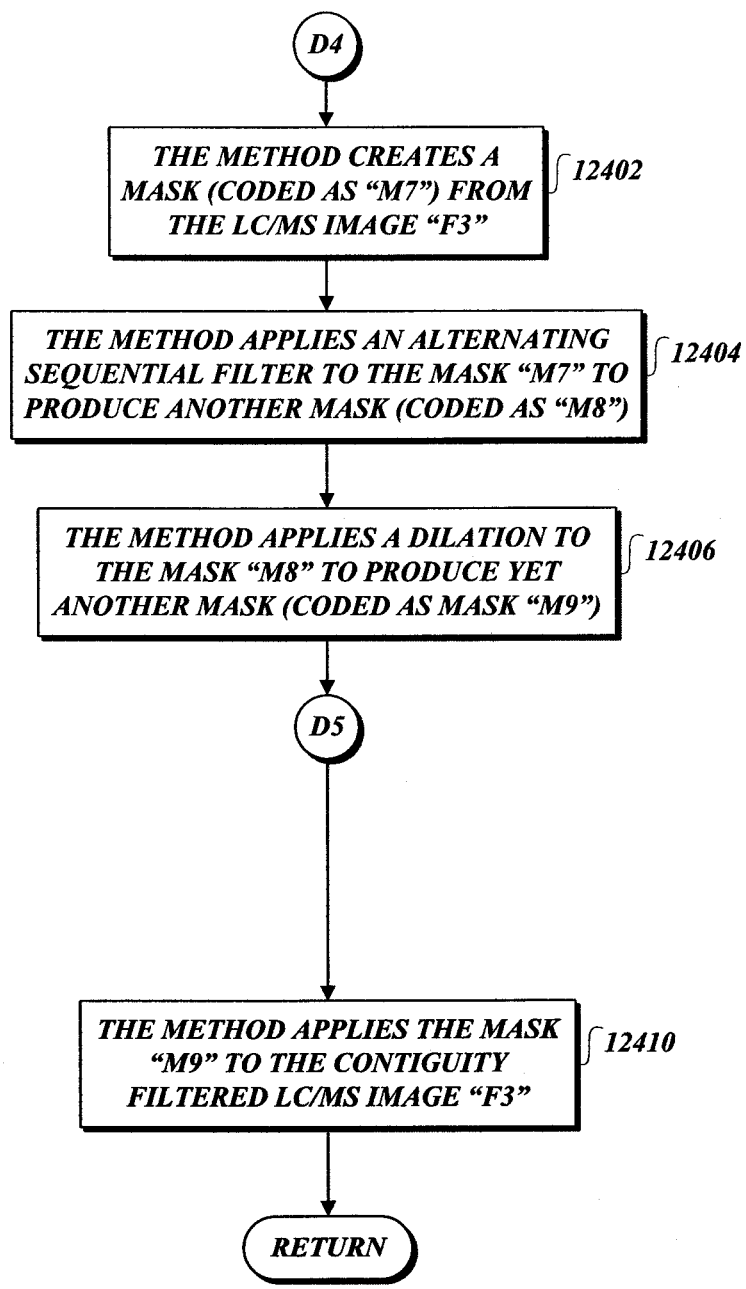
Figure 12A:
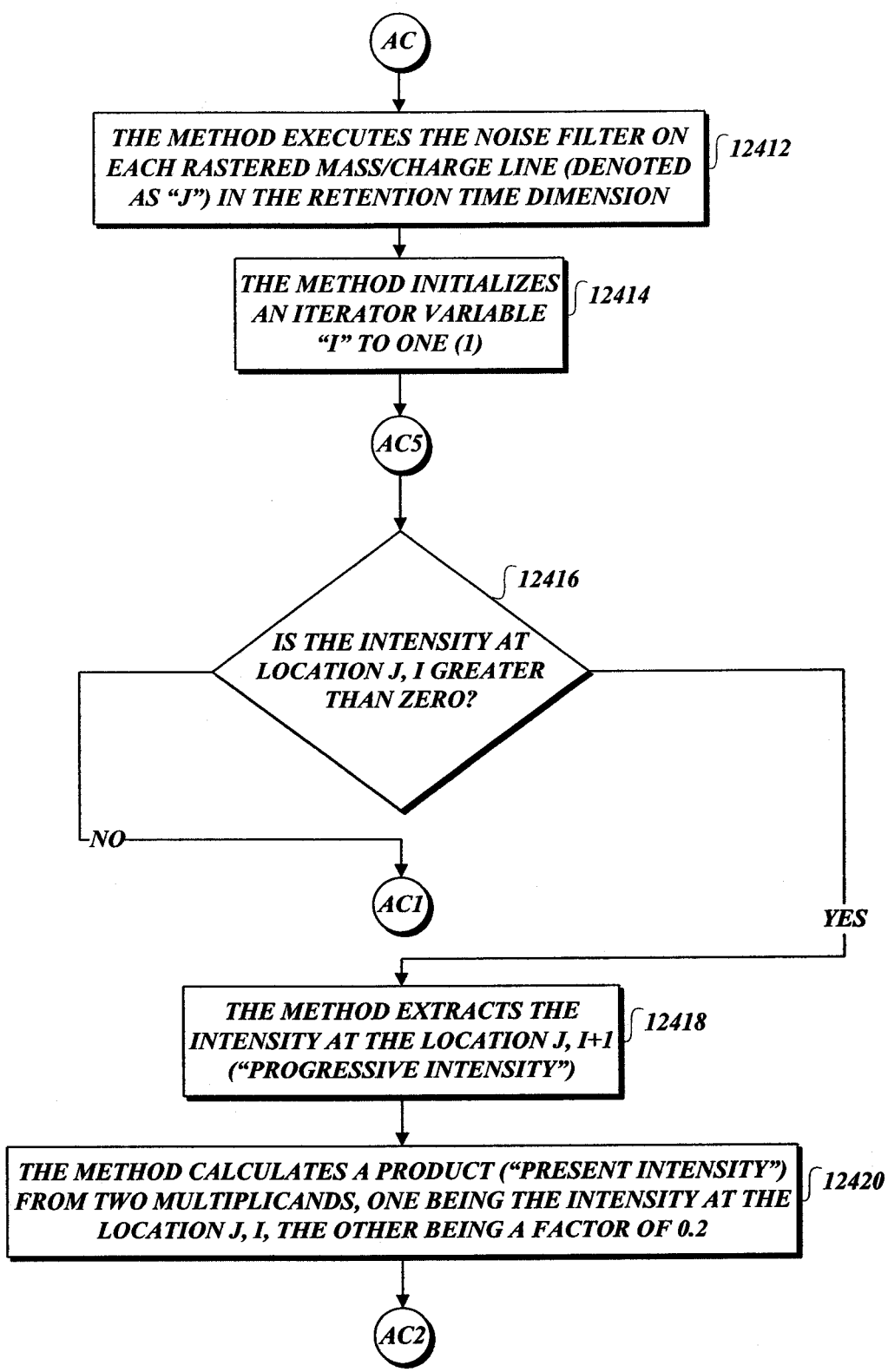
Figure 12A:
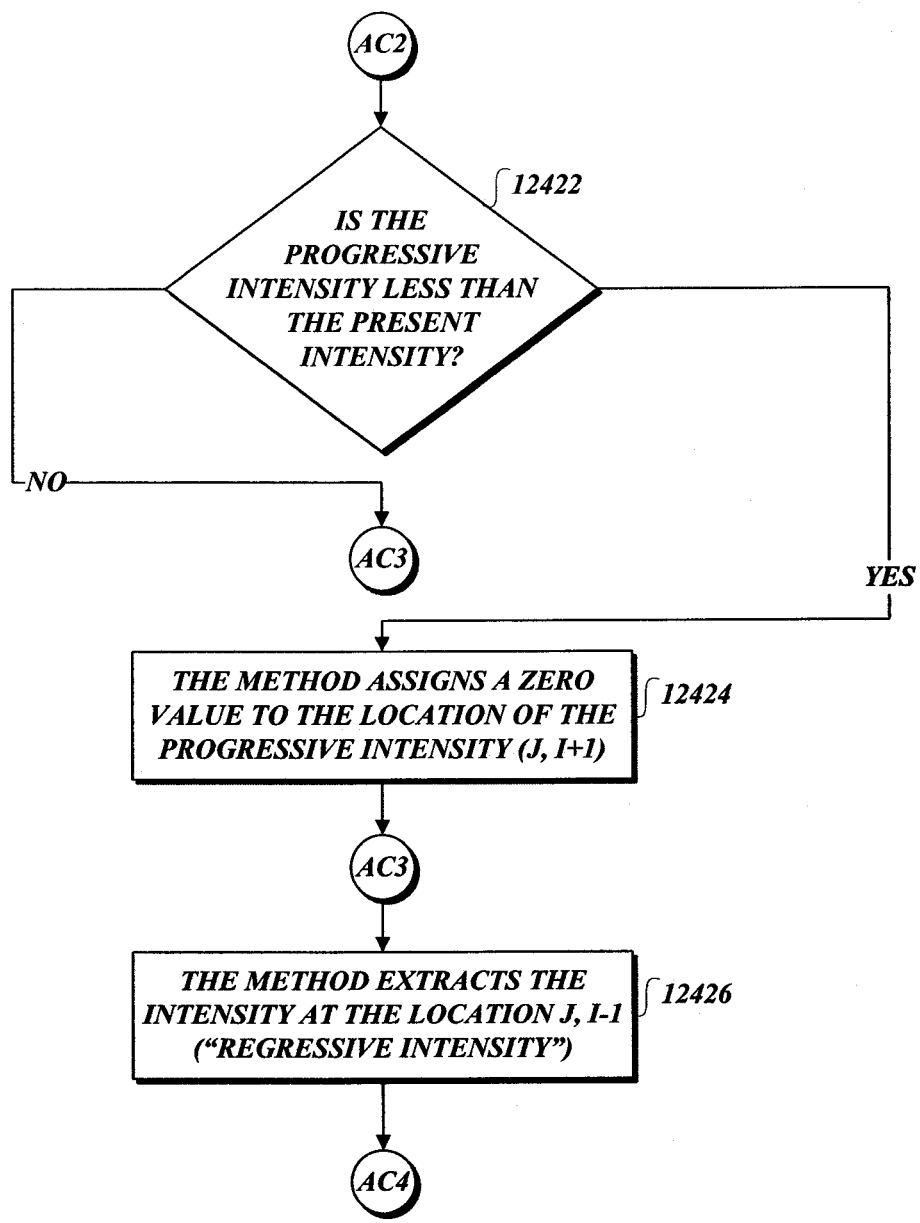
Figure 12A:
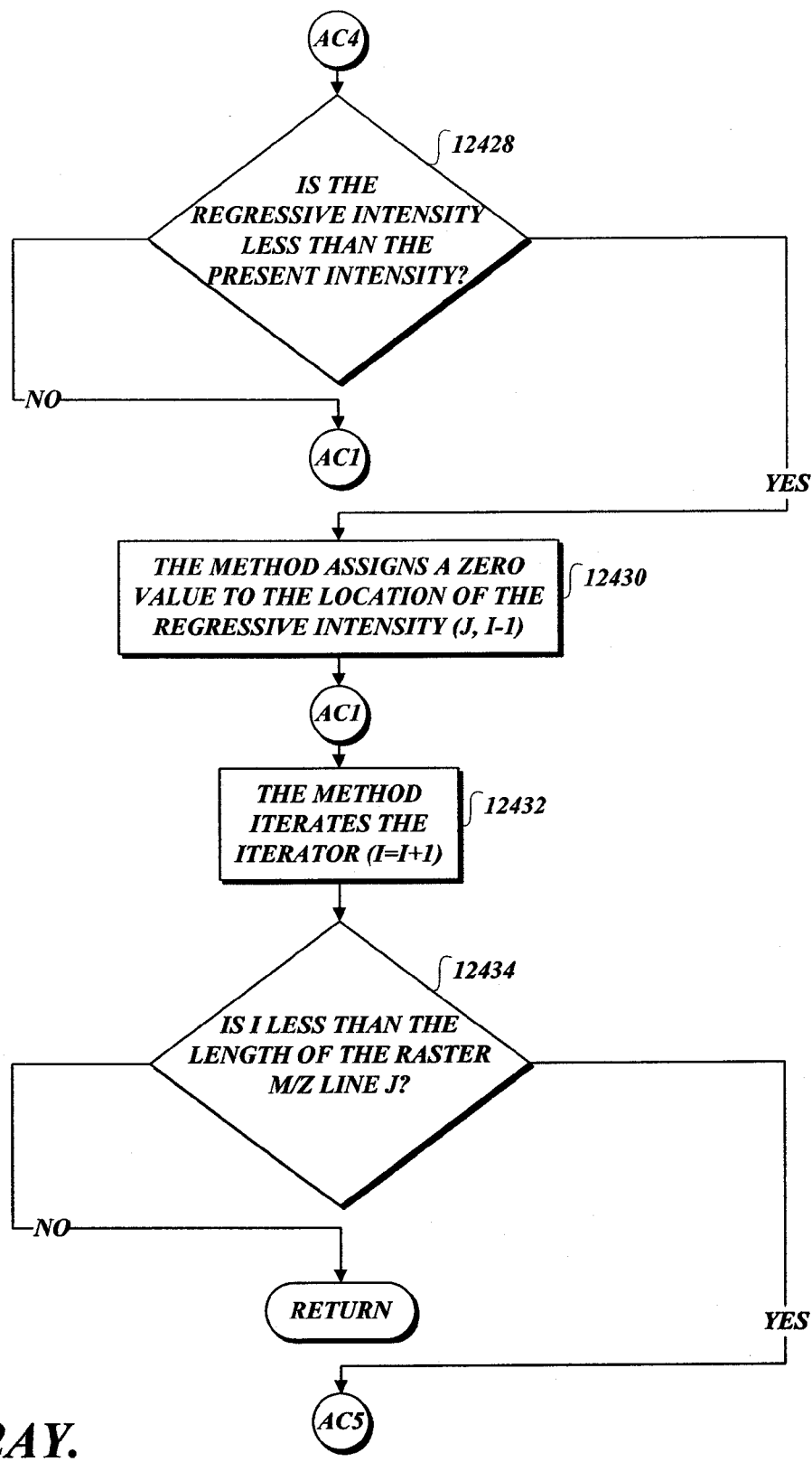
Figure 12A:
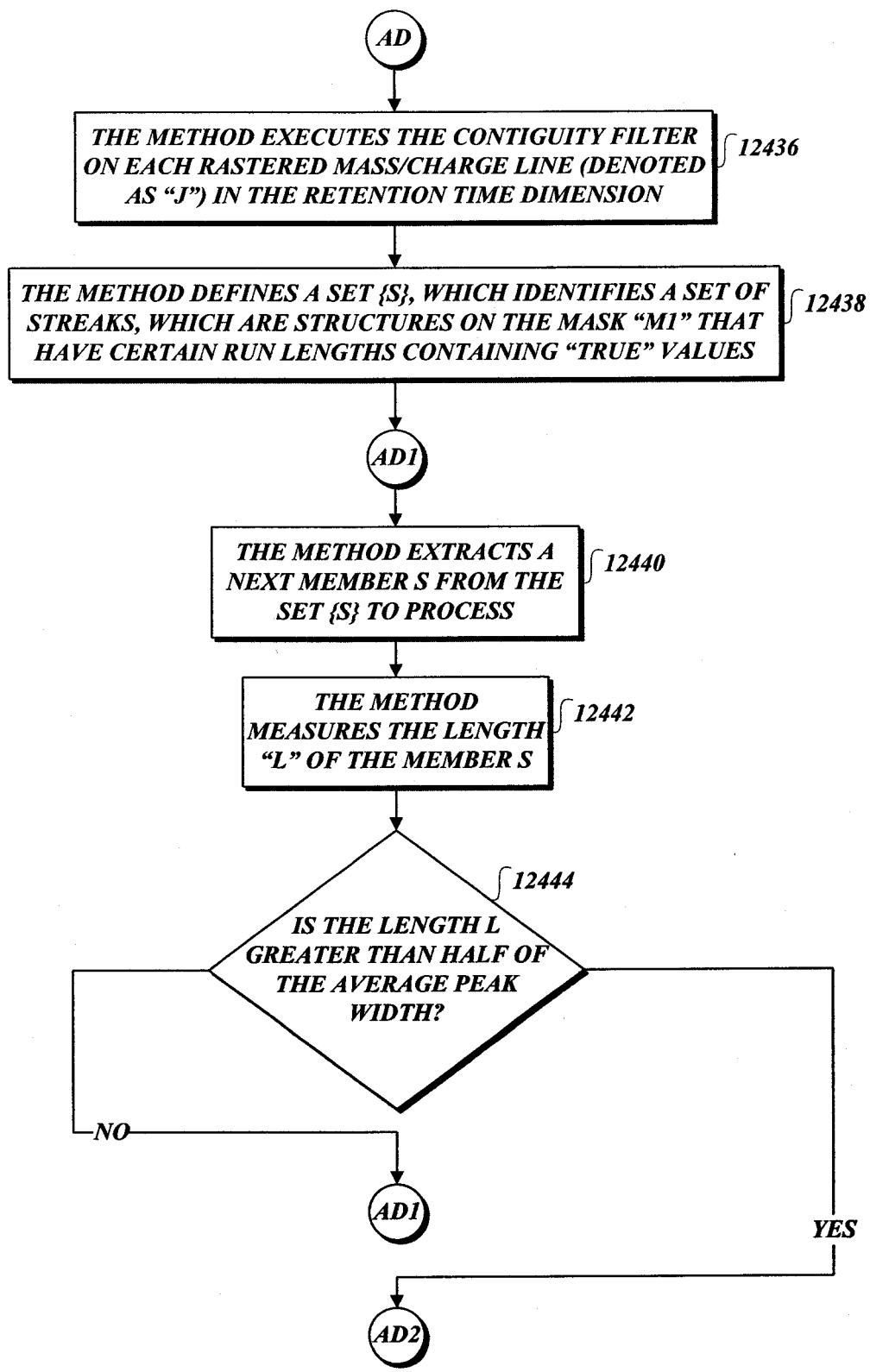
Figure 12B:
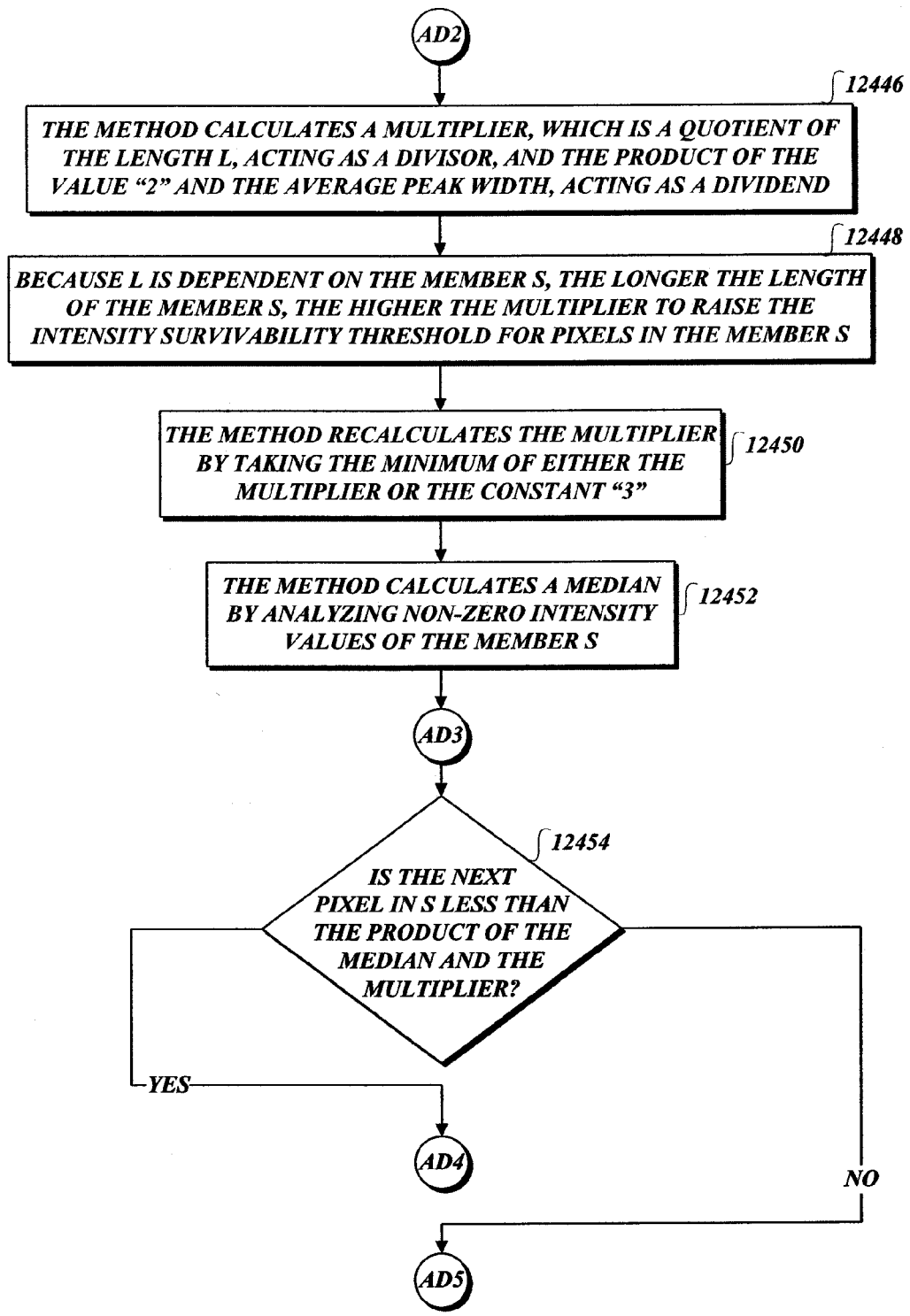
Figure 12B:
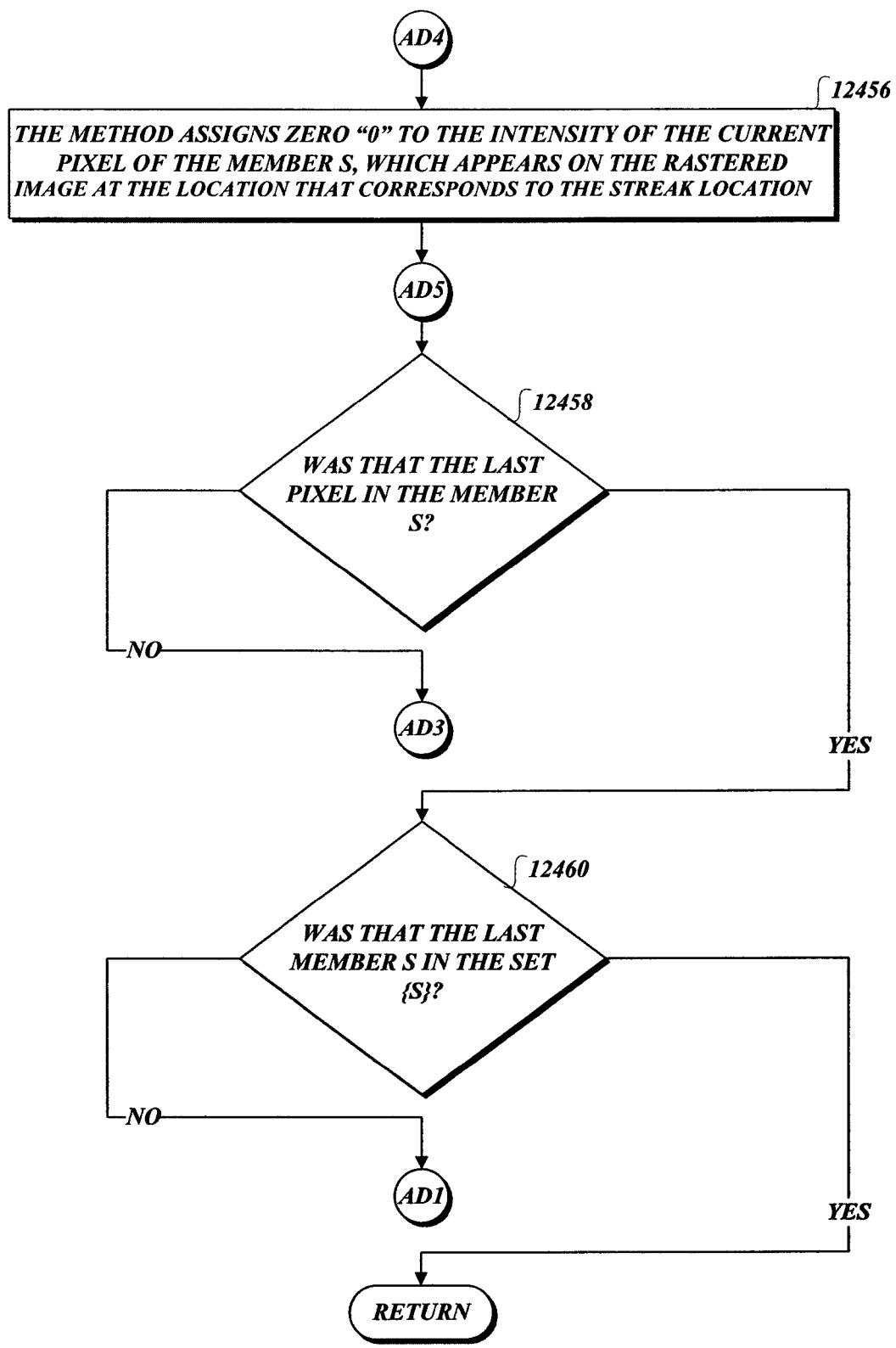
Figure 12B:
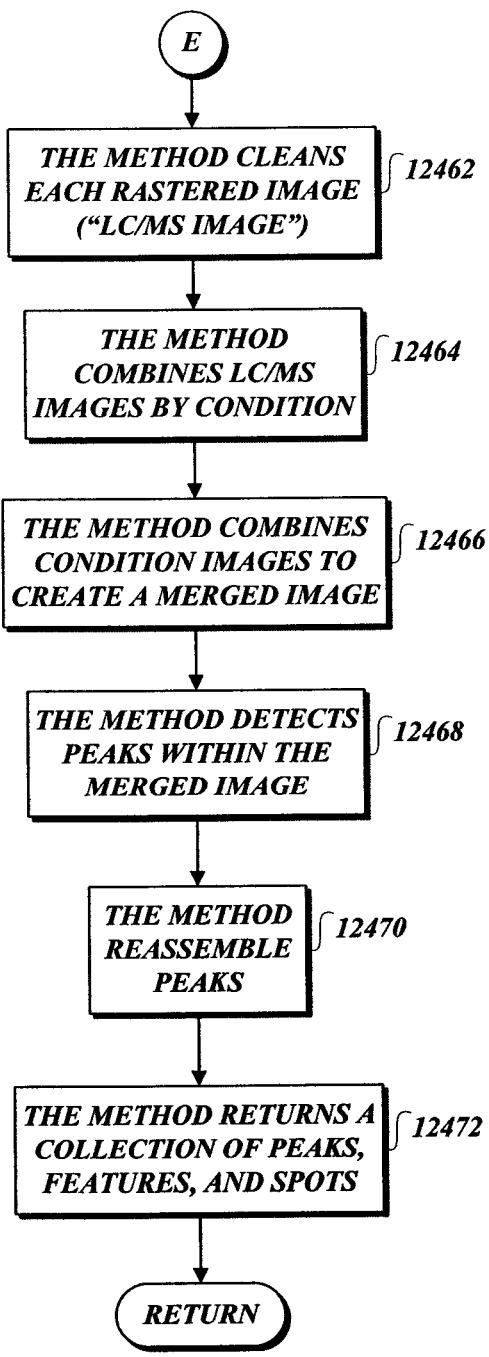
Figure 12B:
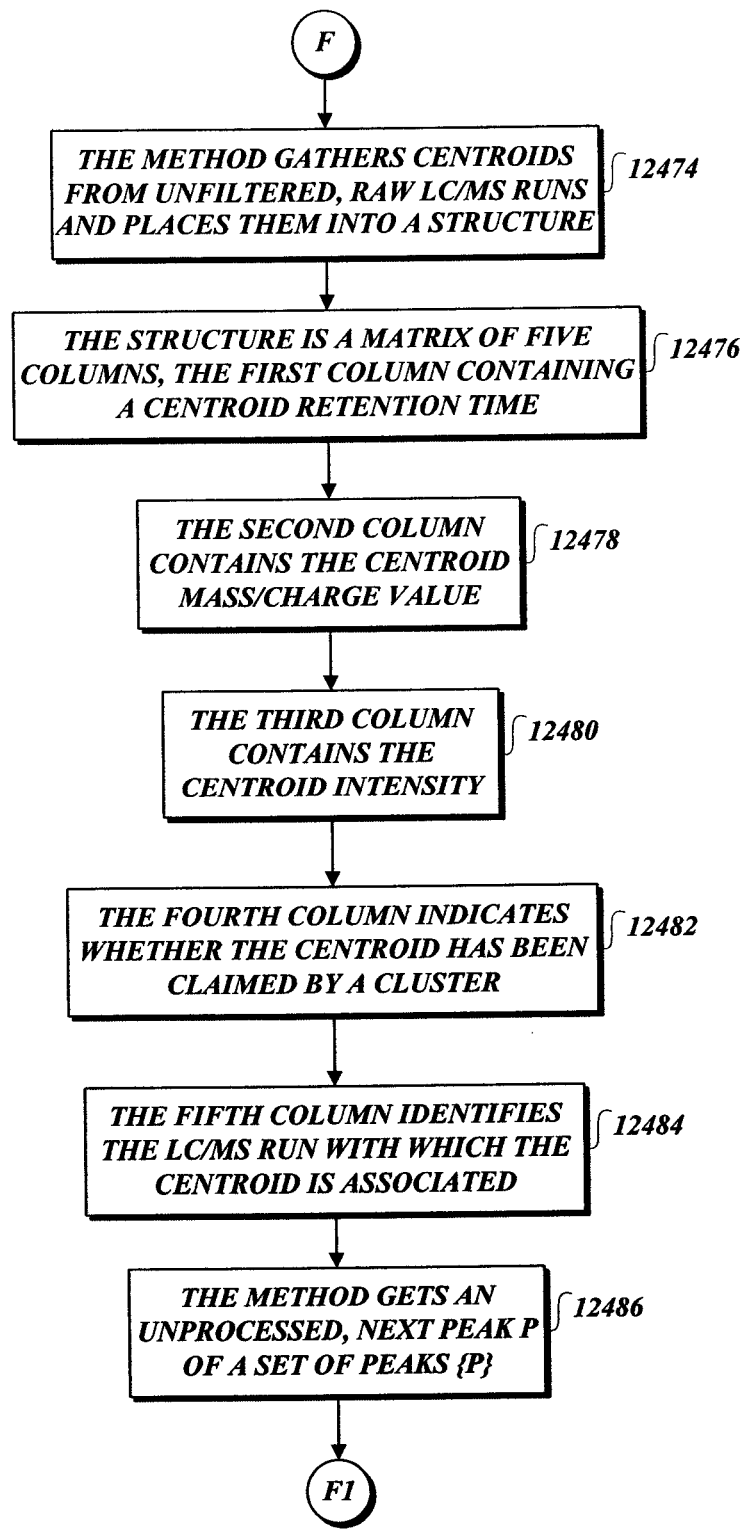
Figure 12B:
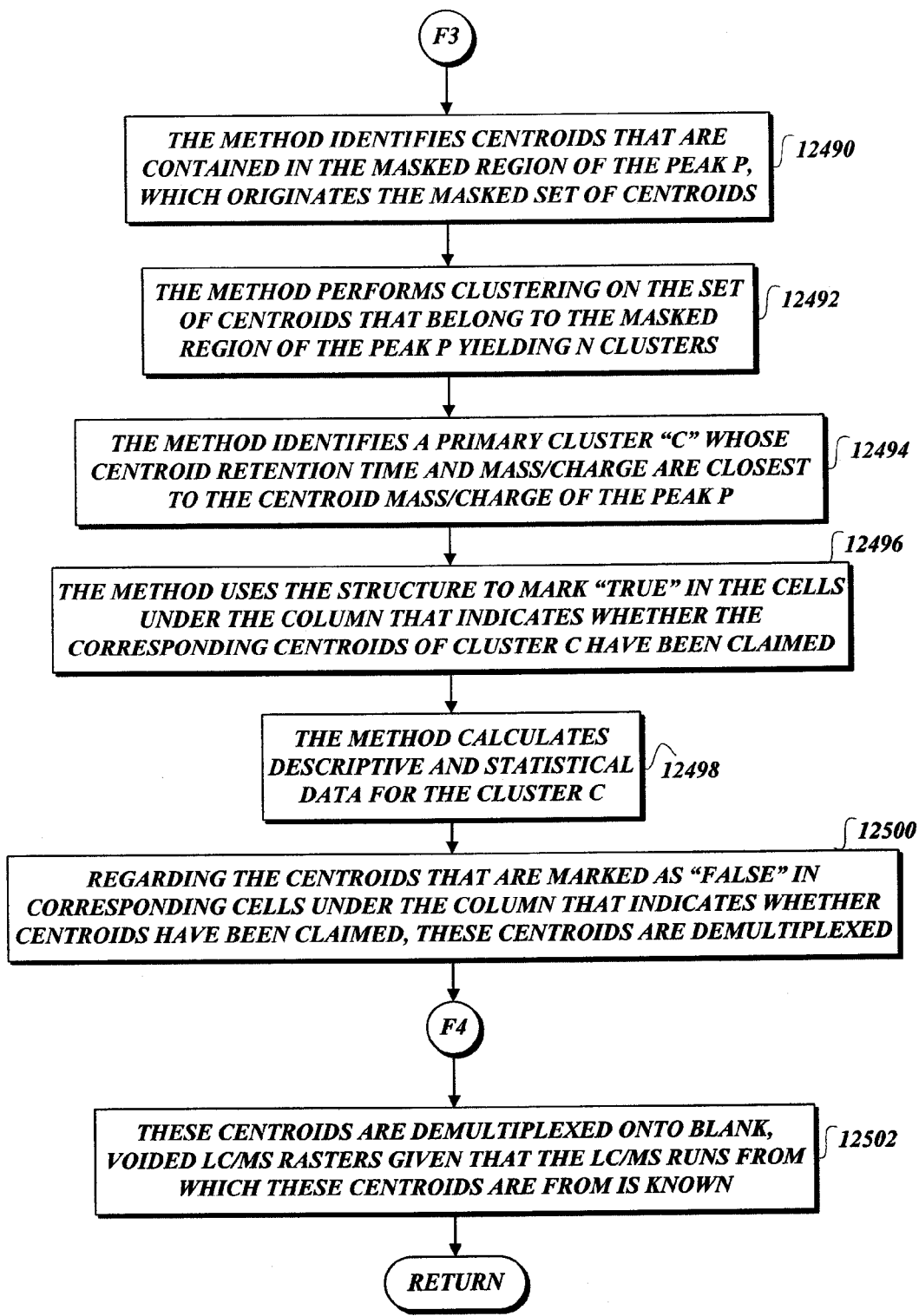
Figure 12B:
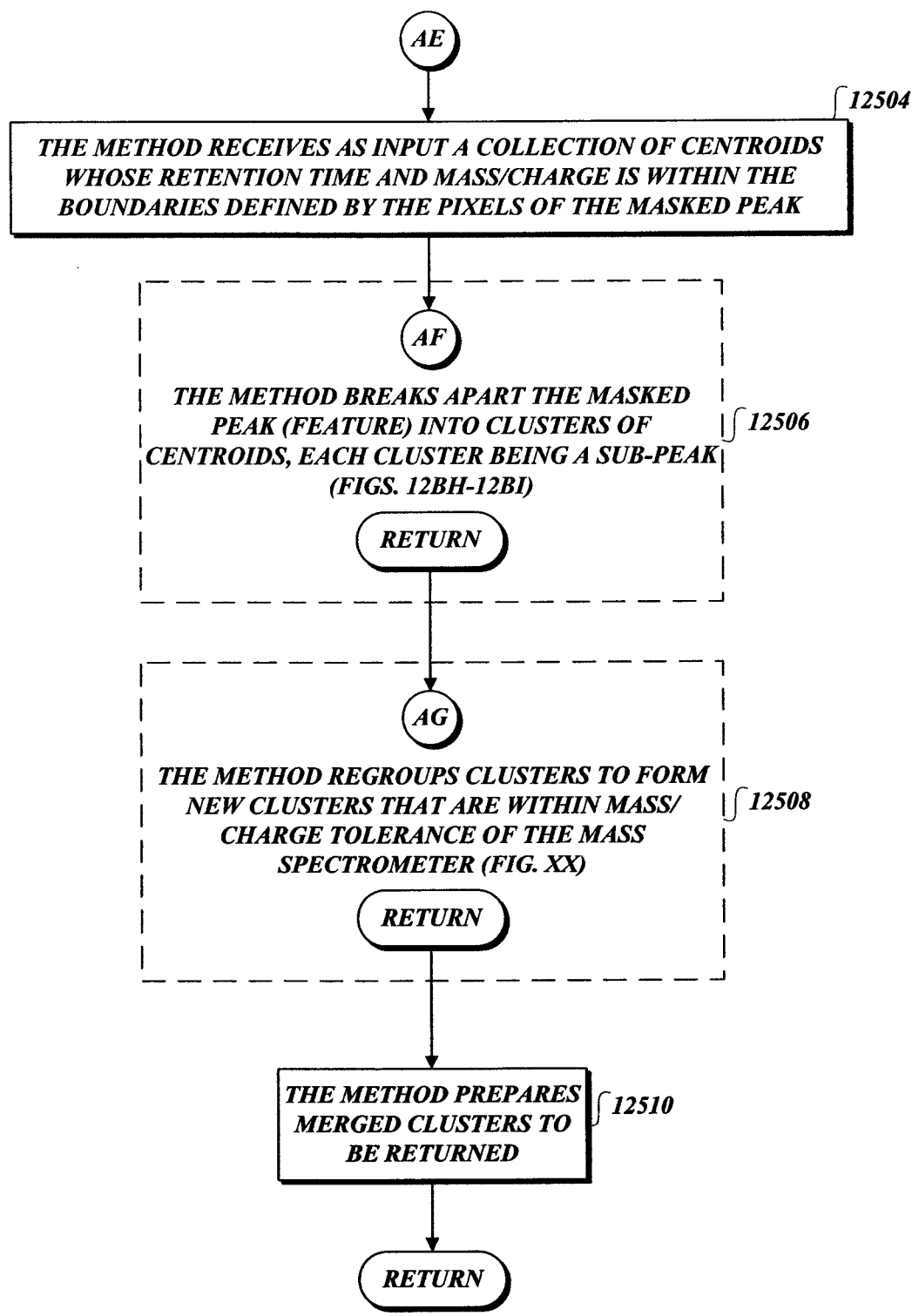
Figure 12B:
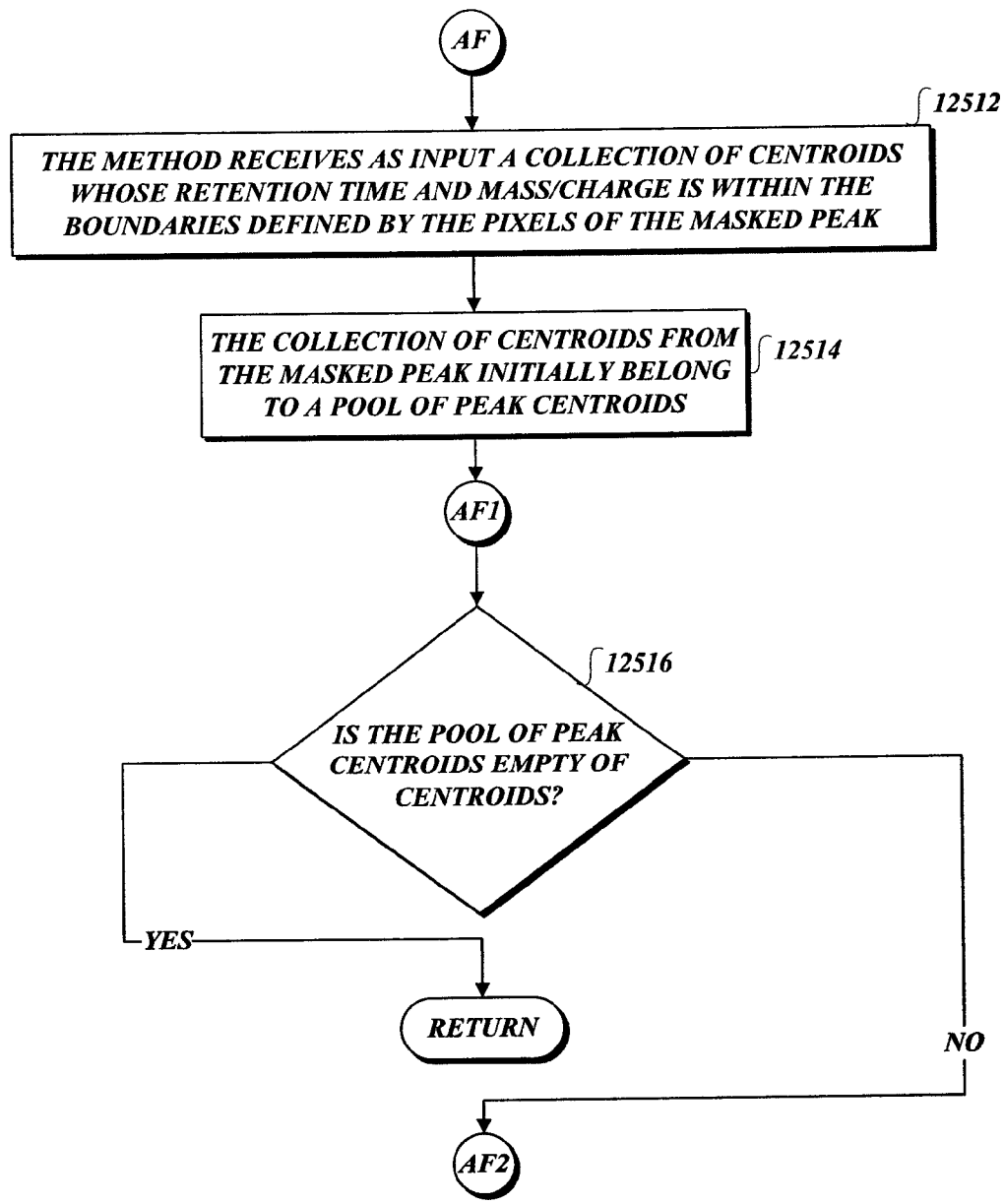
Figure 12B:
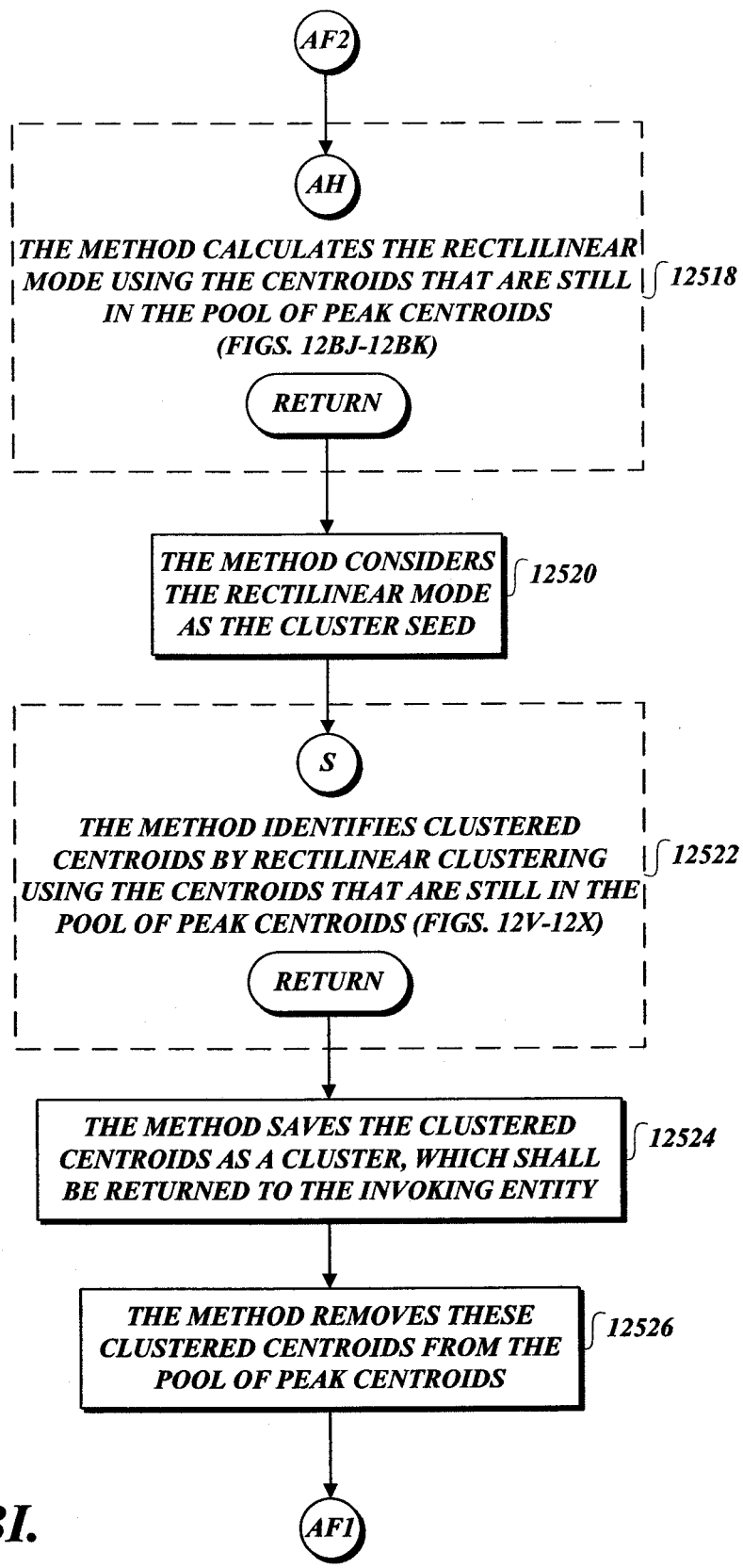
Figure 12B:
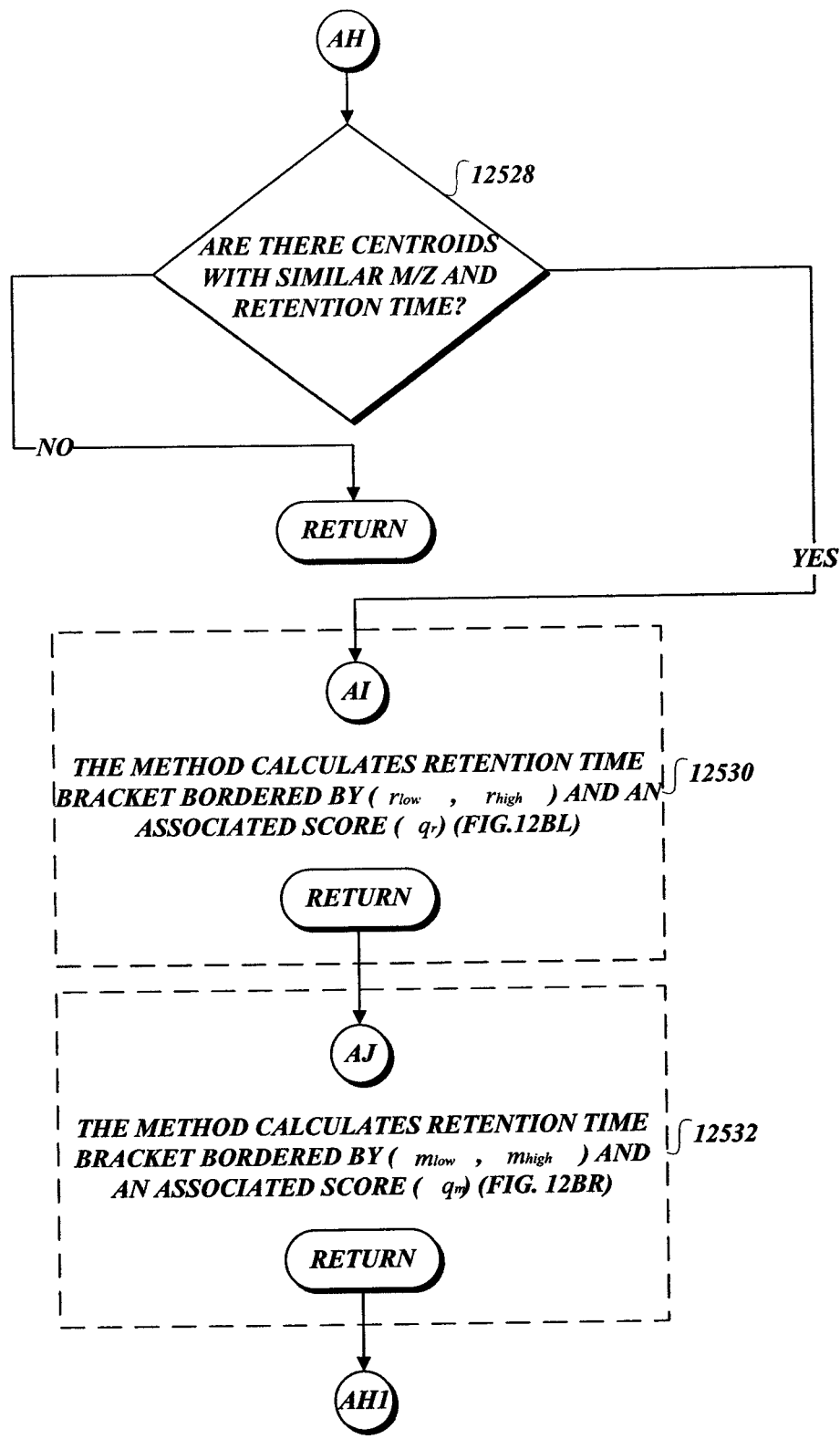
Figure 12B:
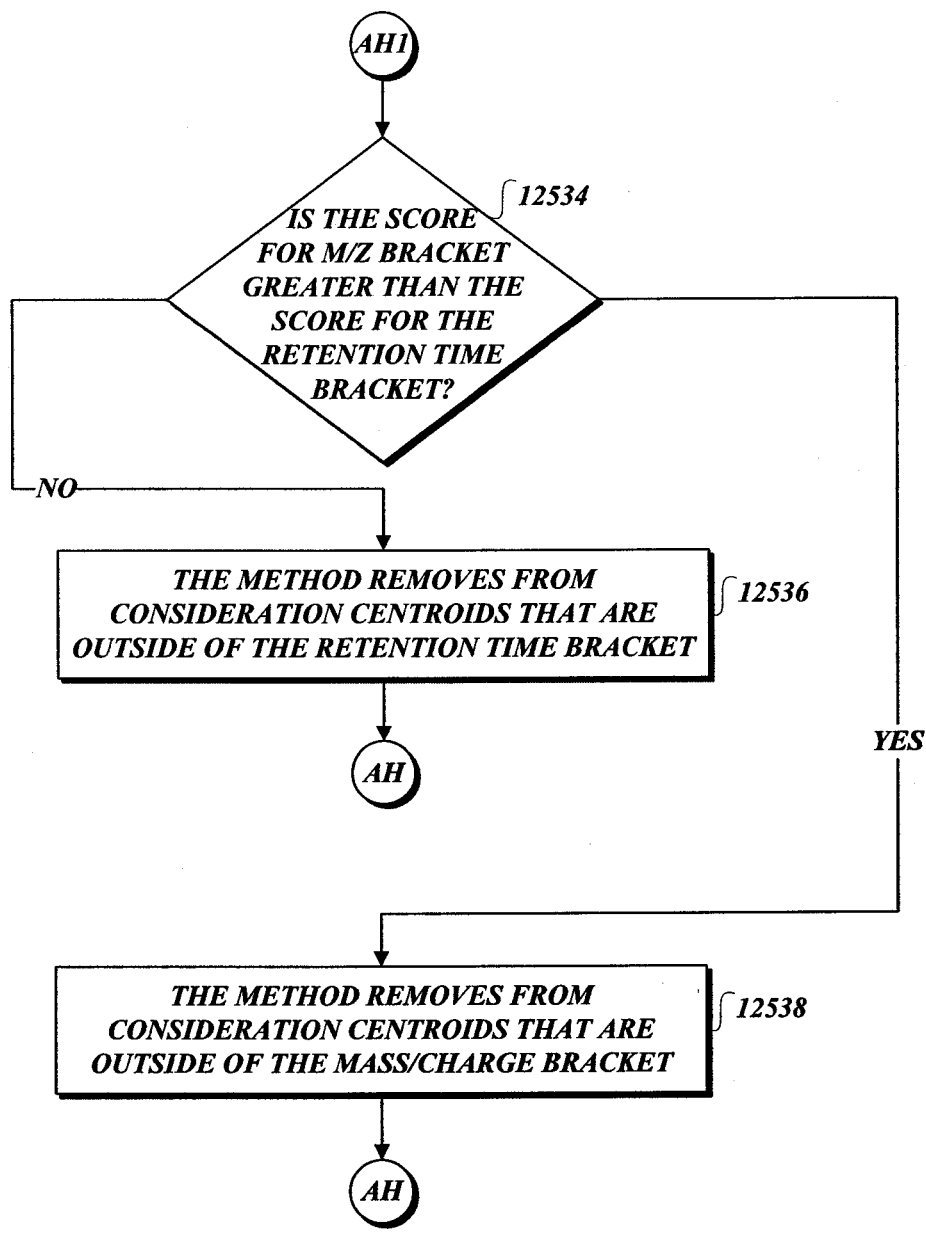
Figure 12B:
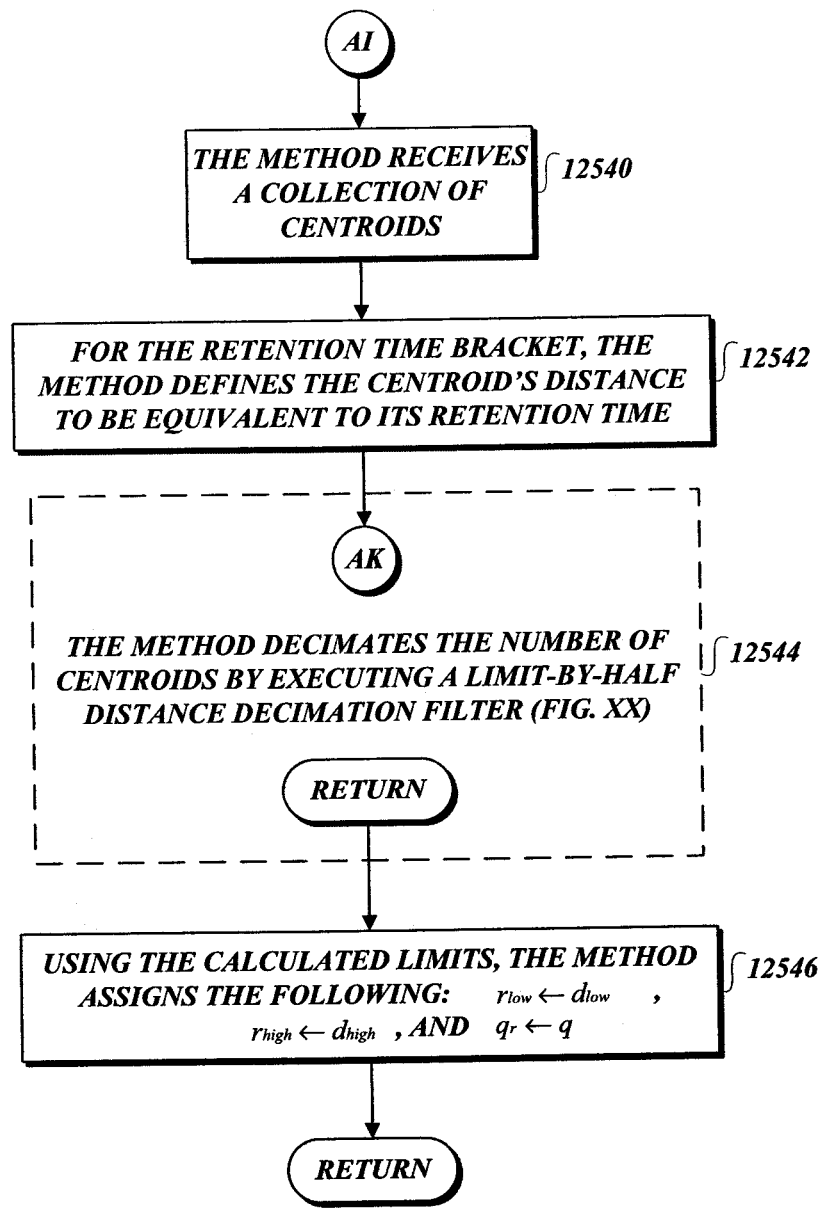
Figure 12B:
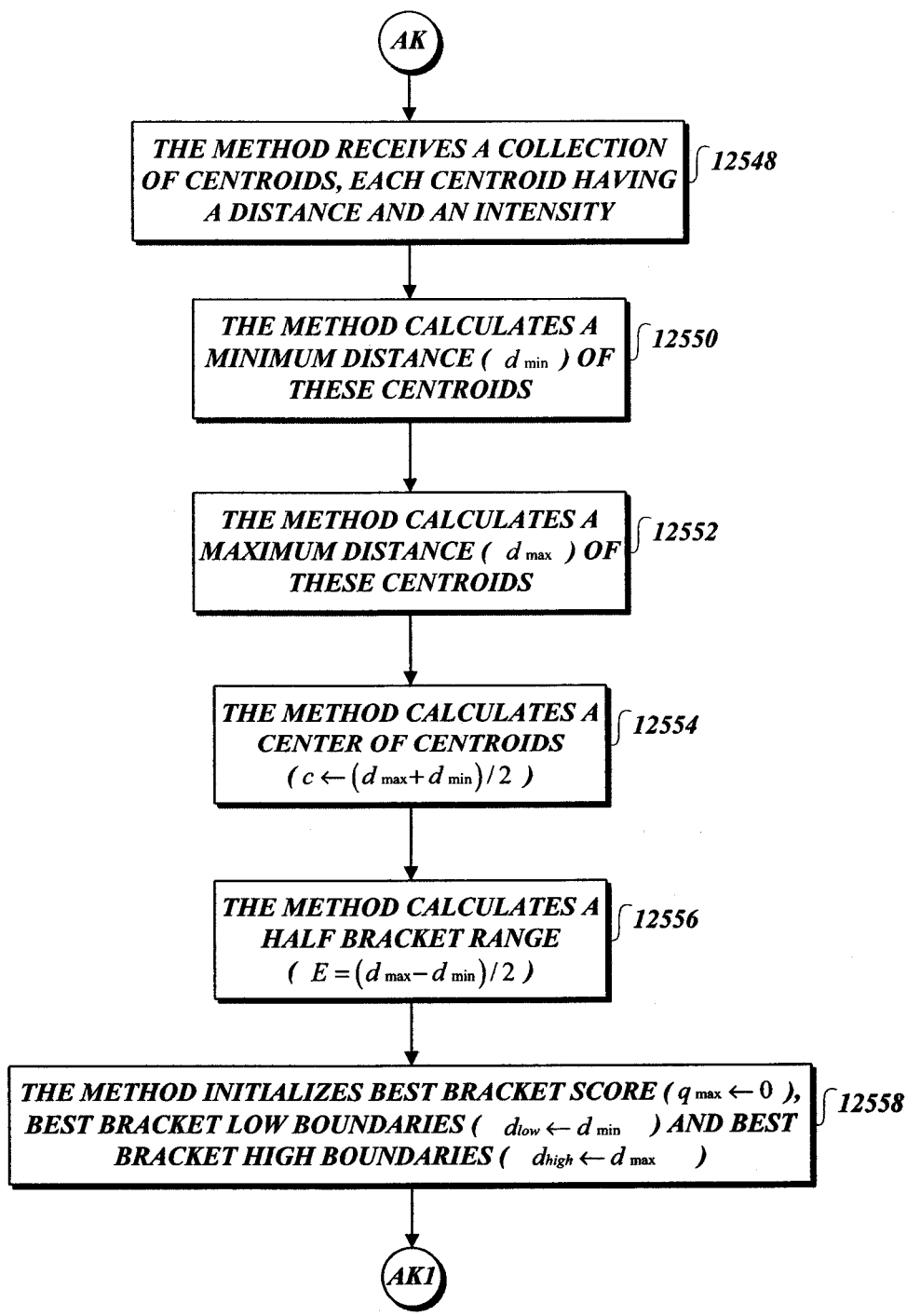
Figure 12B:
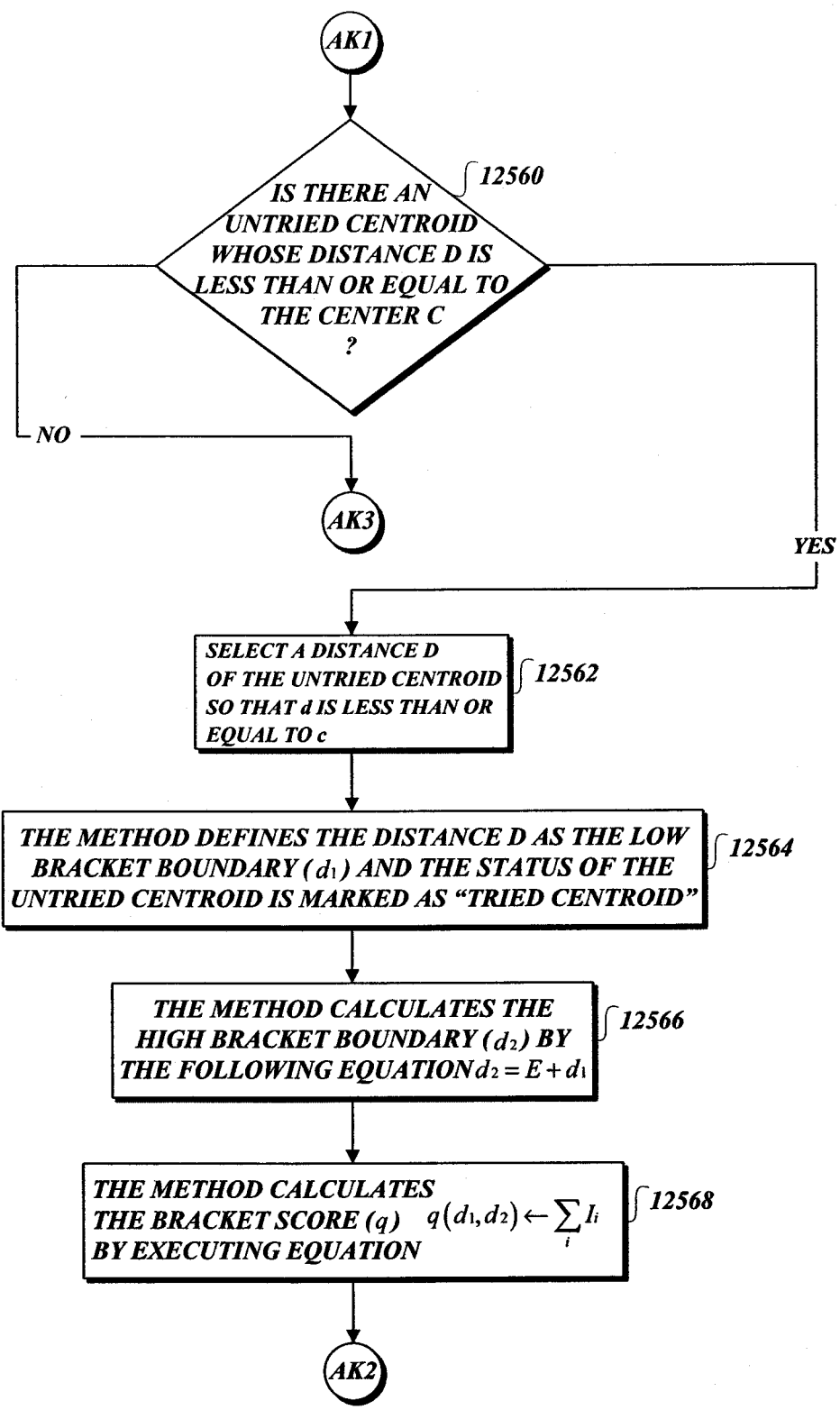
Figure 12B:
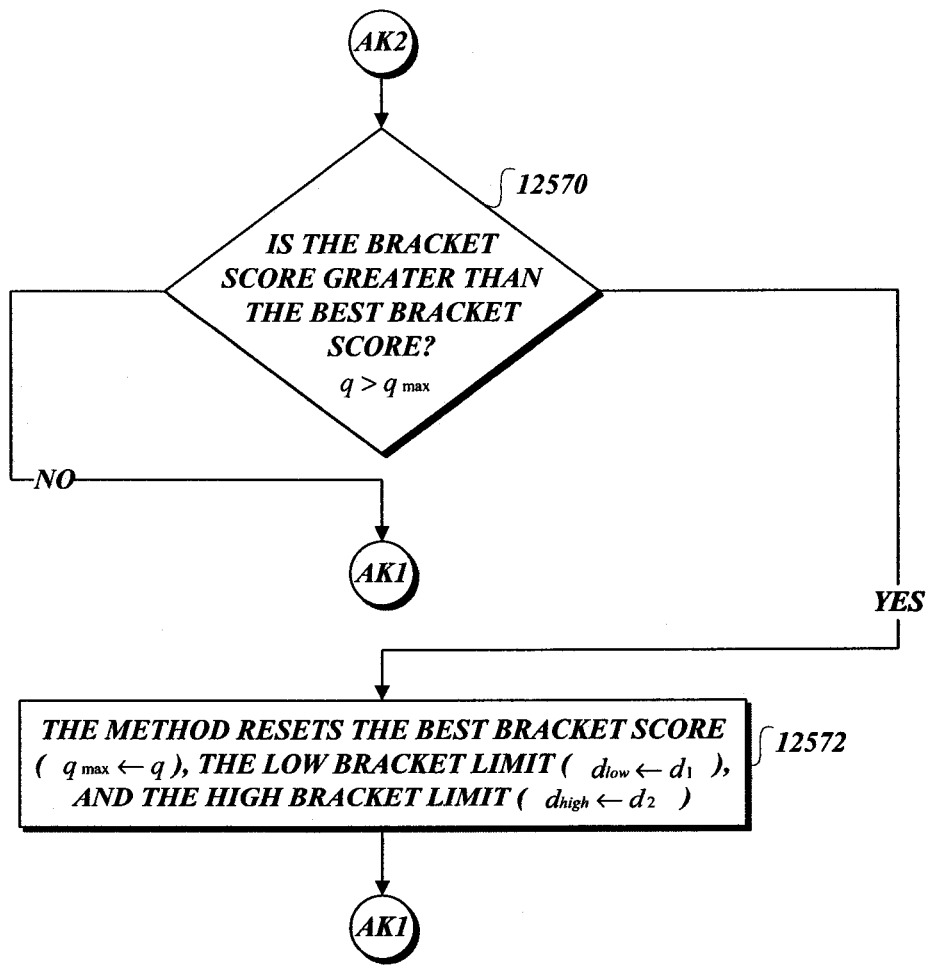
Figure 12B:
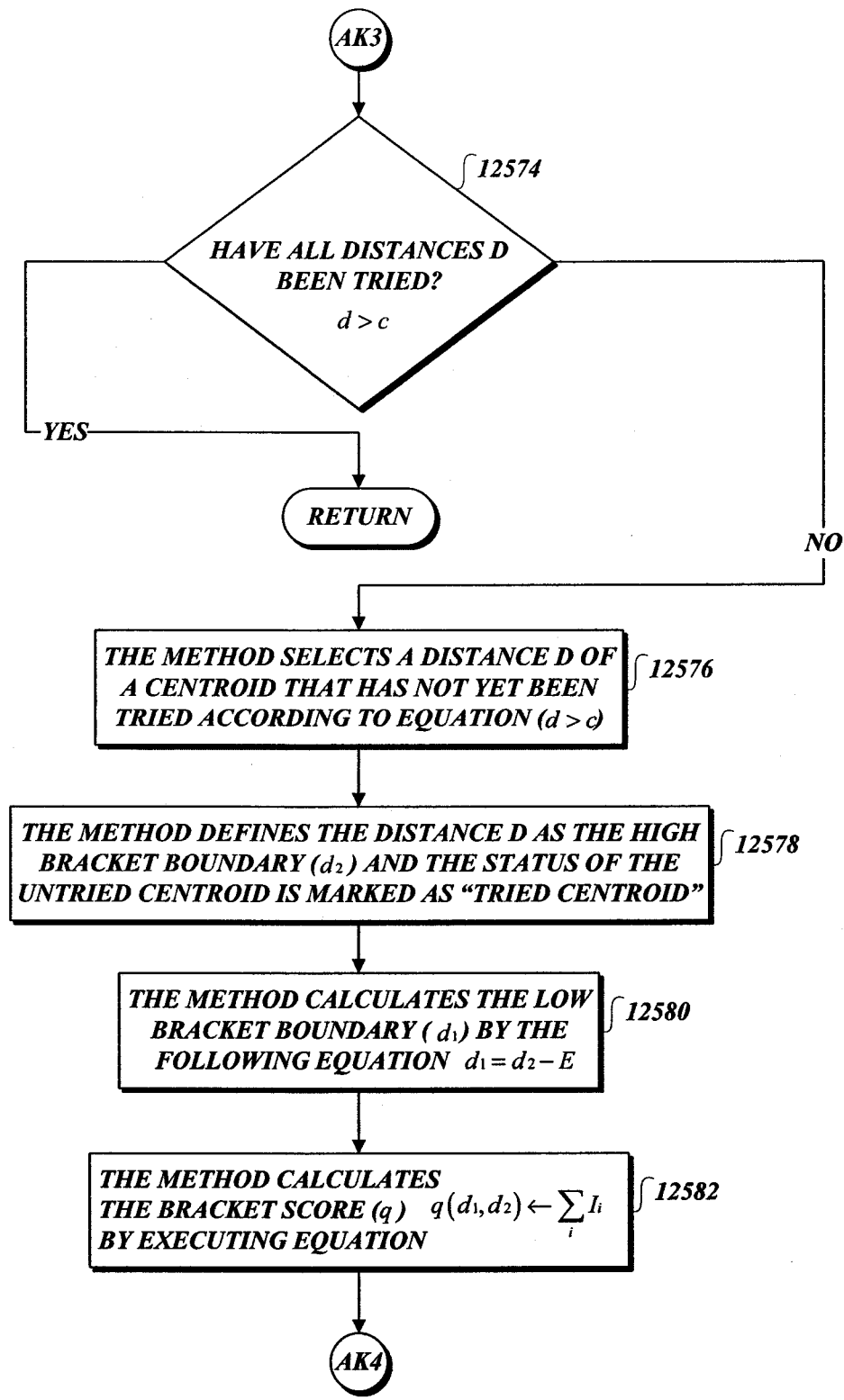
Figure 12B:
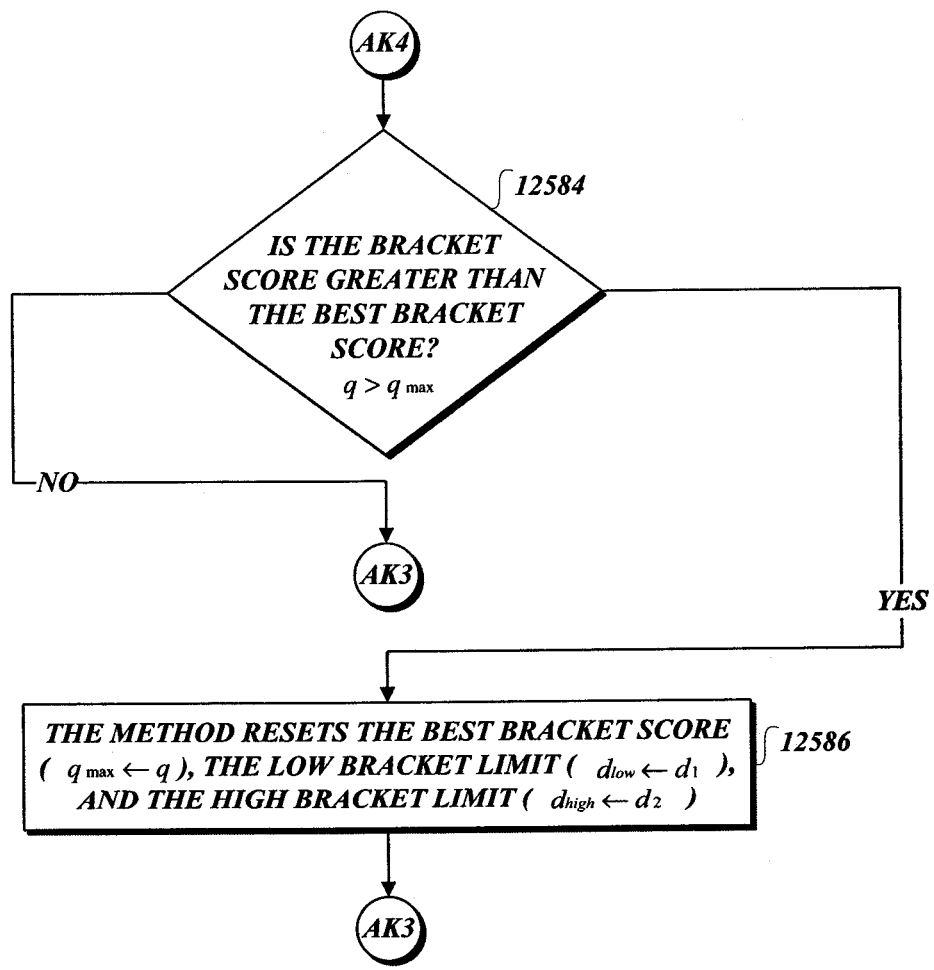
Figure 12B:
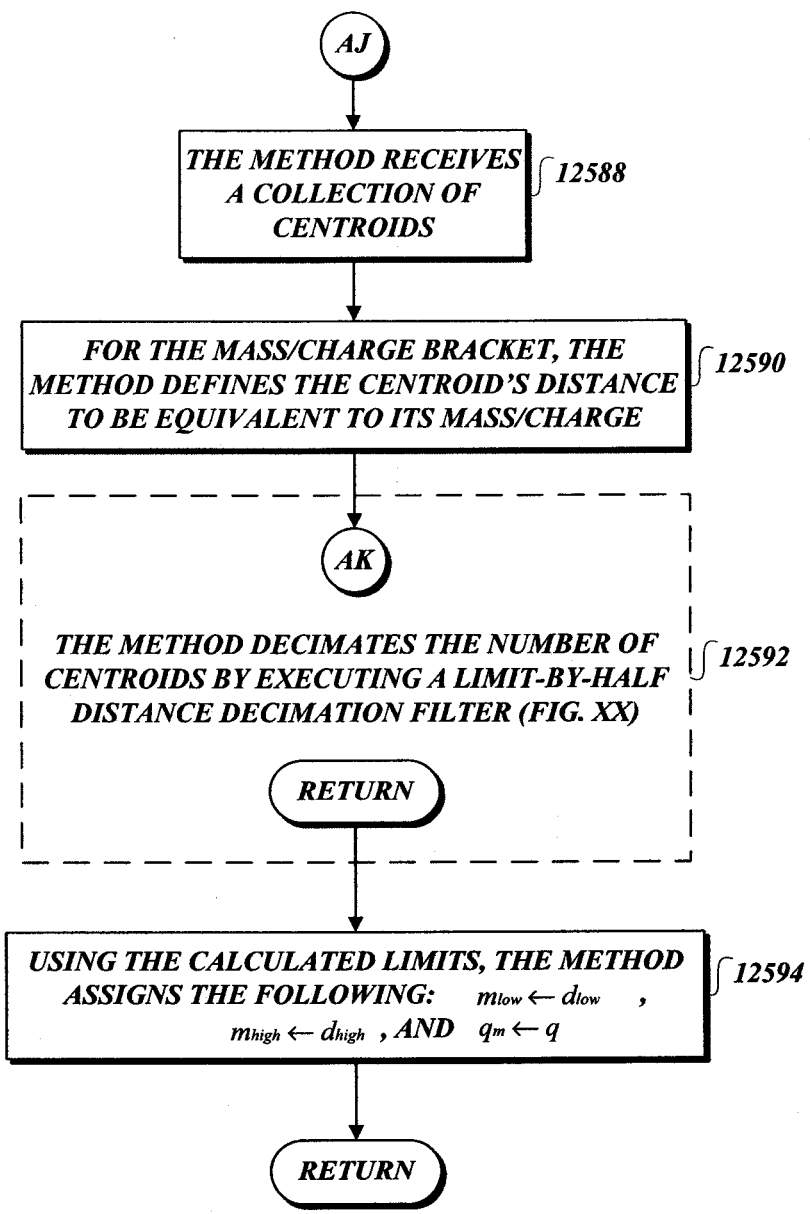
Figure 12B:
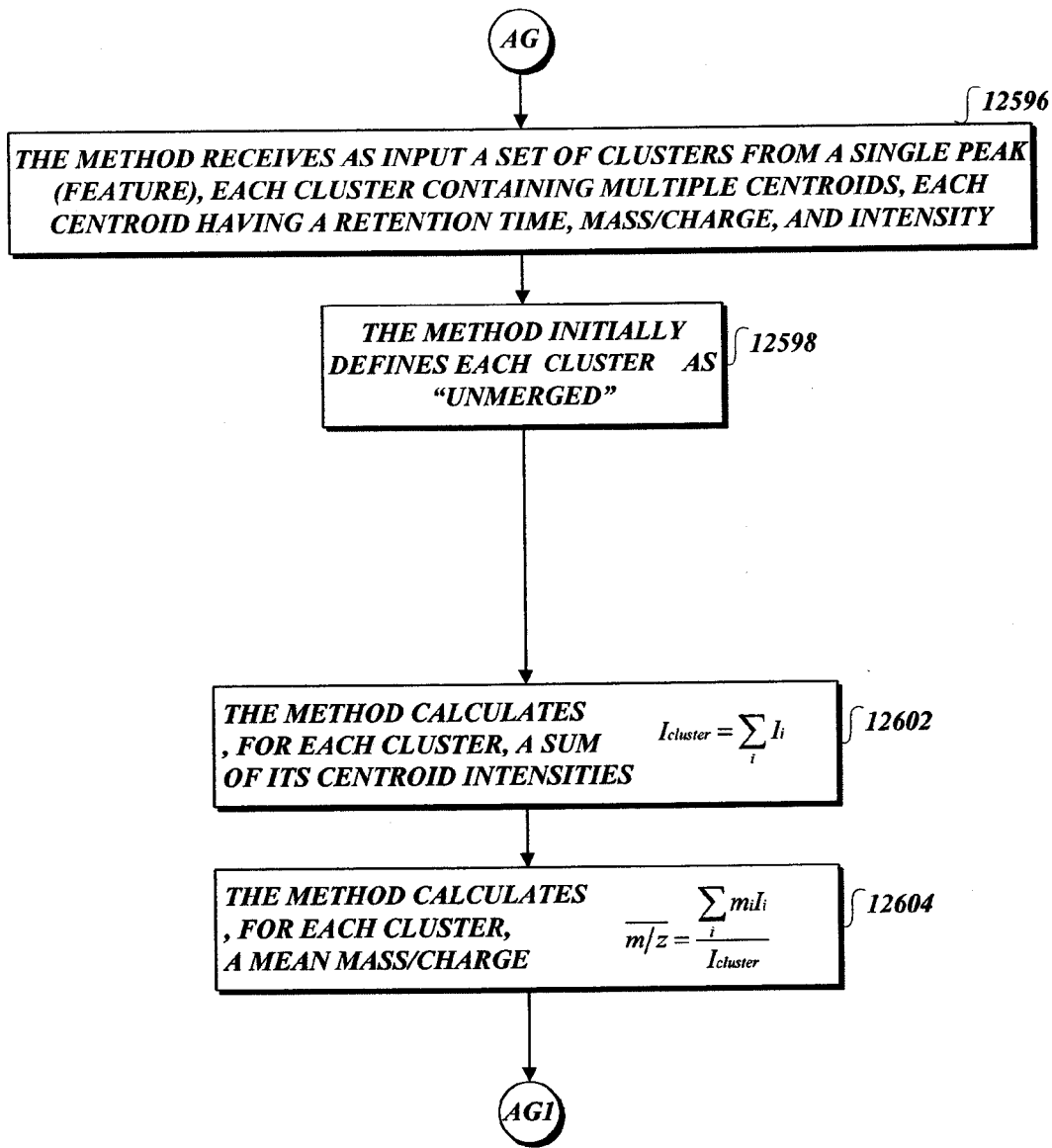
Figure 12B:
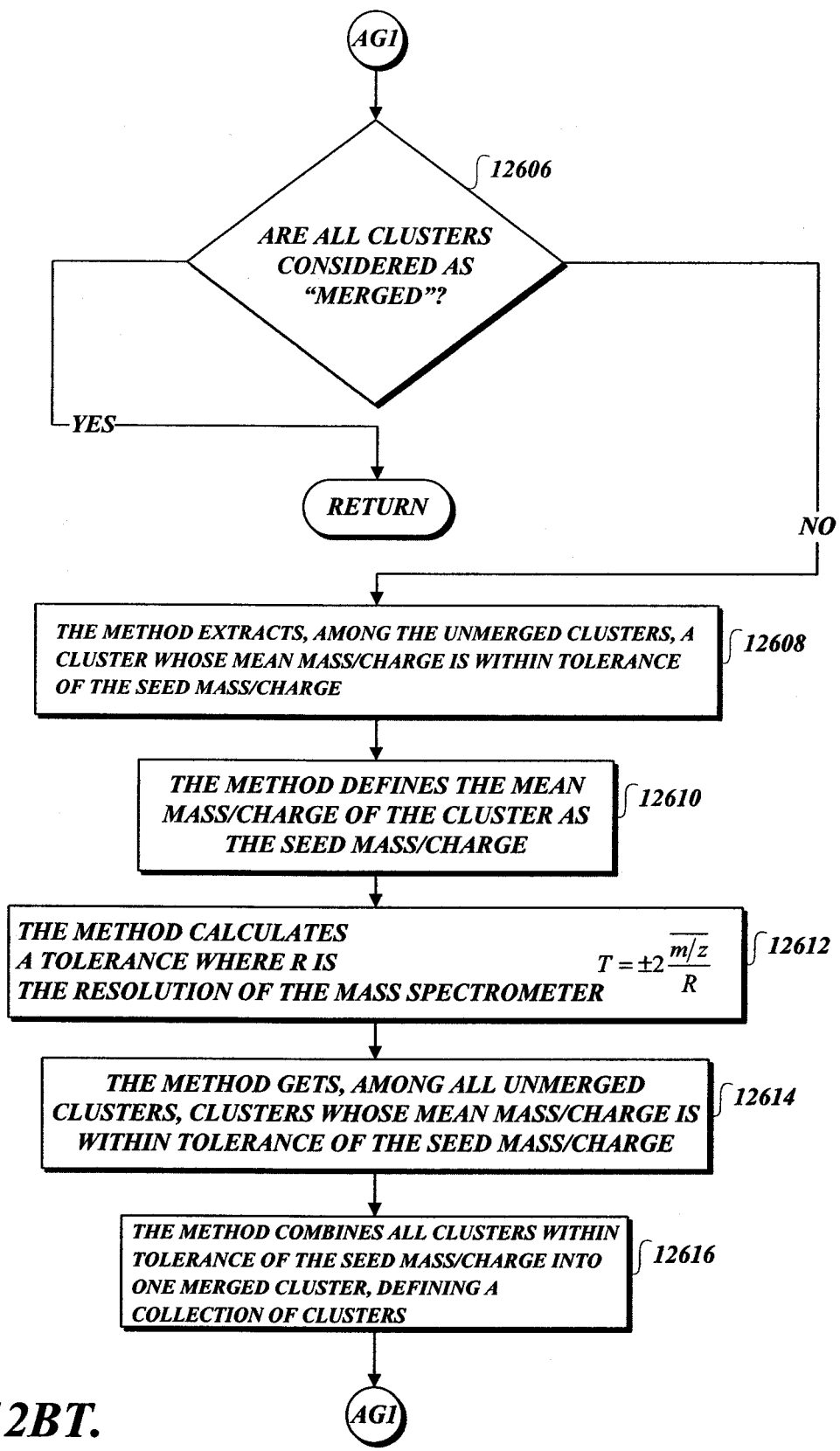

The method then continues to continuation terminal X where a set of method steps 12264 is defined as performing distant clustering and determining the clustered distance boundaries. FIGS. 12Z-12AB. The method then proceeds to block 12266 where the method removes each centroid from the cluster whose distance ($f_i$) is not within new cluster distance boundaries ($f_i > d_c$). At block 12268, the method returns centroids that remain in the cluster. The method then returns from execution to the point of invocation.

The steps of terminal T produce cluster scoring to analyze whether a cluster is used to determine mass/charge uncertainty rate of change (s 2).

From terminal T (FIG. 12AF), the method extracts the lowest retention time of the cluster ($r_{min}$). See block 12270. At block 12272, the method extracts the highest retention time of the cluster ($r_{max}$). The method calculates at block 12274 the number of mass spectra (NO that were taken between the time points of ($r_{min}$) and ($r_{max}$) by the following assignment:

$$N_c \leftarrow (r_{max} - r_{min})q$$

The above calculation reveals the number of mass spectra that were acquired during the retention time of the cluster which is proportional to the number of mass spectra of the cluster ($N_c$). q is the scan rate of the mass spectrometer (number of acquired mass spectra per unit time). Next, at block 12276, the method counts the number of centroids that are in the cluster ($P_c$). At block 12278, the method sums ($I_c$) intensity of all centroids that are in the cluster as follows:

$$I_c \leftarrow \sum_i I_i$$

In the above calculation, I is the intensity of the $i^{th}$ centroid in the cluster. At block 12280, the method calculates the median intensity of clustered centroids $I_{c,median} \leftarrow \text{median}(I_i)$. The method then continues to another continuation terminal ("terminal T1").

From terminal T1, the method continues through another continuation terminal ("terminal AA"), defining a set of method sets 12282 where the method analyzes a mass/charge and retention time vicinity around the cluster that includes a background region. See FIGS. 12AK-12AL. The method then continues to block 12284 where the method counts the number of centroids that are in the vicinity ($P_v$). The number of centroids in a LC/MS run whose retention time and mass/charge values fulfill the following two conditions is the vicinity count ($P_v$): $V(r_{low}) \leq r \leq V(r_{high})$ and $V(m_{low}) \leq m \leq V(m_{high})$ where r is the retention time of a centroid in the LC/MS run; and m is the mass/charge of a centroid in the LC/MS run. The method sums intensities of all centroids that are in the vicinity as follows:

$$I_v \leftarrow \sum_j I_j$$

See block 12286. The above calculation is a sum of the centroid intensities whose centroids are in the vicinity where $I_j$ is the intensity of the $j^{th}$ centroid in the vicinity. At block 12288, the method calculates the median intensity of centroids in the vicinity that are not clustered as follows:

$$I_{v,median} \leftarrow \text{median}(I_k)$$

The above calculation reveals a median of the centroid intensities whose centroids are in the vicinity but not within the cluster. This median of the centroids fulfills the following two conditions: $\{V(r_{low}) \leq r \leq r_{min}, r_{max} < r \leq V(r_{high})\}$ and $\{V(m_{low}) \leq m < m_{min}, m_{max} < m \leq V(m_{high})\}$ where $I_k$ is the intensity of the $k^{th}$ centroid in the vicinity that is not in the cluster. The method then continues to another continuation terminal ("terminal T2").

From terminal T2 (FIG. 12AH), the method proceeds to decision block 12290 where a test is performed to determine whether the cluster of centroids contains a seed. If the answer to the test at decision block 12290 is Yes, the method proceeds to another continuation terminal ("terminal T3"). Otherwise, the answer to the test at decision block 12290 is No, and the method proceeds to another continuation terminal ("terminal T4"). From terminal T4 (FIG. 12AH), the method proceeds to block 12292 where the method assigns a value of zero to the cluster. The method then continues yet to another continuation terminal ("terminal T5") and further proceeds to block 12294 where the method returns the cluster score. The method returns from execution to the point of invocation.

From terminal T3 (FIG. 12AI), the method proceeds to decision block 12296, which tests whether there are an insufficient number of centroids for the time period. In other words, if the number of cluster centroids is less than one-third of the number of retention times then the cluster is not suitable for compression distance estimation. Mathematically, the test is performed as follows to determine whether the following inequality is true:

$$0 < \frac{N_c}{3} - P_c$$

If the answer is Yes to the test at decision block 12296, the method proceeds to terminal T4 and skips back to block 12292 where the above-identified processing steps are repeated. Otherwise, the answer to the test at decision block 12296 is No, and the method proceeds to another decision block 12298 where a test is performed to determine whether the following inequality $0 < 2I_v P_c - I_c P_c - I_c P_v$ is true. This tests the minimum cluster mean intensity which determines whether the mean centroid intensity inside the cluster is less than two-fold the mean centroid intensity in the vicinity but outside the cluster. If that is the case, then the cluster is not suitable for compression distance estimation.

Returning to decision block 12296, if the answer is Yes to the test at decision block 12298, the method proceeds to continuation terminal T4 and skips back to block 12292 where the above-identified steps are repeated. Otherwise, the answer to the test at decision block 12298 is No, and the method proceeds to another continuation terminal ("terminal T6").

From terminal T6 (FIG. 12AJ), the method proceeds to decision block 12300 where another inequality is tested $0 < 2I_{v,median} - I_{c,median}$ to see if the result is true. The test at decision block 12300 looks at minimum cluster median intensity. In other words, if the median centroid intensity inside the cluster is less than two-fold the median centroid intensity in the vicinity but outside the cluster, then the cluster is not suitable for compression distance estimation.

Returning to decision block 12300, if the answer is Yes to the test at decision block 12300, the method proceeds to continuation terminal T4 and skips back to block 12292 where the above-identified processing steps are repeated. Otherwise, the method proceeds to block 12302 because the answer is No where the assigns to ($I_c$) the results of the following calculation:

$$I_c \leftarrow \sum_i I_i$$

Digressing, if any of these three tests above results is true, then the cluster score is zero. Otherwise, if all of these three conditions are false, then the cluster score is the total cluster intensity ($I_c$). The method then continues to terminal T5 where it skips back to block 12294 and the above-identified processing steps are repeated.

The steps of terminal AA help to calculate the retention time range of the vicinity is determined by a low retention time of the vicinity ($V(r_{low})$) and a high retention time of the vicinity ($V(r_{high})$). From terminal AA (FIG. 12AK), the method extracts the maximum retention time ($r_{max}$) and the minimum retention time ($r_{min}$) of the cluster. See block 12304. At block 12306, the method calculates the vicinity retention time width as follows:

$$V(r_{width}) \leftarrow 2\max(r_{max} - r_{min}, r_{peak})$$

In the above calculation, $r_{peak}$ is the retention time width of a peak. If $r_{peak}$ is not a predetermined value, then $r_{peak}$ is set to zero. At block 12308, the method calculates the mean retention time of the center of the cluster as follows:

$$r_{mean} \leftarrow \frac{\sum_i r_i I_i}{I_c}$$

In the above calculation, $r_i$ is the retention time of the $i^{th}$ centroid in the cluster. At block 12310, the method calculates the low retention time of the vicinity as follows:

$$V(r_{low}) \leftarrow r_{mean} - \frac{V(r_{width})}{2}$$

At block 12312, the method calculates the high retention time of the vicinity as follows:

$$V(r_{high}) \leftarrow r_{mean} + \frac{V(r_{width})}{2}$$

At block 12314, the method extracts the maximum mass/charge ($m_{max}$) and the minimum mass/charge ($m_{min}$) of the cluster. These values assist to calculate the mass/charge range of the vicinity by a further calculation of a low mass/charge of the vicinity ($V(m_{low})$) and a high mass/charge of the vicinity ($V(m_{high})$). The method then continues to another continuation terminal ("terminal AA1").

From terminal AA1 (FIG. 12AL), the method calculates the vicinity mass/charge width as follows:

$$V(m_{width}) \leftarrow 4\max\left(s_1 m_{mean}, m_{max} - m_{min}, \frac{10 m_{mean}}{R}\right)$$

In the above calculation, R is the resolution of the mass spectrometer; and $s_1$ is the centroid integration range rate of change. See block 12316. At block 12318, the method calculates the mean mass/charge of the cluster:

$$m_{mean} \leftarrow \frac{\sum_i m_i I_i}{I_c}$$

In the above calculation, $m_i$ is the mass/charge of the $i^{th}$ centroid in the cluster. At this point, a cluster center can be described by the weighted mean of the centroids ($r_{mean}, M_{mean}$). At block 12320, the method calculates the low mass/charge of the vicinity as follows:

$$V(m_{low}) \leftarrow m_{mean} - \frac{V(m_{width})}{2}$$

At block 12322, the method calculates the high mass/charge of the vicinity as follows:

$$V(m_{high}) \leftarrow m_{mean} + \frac{V(m_{width})}{2}$$

The method then returns from execution to the point at which the method was invoked.

The steps of terminal R remove degenerate clusters whose scores are too low. A cluster is not useful if it is degenerate. One instance of degeneracy occurs when a cluster seed is found in another cluster. Among various degenerate clusters, the clusters with the highest score are used for determining the centroid mass/charge uncertainty. From terminal R (FIG. 12AM), the method receives at block 12324 a collection of clusters all of which are initialized as non-classified and each of which has a seed and a score. The method continues to another continuation terminal ("terminal R1"). From terminal R1 (FIG. 12AM) the method proceeds to decision block 12326 where a test is performed to determine whether there are non-classified clusters. If the answer is Yes to the test at decision block 12326, the method proceeds to another continuation terminal ("terminal R2"). Otherwise, the answer to the test at decision block 12326 is No, and the method proceeds to block 12328, where the method removes useless clusters. Proceeding to block 12330, the method returns useful clusters. The method then returns from execution to the point from which the method was invoked.

From terminal R2 (FIG. 12AN), the method at block 12332 obtains a cluster with the highest score that has not yet been classified. At block 12334, the method extracts the seed of the obtained cluster. Proceeding to decision block 12336, the method executes a test to determine whether the seed is in another useful cluster. If the answer to the test at decision block 12336 is Yes, the method proceeds to block 12338 where the method classifies the cluster as useless. The method then continues to terminal R1 and skips back to decision block 12326 where the above-identified processing steps are repeated. Otherwise, the answer to the test at decision block 12336 is No, and the method proceeds to block 12340 where the method classifies the cluster as useful. The method further proceeds to terminal R1 and skips back to decision block 12326 where the above identified processing steps are repeated.

The steps of terminal P measure variation. Specifically, the variation of the mass/charge within each single cluster is measured. This measurement is considered to be the mass/charge uncertainty ($\Delta_2$) at the mean mass/charge of the same cluster ($\overline{m/z}$). From terminal P (FIG. 12AO), the method proceeds to decision block 12342 where a test is performed to determine whether there is a data pair (mean mass/charge and mass/charge compression distance) for every cluster. If the answer to the test at decision block 12342 is Yes, the method at block 12344 returns all data pairs. The method then returns from execution to a point at which the method was invoked. If the answer to the test at decision block 12342 is No, the method proceeds to block 12346 where the method gets a cluster that has no data pair (mean mass/charge and mass/charge compression distance). The method then proceeds to block 12348 where the method calculates the mean mass/charge as follows:

$$\overline{m/z} \leftarrow \frac{\sum_i^n (w_i (m/z)_i)}{\sum_i^n w_i}$$

The method then proceeds to another continuation terminal ("terminal P1").

From terminal P1 (FIG. 12AP), the method proceeds to decision block 12350 which determines the cluster compression distance ($\Delta_2$). The compression distance is the mass/charge bin width to turn a cluster of centroids into a line in a raster (LC/MS image). The compression distance is a measure of the mass/charge uncertainty. It is suitable to want 95% of the centroids' intensity from a single ion and peak to be within a bin width. For each cluster of centroids it is suitable to apply one of the following two methods.

A test is performed at decision block 12350 to determine whether the method 1 should be used to calculate the cluster compression distance. If the answer is No to the test at decision block 12350, the method proceeds to block 12352 where the method calculates the mass/charge compression distance using method 2 as follows expecting that the mass/charge of the centroids is normally distributed within a cluster:

$$\Delta_2 \leftarrow 2\sqrt{\frac{n \sum_i^n w_i ((m/z)_i - \overline{m/z})^2}{(n-1) \sum_i^n w_i}}$$

In the above calculation, $w_i$ is the weight of the $i^{th}$ centroid as calculated hereinabove. The method then continues to another continuation terminal ("terminal P2"). If the answer to the test at decision block 12350 is Yes, the method proceeds to block 12354 where the method calculates the width of a bin taken from a raster with a maximum number of bins where more than 95% of the cluster centroids are in the bin. It is suitable to construct a raster, based on method 1, with the maximum number of bins where more than 95% of the cluster centroids are in one bin. The width of this bin is $\Delta_2$. The method then continues to terminal P2 and further proceeds to block 12356 where the method creates a data pair $(\overline{m/z}, \Delta_2)$ for each cluster. The method then continues to terminal P and skips back to block 12342 where the above-identified processing steps are repeated.

The steps of terminal C add centroids to the LC/MS image (raster). For each LC/MS run, the steps add centroids to a copy of the LC/MS image that is for the respective LC/MS run. From terminal C (FIG. 12AQ), the method proceeds to decision block 12358 where a test is performed to determine whether all LC/MS runs have a rastered image populated by centroids. If the answer is Yes to the test at decision block 12358, the method returns from execution to the point from which the method was invoked. If the answer to the test at decision block 12358 is No, the method extracts centroids from an LC/MS run that has no corresponding rastered image. See block 12360. The method then continues to another continuation terminal ("terminal AB"), defining a set of method steps 12362 where the method creates a rastered LC/MS image from the extracted centroids. See FIGS. 12AR-12AS. The method continues to terminal C and skips back to decision block 12358 where the above-identified processing steps are repeated.

The steps of terminal AB create an LC/MS image (raster) from centroid data. From terminal AB (FIG. 12AR), the method creates an empty n by k matrix raster for the LC/MS run, which serves as the eventual LC/MS image containing centroid data. See block 12364. Digressing, along the horizontal dimension of the n by k matrix the retention time increases such that every cell in a matrix column refers to the same retention time. The retention time for each column is determined by the minimum retention time and the number of mass spectra acquired per unit time (scan rate). Along the vertical dimension of the matrix the mass/charge increases such that every cell in the same matrix row refers to the same mass/charge. It is suitable to use $(m/z)_n$, which is the highest mass/charge of the LC/MS image, for the mass/charge value $(m/z)$ in the following equation $$b = \text{ceil}\left(1 + \frac{\ln((m/z)_b) - \ln((m/z)_0)}{s}\right)$$

where the grid number (b) is equal to the number of mass/charge bins (n) in the LC/MS image. The above calculation is made to reveal a bin number of a mass/charge where the function ceil is a function that rounds up to the next highest integer. The number of rows in the matrix is the number of mass/charge bins (n). The mass/charge for each row can be determined by the following equation $(m/z)_b = (m/z)_0 * \exp(s*(b-1))$, which describes the relationship between the bin number and its corresponding mass/charge, and where b=1, 2, 3, . . . , n; n is the number of bins in the raster; and $(m/z)_b$ is the mass/charge at bin b. Given an appropriate bin width rate of change (s) it is suitable to use the above calculation to determine the mass/charge values for each LC/MS image gradation that will be used to construct a LC/MS image for related LC/MS runs. The bin width rate of change is derived from the centroid integration range rate of change $(s_1)$ and the mass/charge uncertainty rate of change $(s_2)$. Each matrix cell contains an intensity. The intensities are initialized at zero. The same matrix dimensions, bin numbers, mass/charge, and retention times are used for each LC/MS run in the experiment.

At block 12366, the empty n by k matrix contains intensities that are initialized to zero, the matrix has n rows, each row for each mass/charge bin, and k columns, each column for each retention time bin. The method then continues to another continuation terminal ("terminal AB1"). From terminal AB1 (FIG. 12AR) the method proceeds to decision block 12368 where a test is performed to determine whether all centroids have been added to the raster. If the answer to the test at decision block 12368 is Yes, the method proceeds to block 12370 where the filled n by k matrix contains intensities, the matrix has n rows, each row for each mass/charge bin, and k columns, each column for each retention time bin. The method proceeds further to block 12372 where the method returns the filled n by k matrix. The method returns from execution to the point at which the method was invoked. If the answer to the test at decision block 12368 is No, the method continues to another continuation terminal ("terminal AB2").

From terminal AB2 (FIG. 12AS), the method at block 12374 gets the centroid for the LC/MS run that has not been added to the raster. At block 12376 the method calculates a raster column number via equating a column number to the execution of a floor function $\text{FLOOR}((R_R - R_{MIN})S_R)$ where $R_r$ is the centroid's retention time. At block 12378, the method calculates a raster row number (b) using the centroid's mass/charge $((m/z)_b)$ as follows:

$$b = \text{ceil}\left(1 + \frac{\ln((m/z)_b) - \ln((m/z)_0)}{s}\right)$$

At block 12380, the method extracts the intensity of the cell identified by the row number, column number. At block 12382 the method adds the centroid's intensity to the cell intensity, resulting in a new intensity of the cell at row number, column number. The method then continues to terminal AB1 and skips back to decision block 12368 where the above-identified processing steps are repeated.

Method steps of terminal D filter LC/MS images generated by the above processing steps. Centroid data that has undergone the above processing steps has diffuse centroids that represent a single species or ion binned into a (nearly) contiguous line in the retention time dimension. However, this effect is not limited to desirable signal. Noise usually due to an overloaded column or pervasive contaminant may also be present in the nearly contiguous lines in the retention time dimension. Furthermore, many of these contiguous lines of questionable noise, or streaks, contain one or more viable regions of signal representing species. The method steps of terminal D operate on binned centroid data, whose purpose is to identify streaks (contiguity in the retention time), and remove the noise while preserving the contiguous regions of usable signal.

To better understand the activities of the method steps of terminal D, each LC/MS image is mathematically represented as a matrix, where the vertical dimension is the mass/charge dimension and the horizontal dimension is the retention time dimension. An intensity LC/MS image was constructed hereinbefore by adding the centroid intensities to their corresponding matrix cell (pixel). The pixel is the one where the centroid's mass/charge and retention time fall within the mass/charge and retention time boundaries of that pixel. There may be references to an intensity LC/MS image in the form of float[row][column], where the row dimension is mass/charge, and the column dimension is retention time. Another way of stating this is in the form of [mz][rt]. There may be references to a mask which implies a two-dimensional structure with the same mass/charge and retention time size as the LC/MS image. Furthermore, the values of the mask matrix are binary or Boolean in that they are either masked or not-masked [mz][rt] structure. The initial mask has masked values (Boolean true) at pixels where one or more centroids fall within the mass/charge and retention time boundaries of that pixel. All other pixels are non-masked (Boolean false).

From terminal D (FIG. 12AT), the method receives at block 12384 the LC/MS image (coded as "F1") with intensity data. The method performs initial morphological clean-up of isolated noise on the LC/MS image. It is noted that any morphological operation used is suitably applied to an entire LC/MS image. The method proceeds in parallel to two different and independent paths of execution. One path is marked by the progression toward another continuation terminal ("terminal D1"). The other path is the progression to another continuation terminal ("terminal AC") defining a set of method steps 12386 for performing noise filtering on the LC/MS image with intensity data (coded as "F2" which is the result of noise filtering applied to "F1"). See FIGS. 12AW-12AY. The method then proceeds to another continuation terminal ("terminal D2").

From terminal D1 (FIG. 12AT), the method creates at block 12388 a mask from the LC/MS image (coded as "M1"). Digressing, given that LC/MS images are created from LC/MS runs, binary morphological operation can be suitably applied to remove noise. One issue is the inherent mass/charge uncertainty when binning the raw centroid data on the LC/MS image. This allows for the possibility that, although a single species is represented by a contiguous set of pixels in the retention time dimension, their mass/charge locations can oscillate by 1 pixel, breaking this contiguity assumption. These gaps, or oscillations in (mass/charge), in a row of adjacent pixels of signal that represents a single species (retention time), result from the mapping of precision mass/charge onto a grid with broad bin widths. It is noted that LC/MS runs longer than an average peak width are normal and may suffer the previously discussed oscillation in mass/charge dimension.

Returning to block 12390, the method performs a morphological closing on the mask "M1" resulting in another mask (coded as "M2"). Centroid data includes numerous isolated pixels some of which may be noise. Digressing, to fill retention time gaps in a single species, a morphological closing in the retention time is suitably used. The allowable gap between (k) (in retention time pixels), between two supposed centroids from the species is defined by k=ceil ($0.5*R_{ave}$), where $R_{ave}$ is the average peak width in the retention time; and ceil is a function that rounds up non-integer values to the next highest integer. (k) is then used as the kernel diameter in a morphological closing in the retention time dimension. This closing is applied to the LC/MS image. Isolated pixels within a half peak width of other pixels (at the same mass/charge) are, for now, considered signal. Returning, the method then continues to another continuation terminal ("terminal D3").

From terminal D3 (FIG. 12AU), the method proceeds to block 12392 where the method performs a morphological opening on the mask "M2" resulting in another mask (coded as "M3"). Digressing, after the retention time morphological closing, a retention time morphological opening is performed, which removes isolated centroids that were unable to find relatively adjacent mass/charge neighbors during the previous morphological closing. This morphological opening is applied to the mask that was closed. The opening size is also suitable based on the average peak width in the retention time, and suitably is performed using a kernel (k), defined as k=floor ($0.25*R_{ave}$), where floor is a function that rounds down non-integer values to the next lowest integer. (k) is then used as the kernel diameter in a morphological opening in the retention time dimension.

Figures 14A, 14B, 14C:
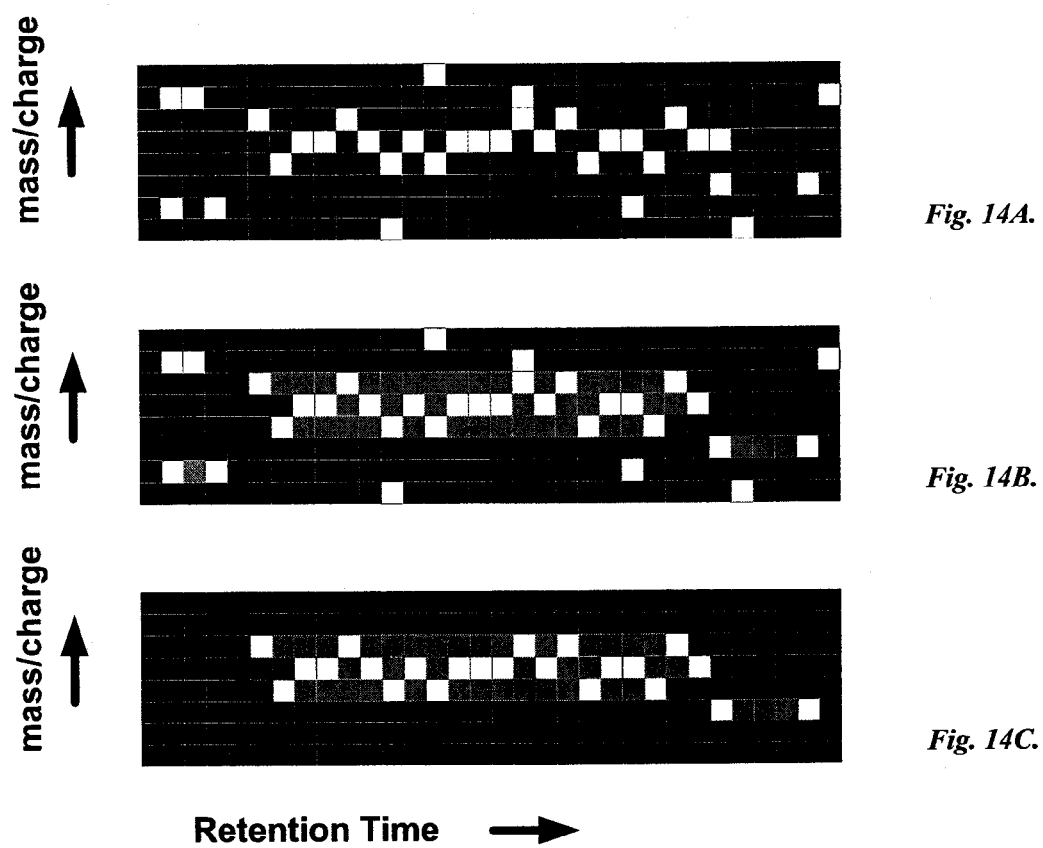
FIGS. 14A-14C illustrate processing of a section of a mask based on a rastered LC/MS image.

Such processing of a section of a mask based on a rastered LC/MS image is further illustrated with reference to FIGS. 14A-14C. FIG. 14A illustrates processing of a section of the mask M1 based on a rastered LC/MS image prior to morphological opening and closing operations. See FIG. 12AT, step 12388. FIG. 14B illustrates a section of the rastered mask after morphological closing (M2) that connects related centroids applied to the mask section M1. See FIG. 12AT, step 12390. FIG. 14C illustrates the section of FIG. 14B after a subsequent morphological opening to remove isolated noise to produce the mask M3. See FIG. 12AU, step 12392.

After completion of the morphological opening of step 12392, the method then continues to terminal D1 and proceeds further to block 12394 where the method applies the mask "M3" to the filtered LC/MS image "F2." Digressing, applying the mask "M3" means that the pixel intensities in the filtered LC/MS image "F2" stay the same if the pixel is masked in the mask. If a pixel is not masked, then the pixel intensity in the filtered LC/MS image "F2" becomes zero. At this point, the filtered LC/MS image "F2" has had non-uniform pixel intensities removed via intensity filtering, coupled with isolated pixels removed via the morphological opening.

At block 12396 the method performs a morphological closing on the mask "M3" resulting in another mask (coded as "M5"). Digressing, due to the previous steps, entities that were once streaks may no longer retain the contiguity that allows identification. In order to recreate streaks to allow identification, a morphological closing of kernel size of 1.5 peak widths is applied in the retention time dimension. This closing is suitably performed using a kernel (k), defined as k=ceil ($1.5*R_{ave}$). (k) is then used as the kernel size in a morphological closing in the retention time dimension.

At block 12398 the method performs a morphological opening on the mask "M5" resulting in another mask (coded as "M6"). Digressing, after the large morphological closing described hereinabove, any structural entity (in the retention time dimension) that appears small in length, with respect to an average peak width, is removed. This is suitably accomplished via a morphological opening in the retention time dimension. The opening is suitably be performed using a kernel (k), defined as k=floor ($0.25*R_{ave}$). (k) is then used as the kernel size in a morphological opening in the retention time dimension.

The method further continues to another continuation terminal ("terminal AD") defining a set of method steps 12400 to perform contiguity filtering on the LC/MS image "F2" to produce a contiguity filtered LC/MS image (coded as "F3"). See FIGS. 12AZ-12BB. The method progresses to another two independent parallel paths of execution. One path leads to another continuation terminal ("terminal D4"). The other path leads to another continuation terminal ("terminal D5"). From terminal D4 (FIG. 12AV), the method proceeds to block 12402 where the method creates a mask (coded as "M7") from the LC/MS image "F3." Digressing, the mask "M7" is taken of the LC/MS image "F3". An alternating sequential filter of size kernel diameter 2 is suitably applied to the mask "M7."

At block 12404 the method applies an alternating sequential filter to the mask "M7" to produce another mask (coded as "M8"). The alternating sequential filter is performed in the orientation that first applies a morphological closing of kernel diameter 2 in the retention time dimension, to close any small gaps in signal that were created during the streak filtering discussed hereinbefore. At block 12406 the method applies a dilation to the mask "M8" to produce yet another mask (coded as mask "M9"). Next, a morphological opening of kernel size 2 is applied, to remove any isolated pixels that the streak filtering produces. Next, a morphological dilation is applied in the retention time dimension, using a kernel diameter of floor(0.5*average peak width). This dilation extends any surviving signal, allowing low signal that was inadvertently filtered out to be returned to the LC/MS image. The method then proceeds to terminal D5 and further progresses to block 12410 where the method applies the mask "M9" to the contiguity filtered LC/MS image "F3." Finally, the mask "M9" is applied to a pristine copy of the original, unmodified, LC/MS image "F3", allowing identified signal without undesired noise to remain. The method then returns from execution to the point at which the method was invoked.

The below steps of terminal AC execute a noise filter. The shape of a chromatogram (intensity vs. retention time) from a single species (chemical, ion) is presumed to be a roughly symmetrical and contiguous peak with one apex. This implies a relationship between intensities of adjacent pixels. If all adjacent pixels are considered part of the same species, then filtering for the aforementioned criteria will separate adjacent signal from noise. Furthermore, the areas of unusable data, mainly large streaks of connected noise, do not satisfy this assumption of adjacency intensity, and are sensitive to this type of filtering. A suitable filter eliminates or reduces such noise and streaks while preserving proper signal that is embedded in the noise and streaks.

From terminal AC (FIG. 12AW), the method at block 12412 executes the noise filter on each rastered mass/charge line (denoted as "J") in the retention time dimension. At block 12414 the method initializes an iterator variable "I" to one (1). The method then continues to another continuation terminal ("terminal AC5"). From terminal AC5 (FIG. 12AW) the method proceeds to decision block 12416 where a test is performed to determine whether the intensity at location J, I is greater than zero. If the answer to the test at decision block 12416 is No, the method proceeds to another continuation terminal ("terminal AC1"). If the answer is Yes to the test at decision block 12416, the method proceeds to block 12418 where the method extracts the intensity at the location J, I+1 ("progressive intensity"). At block 12420, the method calculates a product ("present intensity") from two multiplicands, one being the intensity at the location J, I, the other being a factor of 0.2. The method then continues to another continuation terminal ("terminal AC2").

From terminal AC2 (FIG. 12AX), the method proceeds to decision block 12422 where a test is performed to determine whether the progressive intensity is less than the present intensity. If the answer is No to the test at decision block 12422, the method proceeds to another continuation terminal ("terminal AC3"). If, on the other hand, the answer to the test at decision block 12422 is Yes, the method proceeds to block 12424 where the method assigns a zero value to the location of the progressive intensity (J, I+1). The method then proceeds to terminal AC3 and further proceeds to block 12426 where the method extracts the intensity at the location J, I−1 ("regressive intensity"). The method then continues to another continuation terminal ("terminal AC4").

From terminal AC4 (FIG. 12AY), the method proceeds to decision block 12428 where a test is performed to determine whether the regressive intensity is less than the present intensity. If the answer is No to the test at decision block 12428, the method proceeds to terminal AC1. Otherwise, if the answer to the test at decision block 12428 is Yes, the method at block 12430 assigns a zero value to the location of the regressive intensity (J, I−1). The method then proceeds to terminal AC1 and further proceeds to block 12432 where the method iterates the iterator (I=I+1). The method then progresses to decision block 12434 where a test is performed to determine whether the iterator I is less than the length of the raster mass/charge line J. If the answer to the test at decision block 12434 is No, the method returns from execution to a point from which the method was invoked. If the answer to the test at decision block 12434 is Yes, the method continues to terminal AC5 and skips back to decision block 12416 where the above-identified processing steps are repeated.

Figure 15A:
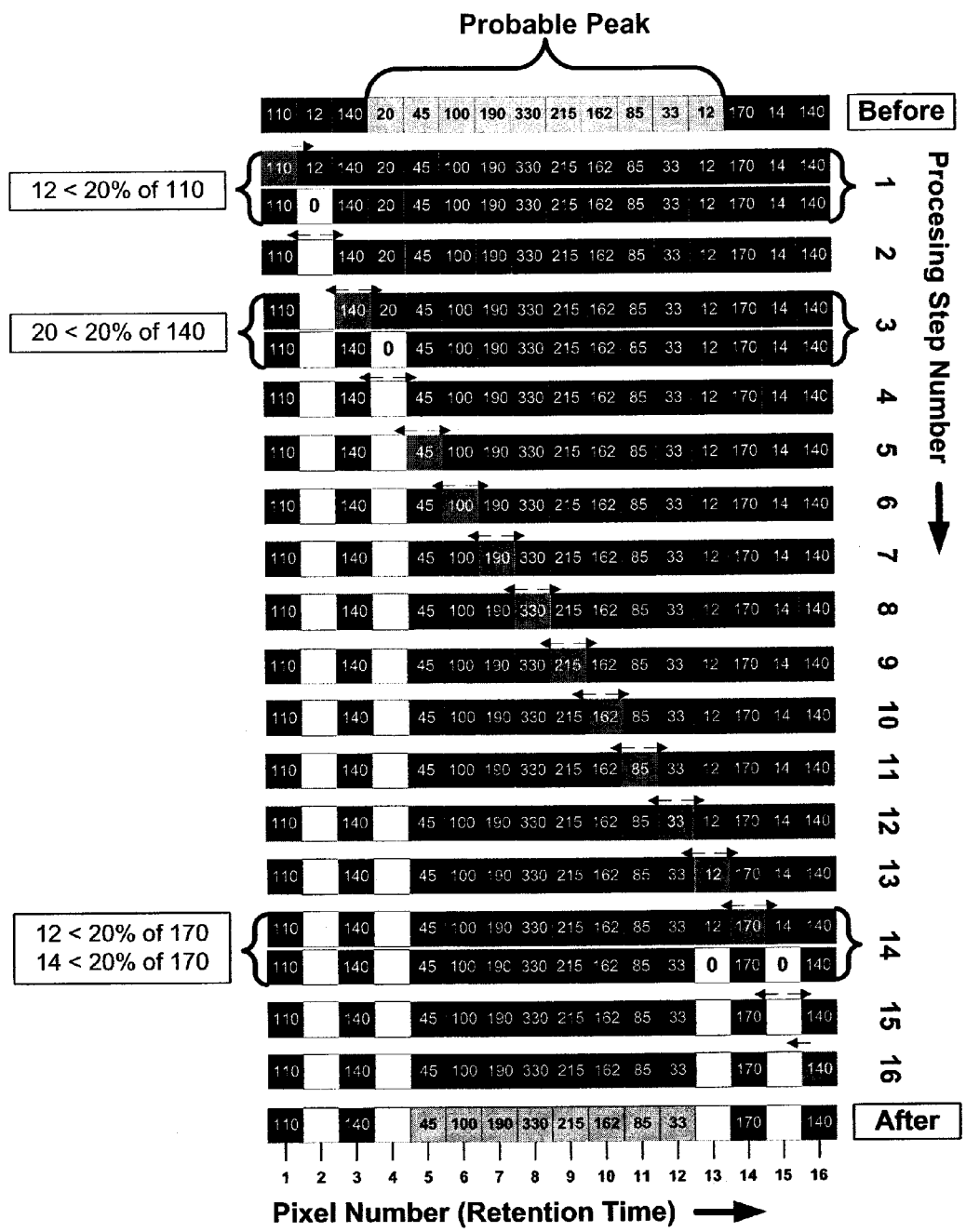
FIG. 15A depicts a noise filtering process showing the effects on a single pixel row of an LC/MS image. This process can be applied to every row of pixels in the LC/MS image.
Figure 15B:
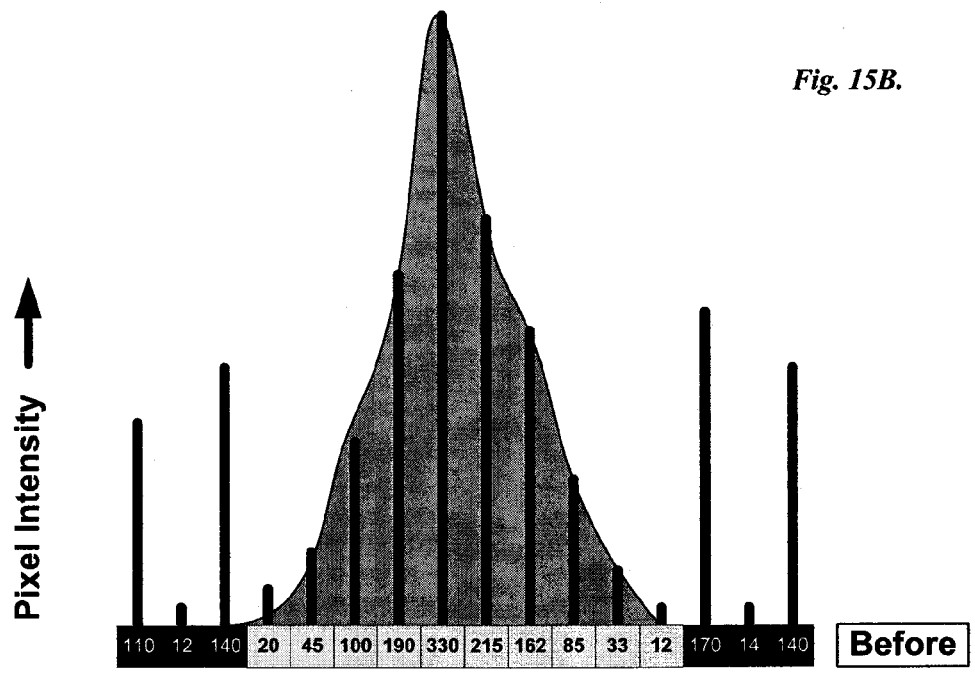
FIGS. 15B-15C are graphic representations of a section of a rastered image (FIG. 15B) and the section of the rastered image after processing (FIG. 15C) as illustrated in FIG. 15A.
Figure 15C:
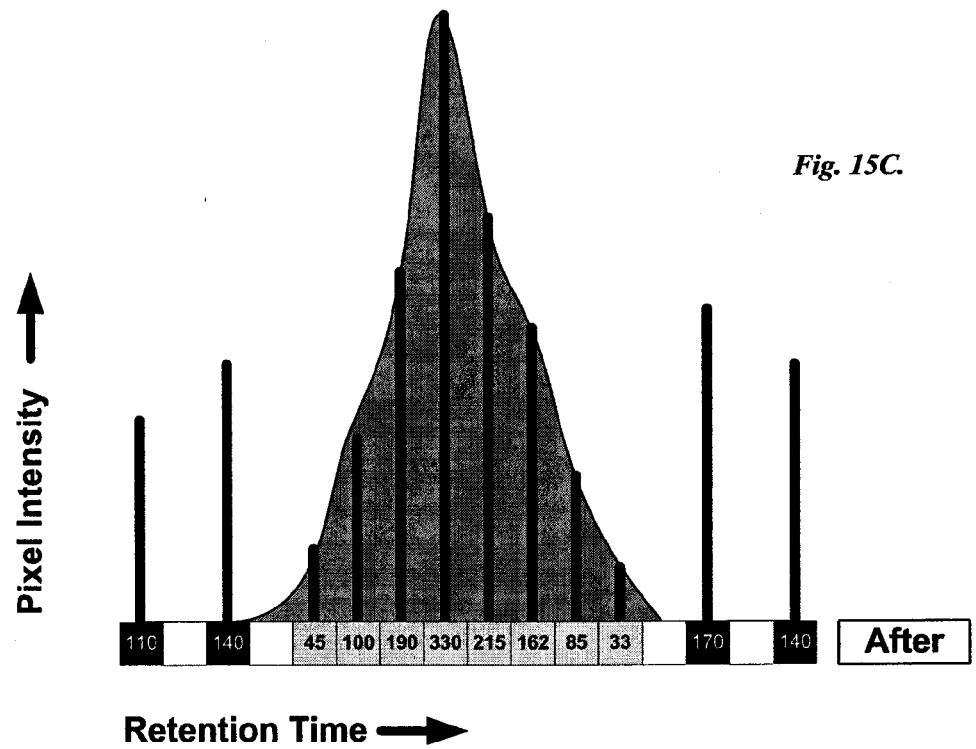

An example of noise filtering as described above is provided in FIGS. 15A-15C. FIG. 15 shows the processing of a single pixel row of an LC/MS image. An LC/MS image prior to noise filtering and after noise filtering are shown in FIG. 15B and FIG. 15C, respectively.

From terminal AD (FIG. 12AZ), the method executes at block 12436 the contiguity filter on each rastered mass/charge line (denoted as "J") in the retention time dimension. At block 12438 the method defines a set {S}, which identifies a set of streaks, which are structures on the mask "M1" that have certain run lengths containing the "true" values. For each LC/MS image line (in the retention time), runs of contiguously masked elements are identified. It is noted that contiguity is defined by the mask. The intensity data underlying the mask may in fact be zero, either from the raw data, or as a byproduct of the aforementioned filtering process. A streak is defined from a non-zero starting pixel, to a non-zero ending pixel.

The method then continues to another continuation terminal ("terminal AD1"). At block 12440 the method extracts a next member S from the set {S} to process. At block 12442 the method measures the length "L" of the member S. The length of the streak "L" is defined as L=right edge pixel index−left edge pixel index+1. At decision block 12444, it is checked to see whether the length "L" is greater than half a peak width, then streak is suitably be subjected to filtering. Because, if length "L" is less than half of the average peak width, then there may be too few pixels to perform any meaningful statistics, and member S passes through this filtering stage. A test is performed at decision block 12444 to determine whether the length L is greater than half of the average peak width. If the answer is No to the test at decision block 12444, the method proceeds to terminal AD1 and skips back to block 12440 where the above-identified processing steps are repeated. Otherwise the answer to the test at decision block 12444 is Yes, and the method continues to another continuation terminal ("terminal AD2").

From terminal AD2 (FIG. 12BA), the method proceeds to block 12446 where the method calculates a multiplier, which is a quotient of the length L, acting as a divisor, and the product of the value "2" and the average peak width, acting as a dividend. The longer the member S is, the more likely that the underlying pixels contain a mix of signal and noise, instead of just signal. To filter noise, and retain signal, a multiplier is used. The purpose of this multiplier is to increase the intensity survivability threshold for pixels proportional to the length of the streak. Since the system 100 already has a defined average peak width, any deviation from that average is subject to more scrutiny, and the more deviant a streak run length from the expected average peak run length, the higher the intensity threshold will be for individual pixels to retain their intensity. This multiplier is suitably capped at min(3, M) because, in the end, it is suitable to reveal real signal embedded in large streaks. If the multiplier is allowed to grow without bound, and a peak is embedded in a massive streak, then nothing will survive, which is suitably avoided.

At block 12448, because L is dependent on the member S, the longer the length of the member S, the higher the multiplier to raise the intensity survivability threshold for pixels in the member S. At block 12450, the method calculates the multiplier by taking the minimum of either the multiplier or the constant "3." At block 12452, the method calculates a median by analyzing non-zero intensity values of the member S. The method then continues to another continuation terminal ("terminal AD3"). From terminal AD3, the method proceeds to decision block 12454 where a test is performed to determine whether the next pixel in S is less than the product of the median and the multiplier. If the answer to the test at decision block 12454 is Yes, the method continues to another continuation terminal ("terminal AD4"). Otherwise, if the answer to the test at decision block 12454 is No, the method proceeds to another continuation terminal ("terminal ADS").

From terminal AD4 (FIG. 12BB), the method at block 12456 assigns zero to the intensity of the current pixel of the member S, which appears on the rastered image at the location that corresponds to the streak location. The method then continues to terminal AD5 and further proceeds to decision block 12458 where a test is performed to determine whether the pixel that was analyzed was the last pixel in the member S. If the answer to the test at decision block 12458 is No, the method proceeds to terminal AD3 and skips back to decision block 12454 where the above-identified processing steps are repeated. Otherwise, the answer to the test at decision block 12458 is Yes, and the method proceeds to another decision block 12460, where a test is performed to determine whether the pixel that was analyzed was the last member S in the set {S}. If the answer is No to the test at decision block 12460, the method proceeds to terminal AD1 and skips back to block 12440 where the above-identified processing steps are repeated. Otherwise, the answer to the test at decision block 12460 is yes, and the method returns from execution to a point from which the method was invoked.

From terminal E (FIG. 12BC), the method proceeds to block 12462 where it cleans each rastered image ("LC/MS image"). At block 12464 the method combines LC/MS images by condition. At block 12466 the method combines condition images to create a merged image. At block 12468 the method detects peaks within the merged image. At block 12470 the method reassembles peaks. At block 12472 the method returns a collection of peaks, features, and spots. The method then returns from execution to the point at which the method was invoked.

The steps of terminal F execute a peak refinement algorithm. To facilitate investigation of peaks and previously undetected peaks, centroids from LC/MS runs are reconsidered. To this end, centroids from all LC/MS runs, regardless of peak membership, are collected. Suitably, centroids are stored in a single list, consisting of centroid retention time location, centroid mass/charge, centroid intensity, a column that indicates whether a centroid has been claimed by a cluster yet, and a column that indicates from which LC/MS run the centroid was found. Other suitable data structures can be used besides the one mentioned above.

From terminal F (FIG. 12BD), the method at block 12474 gathers centroids from unfiltered, raw LC/MS runs and places them into a structure. At block 12476 the structure is a matrix of five columns, the first column containing a centroid retention time. At block 12478, the method determines that the second column contains the centroid mass/charge value. At block 12480 the third column contains the centroid intensity period. At block 12482 the fourth column indicates whether the centroid has been claimed by a cluster. At block 12484 the fifth column identifies the LC/MS run with which the centroid is associated. At block 12486 the method gets an unprocessed, next peak P of a set of peaks {P}. The method then proceeds to another continuation terminal ("terminal F1").

From terminal F1 (FIG. 12BE), the method proceeds to two independent paths of execution. In one path, the method proceeds to another continuation terminal ("terminal F2"). The other path proceeds to another continuation terminal ("terminal AE"), which defines a set of method steps 12488 for finding clusters in a peak by dissecting into one or more clusters of centroids. See FIG. 12BG.

From terminal F2 (FIG. 12BE), the method proceeds to decision block 12489 where a test is performed to determine whether all peaks P have been processed. If the answer is No, the method proceeds to another continuation terminal ("terminal F3"). Otherwise, the answer is Yes, and the method proceeds to yet another continuation terminal ("terminal F4").

From terminal F3 (FIG. 12BF), the method proceeds to block 12490 where the method identifies centroids that are contained in a mask region of the peak P, which originates the masked set of centroids. At this step, the method begins peak refinement of previously identified peaks. Each previously identified peak is processed, in turn. For a given peak P, that peak has an associated mask M, which defines a (possibly) irregular boundary of P. Centroids that fall within P's masked region are clustered, which is discussed hereinafter. This can produce multiple clusters. This clustering results from binning and image processing and the mask may not be as ideally precise. In order to identify the centroids that belong to P, and not just erroneously contained in outer regions of M, the resulting clusters are analyzed.

At block 12492, the method performs clustering on the set of centroids that belong to the masked region of the peak P yielding N clusters to identify a primary cluster. Once this clustering has been performed on the centroids contained in the masked peak region, the clusters are examined. Each cluster has its weighted center or mode in the mass/charge calculated. The cluster whose mass/charge center is closest to the mass/charge center of the seed peak is identified as the primary cluster. The member centroids of this primary cluster are marked as true under the column of "Has Centroid Been Claimed" in the above identified data structure. The newly calculated weighted mass/charge center or mode associated with the primary cluster can now replace the (less accurate) centroid of P. Quantization can now be performed on this set of centroids. By setting all of the centroids in the primary cluster to true under the column of "Has Centroid Been Claimed" of the above identified data structure, they are removed from future clustering participation.

At block 12494 the method identifies a primary cluster "C" whose centroid retention time and mass/charge are closest to the centroid mass/charge of the peak P. The method then uses the structure to mark "true" in the cells under the column that indicates whether the corresponding centroids of the cluster C have been claimed. See block 12496. The cluster whose centroid is closest to the centroid of the original peak is identified as the primary cluster.

At block 12498 the method calculates descriptive and statistical data for the cluster C. This primary cluster that was just identified is examined to determine the peak statistical and descriptive information. For example, a bounding box is calculated for centroids in the primary cluster to determine the minimum and maximum retention time boundaries, as well as the minimum and maximum mass/charge boundaries. As another example, a revised image mask is created, which is the mask on the LC/MS image that represents the feature and is redefined such that pixels that contain a centroid are part of the mask. In other words, a centroid's retention time and mass/charge fall within the boundaries of the retention time and mass/charge of a given pixel. As a further example, weighted centroids and modes are analyzed for centroids in the primary cluster to determine the intensity-weighted average and mode of the retention time and the mass/charge. The mode may be at the location of the most intense centroid or may be determined by rectilinear mode search discussed hereinafter. As yet a further example, the method performs quantization such that for each constituent LC/MS run, the centroids that belong to each run are gathered into a set. The integrated intensity and/or maximum height is calculated, for each LC/MS run's corresponding centroids.

At block 12500, regarding the centroids that are marked as "false" in corresponding cells under the column that indicates whether centroids have been claimed, these centroids are demultiplexed. Next, the method proceeds to terminal F4 (FIG. 12BF) and further proceeds to block 12502, where the above centroids are demultiplexed onto blank, voided LC/MS rasters given that the LC/MS runs from which these centroids are from is known. The method then returns from execution to a point from which the method was invoked.

From terminal AE (FIG. 12BG), the method at block 12504 receives as input a collection of centroids whose retention time and mass/charge is within the boundaries defined by the pixels of the masked peak. The steps of terminal AE (contrast with the steps of terminal F which perform peak refinement of previously identified peaks) determine peaks or features or spots by image processing techniques. The steps of terminal AE analyze a single masked peak. For a masked peak, the initial collection of considered centroids are the centroids whose retention time and mass/charge are within the mask boundaries of the peak. These centroids are subjected to repeated clustering that may produce one or more clusters. This group of clusters may then merge to form fewer larger clusters.

The method then continues to another continuation terminal ("terminal AF"), which defines a set of method of steps 12506 for breaking apart the masked peak (feature) into clusters of centroids, each cluster being a sub-peak. See FIGS. 12BH-12BI. The method continues to another continuation terminal ("terminal AG"), which defines a set of method steps 12508 for regrouping clusters to form new clusters that are within mass/charge tolerance of the mass spectrometer. See FIGS. 12BS-12BT. The method progresses to block 12510 where the method prepares merged clusters to be returned. The method then returns from execution to a point from which the method was invoked.

From terminal AF (FIG. 12BH), the method at block 12512 receives as input a collection of centroids whose retention time and mass/charge are within the boundaries defined by the pixels of the masked peak period. The steps of terminal AF create detailed collection of clusters. It is suitable to start with a single peak mask. The mask indicates a collection of pixels that belong to the peak. These pixels indicate which centroids belong to the peak. A peak centroid belongs to the peak if its retention time and mass/charge are within the retention time and mass/charge boundaries of one of the peak pixels. These centroids are called the pool of peak centroids and they are not yet grouped into clusters.

At block 12514, the collection of centroids from the masked peak initially belong to a pool of peak centroids. The method then continues to another continuation terminal ("terminal AF1"). From terminal AF1 (FIG. 12BH), the method progresses to decision block 12516 where a test is performed to determine whether the pool of peak centroids is empty of centroids. If the answer to the test at decision block 12516 is Yes, the method returns from execution to the point from which the method was invoked. Otherwise, the answer to the test at decision block 12516 is No, and the method proceeds to another continuation terminal, ("terminal AF2"). The test at decision block 12516 essentially determines whether there are remaining centroids that are not yet clustered.

From terminal AF2 (FIG. 12BI), the method proceeds to another continuation terminal ("terminal AH"), which defines a set of method steps 12518 for calculating the rectilinear mode using the centroids that are still in the pool of peak centroids. See FIGS. 12BJ-12BK. The method proceeds to block 12520 where the method considers the rectilinear mode as the cluster seed. The seed centroid is that which came from the prominent cluster among the collection of considered centroids. The method further progresses to another continuation terminal ("terminal S"), which defines a set of method steps 12522 for identifying cluster centroids by rectilinear clustering using the centroids that are still in the pool of peak centroids. See FIGS. 12V-12X. The method proceeds to block 12524 where the method saves the clustered centroids as a cluster, which suitably is returned to the invoking entity. At block 12526, the method removes these cluster centroids from the pool of peak centroids. The method then continues to another continuation terminal, terminal AF1, which skips back to decision block 12516 where the above identified processing steps are repeated.

The steps of terminal AH perform a rectilinear mode search to find a seed centroid. It is suitable to search for the central centroid (seed centroid) of this collection of centroids. The selection of considered centroids is reduced in an iterative fashion to a single centroid. This single centroid is the seed centroid of a prominent cluster among the initial collection of considered centroids. A rectilinear approach to search for the cluster center is suitably selected in order to deal with two dimensional data, whose dimensions are different.

From terminal AH (FIG. 12BJ), the method proceeds to decision block 12528 where a test is performed to determine whether there are centroids with similar mass/charge and retention time. If the answer to the test at decision block 12528 is No, the method returns from execution to a point from which the method was invoked. If the answer to test at decision 12528 is Yes, the method continues to another continuation terminal ("terminal A1"), which defines a set of method steps 12530 for calculating a retention time bracket bordered by $(r_{low}, r_{high})$ and an associated score $(q_r)$. See FIG. 12BL. The method further progresses to a set of method steps 12532 defined at another continuation terminal ("terminal AJ") where the method calculates a retention time bracket bordered by $(m_{low}, m_{high})$ and an associated score $(q_m)$. See FIG. 12ER. The method then continues to another continuation terminal ("terminal AH1").

From terminal AH1 (FIG. 12BK), the method proceeds to decision block 12538 where a test is performed to determine whether the score for mass/charge bracket is greater than the score for the retention time bracket. Digressing, the test at decision block 12538 decides whether to use the retention time bracket or mass/charge bracket. Specifically, if $q_r$ is greater than $q_m$, then the selection of considered centroids is reduced to the centroids whose retention times fulfill the following condition: $r_{low} \geq r_i \geq r_{high}$, where $r_i$ is retention time of the $i^{th}$ considered centroid. If $q_m$ is greater than or equal to $q_r$, then the selection of considered centroids is reduced to the centroids whose mass/charge fulfills the following condition: $m_{low} \geq m_i \geq m_{high}$ where $m_i$ is mass/charge of the $i^{th}$ considered centroid.

Returning, if the answer to the test at decision block 12534 is No, the method proceeds to block 12536 where the method removes from consideration centroids that are outside of the retention time bracket. See block 12536. The method then continues to terminal AH and skips back to decision block 12528 where the above-identified processing steps are repeated. Otherwise, the answer to the test at decision block 12534 is Yes, and a method proceeds to block 12538 where it removes from consideration centroids that are outside of the mass/charge bracket. The method then again enters terminal AH and skips back to decision bock 12528 where the above-identified processing steps are repeated.

From terminal AI (FIG. 12BL), the method at block 12540 receives a collection of centroids. At block 12542, for the retention time bracket, the method defines the centroid's distance to be equivalent to its retention time. Digressing, each centroid is given a distance. For the retention time bracket, the centroid's distance is equivalent to its retention time. In other words, a suitable algorithm is used, such as a limit-by-half-distance algorithm where the centroid's distance is the retention time. The result is three values ($d_{low}$, $d_{high}$, q). Returning, the method then proceeds to another continuation terminal ("terminal AK"), which defines a set of method steps 12544 for decimating the number of centroids by executing a limit-by-half distance decimation filter. See FIGS. 12BM-12BQ. The method proceeds to block 12546 where using the calculated limits, the method assigns the following by executing the following assignments:

$r_{low} \leftarrow d_{low}$, $r_{high} \leftarrow d_{high}$, and $q_r \leftarrow q$.

The terms above include $d_{low}$ which is the bracket's low boundary calculated from the limit-by-half-distance algorithm; $d_{high}$ which is the bracket's high boundary calculated from the limit-by-half-distance algorithm; q which is the bracket's score calculated from the limit-by-half-distance algorithm; $r_{low}$ which is the low mass/charge boundary for the retention time bracket; $r_{high}$ which is the high mass/charge boundary for the retention time bracket; and $q_r$ which is the score for the retention time bracket. The method returns from execution to a point from which the method was invoked.

The steps of terminal AK execute the "limit-by-half-distance" algorithm. These steps find a subset of centroids within a collection of centroids. The centroids of this subset fall within a distance bracket that is defined by a low and high distance ($d_{low}$, $d_{high}$). The distance bracket flanks the center and the seed centroid of a prominent cluster. The bracket is also scored ("$q_{max}$") for quality. From terminal AK (FIG. 12BM), the method receives a collection of centroids, each centroid having a distance and an intensity. See block 12548. At block 12550, the method calculates a minimum bracket distance ($d_{min}$) of these centroids. At block 12552, the method calculates a maximum bracket distance ($d_{max}$) of these centroids. At block 12554, the method calculates a center of centroids ($c \leftarrow (d_{max}+d_{min})/2$). The calculation in the previous sentence defines (among the considered centroids) a center between the lowest distance ($d_{min}$) and the highest distance ($d_{max}$).

At block 12556, the method calculates a half bracket range $E=(d_{max}-d_{min})/2$. The calculation in the previous sentence calculates a bracket size (E) which is half of the maximum distance between any two centroids. Specifically, the bracket is defined by its two boundary distances ($d_1$ and $d_2$) where $d_1$ is less than or equal to $d_2$. The bracket score (q) is based on the centroids it contains. At block 12558, the method initializes the best bracket score ($q_{max} \leftarrow 0$), best bracket low boundaries ($d_{low} \leftarrow d_{min}$) and best bracket high boundaries ($d_{high} \leftarrow d_{max}$). The method then continues to another continuation terminal ("terminal AK1").

From terminal AK1 (FIG. 12BN), the method proceeds to decision block 12560 where a test is performed to determine whether there is an untried centroid whose distance D is less than or equal to the center C. Essentially, the decision block 12560 decides whether to continue iterations of low bracket boundaries. If the answer to the test at decision block 12560 is No, the method continues to another continuation terminal ("terminal AK3"). Otherwise, if the answer to the test at decision block 12560 is Yes, the method proceeds to block 12562 where the method selects a distance (D) of the untried centroid. In other words, from this point, the method selects trial bracket boundaries. At block 12564, the method defines the distance D as the low bracket boundary ($d_1$) and the status of the untried centroid is marked as "tried centroid." At block 12566, the method calculates the high bracket boundary ($d_2$) by the following equation ($d_2=E+d_1$). At block 12568, the method calculates the bracket score (q) by executing the following assignment:

$$q(d_1, d_2) \leftarrow \sum_i I_i$$

The term $I_i$ is the intensity of the ith centroid in the collection of centroids. In essence, block 12568 scores trial brackets. It is suitable to find centroids whose distance fulfills the inequalities of $d_1 \geq d_i \geq d_2$, where $d_i$ is the distance of the $i^{th}$ centroid in the collection of centroids. A score is determined for this trial bracket as stated by the above calculation of (q). The method then continues to another continuation terminal ("terminal AK2").

From terminal AK2 (FIG. 12BO), the method proceeds to decision block 12570 where a test is performed to determine whether the bracket score is greater than the best bracket score according to the following equality expression ($q>q_{max}$). In essence, decision block 12570 evaluates trial bracket based on its score as compared to the best bracket score. If the answer to the test at decision block 12570 is No, the method continues to terminal AK1 and skips back to decision block 12560 where the above-identified processing steps are repeated.

From terminal AK3 (FIG. 12BP), the method proceeds to decision block 12574 where a test is performed to determine whether all distances D have been tried according to the following equality (d>c). In essence, decision block 12574 decides whether to continue iterations for high bracket boundaries. If the answer to the test at decision test 12574 is Yes, the method returns from execution to the point from which the method was invoked. If the answer to the test at decision block 12574 is No, the method selects a distance D at block 12576 of a centroid that has not yet been tried according to expression (d>c). The steps from block 12576 select trial bracket boundaries. At block 12578 the method defines the distance D as the high bracket boundary ($d_2$) and the status of the untried centroid is market as "tried centroid." At block 12580, the method calculates the low bracket boundary ($d_1$) by the following equation ($d_1=d_2-E$). At block 12582, the method calculates the bracket score (q) by executing the following assignment:

$$q(d_1, d_2) \leftarrow \sum_i I_i$$

The method then continues to another continuation terminal ("terminal AK4").

From terminal AK4 (FIG. 12BQ), the method proceeds to decision block 12584 where a test is performed to determine whether the bracket score is greater than the best bracket score according to the following inequality ($q>q_{max}$). If the answer to the test at decision block 12584 is No, the method proceeds to terminal AK3 and skips back to decision block 12574 where the above-identified processing steps are repeated. Otherwise, the answer to the test at decision block 12484 is Yes, the method resets the best bracket score ($q_{max} \leftarrow q$), the low bracket limit ($d_{low} \leftarrow d_1$), and the high bracket limit ($d_{high} \leftarrow d_2$). The method then continues to terminal AK3 and skips back to block 12574, where the above-identified processing steps are repeated.

From terminal AJ (FIG. 12BR), the method at block 12588 receives a collection of centroids. The steps of terminal AJ find a mass/charge bracket. Specifically, each centroid is given a distance. For the mass/charge bracket, the centroid's distance is equivalent to its mass/charge. In other words, the limit-by-half-distance algorithm is suitably used where the centroid's distance is the mass/charge. The result are three values ($d_{low}, d_{high}$, q). At block 12590 for the mass/charge bracket, the method defines the centroid's distance to be equivalent to its mass/charge. The method then continues to another continuation terminal, terminal AK, which defines the set of method steps 12592 for executing a limit-by-half distance algorithm. See FIGS. 12BM-12BQ. The method then proceeds to block 12594, using the calculated limits, the method assigns the following:

$m_{low} \leftarrow d_{low}$, $m_{high} \leftarrow d_{high}$, and $q_m \leftarrow q$.

The terms of the above calculations include $d_{low}$ which is the bracket's low boundary from execution of the limit-by-half-distance algorithm; $d_{high}$ which is the bracket's high boundary from execution of the limit-by-half-distance algorithm; q which is the bracket's score from execution of the limit-by-half-distance algorithm; $m_{low}$ which is the low mass/charge boundary for the mass/charge bracket; $m_{high}$ which is the high mass/charge boundary for the mass/charge bracket; and $q_m$ which is the score for the mass/charge bracket. The method then returns from execution to a point from which it was involved.

The steps of terminal AG merge related clusters. From terminal AG (FIG. 12BS), the method at block 12596 receives as input a set of clusters from a single peak (feature), each cluster containing multiple centroids, each centroid having a retention time, mass/charge and intensity. At block 12598 the method initially defines each cluster as "unmerged." At block 12602, the method calculates for each cluster a sum of its central intensity according to the following equation:

$$I_{cluster} = \sum_i I_i.$$

The above calculation is the sum of all centroid intensities within a single cluster where $I_i$ is the intensity of the $i^{th}$ centroid in this cluster. At block 12604, the method calculates for each cluster a mean mass/charge according to the following equation:

$$\overline{m/z} = \frac{\sum_i m_i I_i}{I_{cluster}}$$

The above calculation calculates the intensity-weighted mass/charge of the cluster where $m_i$ is the mass/charge of the $i^{th}$ centroid in this cluster. The method then proceeds to another continuation terminal (terminal AG 1).

From terminal AG1 (FIG. 12BT), the method proceeds to decision block 12606 where a test is performed to determine whether all clusters are considered as merged. Digressing, decision block 12606 determines whether the process is finished. In other words, it is suitable to determine whether any clusters are not merged. If all clusters have been merged then the process terminates and the clusters are returned for additional evaluation and processing. If there is a cluster that is not yet merged, then the process continues. Returning, if the answer to the test at decision block 12606 is Yes, the method returns from execution to a point from which it was invoked.

If the answer to the test at decision block 12606 is No, the method proceeds to block 12608 where it extracts, among the unmerged clusters, clusters whose mean mass/charge is within tolerance of the seed mass/charge. Block 12608 determines a seed cluster. A seed cluster is the cluster that begins merging processes for a group of related clusters. The seed cluster is the cluster with the highest cluster intensity ($I_{cluster}$) among the non-merged clusters. The intensity-weighted mass/charge ($\overline{m/z}$) of the seed cluster is the seed mass/charge. Based on this seed mass/charge, it is suitable to determine a range of acceptable mass/charge. The mass/charge range is defined by a low mass/charge ($(m/z)_{low}$) and a high mass/charge ($(m/z)_{high}$):

$$(m/z)_{low} = \overline{m/z} - T$$
$$(m/z)_{high} = \overline{m/z} + T$$
$$T = 2\frac{\overline{m/z}}{R}$$

In the above calculations R is the resolution of the mass spectrometer. At block 12610, the method defines the mean mass/charge of the cluster as the seed mass/charge. At block 12612, the method calculates a tolerance where R is resolution of the mass spectrometer according to the following equation:

$$T = \pm 2\frac{\overline{m/z}}{R}.$$

At block 12614, the method gets, among all unmerged clusters, clusters whose mean mass/charge is within tolerance of the seed mass/charge. It is suitable to find a collection of non-merged clusters whose intensity-weighted mass/charge are between $(m/z)_{low}$ and $(m/z)_{high}$. This collection is the merge collection and it includes the seed cluster. At block 12616, the method combines all clusters in the collection into one merged cluster, defining a collection of merged clusters.

The method then continues to terminal AG1 and skips back to block 12606 where the above-identified processing steps are repeated.

Figure 13:
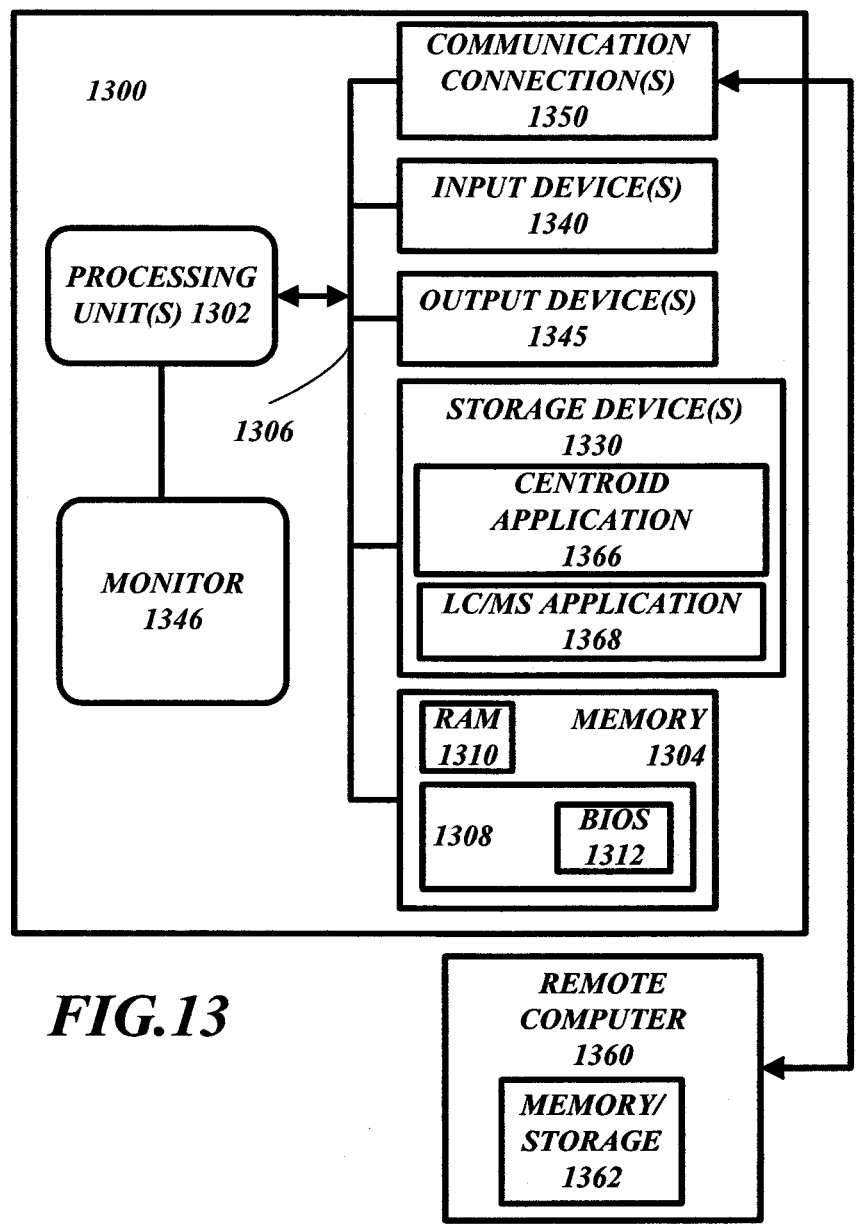
FIG. 13 illustrates a representative computer environment in which the disclosed methods and apparatus can be implemented.

FIG. 13 and the following discussion are intended to provide a brief, general description of an exemplary computing environment in which the disclosed technology may be implemented. Although not required, the disclosed technology is described in the general context of computer-executable instructions, such as program modules, being executed by a personal computer (PC). Generally, program modules include routines, programs, objects, components, data structures, etc., that perform particular tasks or implement particular abstract data types. Moreover, the disclosed technology may be implemented with other computer system configurations, including hand-held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 13, an exemplary system for implementing the disclosed technology includes a general purpose computing device in the form of an exemplary conventional PC 1300, including one or more processing units 1302, a system memory 1304, and a system bus 1306 that couples various system components including the system memory 1304 to the one or more processing units 1302. The system bus 1306 may be any of several types of bus structures including a memory bus or memory controller, a peripheral bus, and a local bus using any of a variety of bus architectures. The exemplary system memory 1304 includes read only memory (ROM) 1308 and random access memory (RAM) 1310. A basic input/output system (BIOS) 1312, containing the basic routines that help with the transfer of information between elements within the PC 1300, is stored in ROM 1308.

The exemplary PC 1300 further includes one or more storage devices 1330 such as a hard disk drive for reading from and writing to a hard disk, a magnetic disk drive for reading from or writing to a removable magnetic disk, and an optical disk drive for reading from or writing to a removable optical disk (such as a CD-ROM or other optical media). Such storage devices can be connected to the system bus 1306 by a hard disk drive interface, a magnetic disk drive interface, and an optical drive interface, respectively. The drives and their associated computer-readable media provide nonvolatile storage of computer-readable instructions, data structures, program modules, and other data for the PC 1300. For example, an LC/MS application 1568 associated with LC or MS instrumentation control, communication, or data processing and a centroid processing application 1566 or other applications can be stored. In some examples, applications are stored or partially stored locally or remotely at a network location. Other types of computer-readable media which can store data that is accessible by a PC, such as magnetic cassettes, flash memory cards, digital video disks, CDs, DVDs, RAMs, ROMs, and the like, may also be used in the exemplary operating environment.

A number of program modules may be stored in the storage devices 1330 including an operating system, one or more application programs, other program modules, and program data. A user may enter commands and information into the PC 1300 through one or more input devices 1340 such as a keyboard and a pointing device such as a mouse. Other input devices may include a digital camera, microphone, joystick, game pad, satellite dish, scanner, or the like. These and other input devices are often connected to the one or more processing units 1302 through a serial port interface that is coupled to the system bus 1306, but may be connected by other interfaces such as a parallel port, game port, or universal serial bus (USB). A monitor 1346 or other type of display device is also connected to the system bus 1306 via an interface, such as a video adapter. Other peripheral output devices, such as speakers and printers (not shown), may be included.

The PC 1300 may operate in a networked environment using logical connections to one or more remote computers, such as a remote computer 1360. In some examples, one or more network or communication connections 1350 are included. The remote computer 1360 may be another PC, a server, a router, a network PC, or a peer device or other common network node, and typically includes many or all of the elements described above relative to the PC 1300, although only a memory storage device 1362 has been illustrated in FIG. 13. The personal computer 1300 and/or the remote computer 1360 can be connected to a logical a local area network (LAN) and a wide area network (WAN). Such networking environments are commonplace in offices, enterprise-wide computer networks, intranets, and the Internet.

When used in a LAN networking environment, the PC 1300 is connected to the LAN through a network interface. When used in a WAN networking environment, the PC 1300 typically includes a modem or other means for establishing communications over the WAN, such as the Internet. In a networked environment, program modules depicted relative to the personal computer 1300, or portions thereof, may be stored in the remote memory storage device or other locations on the LAN or WAN. The network connections shown are exemplary, and other means of establishing a communications link between the computers may be used.

It will be recognized that the illustrated embodiments can be modified in arrangement and detail without departing from such principles. For instance, elements of the illustrated embodiment shown in software may be implemented in hardware and vice-versa. Also, the technologies from any example can be combined with the technologies described in any one or more of the other examples. In view of the many possible embodiments to which the principles of the invention may be applied, it should be recognized that the illustrated embodiments are examples of the invention and should not be taken as a limitation on the scope of the invention. For instance, various components of systems and tools described herein may be combined in function and use. We therefore claim as our invention all subject matter that comes within the scope and spirit of these claims. Alternatives specifically addressed in these sections are merely exemplary and do not constitute all possible alternatives to the embodiments described herein. Thus, while illustrative embodiments have been illustrated and described, it will be appreciated that various changes can be made therein without departing from the spirit and scope of the invention.

We claim:

1. A system, comprising:
    a centroid rasterizer configured to receive original centroid data including a plurality of centroid intensity values and to form LC/MS images by assembling a portion of the centroid intensity values as a matrix according to retention time and mass/charge bin widths, wherein the centroid rasterizer is configured to determine a centroid integration range and a centroid mass/charge uncertainty and to determine the mass/charge bin widths based on at least one of the centroid integration range, the centroid mass/charge uncertainty, and a centroid uncertainty rate of change, wherein the centroid mass/charge uncertainty is based on a centroid uncertainty rate of change corresponding to a slope of a linear fit to centroid variation in a cluster of centroids with respect to a mean of a cluster mass to charge ratio; and an image processor configured to receive and merge the LC/MS images to form a merged image, the image processor further configured to segment the merged image reassembly.

2. The system of claim 1, further comprising a mass spectrometer that produces the original centroid data based on a prepared biological sample.

3. The system of claim 1, wherein the centroid rasterizer is configured to refine peak boundaries on the LC/MS images by analyzing the original centroid data to enhance the formulated mass/charge bin widths.

4. The system of claim 1, wherein the image processor is further configured to return a collection of peaks to adduce biological features of interest.

5. A method for producing LC/MS images from centroid data, comprising:
by a computer, receiving LC/MS data in centroid form as original centroid data;
determining a centroid integration range rate of change for the original centroid data;
determining a mass/charge uncertainty rate of change for at least one cluster of centroids of the original centroid data;
determining a bin width rate of change from at least one of the centroid integration range rate of change and the mass/charge uncertainty rate of change so as to calculate mass/charge values for each raster gradation;
constructing an LC/MS image from the original centroid data using the calculated mass/charge values; and
performing image processing of the LC/MS image by combining replicates of an experimental condition to produce condition images, combining condition images to produce a merged image of an experiment, and segmenting the merged image in preparation for reassembly.

6. The method of claim 5, further comprising removing streaks from the LC/MS image formed from the original centroid data along a retention time dimension, which streaks are formed from usage of the bin width rate of change to calculate various bin widths of the original centroid data in a mass/charge dimension.

7. The method of claim 6, further comprising refining peak boundaries on the LC/MS image by analyzing the original centroid data to correct for loss of centroid precision associated with use of the various bin widths in the mass/charge dimension.

8. The method of claim 7, further comprising:
selecting centroids to form the at least one cluster of centroids; and
using the at least one cluster of centroids to refine the peak boundaries on the LC/MS image.

9. The method of claim 8, further comprising regaining the centroid precision by using the at least one cluster of centroids to redefine mass/charge centers, retention time centers, and apexes of peaks.

10. The method of claim 9, further comprising calculating an integrated intensity for a peak at a particular retention time by calculating a center of mass based on a number of intensity values for the peak at the particular retention time.

11. The method of claim 10, further comprising resplitting peaks that were merged due to wide bin widths.

12. The method of claim 11, wherein resplitting peaks includes resolving peaks that were merged into individual peaks by identifying more than one significant cluster masked by a peak from the LC/MS image.

13. A computer-readable medium having stored thereon computer-executable instructions which when executed implement a method for producing LC/MS images from centroid data, comprising:
receiving LC/MS data in centroid form as original centroid data;
determining a centroid integration range rate of change for the original centroid data;
determining a mass/charge uncertainty rate of change for at least one cluster of centroids of the original centroid data;
determining a bin width rate of change from at least one of the centroid integration range rate of change and the mass/charge uncertainty rate of change so as to calculate mass/charge values for each raster gradation;
constructing an LC/MS image from the original centroid data using the calculated mass/charge values; and
performing image processing of the LC/MS image by combining replicates of an experimental condition to produce conditioned images, combining conditioned images to produce a merged image of an experiment, and segmenting the merged image in preparation for reassembly.

14. The computer-readable medium of claim 13, wherein the method further comprises removing streaks from the LC/MS image formed from the original centroid data along a retention time dimension, which streaks are formed from usage of the bin width rate of change to calculate various bin widths of the original centroid data in a mass/charge dimension.

15. The computer-readable medium of claim 14, wherein the method further comprises refining peak boundaries on the LC/MS image by analyzing the original centroid data to correct for loss of centroid precision associated with use of the various bin widths in the mass/charge dimension.

16. The computer-readable medium of claim 14, wherein the method further comprises selecting centroids to form the at least one cluster of centroids; and using the at least one cluster of centroids to refine the peak boundaries on the LC/MS image.

17. The computer-readable medium of claim 16, wherein the method further comprises regaining the centroid precision by using the at least one cluster of centroids to redefine mass/charge centers, retention time centers, and apexes of peaks.

18. The computer-readable medium of claim 17, wherein the method further comprises calculating an integrated intensity for a peak at a particular retention time by calculating a center of mass based on a number of intensity values for the peak at the particular retention time.

19. The computer-readable medium of claim 18, wherein the method further comprises resplitting peaks that were merged.

20. The computer-readable medium of claim 19, wherein resplitting peaks includes resolving peaks that were merged into individual peaks by identifying more than one significant cluster masked by a peak from the LC/MS image.

* * * * *